US011621913B2

(12) United States Patent
Dutta

(10) Patent No.: US 11,621,913 B2
(45) **Date of Patent: *Apr. 4, 2023**

(54) PATH COMPRESSION IN ROUTING OF SOURCE ROUTED PACKETS

(71) Applicant: Nokia Solutions and Networks Oy, Espoo (FI)

(72) Inventor: Pranjal Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/469,455

(22) PCT Filed: Jun. 14, 2018

(86) PCT No.: PCT/IB2018/000737

§ 371 (c)(1),
(2) Date: Jun. 13, 2019

(87) PCT Pub. No.: WO2019/239172

PCT Pub. Date: Dec. 19, 2019

(65) Prior Publication Data

US 2021/0320861 A1 Oct. 14, 2021

(51) Int. Cl.
*H04L 45/00* (2022.01)
*H04L 45/50* (2022.01)

(52) U.S. Cl.
CPC .............. *H04L 45/34* (2013.01); *H04L 45/22* (2013.01); *H04L 45/50* (2013.01)

(58) Field of Classification Search
CPC combination set(s) only.
See application file for complete search history.

(56) References Cited

U.S. PATENT DOCUMENTS 9,444,676 B2 * 9/2016 Lindem, III ........ H04L 41/0663
9,485,150 B2 11/2016 Filsfils et al.
(Continued)

OTHER PUBLICATIONS

Gredler, H. et al., "North-Bound Distribution of Link-State and Traffic Engineering (TE) Information Using BGP", Internet Engineering Task Force, RFC 7752, Mar. 2016, 48 pages.
(Continued)

*Primary Examiner* — Xavier S Wong
(74) *Attorney, Agent, or Firm* — Tong, Rea, Bentley & Kim, LLC

(57) ABSTRACT

Various example embodiments relate generally to supporting path compression in routing of source routed packets in communication networks. Various example embodiments for supporting path compression in routing of source routed packets may be configured to support path compression in routing of source routed packets based on use of various source routing protocols which may be based on various underlying communication protocols. Various example embodiments for supporting path compression in routing of source routed packets may be configured to support path compression in routing of source routed packets based on encoding of a set of hops within a header of a source routed packet using a path identifier (e.g., a path label, a path address, or the like) representing the set of hops (e.g., a set of hops providing a segment of the path, a set of hops providing a protection path configured to protect a portion of the path, or the like).

20 Claims, 102 Drawing Sheets

(56) References Cited

U.S. PATENT DOCUMENTS

| | | | | |
|---|---|---|---|---|
| 10,171,343 | B2 * | 1/2019 | Abdallah | H04W 40/246 |
| 2002/0091855 | A1 | 7/2002 | Yemini et al. | |
| 2004/0190517 | A1 | 9/2004 | Gupta | |
| 2005/0281259 | A1 | 12/2005 | Mitchell | |
| 2007/0115913 | A1 | 5/2007 | Li et al. | |
| 2007/0274286 | A1 | 11/2007 | Krishnan | |
| 2009/0245149 | A1 | 10/2009 | Xia et al. | |
| 2011/0116506 | A1 * | 5/2011 | Su | H04L 45/22 370/392 |
| 2011/0128975 | A1 | 6/2011 | Kang | |
| 2011/0216656 | A1 | 9/2011 | Pratt, Jr. et al. | |
| 2012/0198064 | A1 | 8/2012 | Boutros | |
| 2013/0301656 | A1 | 11/2013 | Park et al. | |
| 2013/0336315 | A1 | 12/2013 | Guichard et al. | |
| 2014/0169211 | A1 | 6/2014 | Harper et al. | |
| 2014/0269714 | A1 | 9/2014 | Bryant et al. | |
| 2014/0280711 | A1 * | 9/2014 | Asati | H04L 67/10 709/217 |
| 2015/0003458 | A1 | 1/2015 | Li et al. | |
| 2015/0003463 | A1 | 1/2015 | Li et al. | |
| 2015/0029837 | A1 | 1/2015 | Ashwood-Smith | |
| 2015/0109904 | A1 | 4/2015 | Filsfils et al. | |
| 2015/0180771 | A1 * | 6/2015 | Ashwood-Smith | H04L 45/566 370/230 |
| 2015/0207736 | A1 | 7/2015 | Roch et al. | |
| 2015/0271059 | A1 * | 9/2015 | Chunduri | H04L 45/22 370/400 |
| 2015/0372903 | A1 * | 12/2015 | Hui | H04L 61/2592 370/218 |
| 2016/0269298 | A1 | 9/2016 | Li et al. | |
| 2017/0126545 | A1 * | 5/2017 | Yi | H04L 45/22 |
| 2017/0134268 | A1 * | 5/2017 | Easale | H04L 47/20 |
| 2017/0353382 | A1 | 12/2017 | Gupta et al. | |
| 2018/0205642 | A1 | 7/2018 | Li | |
| 2021/0306257 | A1 * | 9/2021 | Dutta | H04L 45/741 |

OTHER PUBLICATIONS

Filsfils, C. et al., "Segment Routing Architecture," draft-ietf-spring-segment-routing-12, Network Working Group, Jun. 20, 2017, 28 pages.
Rosen, E. et al., "Multiprotocol Label Switching Architecture," Network Working Group, RFC 3031, Jan. 2001, 57 pages.
Iana, "Special-Purpose Multiprotocol Label Switching (MPLS) Label Values," https://www.iana.org/assignments/mpls-label-values/mpls-label-values.xhtml), printed on Nov. 26, 2018, 2 pages.
Iana, "IEEE 802 Numbers," https://www.iana.org/assignments/ieee-802-numbers/ieee-802-numbers.xhtm, printed on Nov. 26, 2018, 15 pages.
Previdi, S., et al., "IS-IS Extensions for Segment Routing," draft-ietf-isis-segment-routing-extensions-16, IS-IS for IP Internets, Apr. 19, 2018, 35 pages.
Psenak, P., et al., "OSPF Extensions for Segment Routing," draft-ietf-ospf-segment-routing-extensions-19, Open Shortest Path First IGP, Aug. 25, 2017, 28 pages.
Lindem, A., et al., "Extensions to OSPF for Advertising Optional Router Capabilities," Internet Engineering Rask Force, RFC 7770, Feb. 2016, 15 pages.
Psenak, P., et al., "OSPFv3 Extensions for Segment Routing," draft-ietf-ospf-ospfv3-segment-routing-extensions-10, Open Shortest Path First IGP, Sep. 5, 2017, 36 pages.
Lindem, A., et al., "Extensions to OSPF for Advertising Optional Router Capabilities," Network Working Group, RFC 4970, Jul. 2007, 13 pages.
Previdi, S., et al., "BGP Link-State Extensions for Segment Routing," draft-ietf-idr-bgo-ls-segment-routing-ext-03, Inter-Domain Routing, Jul. 26, 2017, 27 pages.
Iana, "Border Gateway Protocol—Link State (BGP-LS) Parameters," https://www.iana.org/assignments/bgp-ls-parameters/bgp-ls-parameters.xhtml, printed on Nov. 26, 2018, 6 pages.
Andersson, L. et al., "LDP Specification," Network Working Group, RFC 5036, Oct. 2007, 135 pages.
Thomas, B. et al., "LDP Capabilities," Network Working Group, RFC 5561, Jul. 2009, 12 pages.
Iana, "Label Distribution Protocol (LDP) Parameters," https://www.iana.org/assignments/ldp-namespaces/ldp-namespaces.xhtml, printed on Nov. 26, 2018, 13 pages.
Awduche, D., et al., "RSVP-TE: Extensions to RSVP for LSP Tunnels," Network Working Group, RFC 3209, Dec. 2001, 61 pages.
Rekhter, Y., et al., "Carrying Label Information in BGP-4," Network Working Group, RFC 3107, May 2001, 8 pages.
Iana, "Subsequent Address Family Identifiers (SAFI) Parameters," https://www.iana.org/assignments/safi-namespace/safi-namespace.xhtml, printed on Nov. 26, 2018, 2 pages.
Filsils, C. et al., "Segment Routing with MPLS Data Plane," draft-ietf-spring-segment-routing-mpls-10, Network Working Group, Jun. 22, 2017.
Filsfils, C. et al., "Segment Routing Policy for Traffic Engineering," draft-filsfils-spring-segment-routing-policy-01.txt, Network Working Group, Jul. 3, 2017, 31 pages.
Atlas, A. et al., "Basic Specification for IP Fast Reroute: Loop-Free Alternates," Network Working Group, RFC 5286, Sep. 2008, 32 pages.
Bryant, S., et al., "Remote Loop-Free Alternate (LFA) Fast Reroute (FRR)," Internet Engineering Task Force, RFC 7490, Apr. 2015, 30 pages.
Francois, P., et al., "Topology Independent Fast reroute using Segment Routing," draft-francois-segment-routing-ti-lfa-00, Network Working Group, Nov. 18, 2013, 11 pages.
Pan, P. et al., "Fast Reroute Extensions to RSVP-TE for LSP Tunnels," Network Working Group, RFC 4090, May 2005, 39 pages.
Deering, S., et al., "Internet Protocol, Version 6 (IPv6) Specification," Network Working Group, RFC 2460, Dec. 1998, 37 pages.
Previdi, S. et al., "IPv6 Segment Routing Header (SRH)," draft-ietf-6man-segment-routing-header-07, Network Working Group, Jul. 20, 2017, 34 pages.
Iana, "Internet Protocol Version 6 (IPv6) Parameters," https://www.iana.org/assignments/ipv6-parameters/ipv6-parameters.xhtml, printed on Jun. 10, 2019, 4 pages.
Ginsberg, L. et al., "IS-IS Extensions for advertising Router Information," Internet Engineering Rask Force, RFC 7981, Oct. 2016, 11 pages.
Information Sciences Institute, University of Southern California, "DARPA Internet Program Protocol Specification," Internet Protocol, RFC 791, Sep. 1981, 89 pages.
Iana, "Internet Protocol Version 4 (IPv4) Parameters," https://www.iana.org/assignments/ip-parameters/ip-parameters.xhtml, printed on Jun. 10, 2019, 3 pages.
Iana, "Protocol Numbers," https://www.iana.org/assignments/protocol-numbers/protocol-numbers.xhtml, printed on Jun. 10, 2019, 10 pages.
Katz, D., "IP Router Alert Option," Network Working Group, RFC 2113, Feb. 1997, 4 pages.
Iana, "Iana IPv4 Special-Purpose Address Registry," https://www.iana.org/assignments/iana-ipv4-special-registry/iana-ipv4-special-registry.xhtml, printed on Jun. 10, 2019, 2 pages.
Oran, D., "OSI IS-IS Intra-domain Routing Protocol," Network Working Group, RFC 1142, Feb. 1990, 205 pages.
Iana, "IS-IS TLV Codepoints," https://www.iana.org/assignments/isis-tlv-codepoints/isis-tlv-codepoints.xhtml, printed on Jun. 11, 2019, 14 pages.
Berger, L. et al., "The OSPF Opaque LSA Option," Network Working Group, RFC 5250, Jul. 2008, 18 pages.
Hinden, R. et al., "Unique Local IPv6 Unicast Addresses," Network Working Group, RFC 4193, Oct. 2005, 17 pages.
Iana, "Iana IPv6 Special-Purpose Address Registry," https://www.iana.org/assignments/iana-ipv6-special-registry/iana-ipv6-special-registry.xhtml, printed on Jun. 11, 2019, 2 pages.
Hinden R. et al., "IP Version 6 Addressing Architecture," Network Working Group, RFC 4291, Feb. 2006, 26 pages.

(56) References Cited

OTHER PUBLICATIONS

Coltun, R., et al., "OSPF for IPv6," Network Working Group, RFC 5340, Jul. 2008, 95 pages.
Filsfils, C. et al., "Segment Routing with MPLS Data Plane," draft-ietf-spring-segment-routing-mpls-11, Network Working Group, Oct. 2017, 19 pages.
Moy, J., "OSPF Version 2," Network Working Group, RFC 2328, Apr. 1998, 244 pages.
Psenak, P. et al., "OSPF Extensions for Segment Routing," draft-ietf-ospf-segment-routing-extensions-24, Open Shortest Path First IGP, Dec. 14, 2017, 30 pages.
Psenak, P. et al., "Multi-Topology (MT) Routing in OSPF," Network Working Group, RFC 4915, Jun. 2007, 21 pages.
Braden, R. et al., "Resource Reservation Protocol—Version 1 Functional Specification," Network Working Group, RFC 2205, Sep. 1997, 112 pages.
Reynolds, J. et al., "Assigned Numbers," Network Working Group, RFC 1700, Oct. 1994, 230 pages.
International Search Report and Written Opinion mailed in corresponding PCT/IB2018/000737 dated Feb. 4, 2019, 14 pages.
Cicic, T., et al., "Redundant Trees for Fast IP Recovery," 2007 Fourth International Conference on Broadband Communications, Networks and Systems (BROADNETS '07), Sep. 10, 2007, pp. 152-159.

* cited by examiner

FIG. 18

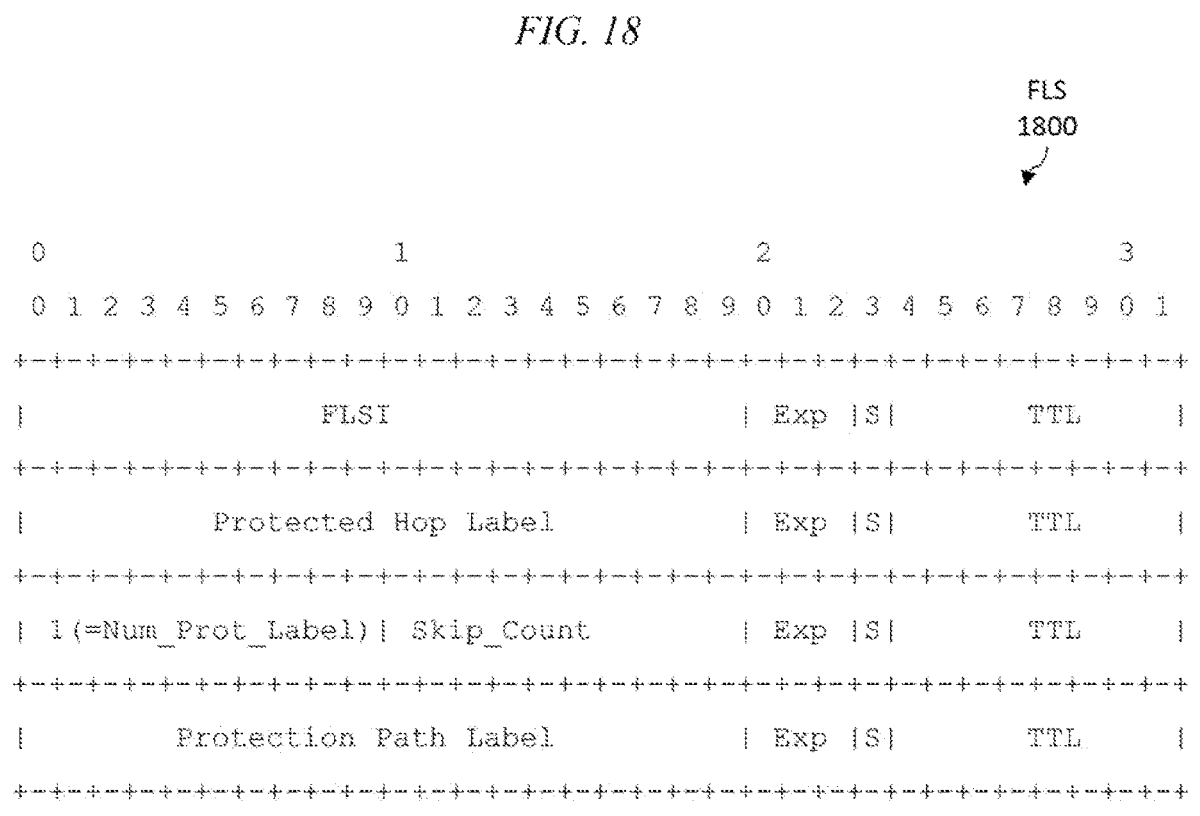

FLS
1800

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                FLSI                   | Exp |S|       TTL     |
+-+-+-+-+-+-+-+-+-+-+-+-+-+-+-+-+-+-+-+-+-+-+-+-+-+-+-+-+-+-+-+-+
|          Protected Hop Label          | Exp |S|       TTL     |
+-+-+-+-+-+-+-+-+-+-+-+-+-+-+-+-+-+-+-+-+-+-+-+-+-+-+-+-+-+-+-+-+
| 1(=Num_Prot_Label)| Skip_Count        | Exp |S|       TTL     |
+-+-+-+-+-+-+-+-+-+-+-+-+-+-+-+-+-+-+-+-+-+-+-+-+-+-+-+-+-+-+-+-+
|        Protection Path Label          | Exp |S|       TTL     |
+-+-+-+-+-+-+-+-+-+-+-+-+-+-+-+-+-+-+-+-+-+-+-+-+-+-+-+-+-+-+-+-+
```

*FIG. 20*

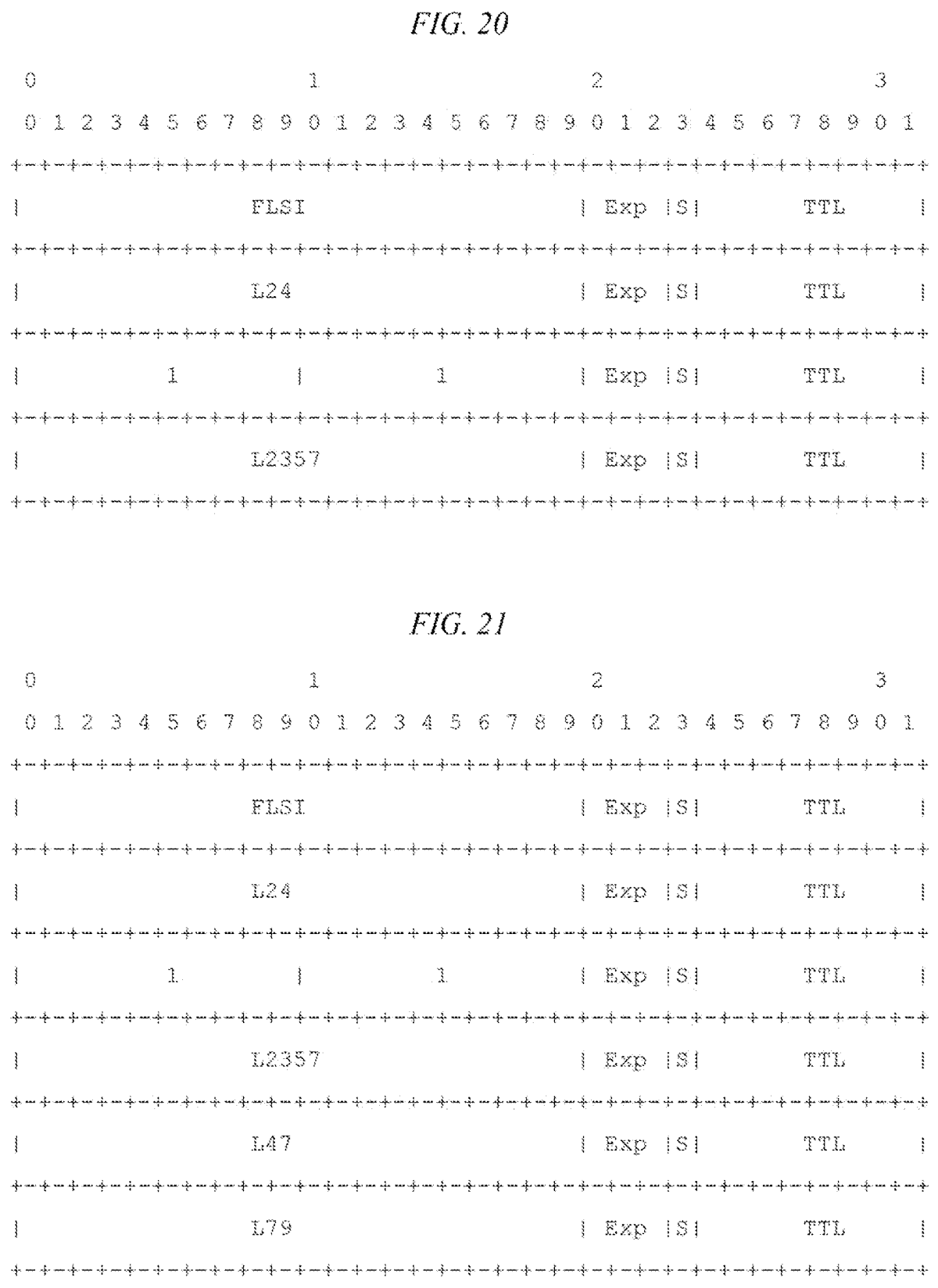

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                FLSI                   | Exp |S|       TTL     |
+-+-+-+-+-+-+-+-+-+-+-+-+-+-+-+-+-+-+-+-+-+-+-+-+-+-+-+-+-+-+-+-+
|                L24                    | Exp |S|       TTL     |
+-+-+-+-+-+-+-+-+-+-+-+-+-+-+-+-+-+-+-+-+-+-+-+-+-+-+-+-+-+-+-+-+
|          1         |          1       | Exp |S|       TTL     |
+-+-+-+-+-+-+-+-+-+-+-+-+-+-+-+-+-+-+-+-+-+-+-+-+-+-+-+-+-+-+-+-+
|                L2357                  | Exp |S|       TTL     |
+-+-+-+-+-+-+-+-+-+-+-+-+-+-+-+-+-+-+-+-+-+-+-+-+-+-+-+-+-+-+-+-+
```

*FIG. 21*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                FLSI                   | Exp |S|       TTL     |
+-+-+-+-+-+-+-+-+-+-+-+-+-+-+-+-+-+-+-+-+-+-+-+-+-+-+-+-+-+-+-+-+
|                L24                    | Exp |S|       TTL     |
+-+-+-+-+-+-+-+-+-+-+-+-+-+-+-+-+-+-+-+-+-+-+-+-+-+-+-+-+-+-+-+-+
|          1         |          1       | Exp |S|       TTL     |
+-+-+-+-+-+-+-+-+-+-+-+-+-+-+-+-+-+-+-+-+-+-+-+-+-+-+-+-+-+-+-+-+
|                L2357                  | Exp |S|       TTL     |
+-+-+-+-+-+-+-+-+-+-+-+-+-+-+-+-+-+-+-+-+-+-+-+-+-+-+-+-+-+-+-+-+
|                L47                    | Exp |S|       TTL     |
+-+-+-+-+-+-+-+-+-+-+-+-+-+-+-+-+-+-+-+-+-+-+-+-+-+-+-+-+-+-+-+-+
|                L79                    | Exp |S|       TTL     |
+-+-+-+-+-+-+-+-+-+-+-+-+-+-+-+-+-+-+-+-+-+-+-+-+-+-+-+-+-+-+-+-+
```

*FIG. 22*

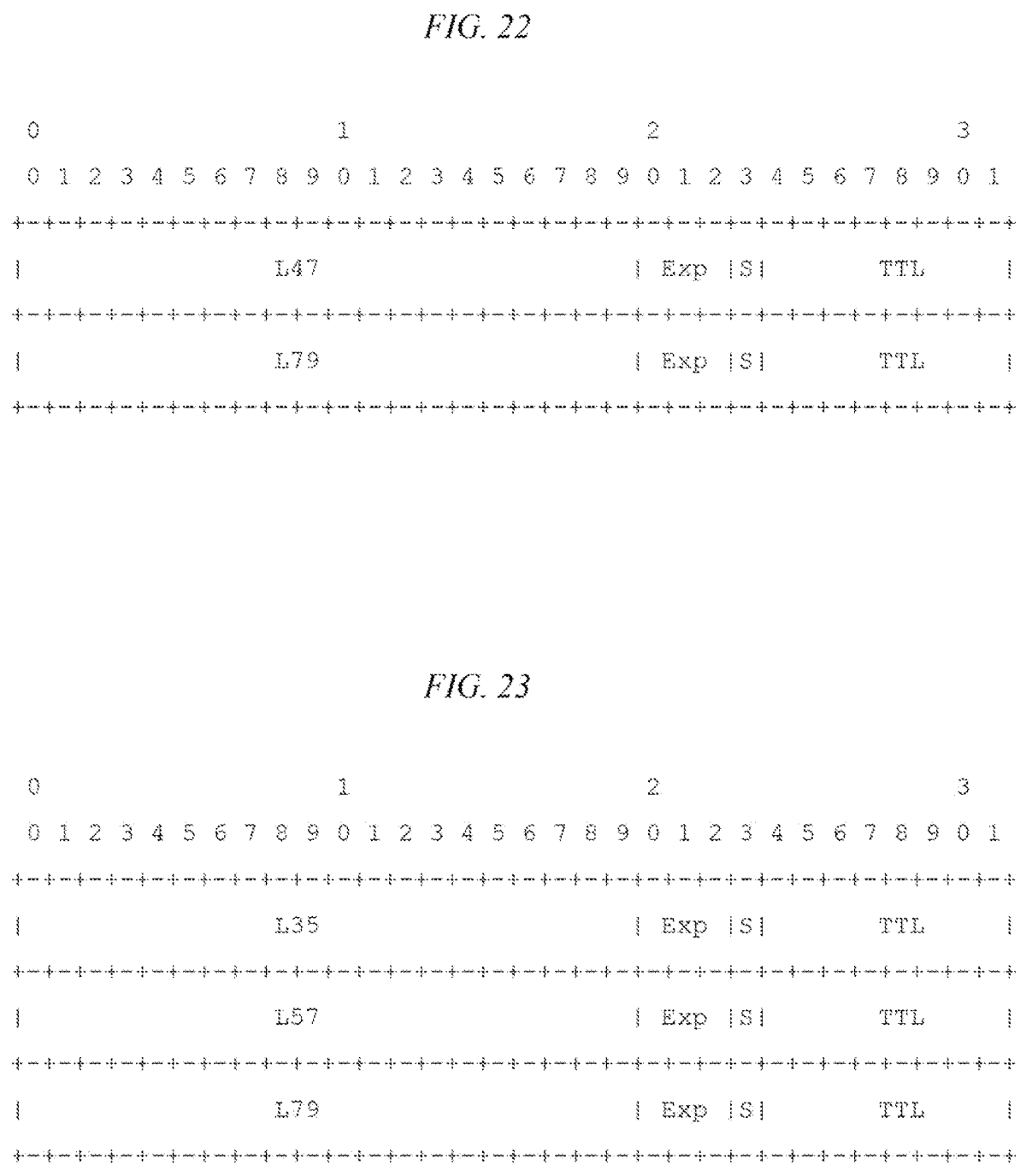

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                L47                    | Exp |S|       TTL     |
+-+-+-+-+-+-+-+-+-+-+-+-+-+-+-+-+-+-+-+-+-+-+-+-+-+-+-+-+-+-+-+-+
|                L79                    | Exp |S|       TTL     |
+-+-+-+-+-+-+-+-+-+-+-+-+-+-+-+-+-+-+-+-+-+-+-+-+-+-+-+-+-+-+-+-+
```

*FIG. 23*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                L35                    | Exp |S|       TTL     |
+-+-+-+-+-+-+-+-+-+-+-+-+-+-+-+-+-+-+-+-+-+-+-+-+-+-+-+-+-+-+-+-+
|                L57                    | Exp |S|       TTL     |
+-+-+-+-+-+-+-+-+-+-+-+-+-+-+-+-+-+-+-+-+-+-+-+-+-+-+-+-+-+-+-+-+
|                L79                    | Exp |S|       TTL     |
+-+-+-+-+-+-+-+-+-+-+-+-+-+-+-+-+-+-+-+-+-+-+-+-+-+-+-+-+-+-+-+-+
```

*FIG. 24*

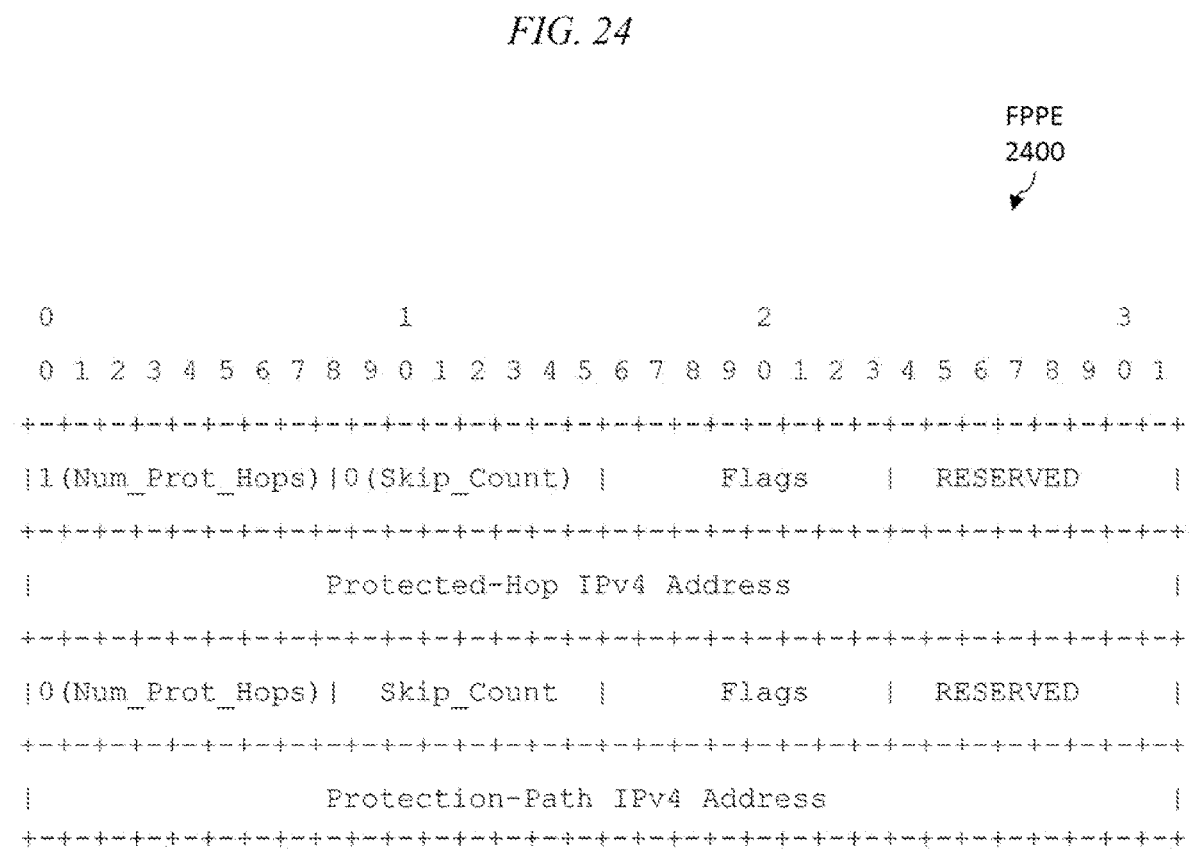

FPPE
2400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count)  |      Flags     |  RESERVED     |
+-+-+-+-+-+-+-+-+-+-+-+-+-+-+-+-+-+-+-+-+-+-+-+-+-+-+-+-+-+-+-+-+
|                Protected-Hop IPv4 Address                      |
+-+-+-+-+-+-+-+-+-+-+-+-+-+-+-+-+-+-+-+-+-+-+-+-+-+-+-+-+-+-+-+-+
|0(Num_Prot_Hops)|  Skip_Count   |      Flags     |  RESERVED     |
+-+-+-+-+-+-+-+-+-+-+-+-+-+-+-+-+-+-+-+-+-+-+-+-+-+-+-+-+-+-+-+-+
|                Protection-Path IPv4 Address                    |
+-+-+-+-+-+-+-+-+-+-+-+-+-+-+-+-+-+-+-+-+-+-+-+-+-+-+-+-+-+-+-+-+
```

FIG. 26

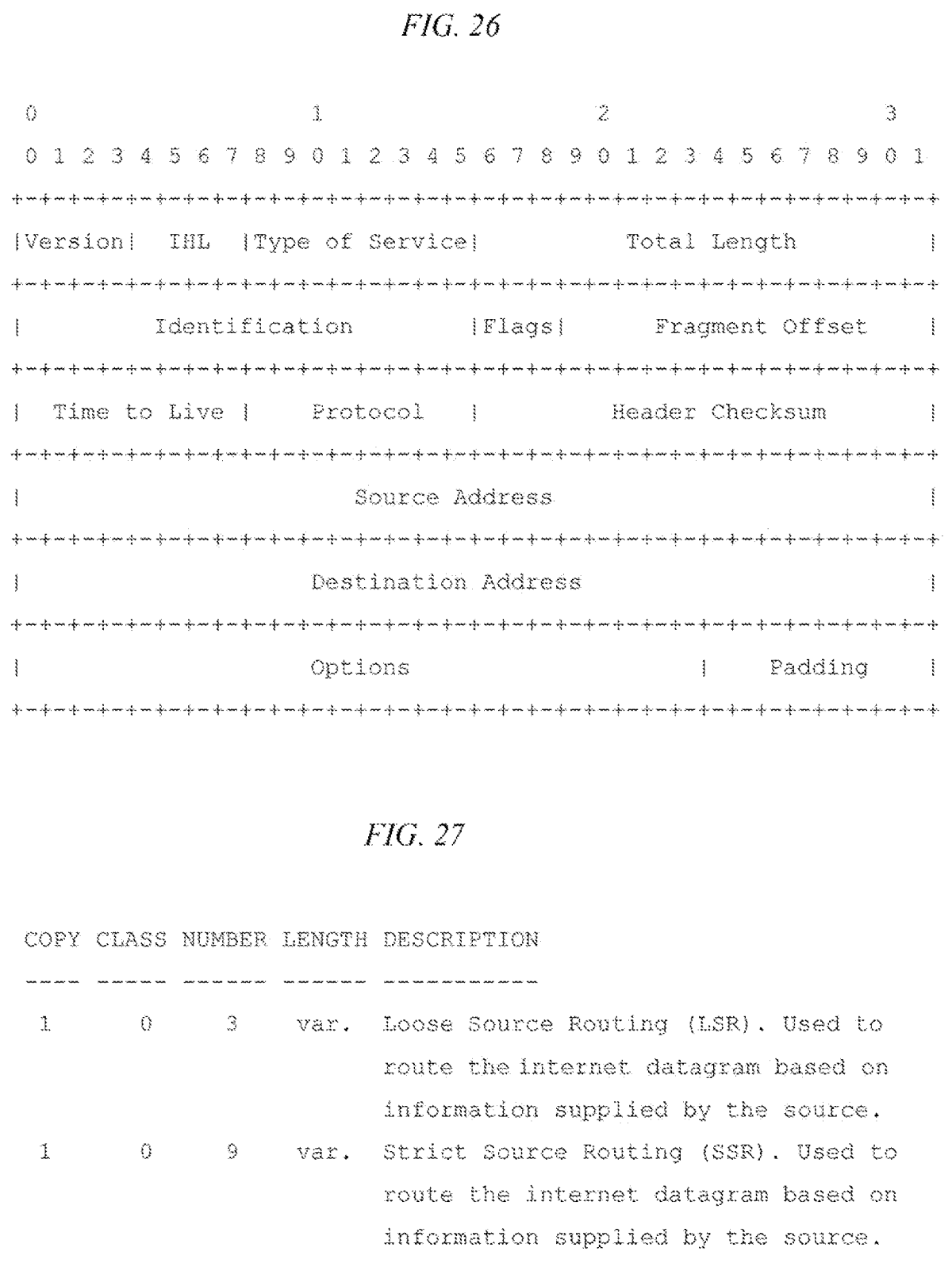

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+
|                       Source Address                          |
+-+-+-+-+-+-+-+-+-+-+-+-+-+-+-+-+-+-+-+-+-+-+-+-+-+-+-+-+-+-+-+-+
|                    Destination Address                        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

FIG. 27

```
COPY CLASS NUMBER LENGTH DESCRIPTION
---- ----- ------ ------ -----------
 1     0     3     var.  Loose Source Routing (LSR). Used to
                         route the internet datagram based on
                         information supplied by the source.
 1     0     9     var.  Strict Source Routing (SSR). Used to
                         route the internet datagram based on
                         information supplied by the source.
```

FIG. 28

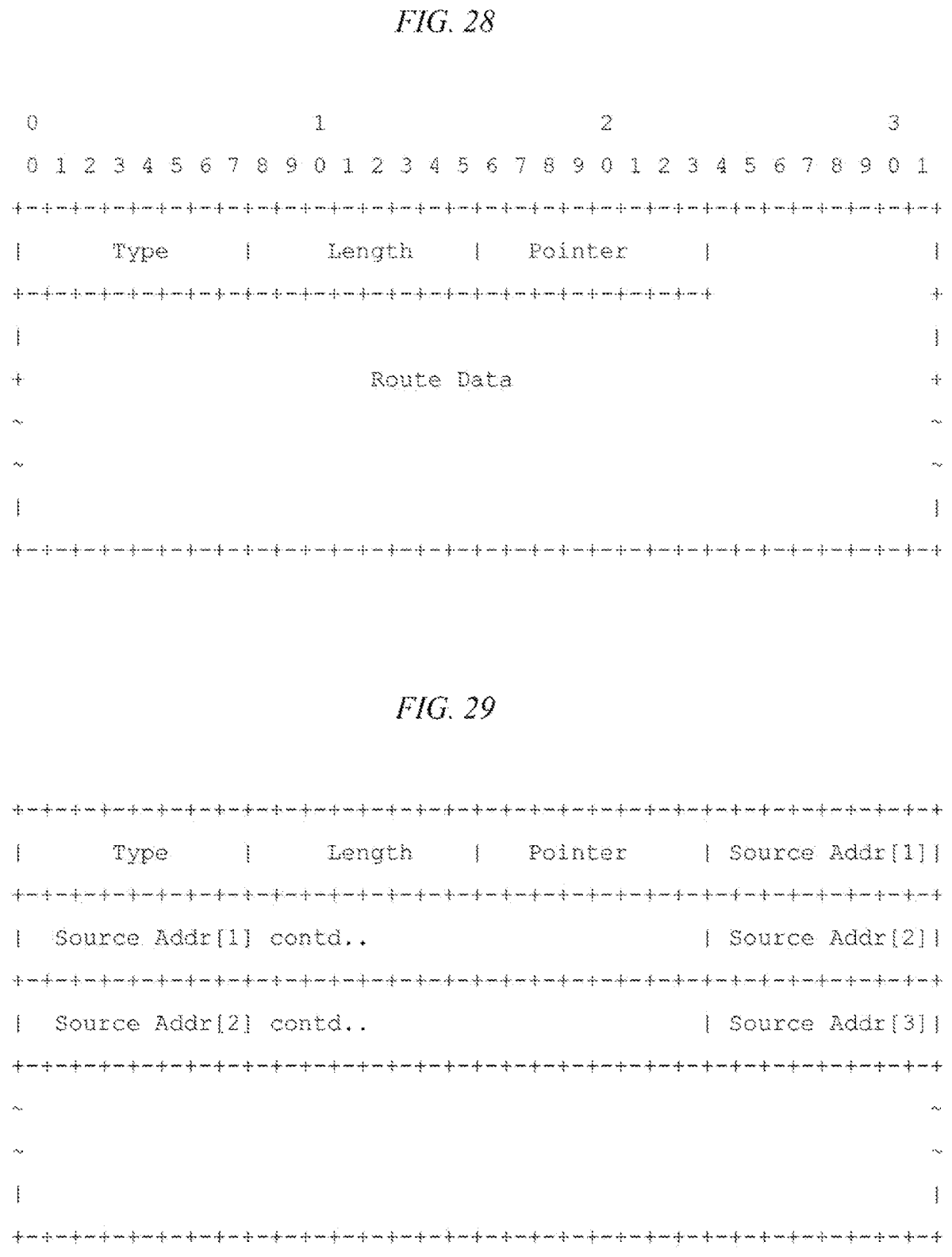

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |    Pointer    |               |
+-+-+-+-+-+-+-+-+-+-+-+-+-+-+-+-+-+-+-+-+-+-+-+-+               +
|                                                               |
+                          Route Data                           +
~                                                               ~
~                                                               ~
|                                                               |
+-+-+-+-+-+-+-+-+-+-+-+-+-+-+-+-+-+-+-+-+-+-+-+-+-+-+-+-+-+-+-+-+
```

FIG. 29

```
+-+-+-+-+-+-+-+-+-+-+-+-+-+-+-+-+-+-+-+-+-+-+-+-+-+-+-+-+-+-+-+-+
|     Type      |    Length     |    Pointer    | Source Addr[1]|
+-+-+-+-+-+-+-+-+-+-+-+-+-+-+-+-+-+-+-+-+-+-+-+-+-+-+-+-+-+-+-+-+
|  Source Addr[1] contd..                       | Source Addr[2]|
+-+-+-+-+-+-+-+-+-+-+-+-+-+-+-+-+-+-+-+-+-+-+-+-+-+-+-+-+-+-+-+-+
|  Source Addr[2] contd..                       | Source Addr[3]|
+-+-+-+-+-+-+-+-+-+-+-+-+-+-+-+-+-+-+-+-+-+-+-+-+-+-+-+-+-+-+-+-+
~                                                               ~
~                                                               ~
|                                                               |
+-+-+-+-+-+-+-+-+-+-+-+-+-+-+-+-+-+-+-+-+-+-+-+-+-+-+-+-+-+-+-+-+
```

FIG. 30

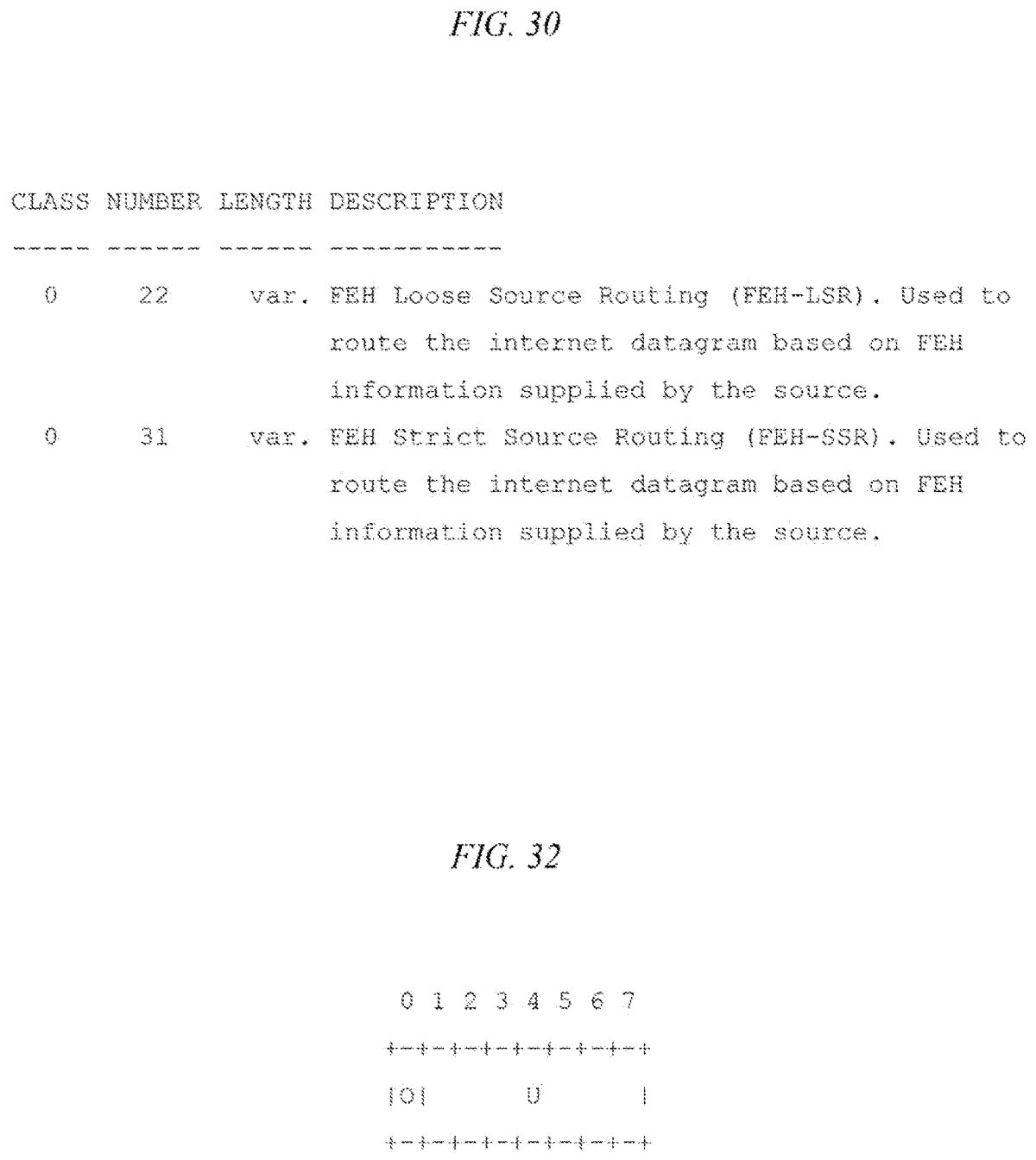

| CLASS | NUMBER | LENGTH | DESCRIPTION |
|---|---|---|---|
| 0 | 22 | var. | FEH Loose Source Routing (FEH-LSR). Used to route the internet datagram based on FEH information supplied by the source. |
| 0 | 31 | var. | FEH Strict Source Routing (FEH-SSR). Used to route the internet datagram based on FEH information supplied by the source. |

```
 0 1 2 3 4 5 6 7
+-+-+-+-+-+-+-+-+
|O|      U      |
+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     | Segments Left |     Flags     |
+-+-+-+-+-+-+-+-+-+-+-+-+-+-+-+-+-+-+-+-+-+-+-+-+-+-+-+-+-+-+-+-+
|                                                               |
+                     IPV4-FEH List[1]                          +
|                                                               |
+-+-+-+-+-+-+-+-+-+-+-+-+-+-+-+-+-+-+-+-+-+-+-+-+-+-+-+-+-+-+-+-+

.                               .                               .
.                               .                               .
.                               .                               .
+-+-+-+-+-+-+-+-+-+-+-+-+-+-+-+-+-+-+-+-+-+-+-+-+-+-+-+-+-+-+-+-+
|                                                               |
+                      IPV4-FEH List[n]                         +
|                                                               |
+-+-+-+-+-+-+-+-+-+-+-+-+-+-+-+-+-+-+-+-+-+-+-+-+-+-+-+-+-+-+-+-+
```

*FIG. 33*

```
 0                   1                   2                   3
+-+-+-+-+-+-+-+-+-+-+-+-+-+-+-+-+-+-+-+-+-+-+-+-+-+-+-+-+-+-+-+-+
| Num Prot Hops |   Skip_Count  |     Flags     |  RESERVED     |
+-+-+-+-+-+-+-+-+-+-+-+-+-+-+-+-+-+-+-+-+-+-+-+-+-+-+-+-+-+-+-+-+
|                         IPv4 Address                          |
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
|R|P|    U      |
+-+-+-+-+-+-+-+-+
```

Figure 35:
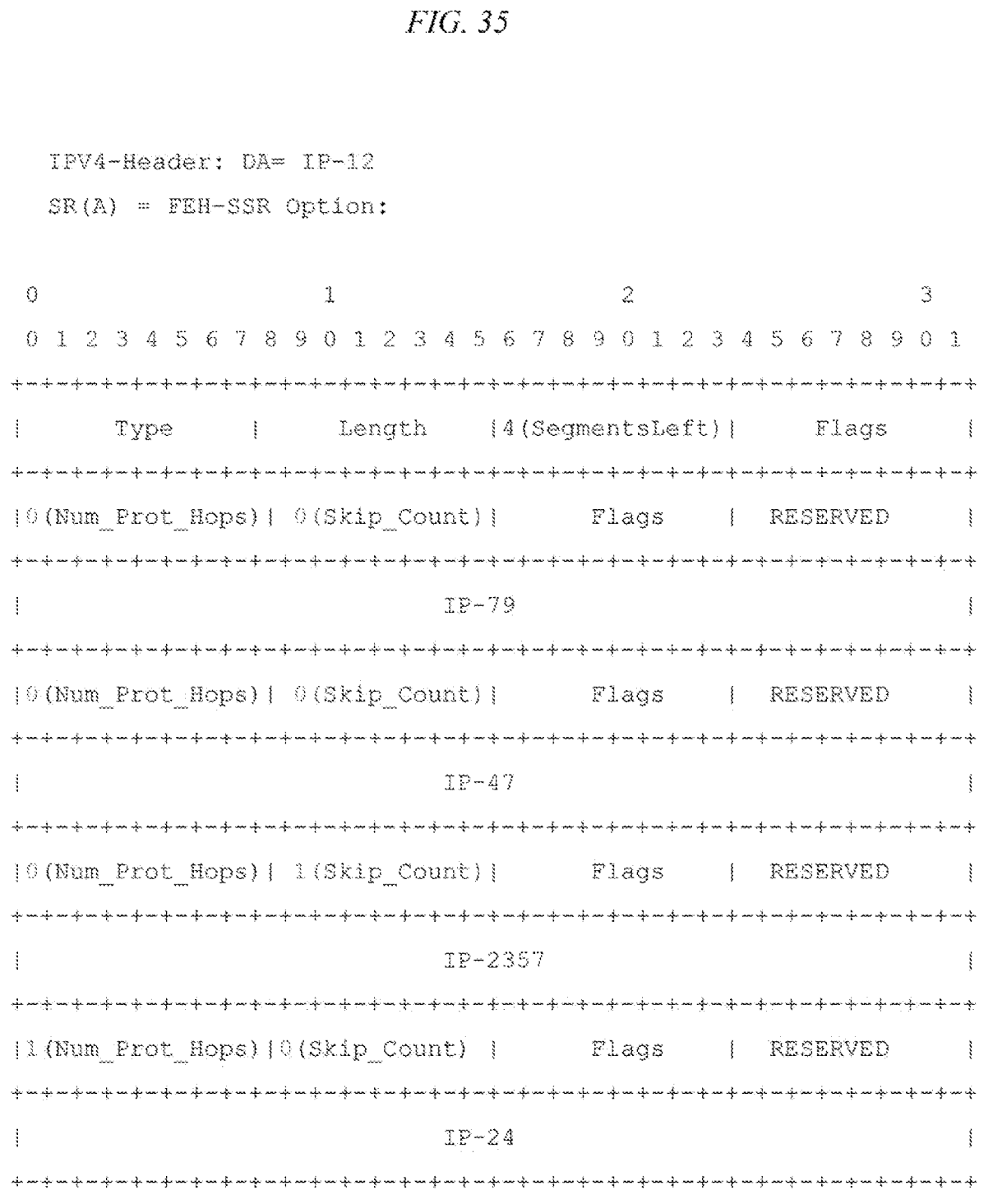

```
IPV4-Header: DA= IP-12
SR(A) = FEH-SSR Option:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type       |     Length      |4(SegmentsLeft)|     Flags     |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|     Flags     |  RESERVED     |
+-+-+-+-+-+-+-+-+-+-+-+-+-+-+-+-+-+-+-+-+-+-+-+-+-+-+-+-+-+-+-+-+
|                             IP-79                             |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|     Flags     |  RESERVED     |
+-+-+-+-+-+-+-+-+-+-+-+-+-+-+-+-+-+-+-+-+-+-+-+-+-+-+-+-+-+-+-+-+
|                             IP-47                             |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|     Flags     |  RESERVED     |
+-+-+-+-+-+-+-+-+-+-+-+-+-+-+-+-+-+-+-+-+-+-+-+-+-+-+-+-+-+-+-+-+
|                             IP-2357                           |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |     Flags     |  RESERVED     |
+-+-+-+-+-+-+-+-+-+-+-+-+-+-+-+-+-+-+-+-+-+-+-+-+-+-+-+-+-+-+-+-+
|                             IP-24                             |
+-+-+-+-+-+-+-+-+-+-+-+-+-+-+-+-+-+-+-+-+-+-+-+-+-+-+-+-+-+-+-+-+
```

*FIG. 36*

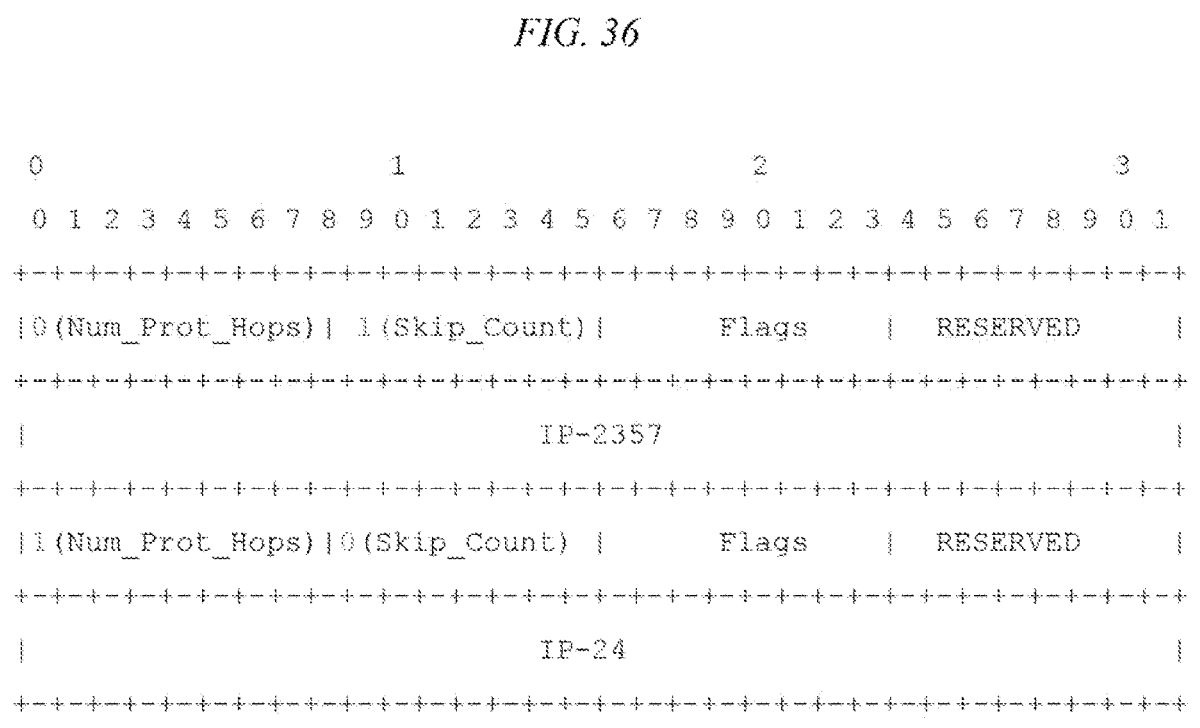

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|       Flags     |  RESERVED    |
+-+-+-+-+-+-+-+-+-+-+-+-+-+-+-+-+-+-+-+-+-+-+-+-+-+-+-+-+-+-+-+-+
|                             IP-2357                            |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |       Flags     |  RESERVED    |
+-+-+-+-+-+-+-+-+-+-+-+-+-+-+-+-+-+-+-+-+-+-+-+-+-+-+-+-+-+-+-+-+
|                             IP-24                              |
+-+-+-+-+-+-+-+-+-+-+-+-+-+-+-+-+-+-+-+-+-+-+-+-+-+-+-+-+-+-+-+-+
```

FIG. 37

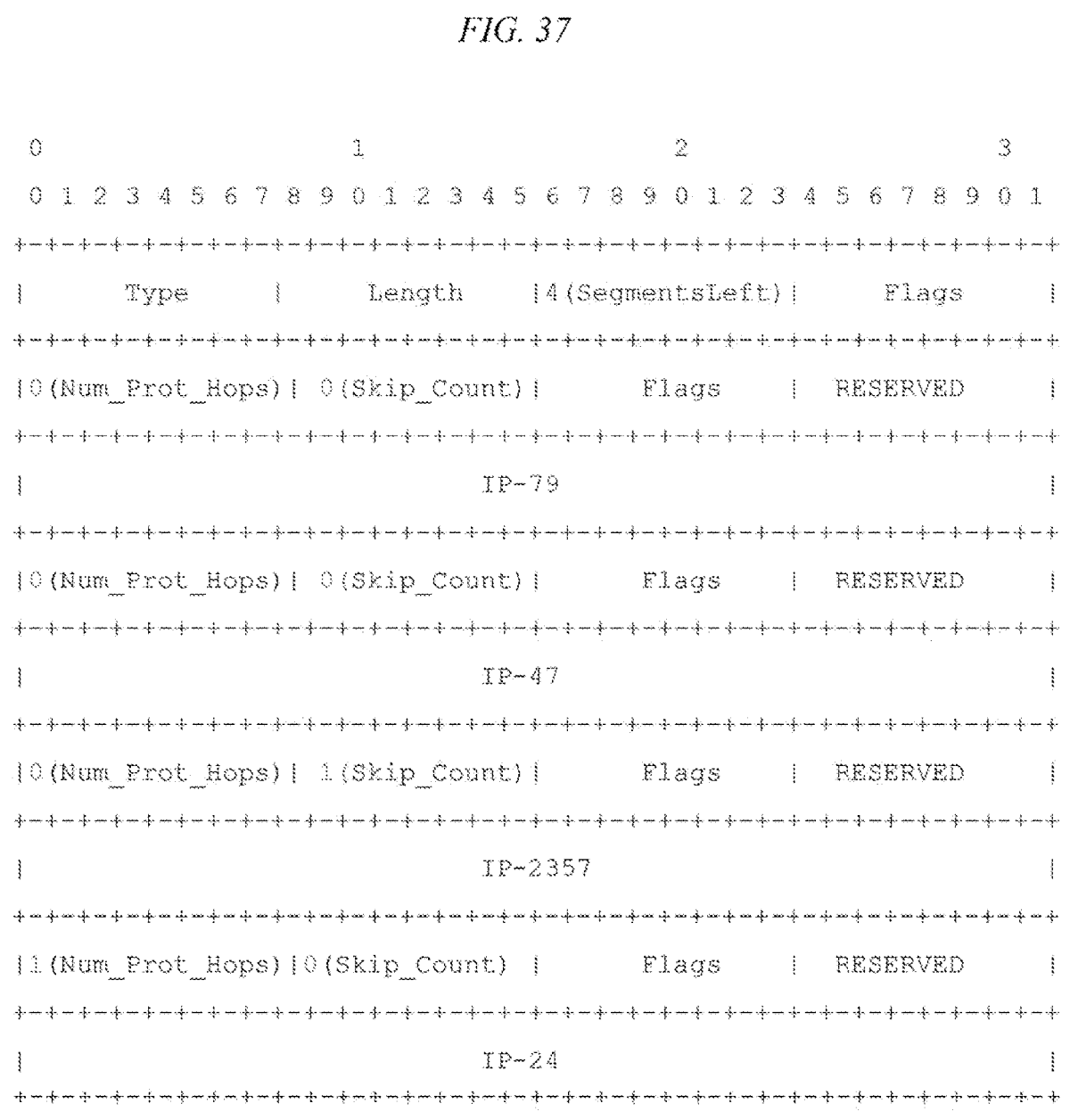

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |4(SegmentsLeft)|     Flags     |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|     Flags     |  RESERVED     |
+-+-+-+-+-+-+-+-+-+-+-+-+-+-+-+-+-+-+-+-+-+-+-+-+-+-+-+-+-+-+-+-+
|                             IP-79                             |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|     Flags     |  RESERVED     |
+-+-+-+-+-+-+-+-+-+-+-+-+-+-+-+-+-+-+-+-+-+-+-+-+-+-+-+-+-+-+-+-+
|                             IP-47                             |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|     Flags     |  RESERVED     |
+-+-+-+-+-+-+-+-+-+-+-+-+-+-+-+-+-+-+-+-+-+-+-+-+-+-+-+-+-+-+-+-+
|                             IP-2357                           |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |     Flags     |  RESERVED     |
+-+-+-+-+-+-+-+-+-+-+-+-+-+-+-+-+-+-+-+-+-+-+-+-+-+-+-+-+-+-+-+-+
|                             IP-24                             |
+-+-+-+-+-+-+-+-+-+-+-+-+-+-+-+-+-+-+-+-+-+-+-+-+-+-+-+-+-+-+-+-+
```

*FIG. 38*

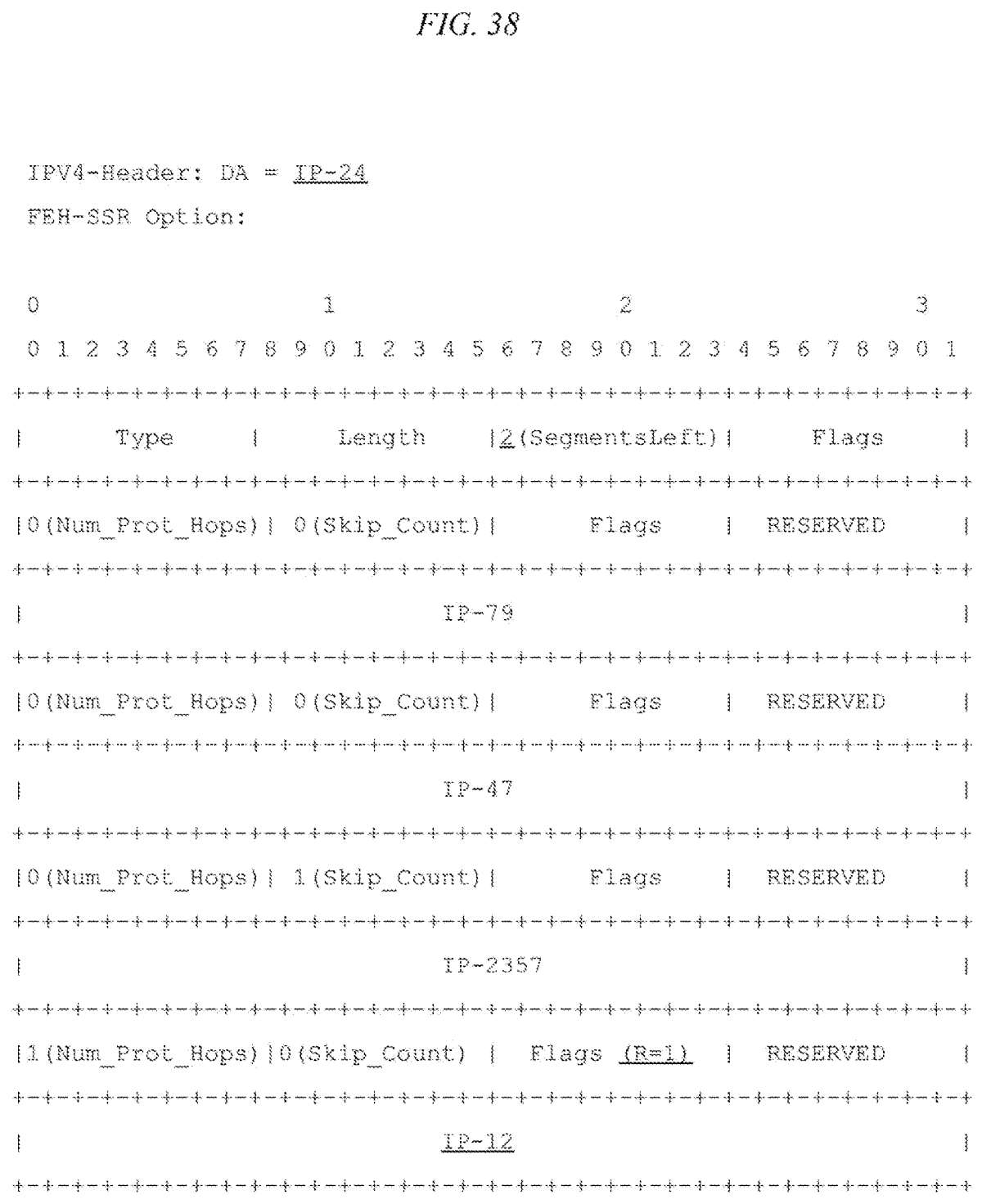

```
IPV4-Header: DA = IP-24
FEH-SSR Option:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |2(SegmentsLeft)|     Flags     |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|     Flags     | RESERVED      |
+-+-+-+-+-+-+-+-+-+-+-+-+-+-+-+-+-+-+-+-+-+-+-+-+-+-+-+-+-+-+-+-+
|                             IP-79                             |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|     Flags     | RESERVED      |
+-+-+-+-+-+-+-+-+-+-+-+-+-+-+-+-+-+-+-+-+-+-+-+-+-+-+-+-+-+-+-+-+
|                             IP-47                             |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|     Flags     | RESERVED      |
+-+-+-+-+-+-+-+-+-+-+-+-+-+-+-+-+-+-+-+-+-+-+-+-+-+-+-+-+-+-+-+-+
|                             IP-2357                           |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)  | RESERVED      |
+-+-+-+-+-+-+-+-+-+-+-+-+-+-+-+-+-+-+-+-+-+-+-+-+-+-+-+-+-+-+-+-+
|                             IP-12                             |
+-+-+-+-+-+-+-+-+-+-+-+-+-+-+-+-+-+-+-+-+-+-+-+-+-+-+-+-+-+-+-+-+
```

*FIG. 39*

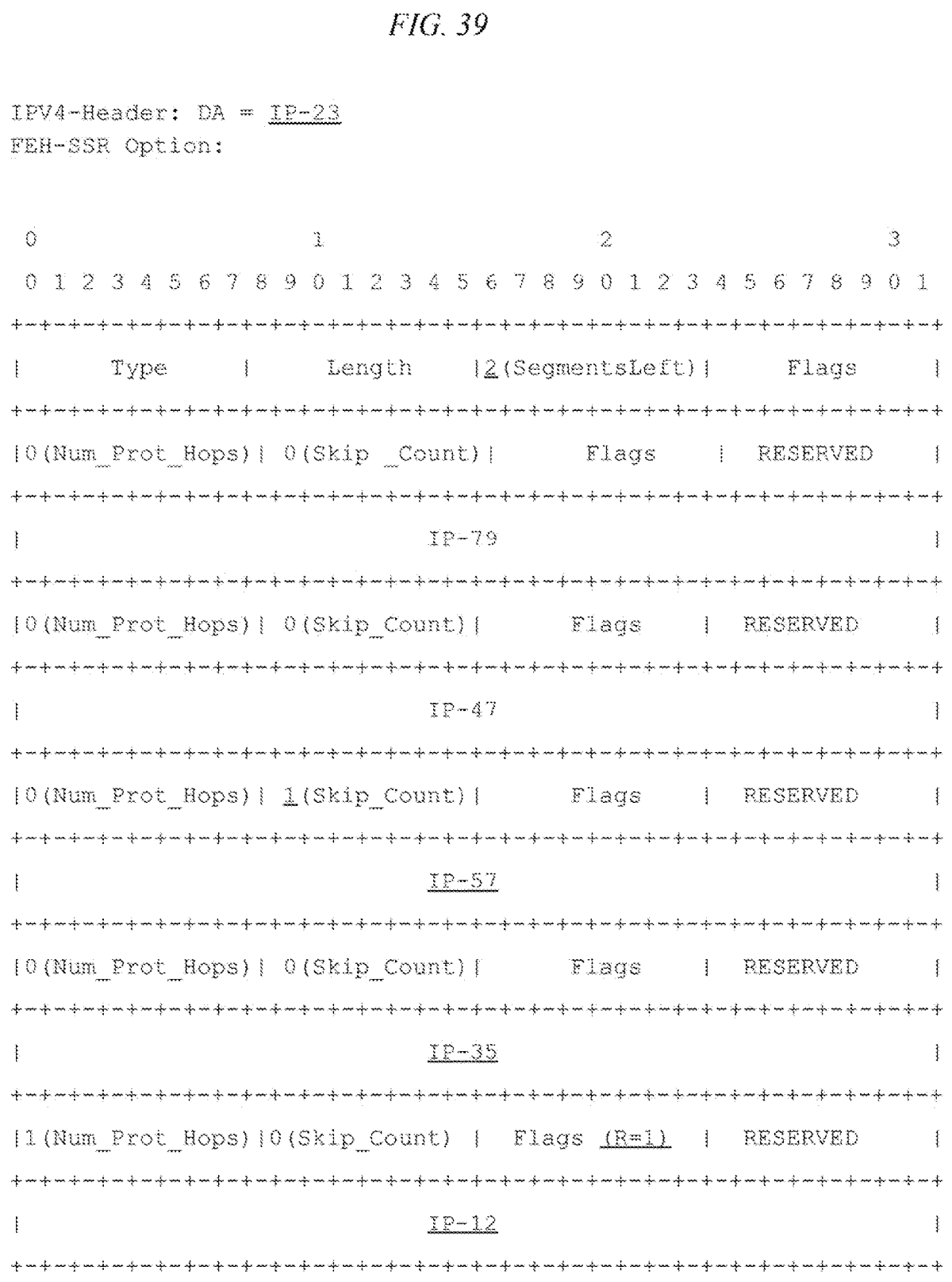

```
IPV4-Header: DA = IP-23
FEH-SSR Option:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |2(SegmentsLeft)|     Flags     |
+-+-+-+-+-+-+-+-+-+-+-+-+-+-+-+-+-+-+-+-+-+-+-+-+-+-+-+-+-+-+-+-+
|0(Num_Prot_Hops)| 0(Skip _Count)|      Flags     | RESERVED     |
+-+-+-+-+-+-+-+-+-+-+-+-+-+-+-+-+-+-+-+-+-+-+-+-+-+-+-+-+-+-+-+-+
|                            IP-79                              |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     | RESERVED      |
+-+-+-+-+-+-+-+-+-+-+-+-+-+-+-+-+-+-+-+-+-+-+-+-+-+-+-+-+-+-+-+-+
|                            IP-47                              |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     | RESERVED      |
+-+-+-+-+-+-+-+-+-+-+-+-+-+-+-+-+-+-+-+-+-+-+-+-+-+-+-+-+-+-+-+-+
|                            IP-57                              |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     | RESERVED      |
+-+-+-+-+-+-+-+-+-+-+-+-+-+-+-+-+-+-+-+-+-+-+-+-+-+-+-+-+-+-+-+-+
|                            IP-35                              |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count)  |  Flags (R=1)   | RESERVED     |
+-+-+-+-+-+-+-+-+-+-+-+-+-+-+-+-+-+-+-+-+-+-+-+-+-+-+-+-+-+-+-+-+
|                            IP-12                              |
+-+-+-+-+-+-+-+-+-+-+-+-+-+-+-+-+-+-+-+-+-+-+-+-+-+-+-+-+-+-+-+-+
```

FIG. 40

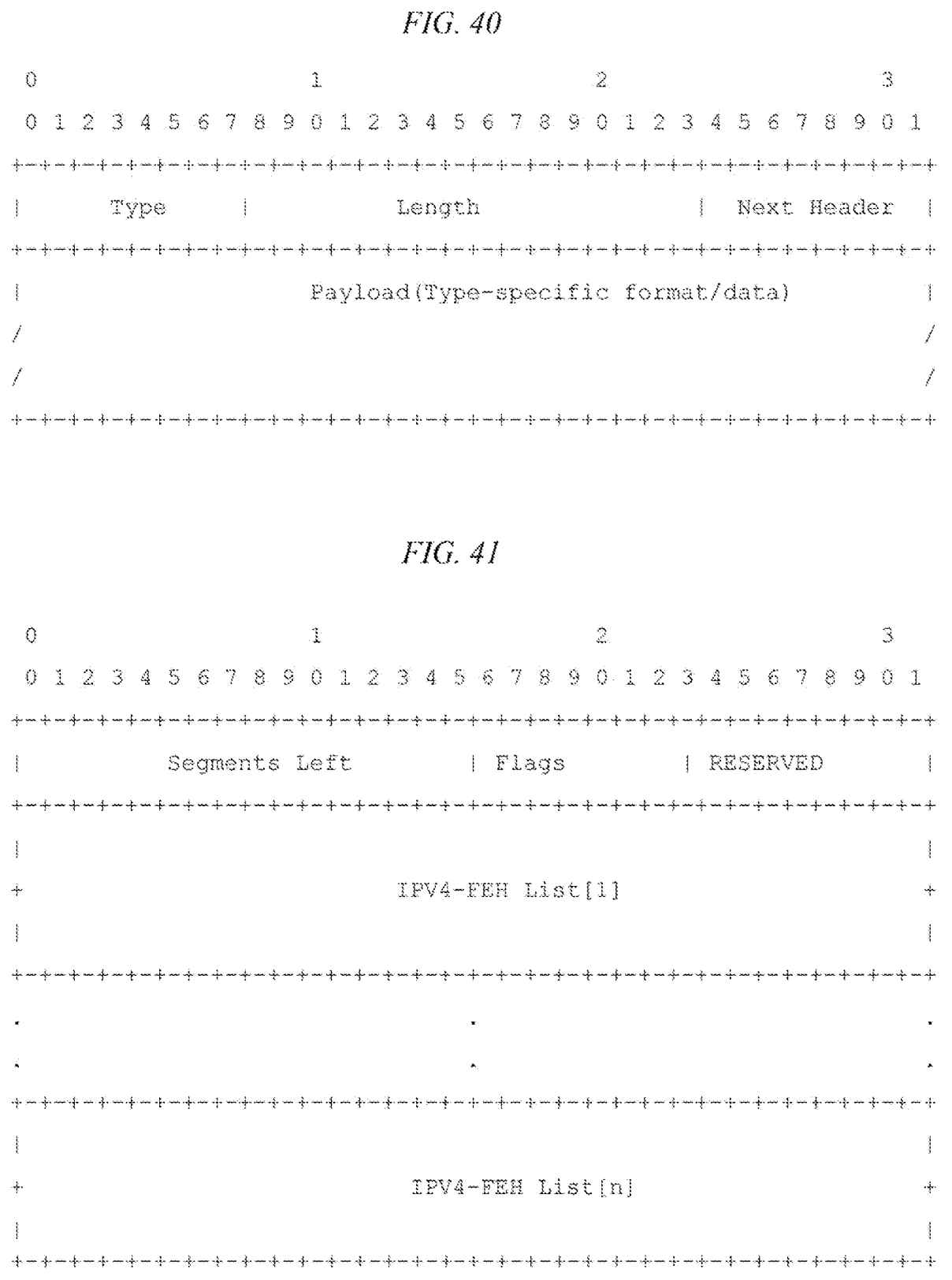

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |               Length          |  Next Header  |
+-+-+-+-+-+-+-+-+-+-+-+-+-+-+-+-+-+-+-+-+-+-+-+-+-+-+-+-+-+-+-+-+
|          Payload(Type-specific format/data)                   |
/                                                               /
/                                                               /
+-+-+-+-+-+-+-+-+-+-+-+-+-+-+-+-+-+-+-+-+-+-+-+-+-+-+-+-+-+-+-+-+
```

FIG. 41

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Segments Left          | Flags       | RESERVED        |
+-+-+-+-+-+-+-+-+-+-+-+-+-+-+-+-+-+-+-+-+-+-+-+-+-+-+-+-+-+-+-+-+
|                                                               |
+                       IPV4-FEH List[1]                        +
|                                                               |
+-+-+-+-+-+-+-+-+-+-+-+-+-+-+-+-+-+-+-+-+-+-+-+-+-+-+-+-+-+-+-+-+
.                               .                               .
.                               .                               .
+-+-+-+-+-+-+-+-+-+-+-+-+-+-+-+-+-+-+-+-+-+-+-+-+-+-+-+-+-+-+-+-+
|                                                               |
+                        IPV4-FEH List[n]                       +
|                                                               |
+-+-+-+-+-+-+-+-+-+-+-+-+-+-+-+-+-+-+-+-+-+-+-+-+-+-+-+-+-+-+-+-+
```

Figures 42, 43, 44:
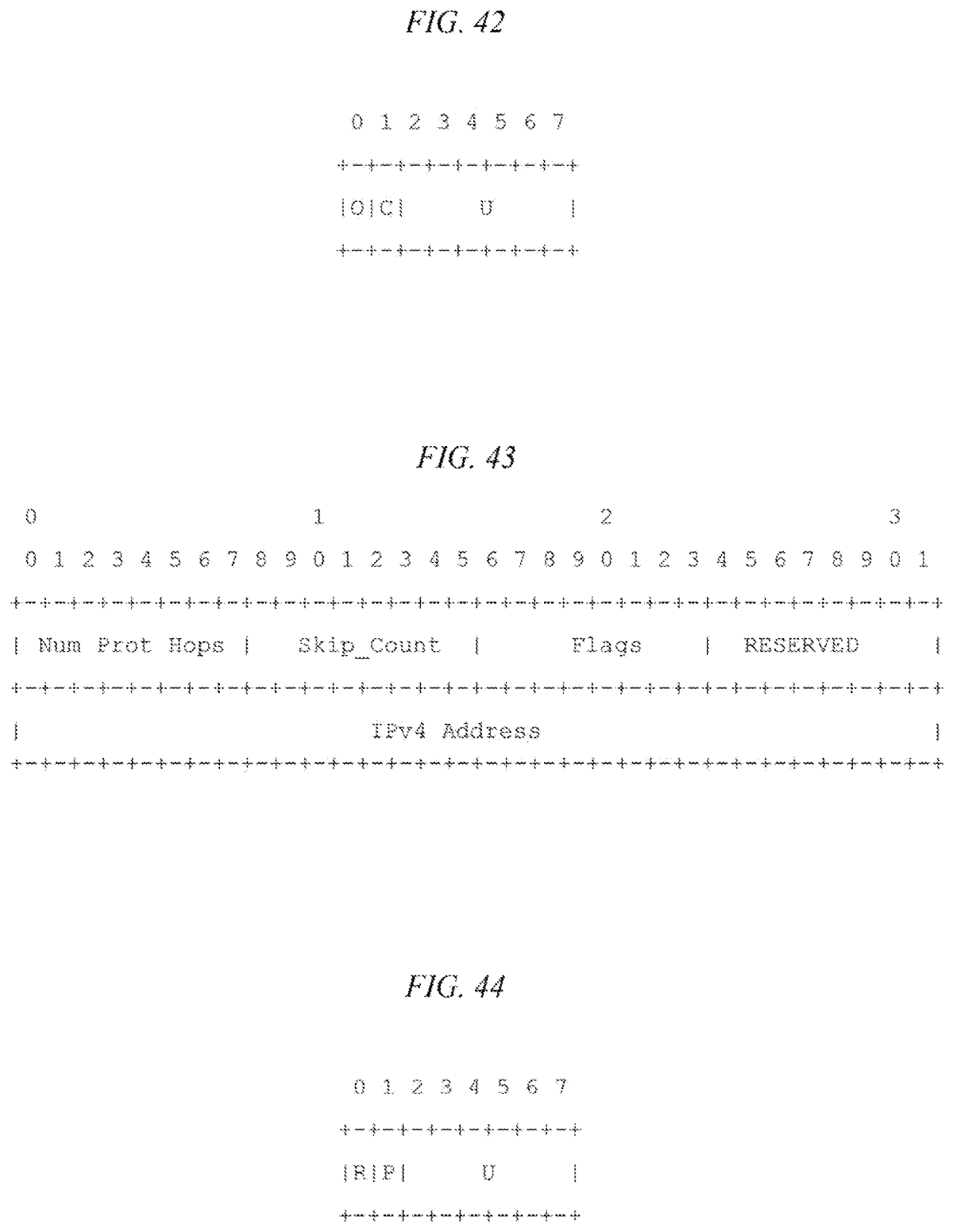

```
 0 1 2 3 4 5 6 7
+-+-+-+-+-+-+-+-+
|O|C|     U     |
+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Num Prot Hops |   Skip_Count  |      Flags      |   RESERVED    |
+-+-+-+-+-+-+-+-+-+-+-+-+-+-+-+-+-+-+-+-+-+-+-+-+-+-+-+-+-+-+-+-+
|                          IPv4 Address                         |
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
|R|P|     U     |
+-+-+-+-+-+-+-+-+
```

Figure 45:
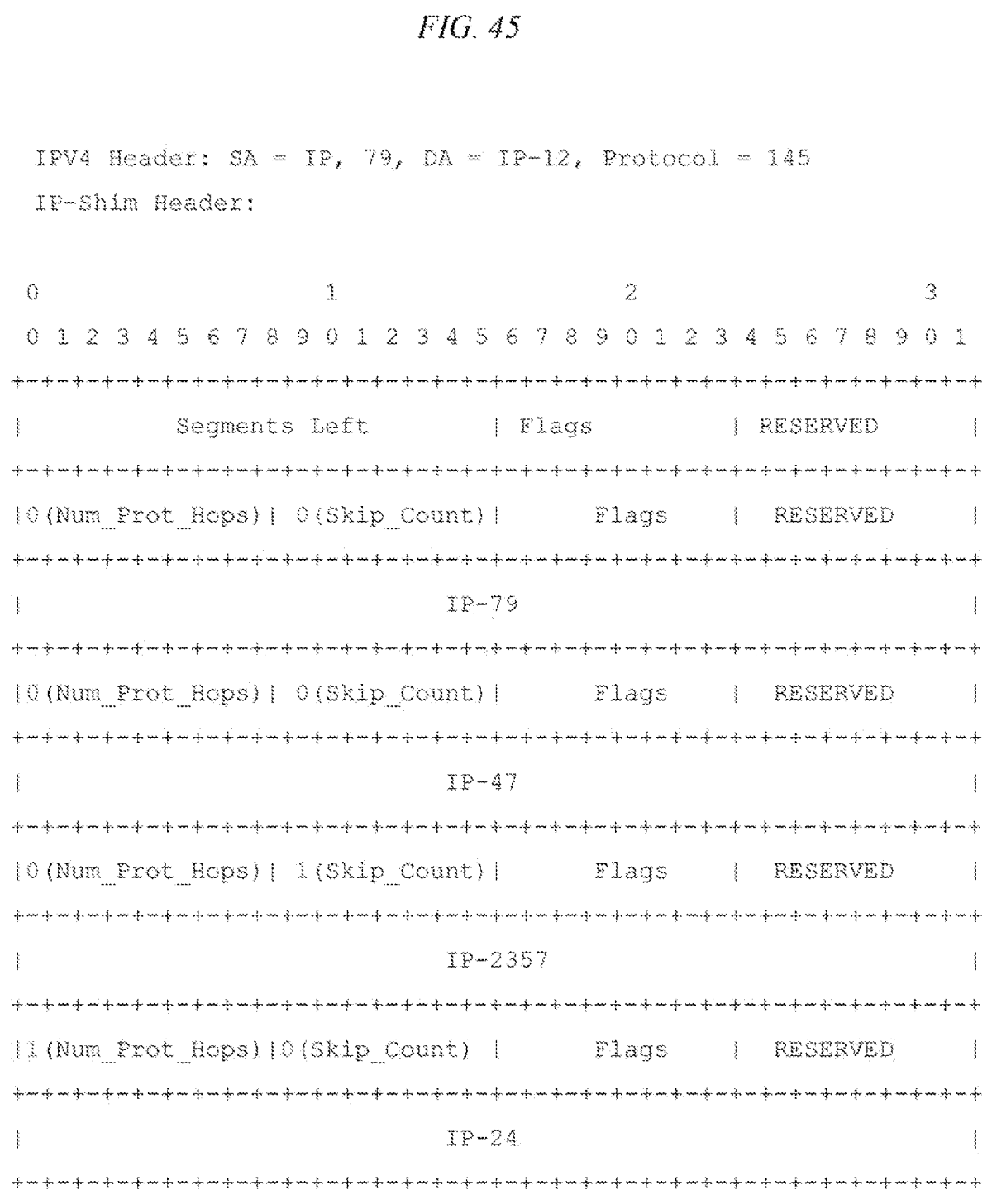

```
IPV4 Header: SA = IP, 79, DA = IP-12, Protocol = 145
IP-Shim Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Segments Left        | Flags         | RESERVED      |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                             IP-79                             |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                             IP-47                             |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                             IP-2357                           |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |      Flags    |  RESERVED     |
+-+-+-+-+-+-+-+-+-+-+-+-+-+-+-+-+-+-+-+-+-+-+-+-+-+-+-+-+-+-+-+-+
|                             IP-24                             |
+-+-+-+-+-+-+-+-+-+-+-+-+-+-+-+-+-+-+-+-+-+-+-+-+-+-+-+-+-+-+-+-+
```

FIG. 46

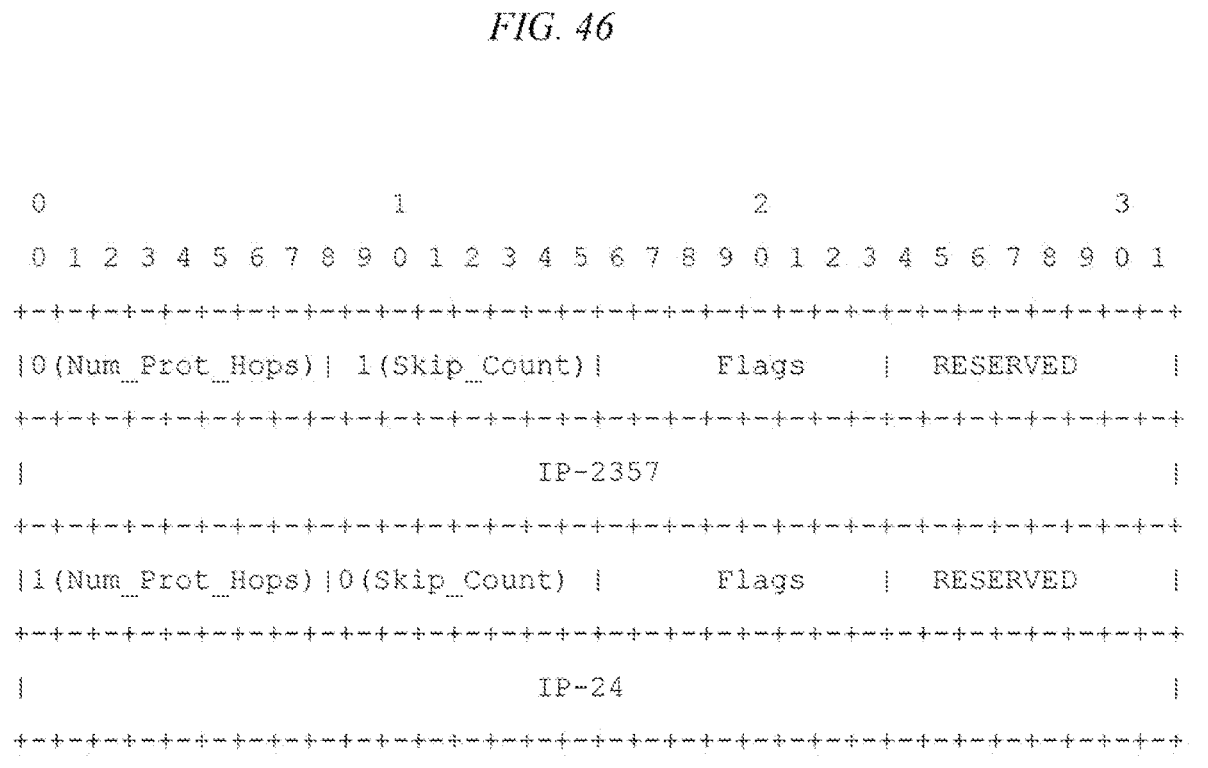

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|     Flags     |  RESERVED     |
+-+-+-+-+-+-+-+-+-+-+-+-+-+-+-+-+-+-+-+-+-+-+-+-+-+-+-+-+-+-+-+-+
|                            IP-2357                            |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |     Flags     |  RESERVED     |
+-+-+-+-+-+-+-+-+-+-+-+-+-+-+-+-+-+-+-+-+-+-+-+-+-+-+-+-+-+-+-+-+
|                            IP-24                              |
+-+-+-+-+-+-+-+-+-+-+-+-+-+-+-+-+-+-+-+-+-+-+-+-+-+-+-+-+-+-+-+-+
```

*FIG. 47*

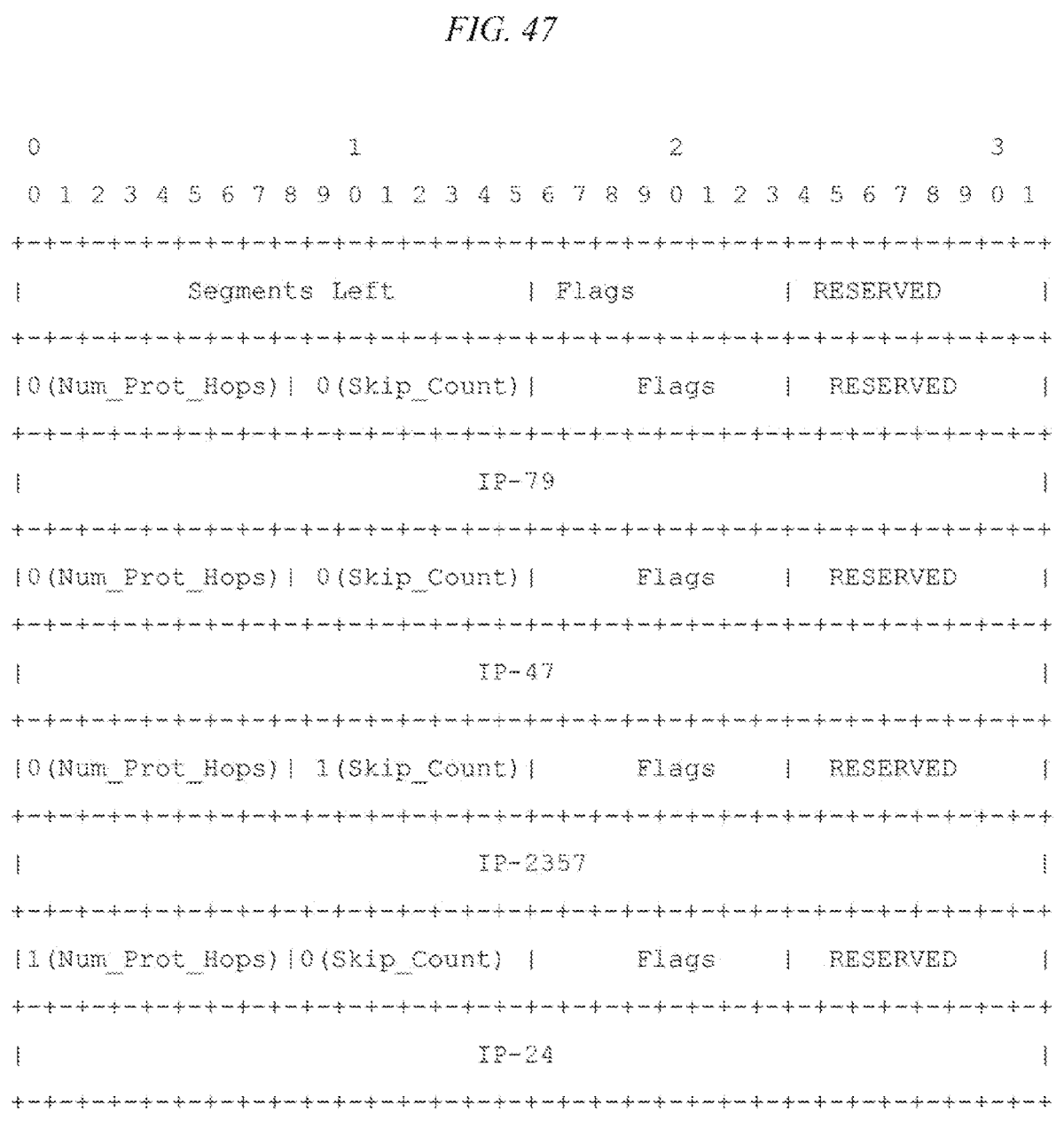

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Segments Left        | Flags         | RESERVED      |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                             IP-79                             |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                             IP-47                             |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                             IP-2357                           |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |      Flags    |  RESERVED     |
+-+-+-+-+-+-+-+-+-+-+-+-+-+-+-+-+-+-+-+-+-+-+-+-+-+-+-+-+-+-+-+-+
|                             IP-24                             |
+-+-+-+-+-+-+-+-+-+-+-+-+-+-+-+-+-+-+-+-+-+-+-+-+-+-+-+-+-+-+-+-+
```

FIG. 48

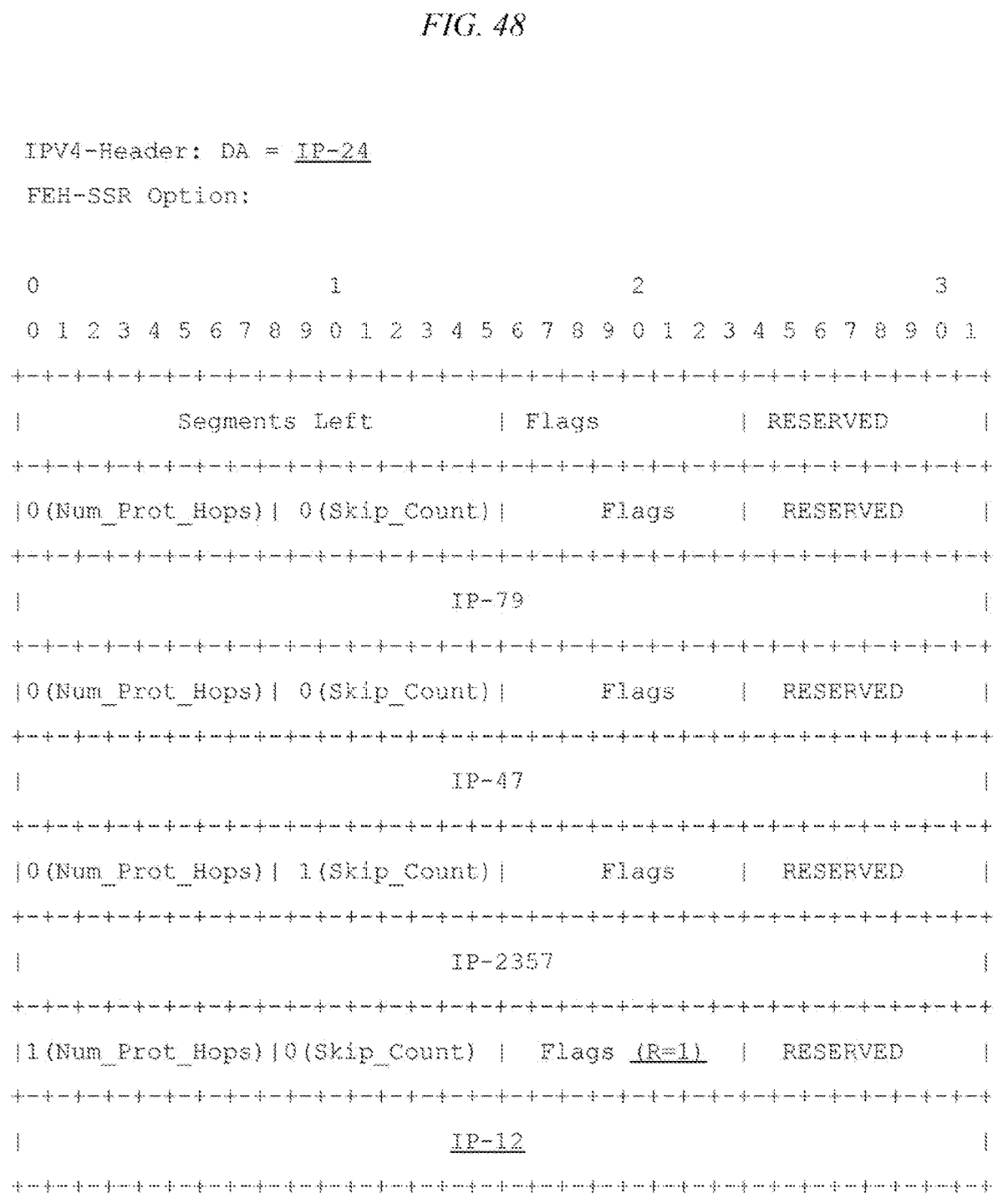

```
IPV4-Header: DA = IP-24
FEH-SSR Option:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Segments Left         | Flags          | RESERVED       |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|       Flags    |  RESERVED      |
+-+-+-+-+-+-+-+-+-+-+-+-+-+-+-+-+-+-+-+-+-+-+-+-+-+-+-+-+-+-+-+-+
|                             IP-79                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|       Flags    |  RESERVED      |
+-+-+-+-+-+-+-+-+-+-+-+-+-+-+-+-+-+-+-+-+-+-+-+-+-+-+-+-+-+-+-+-+
|                             IP-47                               |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|       Flags    |  RESERVED      |
+-+-+-+-+-+-+-+-+-+-+-+-+-+-+-+-+-+-+-+-+-+-+-+-+-+-+-+-+-+-+-+-+
|                             IP-2357                             |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)   |  RESERVED      |
+-+-+-+-+-+-+-+-+-+-+-+-+-+-+-+-+-+-+-+-+-+-+-+-+-+-+-+-+-+-+-+-+
|                             IP-12                               |
+-+-+-+-+-+-+-+-+-+-+-+-+-+-+-+-+-+-+-+-+-+-+-+-+-+-+-+-+-+-+-+-+
```

FIG. 49

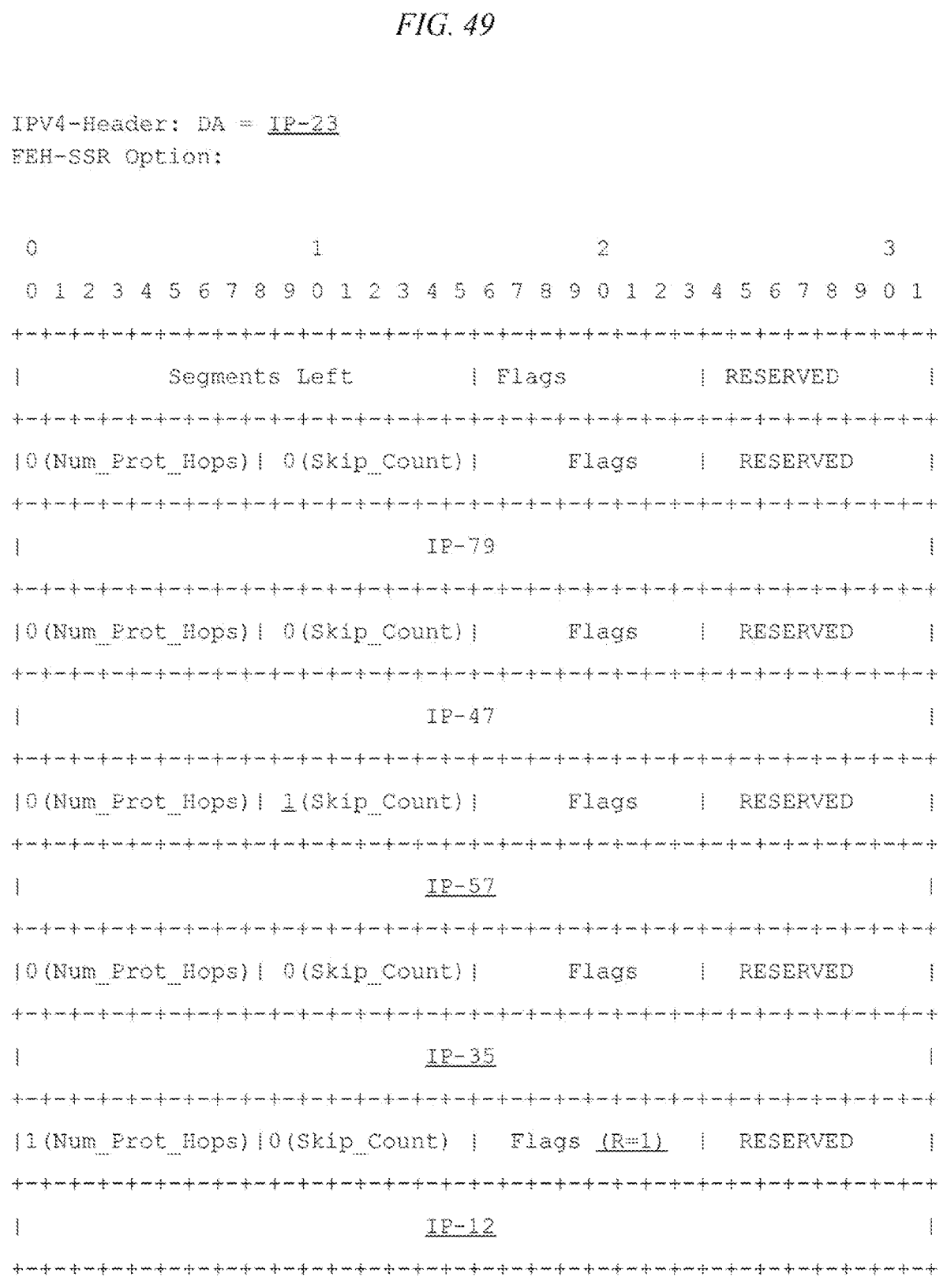

```
IPV4-Header: DA = IP-23
FEH-SSR Option:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Segments Left         | Flags          | RESERVED      |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED      |
+-+-+-+-+-+-+-+-+-+-+-+-+-+-+-+-+-+-+-+-+-+-+-+-+-+-+-+-+-+-+-+-+
|                             IP-79                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED      |
+-+-+-+-+-+-+-+-+-+-+-+-+-+-+-+-+-+-+-+-+-+-+-+-+-+-+-+-+-+-+-+-+
|                             IP-47                               |
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |  RESERVED      |
+-+-+-+-+-+-+-+-+-+-+-+-+-+-+-+-+-+-+-+-+-+-+-+-+-+-+-+-+-+-+-+-+
|                             IP-57                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED      |
+-+-+-+-+-+-+-+-+-+-+-+-+-+-+-+-+-+-+-+-+-+-+-+-+-+-+-+-+-+-+-+-+
|                             IP-35                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)   |  RESERVED      |
+-+-+-+-+-+-+-+-+-+-+-+-+-+-+-+-+-+-+-+-+-+-+-+-+-+-+-+-+-+-+-+-+
|                             IP-12                               |
+-+-+-+-+-+-+-+-+-+-+-+-+-+-+-+-+-+-+-+-+-+-+-+-+-+-+-+-+-+-+-+-+
```

*FIG. 50*

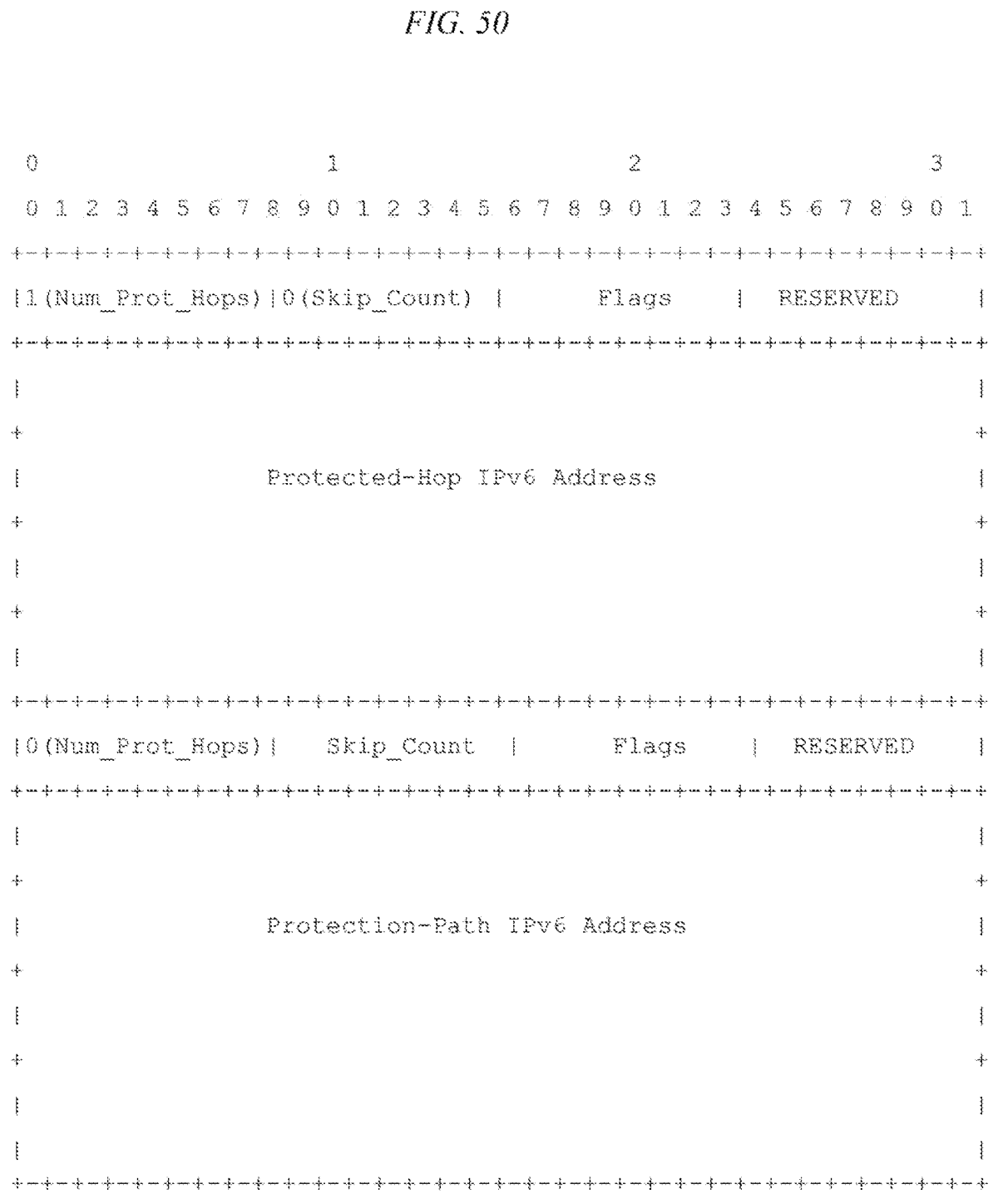

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |     Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                Protected-Hop IPv6 Address                     |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)|  Skip_Count   |     Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                Protection-Path IPv6 Address                   |
+                                                               +
|                                                               |
+                                                               +
|                                                               |
|                                                               |
+-+-+-+-+-+-+-+-+-+-+-+-+-+-+-+-+-+-+-+-+-+-+-+-+-+-+-+-+-+-+-+-+
```

FIG. 52

```
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=0| Segments Left |
+-+-+-+-+-+-+-+-+-+-+-+-+-+-+-+-+-+-+-+-+-+-+-+-+-+-+-+-+-+-+-+-+
|                            Reserved                           |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[1]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[2]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
.                               .                               .
.                               .                               .
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                           Address[n]                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 53*

```
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=5| Segments Left |
+-+-+-+-+-+-+-+-+-+-+-+-+-+-+-+-+-+-+-+-+-+-+-+-+-+-+-+-+-+-+-+-+
| Last Entry    |     Flags     |              Tag              |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                       IPV6-FEH List[1]                        +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
.                               .                               .
.                               .                               .
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                       IPV6-FEH List[n]                        +
|                                                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
|O|     U       |
+-+-+-+-+-+-+-+-+
```

```
 0                   1                   2                   3
+-+-+-+-+-+-+-+-+-+-+-+-+-+-+-+-+-+-+-+-+-+-+-+-+-+-+-+-+-+-+-+-+
| Num Prot Hops |   Skip_Count  |      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                         IPv6 Address                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
|R|P|     U     |
+-+-+-+-+-+-+-+-+
```

Figure 57:
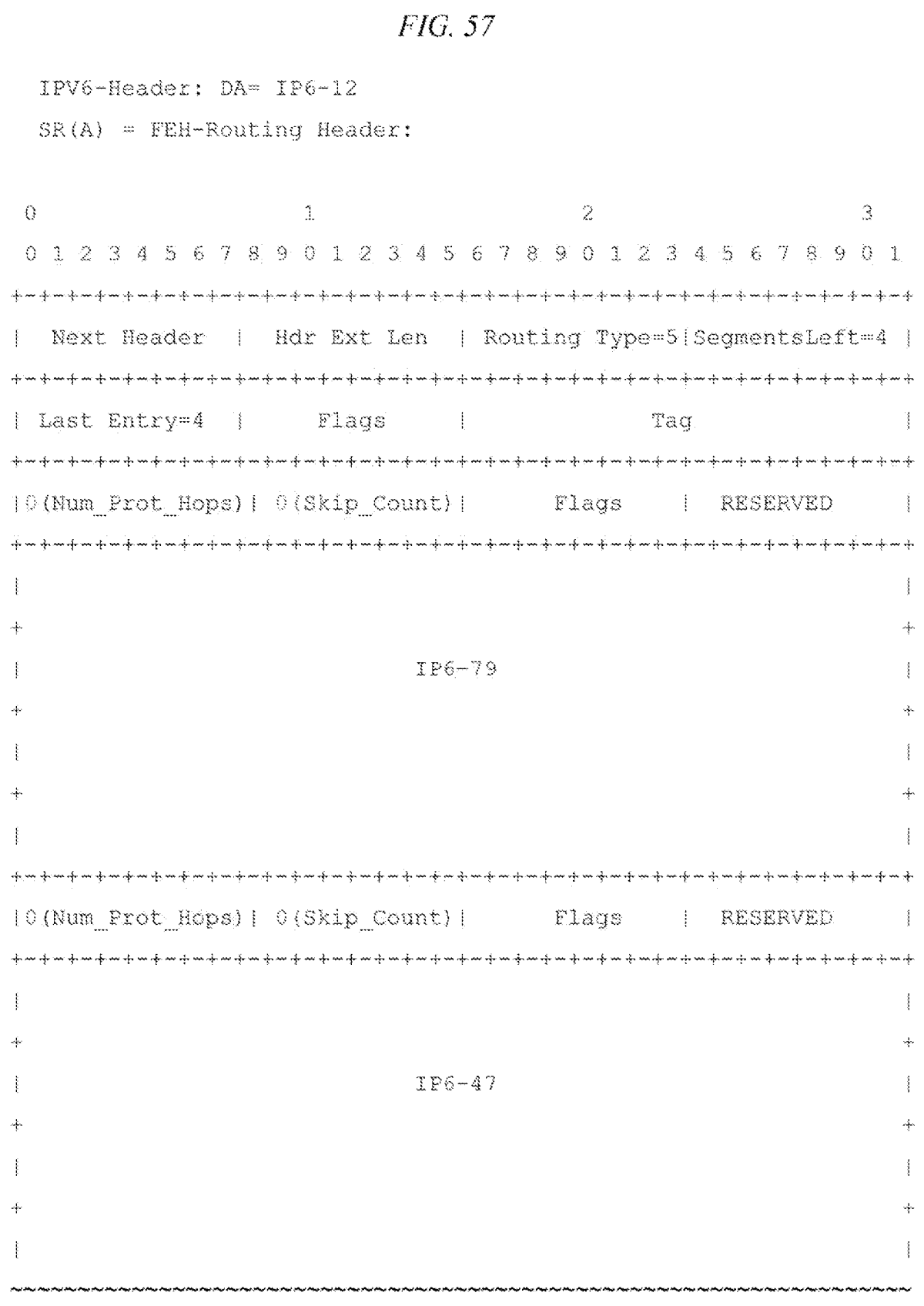

```
IPV6-Header: DA= IP6-12
SR(A) = FEH-Routing Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=5|SegmentsLeft=4 |
+-+-+-+-+-+-+-+-+-+-+-+-+-+-+-+-+-+-+-+-+-+-+-+-+-+-+-+-+-+-+-+-+
| Last Entry=4  |     Flags     |              Tag              |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

*FIG. 57*
*CON'T*

```
~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-2357                           |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-24                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 58

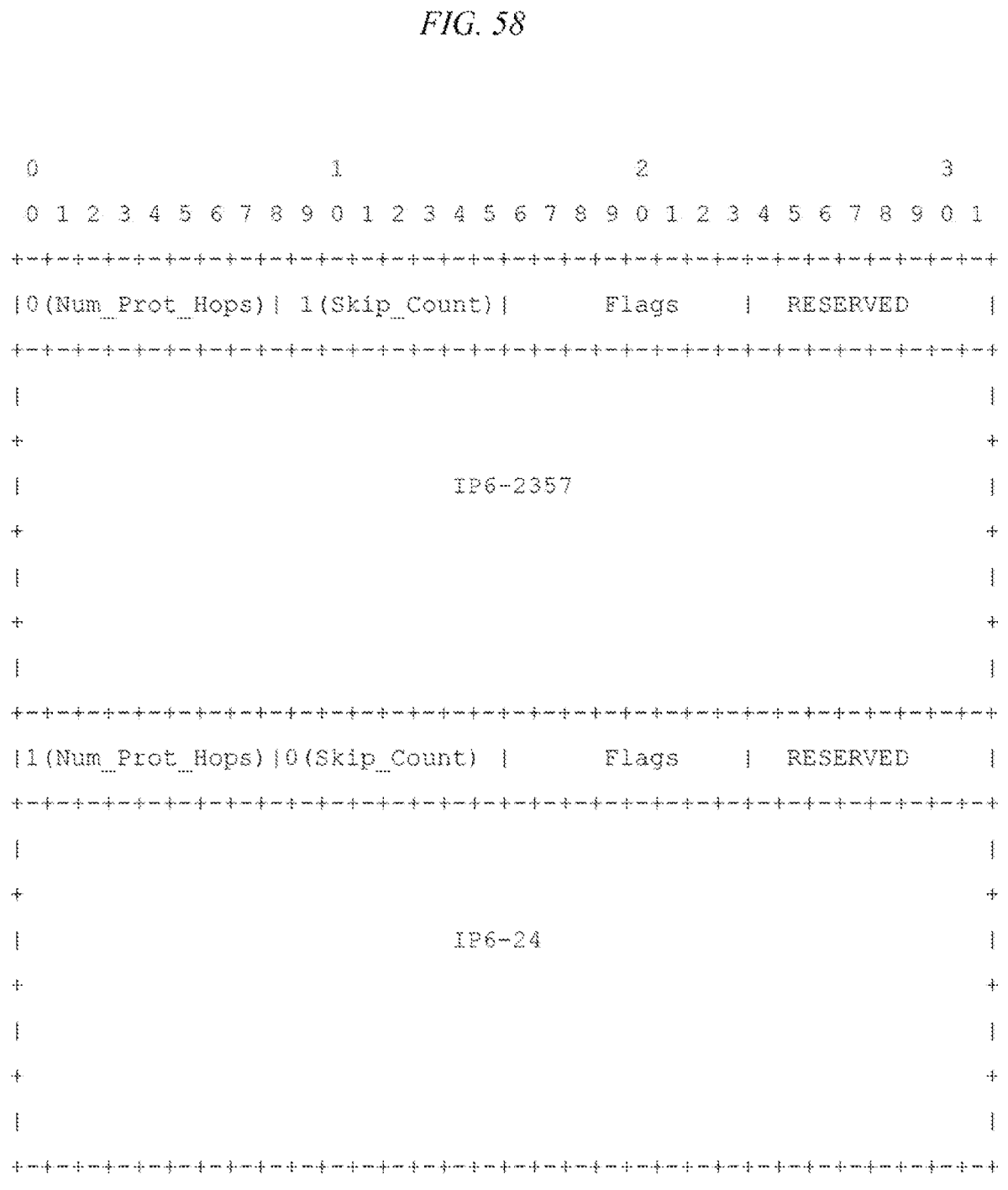

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                           IP6-2357                            |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                           IP6-24                              |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 59*

```
IPV6-Header: DA= IP6-12
SR(A) = FEH-Routing Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=5|SegmentsLeft=4 |
+-+-+-+-+-+-+-+-+-+-+-+-+-+-+-+-+-+-+-+-+-+-+-+-+-+-+-+-+-+-+-+-+
| Last Entry=4  |     Flags     |              Tag              |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

*FIG. 59*
*CON'T*

```
~~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                            IP6-2357                           |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |      Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                            IP6-24                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 60*

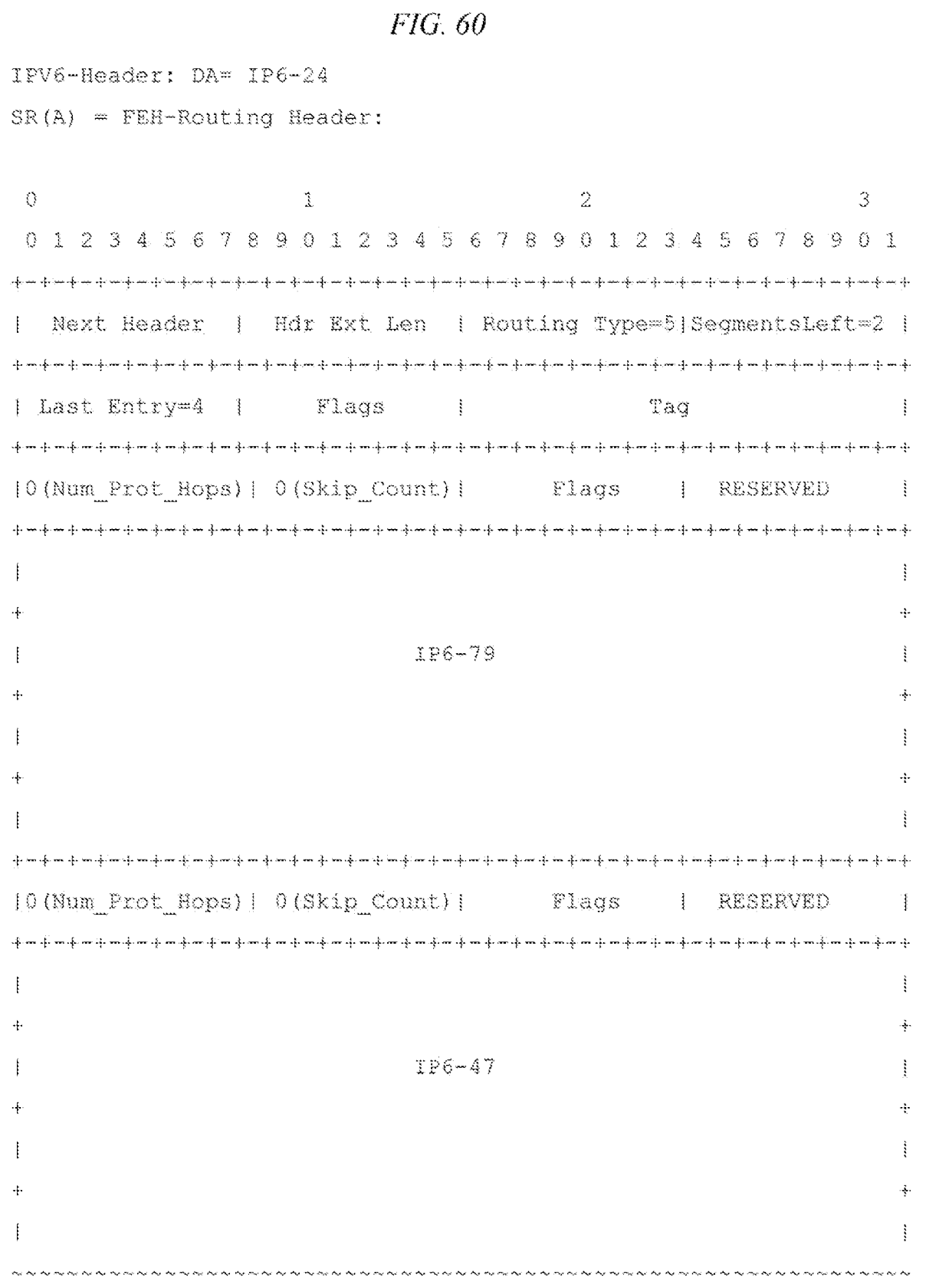

```
IPV6-Header: DA= IP6-24
SR(A) = FEH-Routing Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=5|SegmentsLeft=2 |
+-+-+-+-+-+-+-+-+-+-+-+-+-+-+-+-+-+-+-+-+-+-+-+-+-+-+-+-+-+-+-+-+
| Last Entry=4  |     Flags     |              Tag              |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

FIG. 60
CON'T

```
~~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-2357                           |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)   |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-12                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 61*

```
IPV6-Header: DA= IP6-23
SR(A) = FEH-Routing Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Next Header  |  Hdr Ext Len  | Routing Type=5|SegmentsLeft=4 |
+-+-+-+-+-+-+-+-+-+-+-+-+-+-+-+-+-+-+-+-+-+-+-+-+-+-+-+-+-+-+-+-+
| Last Entry=5  |     Flags     |              Tag              |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

*FIG. 61*
*CON'T*

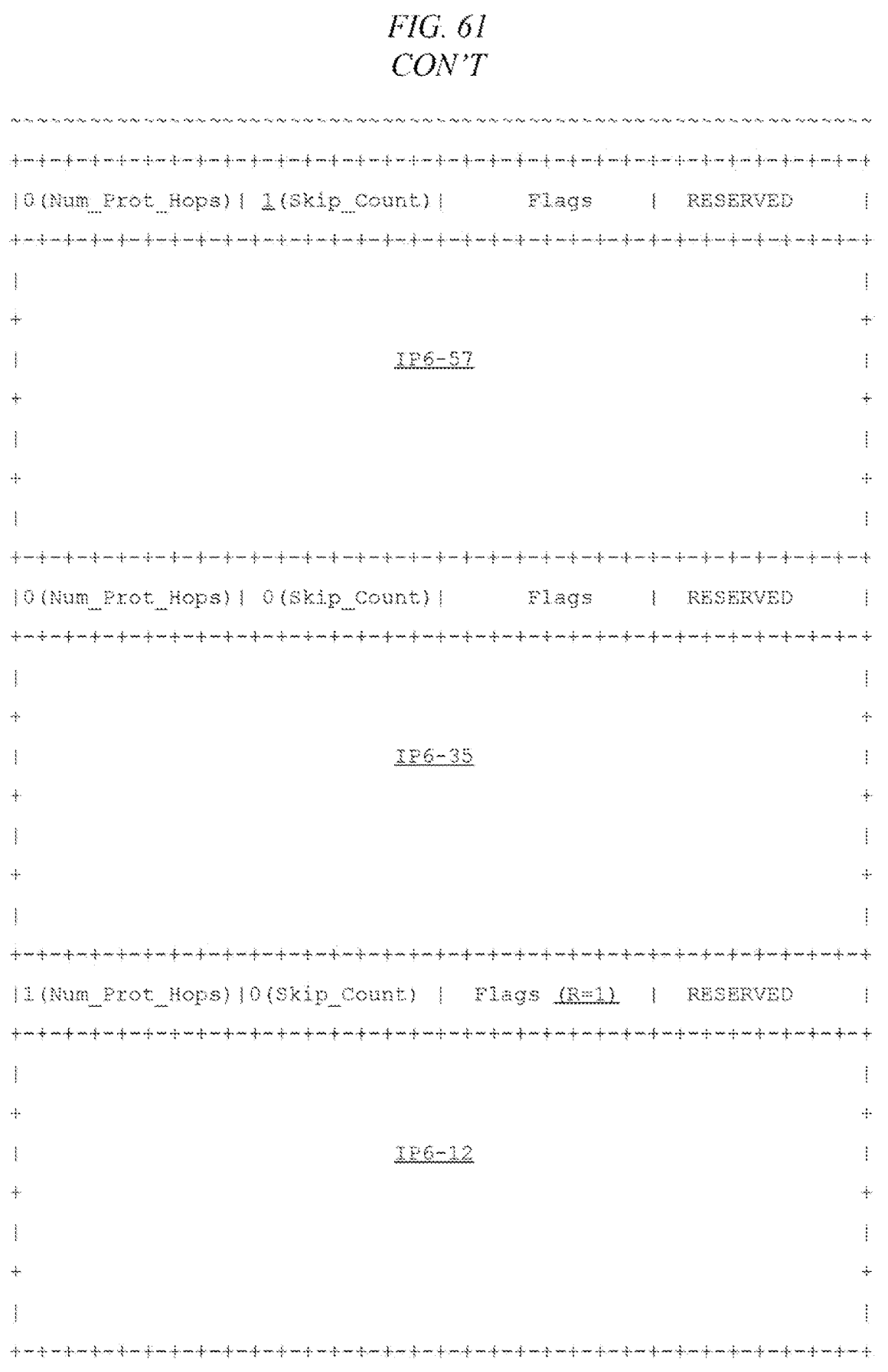

```
~~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                            IP6-57                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                            IP6-35                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)   |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                            IP6-12                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 62*

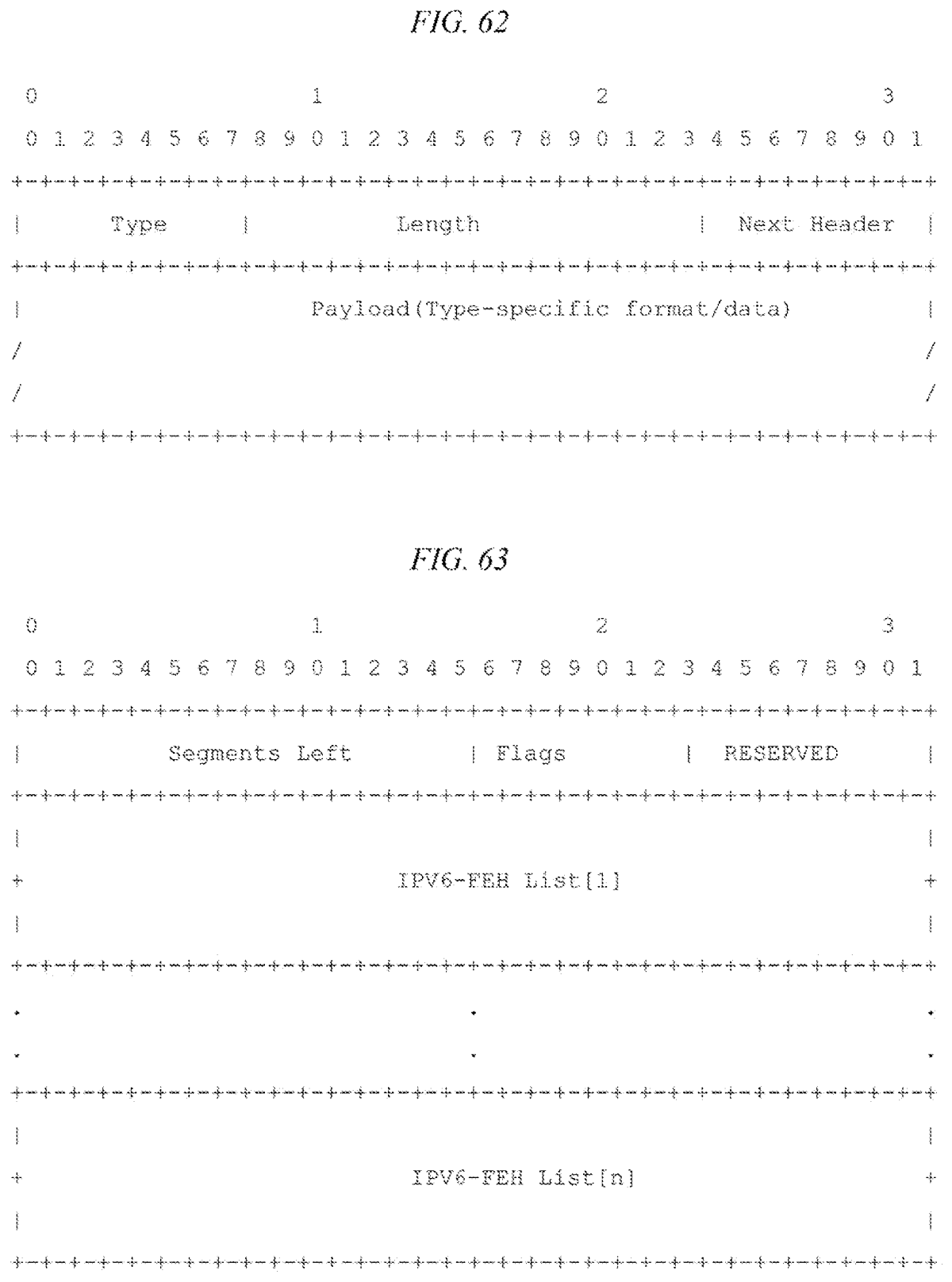

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |              Length           |  Next Header  |
+-+-+-+-+-+-+-+-+-+-+-+-+-+-+-+-+-+-+-+-+-+-+-+-+-+-+-+-+-+-+-+-+
|               Payload(Type-specific format/data)              |
/                                                               /
/                                                               /
+-+-+-+-+-+-+-+-+-+-+-+-+-+-+-+-+-+-+-+-+-+-+-+-+-+-+-+-+-+-+-+-+
```

*FIG. 63*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Segments Left          | Flags         |  RESERVED   |
+-+-+-+-+-+-+-+-+-+-+-+-+-+-+-+-+-+-+-+-+-+-+-+-+-+-+-+-+-+-+-+-+
|                                                               |
+                         IPV6-FEH List[1]                      +
|                                                               |
+-+-+-+-+-+-+-+-+-+-+-+-+-+-+-+-+-+-+-+-+-+-+-+-+-+-+-+-+-+-+-+-+
.                               .                               .
.                               .                               .
+-+-+-+-+-+-+-+-+-+-+-+-+-+-+-+-+-+-+-+-+-+-+-+-+-+-+-+-+-+-+-+-+
|                                                               |
+                          IPV6-FEH List[n]                     +
|                                                               |
+-+-+-+-+-+-+-+-+-+-+-+-+-+-+-+-+-+-+-+-+-+-+-+-+-+-+-+-+-+-+-+-+
```

Figures 64, 65, 66:
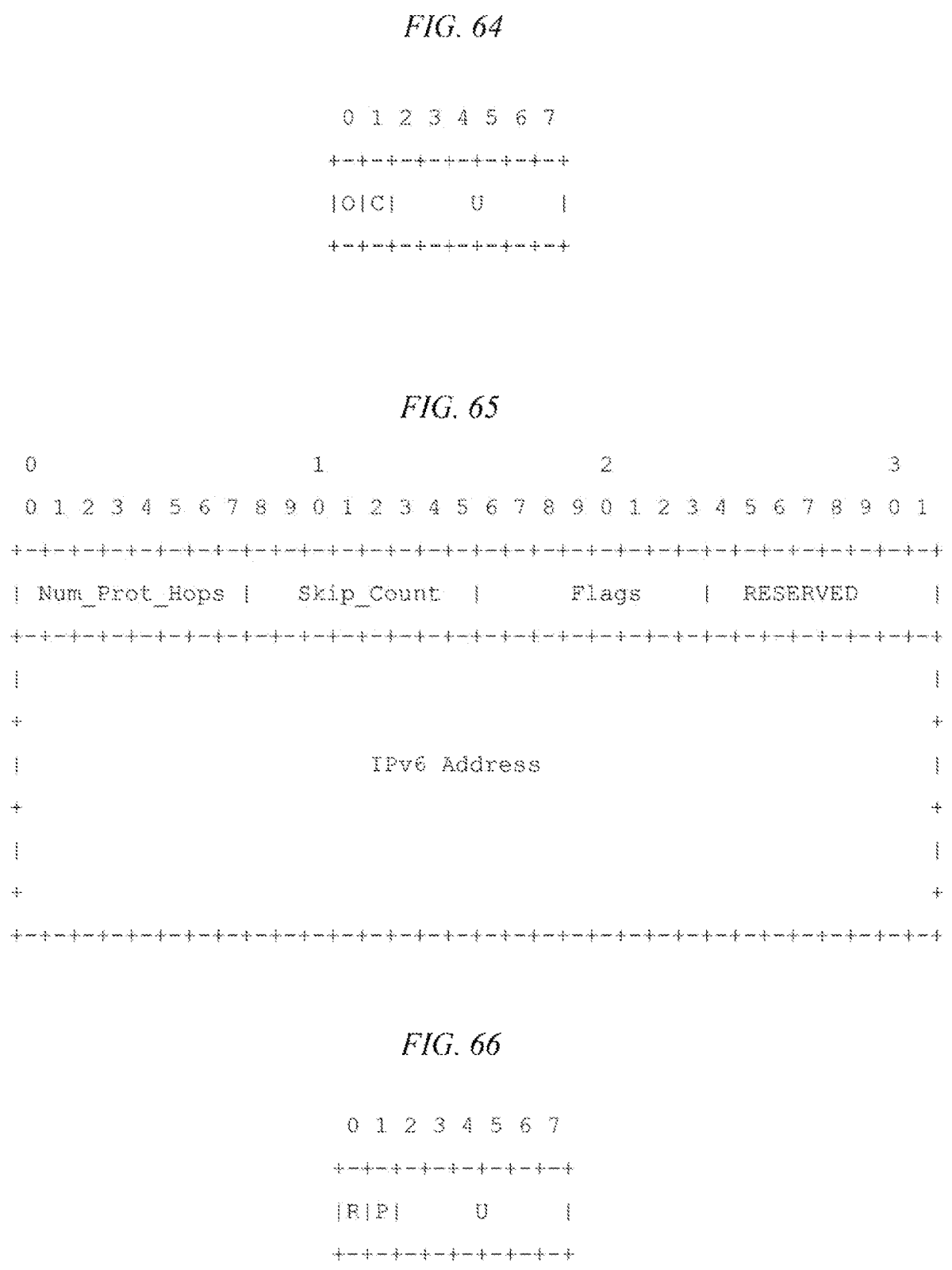

```
 0 1 2 3 4 5 6 7
+-+-+-+-+-+-+-+-+
|O|C|     U     |
+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Num_Prot_Hops |   Skip_Count  |     Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                         IPv6 Address                          |
+                                                               +
|                                                               |
+                                                               +
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
|R|P|     U     |
+-+-+-+-+-+-+-+-+
```

Figure 67:
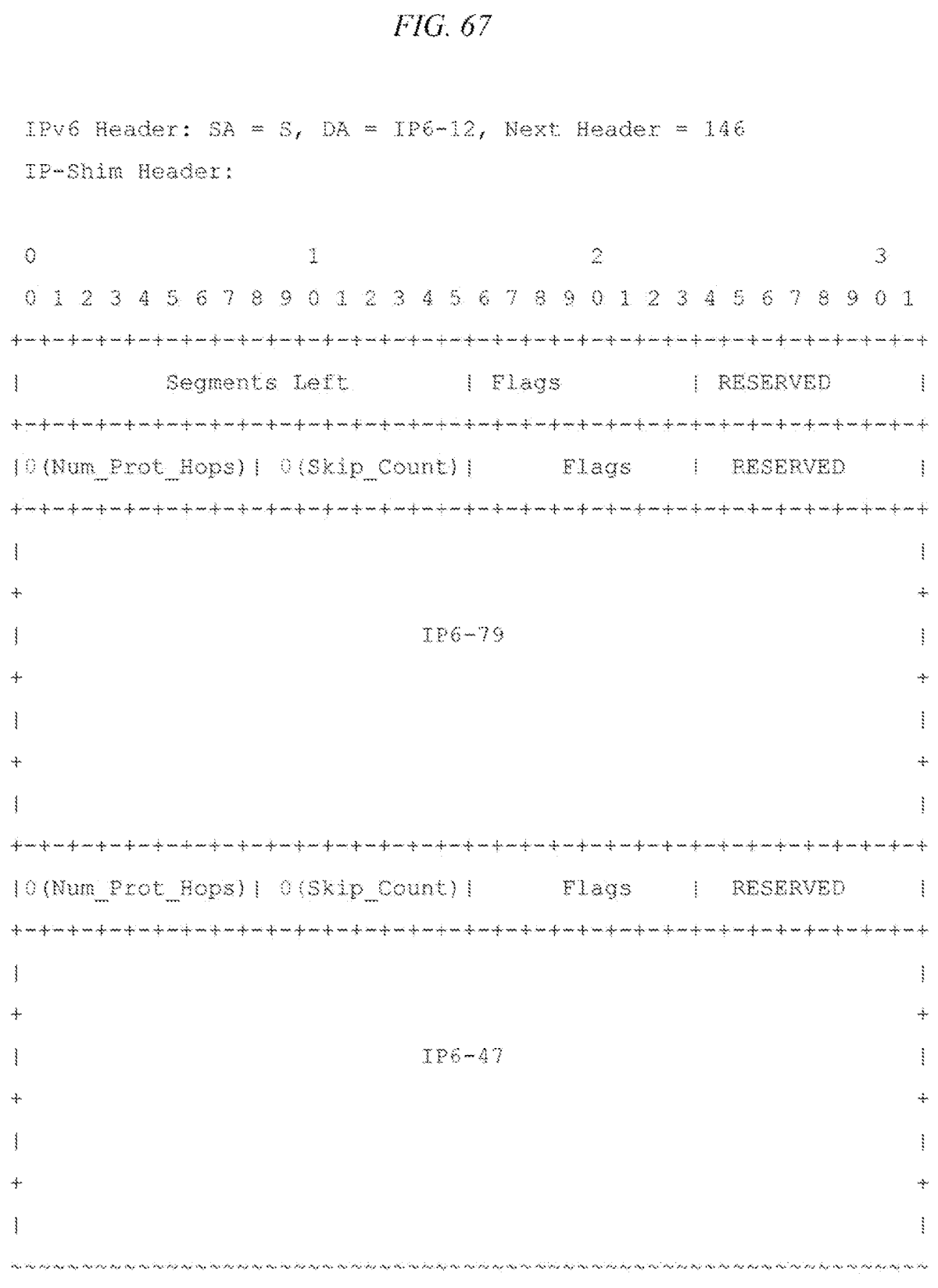

```
IPv6 Header: SA = S, DA = IP6-12, Next Header = 146
IP-Shim Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Segments Left        | Flags          | RESERVED      |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

FIG. 67
CON'T

```
~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                            IP6-2357                           |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |      Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                            IP6-24                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 68*

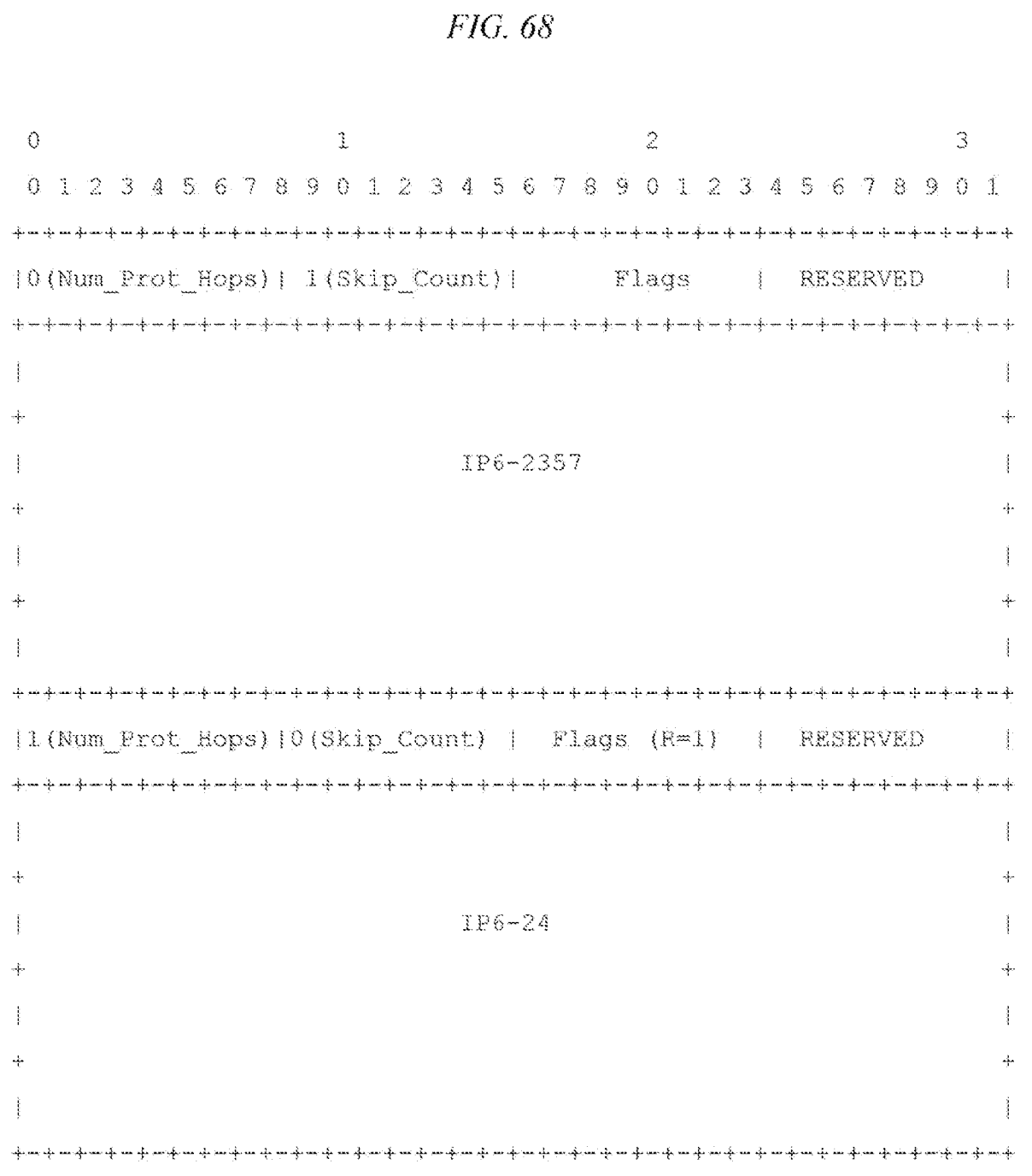

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                          IP6-2357                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)   |   RESERVED    |
+-+-+-+-+-+-+-+-+-+-+-+-+-+-+-+-+-+-+-+-+-+-+-+-+-+-+-+-+-+-+-+-+
|                                                               |
+                                                               +
|                          IP6-24                               |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 69*

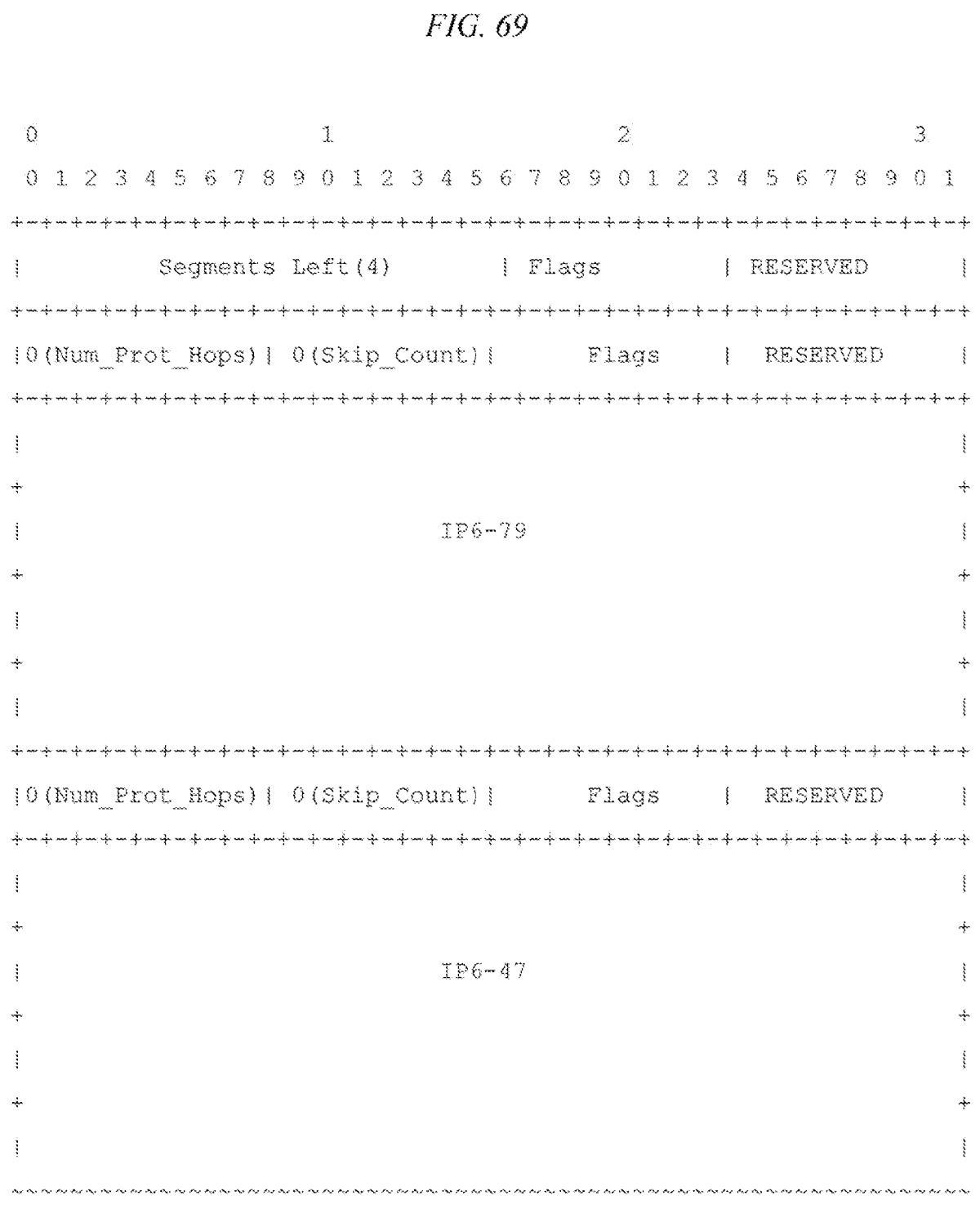

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Segments Left(4)      | Flags         | RESERVED      |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

*FIG. 69*
*CON'T*

```
~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                          IP6-2357                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |   Flags (R=1)   |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                           IP6-24                              |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 70

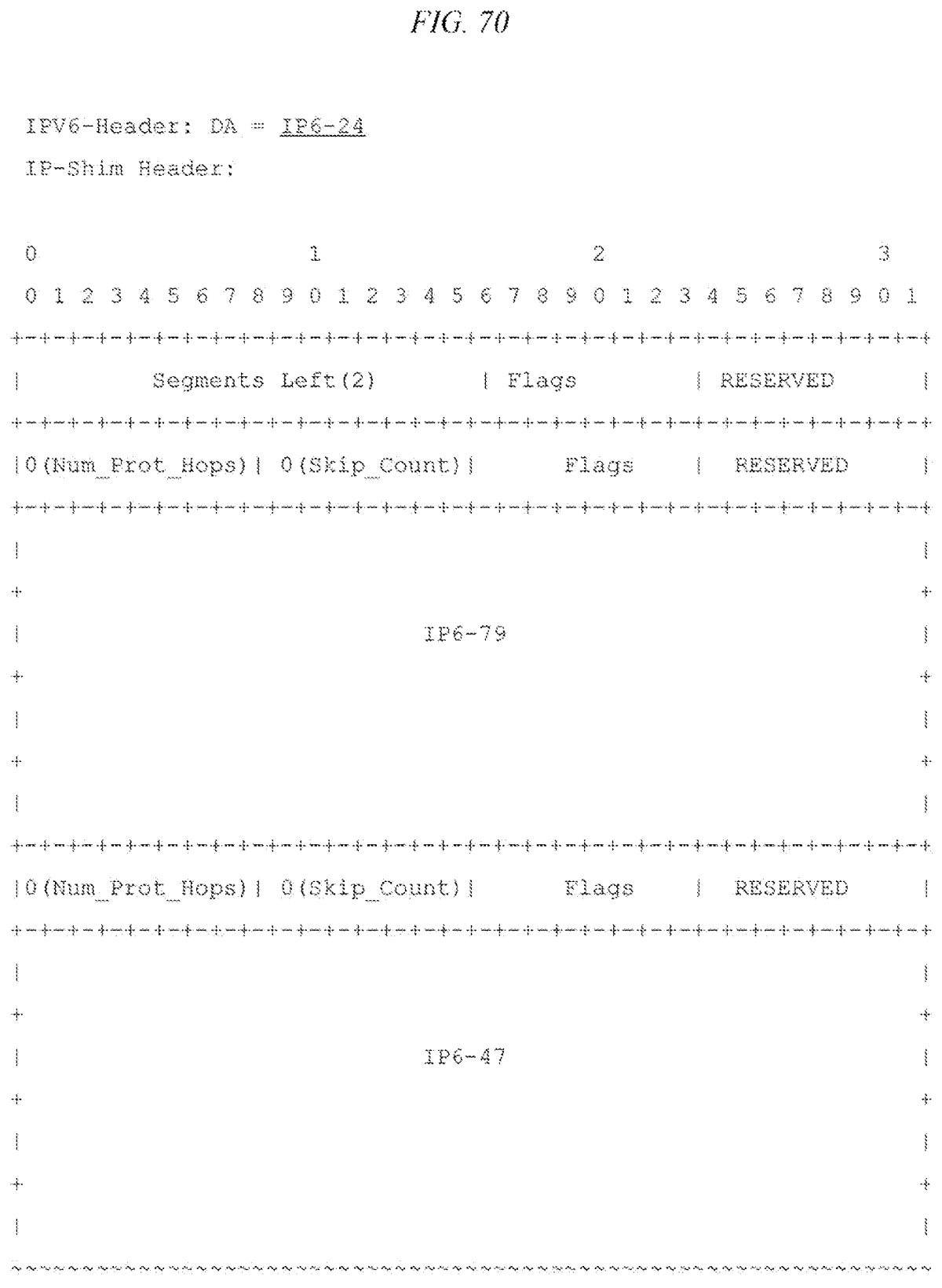

```
IPV6-Header: DA = IP6-24
IP-Shim Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Segments Left(2)      | Flags         | RESERVED      |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags    |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

*FIG. 70*
*CON'T*

```
~~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-2357                           |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)   |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-12                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 71*

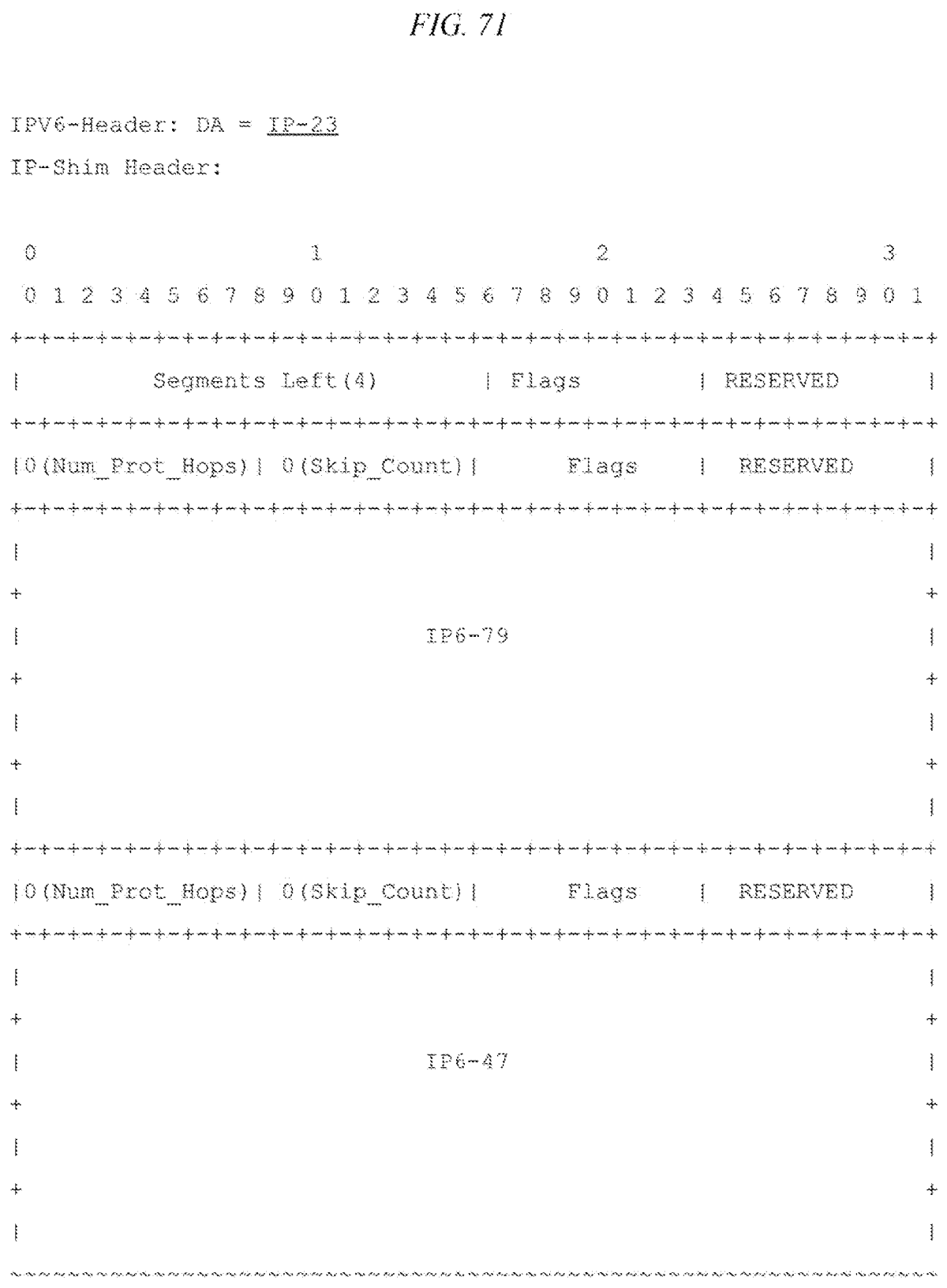

```
IPV6-Header: DA = IP-23
IP-Shim Header:

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Segments Left(4)          | Flags         | RESERVED      |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED      |
+-+-+-+-+-+-+-+-+-+-+-+-+-+-+-+-+-+-+-+-+-+-+-+-+-+-+-+-+-+-+-+-+
|                                                               |
+                                                               +
|                            IP6-79                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED      |
+-+-+-+-+-+-+-+-+-+-+-+-+-+-+-+-+-+-+-+-+-+-+-+-+-+-+-+-+-+-+-+-+
|                                                               |
+                                                               +
|                            IP6-47                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

*FIG. 71*
*CON'T*

```
~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|0(Num_Prot_Hops)| 1(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-57                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|0(Num_Prot_Hops)| 0(Skip_Count)|      Flags     |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-35                             |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~
```

*FIG. 71*
*CON'T*

```
~~~~~~~~~~~~~~~~~~~~~~~~~~~~~~~~~~~~~~~~~~~~~~~~~~~~~~~~~~~~~~~~
+-+-+-+-+-+-+-+-+-+-+-+-+-+-+-+-+-+-+-+-+-+-+-+-+-+-+-+-+-+-+-+-+
|1(Num_Prot_Hops)|0(Skip_Count) |  Flags (R=1)  |  RESERVED     |
+-+-+-+-+-+-+-+-+-+-+-+-+-+-+-+-+-+-+-+-+-+-+-+-+-+-+-+-+-+-+-+-+
|                                                               |
+                                                               +
|                            IP6-12                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

*FIG. 72*

| Advertising Router | Path | Path Label |
|---|---|---|
| AREA: SELF | | |
| R1 | ..................... | ..................... |
| | ..................... | ..................... |
| R2 | {IP-23, IP-35, IP-57} | L2357 |
| | {IP-25, IP-56} | L256 |
| R3 | ..................... | ..................... |
| | ..................... | ..................... |
| R4 | ..................... | ..................... |
| ..................................................................................................... | | |
| R9 | ..................... | ..................... |
| | ..................... | ..................... |
| AREA: OTHER | | |
| R10 | ..................... | ..................... |
| | ..................... | ..................... |
| R11 | ..................... | ..................... |
| | ..................... | ..................... |
| ..................................................................................................... | | |
| RN | ..................... | ..................... |
| | ..................... | ..................... |

FIG. 73

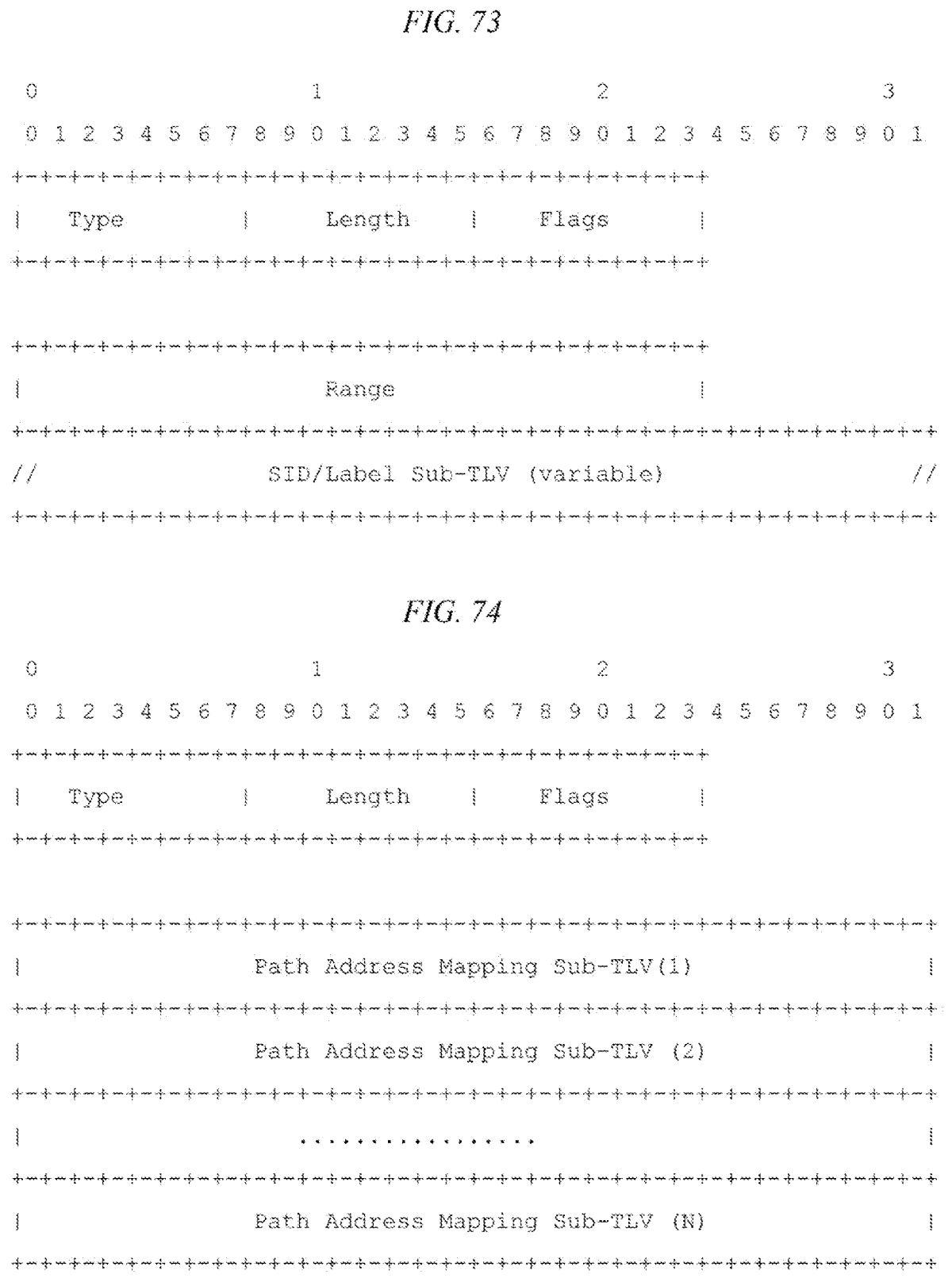

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|    Type       |      Length   |     Flags     |
+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+
|                     Range                     |
+-+-+-+-+-+-+-+-+-+-+-+-+-+-+-+-+-+-+-+-+-+-+-+-+-+-+-+-+-+-+-+-+
//                 SID/Label Sub-TLV (variable)                //
+-+-+-+-+-+-+-+-+-+-+-+-+-+-+-+-+-+-+-+-+-+-+-+-+-+-+-+-+-+-+-+-+
```

FIG. 74

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|    Type       |      Length   |     Flags     |
+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                Path Address Mapping Sub-TLV(1)                |
+-+-+-+-+-+-+-+-+-+-+-+-+-+-+-+-+-+-+-+-+-+-+-+-+-+-+-+-+-+-+-+-+
|                Path Address Mapping Sub-TLV (2)               |
+-+-+-+-+-+-+-+-+-+-+-+-+-+-+-+-+-+-+-+-+-+-+-+-+-+-+-+-+-+-+-+-+
|                   .................                           |
+-+-+-+-+-+-+-+-+-+-+-+-+-+-+-+-+-+-+-+-+-+-+-+-+-+-+-+-+-+-+-+-+
|                Path Address Mapping Sub-TLV (N)               |
+-+-+-+-+-+-+-+-+-+-+-+-+-+-+-+-+-+-+-+-+-+-+-+-+-+-+-+-+-+-+-+-+
```

*FIG. 75*

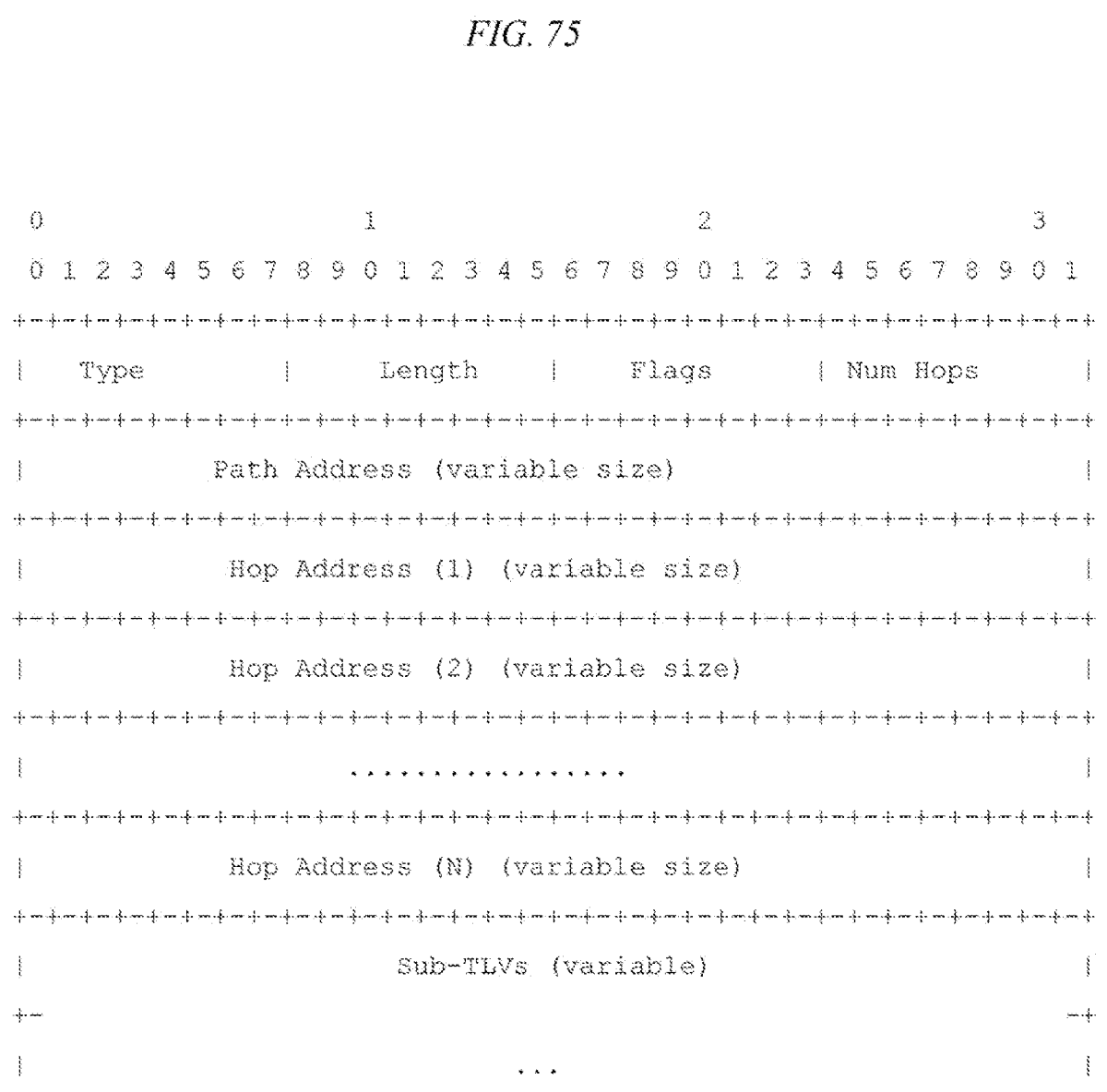

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |      Length     |     Flags     | Num Hops    |
+-+-+-+-+-+-+-+-+-+-+-+-+-+-+-+-+-+-+-+-+-+-+-+-+-+-+-+-+-+-+-+-+
|           Path Address (variable size)                        |
+-+-+-+-+-+-+-+-+-+-+-+-+-+-+-+-+-+-+-+-+-+-+-+-+-+-+-+-+-+-+-+-+
|            Hop Address (1) (variable size)                    |
+-+-+-+-+-+-+-+-+-+-+-+-+-+-+-+-+-+-+-+-+-+-+-+-+-+-+-+-+-+-+-+-+
|            Hop Address (2) (variable size)                    |
+-+-+-+-+-+-+-+-+-+-+-+-+-+-+-+-+-+-+-+-+-+-+-+-+-+-+-+-+-+-+-+-+
|                ................                               |
+-+-+-+-+-+-+-+-+-+-+-+-+-+-+-+-+-+-+-+-+-+-+-+-+-+-+-+-+-+-+-+-+
|            Hop Address (N) (variable size)                    |
+-+-+-+-+-+-+-+-+-+-+-+-+-+-+-+-+-+-+-+-+-+-+-+-+-+-+-+-+-+-+-+-+
|                     Sub-TLVs (variable)                       |
+-                                                             -+
|                           ...                                 |
```

*FIG. 76*

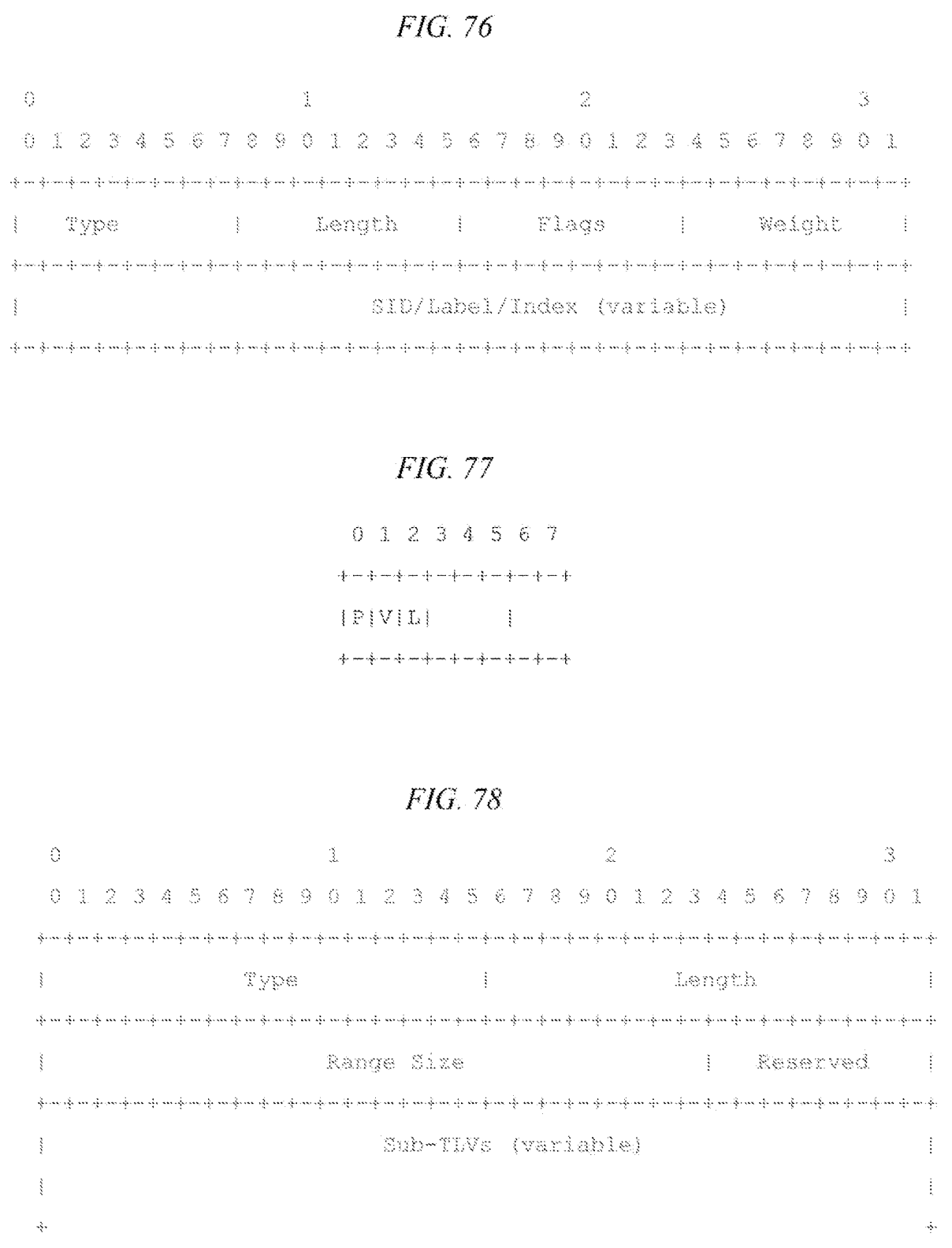

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type        |     Length    |    Flags      |     Weight    |
+-+-+-+-+-+-+-+-+-+-+-+-+-+-+-+-+-+-+-+-+-+-+-+-+-+-+-+-+-+-+-+-+
|                   SID/Label/Index (variable)                  |
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
|P|V|L|         |
+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |            Length             |
+-+-+-+-+-+-+-+-+-+-+-+-+-+-+-+-+-+-+-+-+-+-+-+-+-+-+-+-+-+-+-+-+
|               Range Size                      |   Reserved    |
+-+-+-+-+-+-+-+-+-+-+-+-+-+-+-+-+-+-+-+-+-+-+-+-+-+-+-+-+-+-+-+-+
|                  Sub-TLVs (variable)                          |
|                                                               |
+                                                               +
```

*FIG. 79*

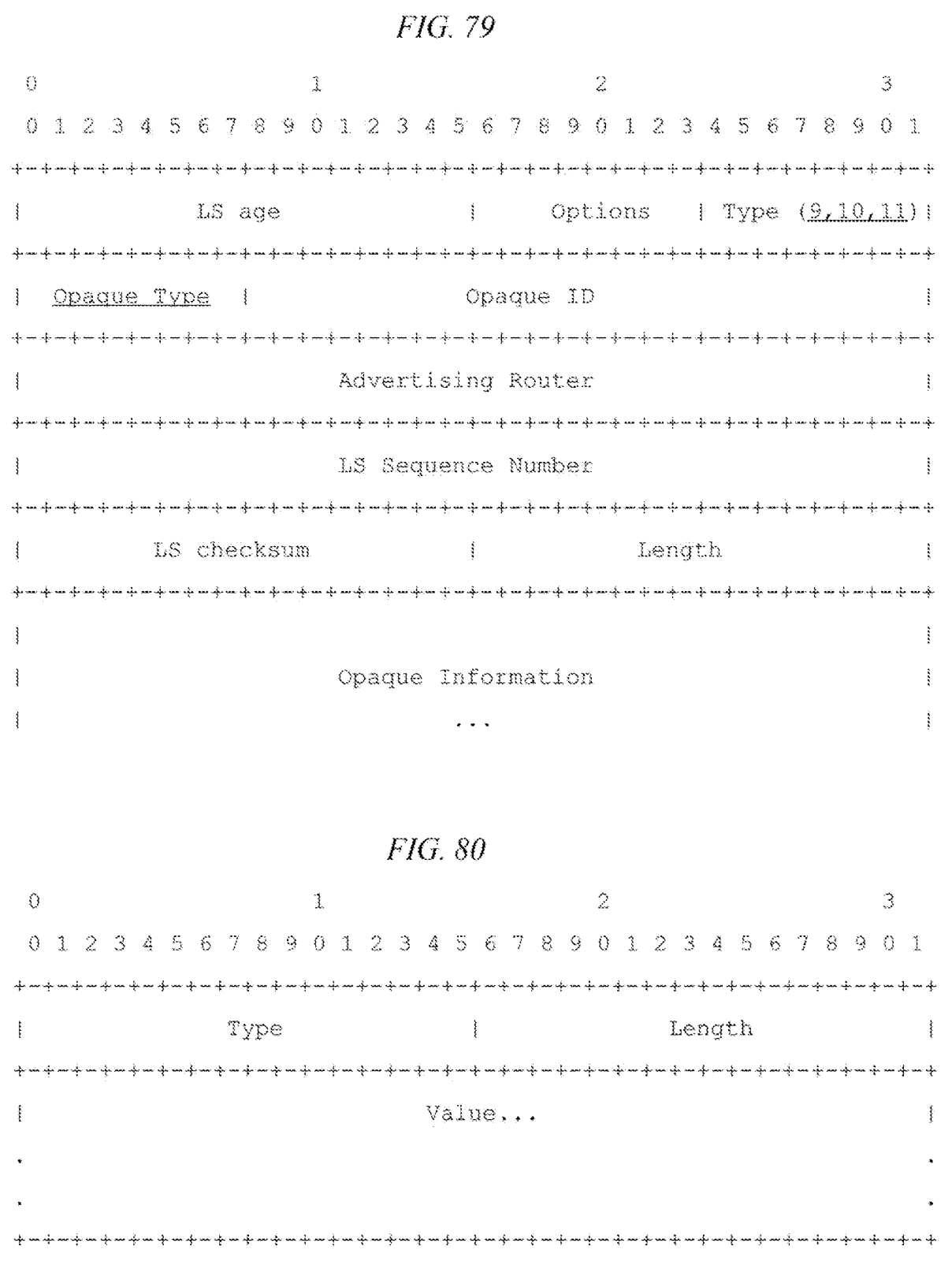

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |     Options   | Type (9,10,11)|
+-+-+-+-+-+-+-+-+-+-+-+-+-+-+-+-+-+-+-+-+-+-+-+-+-+-+-+-+-+-+-+-+
| Opaque Type  |               Opaque ID                        |
+-+-+-+-+-+-+-+-+-+-+-+-+-+-+-+-+-+-+-+-+-+-+-+-+-+-+-+-+-+-+-+-+
|                      Advertising Router                       |
+-+-+-+-+-+-+-+-+-+-+-+-+-+-+-+-+-+-+-+-+-+-+-+-+-+-+-+-+-+-+-+-+
|                      LS Sequence Number                       |
+-+-+-+-+-+-+-+-+-+-+-+-+-+-+-+-+-+-+-+-+-+-+-+-+-+-+-+-+-+-+-+-+
|         LS checksum           |           Length              |
+-+-+-+-+-+-+-+-+-+-+-+-+-+-+-+-+-+-+-+-+-+-+-+-+-+-+-+-+-+-+-+-+
|                                                               |
|                      Opaque Information                       |
|                            ...                                |
```

*FIG. 80*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|                            Value...                           |
.                                                               .
.                                                               .
+-+-+-+-+-+-+-+-+-+-+-+-+-+-+-+-+-+-+-+-+-+-+-+-+-+-+-+-+-+-+-+-+
```

*FIG. 81*

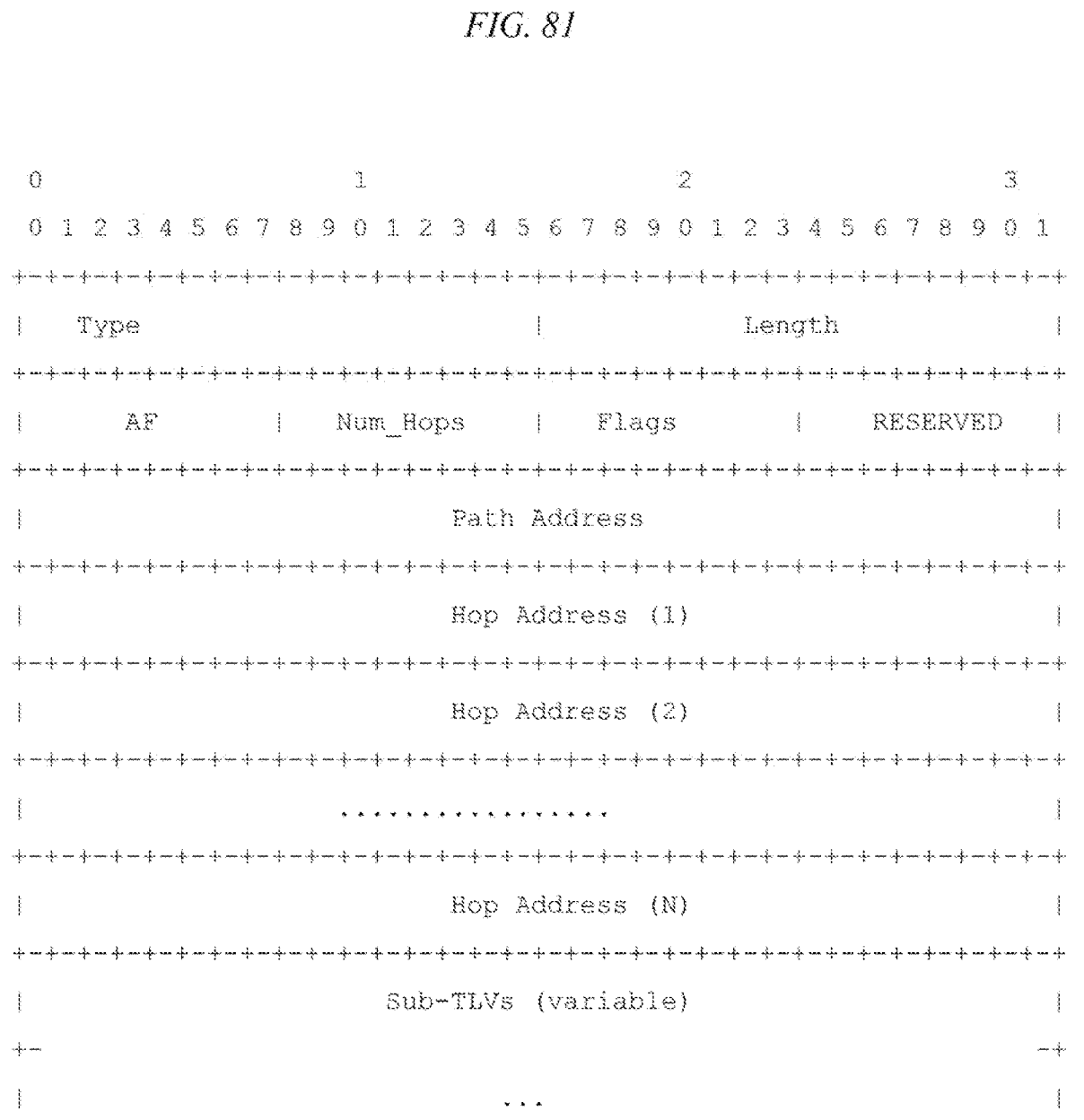

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type                        |          Length               |
+-+-+-+-+-+-+-+-+-+-+-+-+-+-+-+-+-+-+-+-+-+-+-+-+-+-+-+-+-+-+-+-+
|      AF       |   Num_Hops    |    Flags      |   RESERVED    |
+-+-+-+-+-+-+-+-+-+-+-+-+-+-+-+-+-+-+-+-+-+-+-+-+-+-+-+-+-+-+-+-+
|                          Path Address                         |
+-+-+-+-+-+-+-+-+-+-+-+-+-+-+-+-+-+-+-+-+-+-+-+-+-+-+-+-+-+-+-+-+
|                          Hop Address (1)                      |
+-+-+-+-+-+-+-+-+-+-+-+-+-+-+-+-+-+-+-+-+-+-+-+-+-+-+-+-+-+-+-+-+
|                          Hop Address (2)                      |
+-+-+-+-+-+-+-+-+-+-+-+-+-+-+-+-+-+-+-+-+-+-+-+-+-+-+-+-+-+-+-+-+
|                ................                               |
+-+-+-+-+-+-+-+-+-+-+-+-+-+-+-+-+-+-+-+-+-+-+-+-+-+-+-+-+-+-+-+-+
|                          Hop Address (N)                      |
+-+-+-+-+-+-+-+-+-+-+-+-+-+-+-+-+-+-+-+-+-+-+-+-+-+-+-+-+-+-+-+-+
|                     Sub-TLVs (variable)                       |
+-                                                             -+
|                               ...                             |
```

FIG. 82

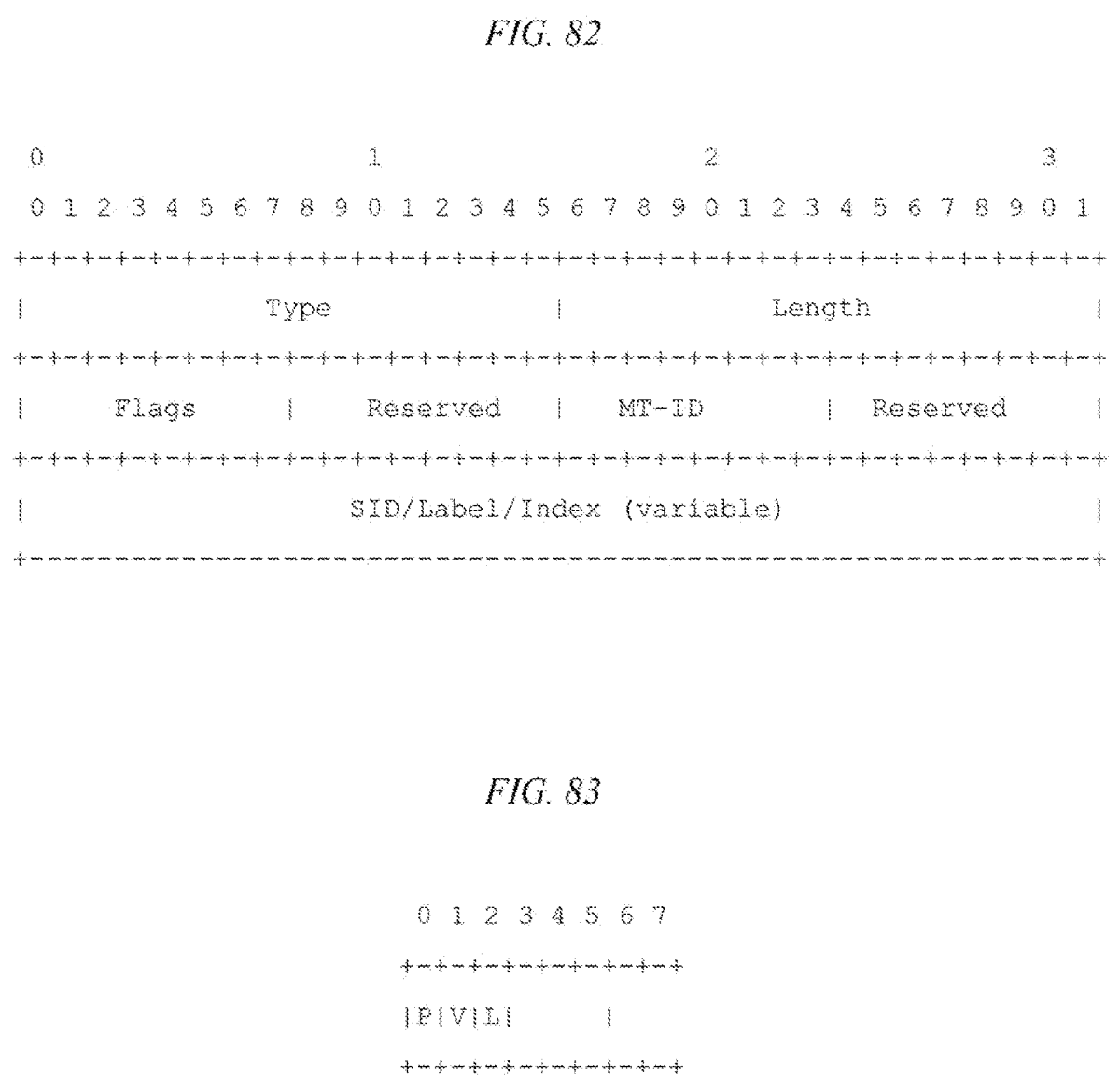

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |            Length             |
+-+-+-+-+-+-+-+-+-+-+-+-+-+-+-+-+-+-+-+-+-+-+-+-+-+-+-+-+-+-+-+-+
|     Flags     |   Reserved    |     MT-ID     |   Reserved    |
+-+-+-+-+-+-+-+-+-+-+-+-+-+-+-+-+-+-+-+-+-+-+-+-+-+-+-+-+-+-+-+-+
|                  SID/Label/Index (variable)                   |
+---------------------------------------------------------------+
```

```
 0 1 2 3 4 5 6 7
+-+-+-+-+-+-+-+-+
|P|V|L|         |
+-+-+-+-+-+-+-+-+
```

Figures 84, 85, 86:
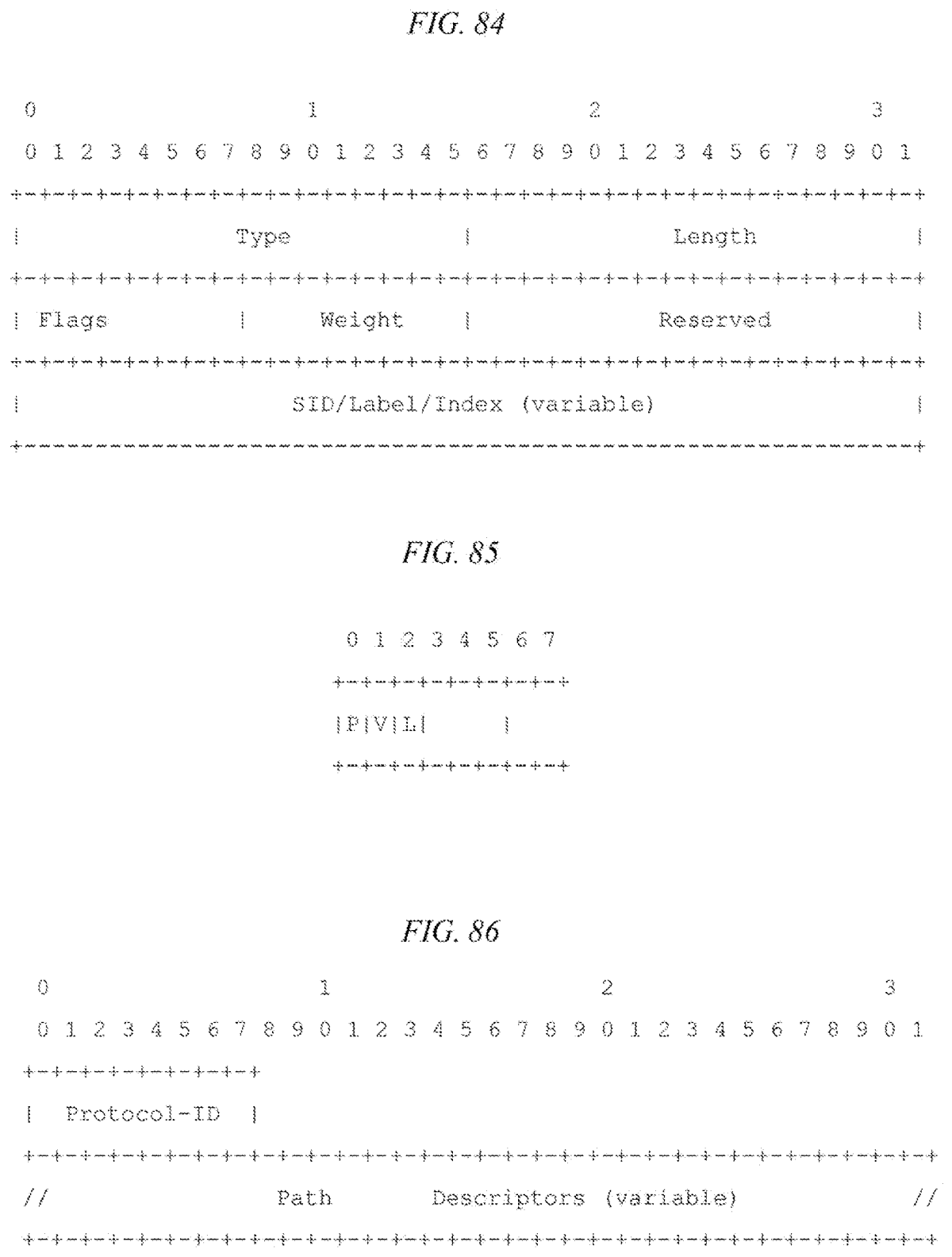

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |            Length             |
+-+-+-+-+-+-+-+-+-+-+-+-+-+-+-+-+-+-+-+-+-+-+-+-+-+-+-+-+-+-+-+-+
| Flags         |     Weight    |           Reserved            |
+-+-+-+-+-+-+-+-+-+-+-+-+-+-+-+-+-+-+-+-+-+-+-+-+-+-+-+-+-+-+-+-+
|                  SID/Label/Index (variable)                   |
+---------------------------------------------------------------+
```

```
 0 1 2 3 4 5 6 7
+-+-+-+-+-+-+-+-+
|P|V|L|         |
+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|  Protocol-ID  |
+-+-+-+-+-+-+-+-+-+-+-+-+-+-+-+-+-+-+-+-+-+-+-+-+-+-+-+-+-+-+-+-+
//                Path       Descriptors (variable)            //
+-+-+-+-+-+-+-+-+-+-+-+-+-+-+-+-+-+-+-+-+-+-+-+-+-+-+-+-+-+-+-+-+
```

FIG. 87

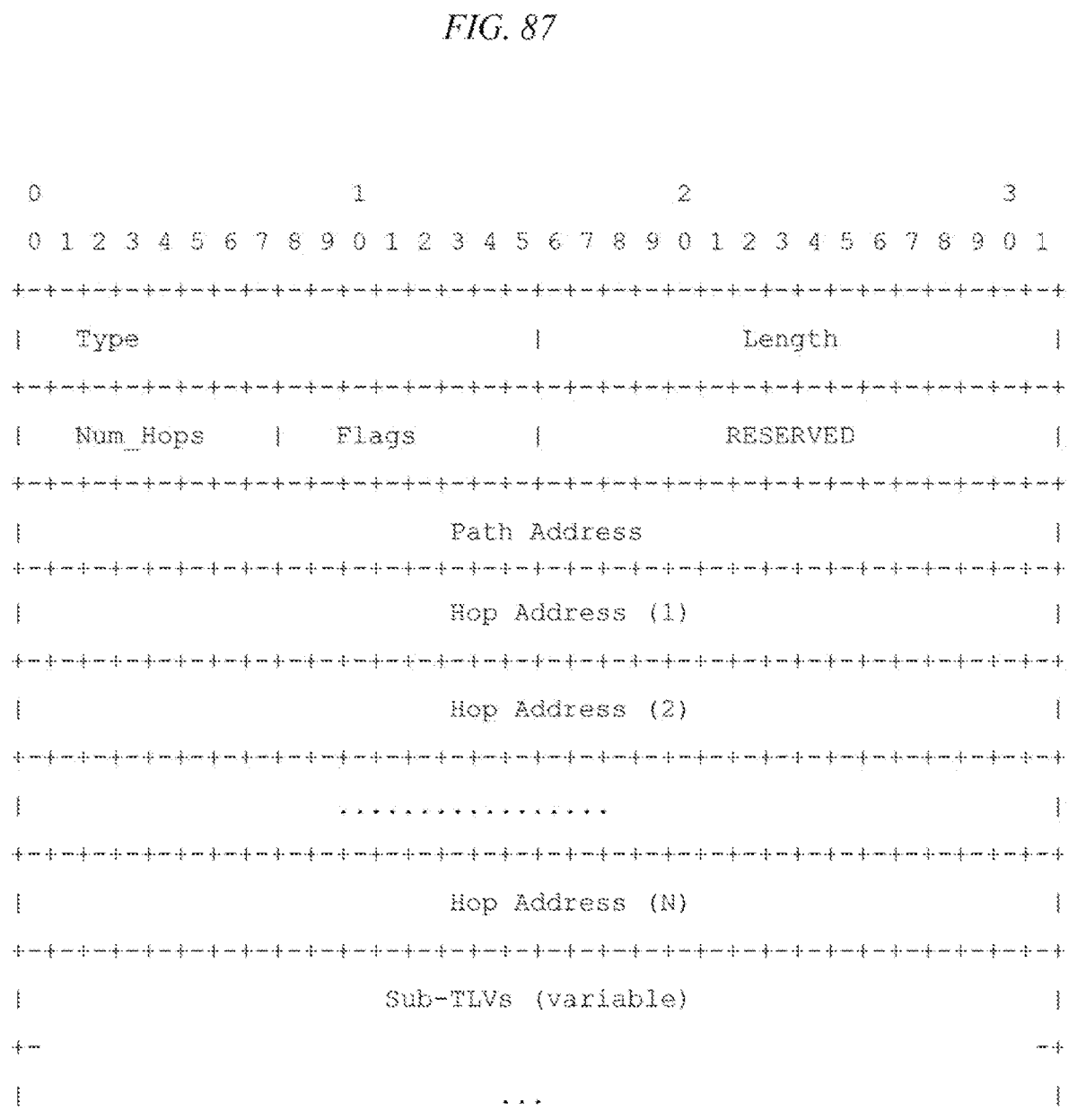

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type                        |           Length              |
+-+-+-+-+-+-+-+-+-+-+-+-+-+-+-+-+-+-+-+-+-+-+-+-+-+-+-+-+-+-+-+-+
|   Num_Hops    |   Flags       |          RESERVED             |
+-+-+-+-+-+-+-+-+-+-+-+-+-+-+-+-+-+-+-+-+-+-+-+-+-+-+-+-+-+-+-+-+
|                          Path Address                         |
+-+-+-+-+-+-+-+-+-+-+-+-+-+-+-+-+-+-+-+-+-+-+-+-+-+-+-+-+-+-+-+-+
|                          Hop Address (1)                      |
+-+-+-+-+-+-+-+-+-+-+-+-+-+-+-+-+-+-+-+-+-+-+-+-+-+-+-+-+-+-+-+-+
|                          Hop Address (2)                      |
+-+-+-+-+-+-+-+-+-+-+-+-+-+-+-+-+-+-+-+-+-+-+-+-+-+-+-+-+-+-+-+-+
|                  .................                            |
+-+-+-+-+-+-+-+-+-+-+-+-+-+-+-+-+-+-+-+-+-+-+-+-+-+-+-+-+-+-+-+-+
|                          Hop Address (N)                      |
+-+-+-+-+-+-+-+-+-+-+-+-+-+-+-+-+-+-+-+-+-+-+-+-+-+-+-+-+-+-+-+-+
|                     Sub-TLVs (variable)                       |
+-                                                             -+
|                               ...                             |
```

*FIG. 88*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type (=267)                 |            Length             |
+-+-+-+-+-+-+-+-+-+-+-+-+-+-+-+-+-+-+-+-+-+-+-+-+-+-+-+-+-+-+-+-+
|   Num_Hops    |   Flags       |           RESERVED            |
+-+-+-+-+-+-+-+-+-+-+-+-+-+-+-+-+-+-+-+-+-+-+-+-+-+-+-+-+-+-+-+-+
|                                                               |
+                                                               +
|                     IPv6 Path Address                         |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                     IPv6 Hop Address (1)                      |
+                                                               +
|                                                               |
+                                                               +
|                                                               |
|
~~~~~~~~~~~~~~~~~~~~~~~~~~~~~~~~~~~~~~~~~~~~~~~~~~~~~~~~~~~~~~~~~
```

*FIG. 88*
*CON'T*

```
+-+-+-+-+-+-+-+-+-+-+-+-+-+-+-+-+-+-+-+-+-+-+-+-+-+-+-+-+-+-+-+-+
|                                                               |
+                                                               +
|                    IPv6 Hop Address (2)                       |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                 .................                             |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                    IPv6 Hop Address (N)                       |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                     Sub-TLVs (variable)                       |
|                              ...                              |
```

FIG. 89

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
| Flags       |                    Reserved                     |
+-+-+-+-+-+-+-+-+-+-+-+-+-+-+-+-+-+-+-+-+-+-+-+-+-+-+-+-+-+-+-+-+
|                SID/Label/Index (variable)                     |
+---------------------------------------------------------------+
```

```
 0 1 2 3 4 5 6 7
+-+-+-+-+-+-+-+-+
|P|V|L|         |
+-+-+-+-+-+-+-+-+
```

| Advertising Router | Path | Path Address |
|---|---|---|
| AREA: SELF | | |
| R1 | .................. | .................. |
| | .................. | .................. |
| R2 | {IP-23, IP-35, IP-57} | IP-2357 |
| | {IP-25, IP-56} | IP-256 |
| R3 | .................. | .................. |
| | .................. | .................. |
| R4 | .................. | .................. |
| .................................................................................................. | | |
| R9 | .................. | .................. |
| | .................. | .................. |
| AREA: OTHER | | |
| R10 | .................. | .................. |
| | .................. | .................. |
| R11 | .................. | .................. |
| | .................. | .................. |
| .................................................................................................. | | |
| RN | .................. | .................. |
| | .................. | .................. |

FIG. 92

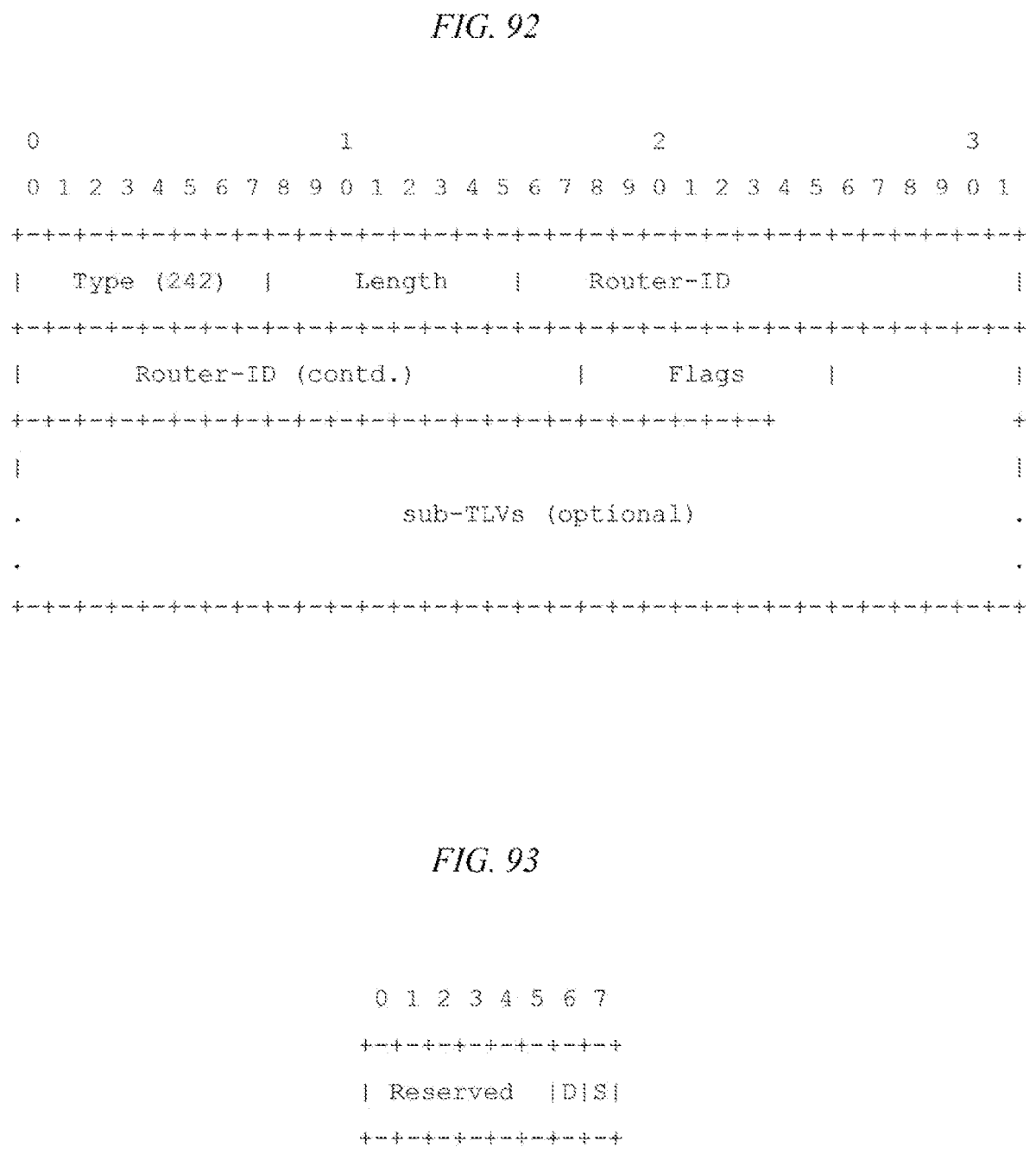

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type (242)  |     Length    |    Router-ID                  |
+-+-+-+-+-+-+-+-+-+-+-+-+-+-+-+-+-+-+-+-+-+-+-+-+-+-+-+-+-+-+-+-+
|       Router-ID (contd.)      |      Flags      |             |
+-+-+-+-+-+-+-+-+-+-+-+-+-+-+-+-+-+-+-+-+-+-+-+-+-+             +
|                                                               |
.                      sub-TLVs (optional)                      .
.                                                               .
+-+-+-+-+-+-+-+-+-+-+-+-+-+-+-+-+-+-+-+-+-+-+-+-+-+-+-+-+-+-+-+-+
```

FIG. 93

```
 0 1 2 3 4 5 6 7
+-+-+-+-+-+-+-+-+
| Reserved  |D|S|
+-+-+-+-+-+-+-+-+
```

*FIG. 94*

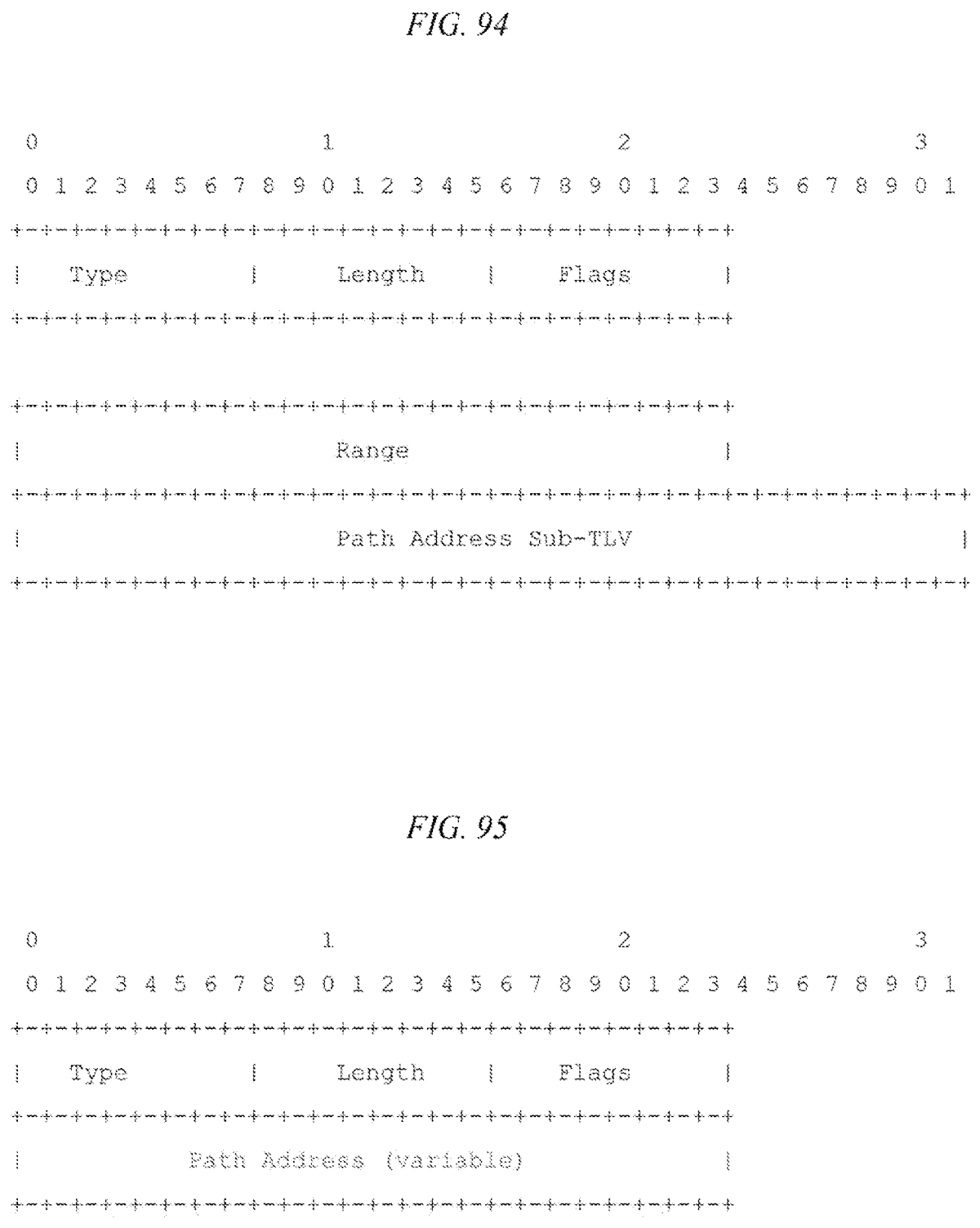

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|    Type       |    Length     |    Flags      |
+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+
|                    Range                      |
+-+-+-+-+-+-+-+-+-+-+-+-+-+-+-+-+-+-+-+-+-+-+-+-+-+-+-+-+-+-+-+-+
|                    Path Address Sub-TLV                       |
+-+-+-+-+-+-+-+-+-+-+-+-+-+-+-+-+-+-+-+-+-+-+-+-+-+-+-+-+-+-+-+-+
```

*FIG. 95*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|    Type       |    Length     |    Flags      |
+-+-+-+-+-+-+-+-+-+-+-+-+-+-+-+-+-+-+-+-+-+-+-+-+
|          Path Address (variable)              |
+-+-+-+-+-+-+-+-+-+-+-+-+-+-+-+-+-+-+-+-+-+-+-+-+
```

FIG. 96

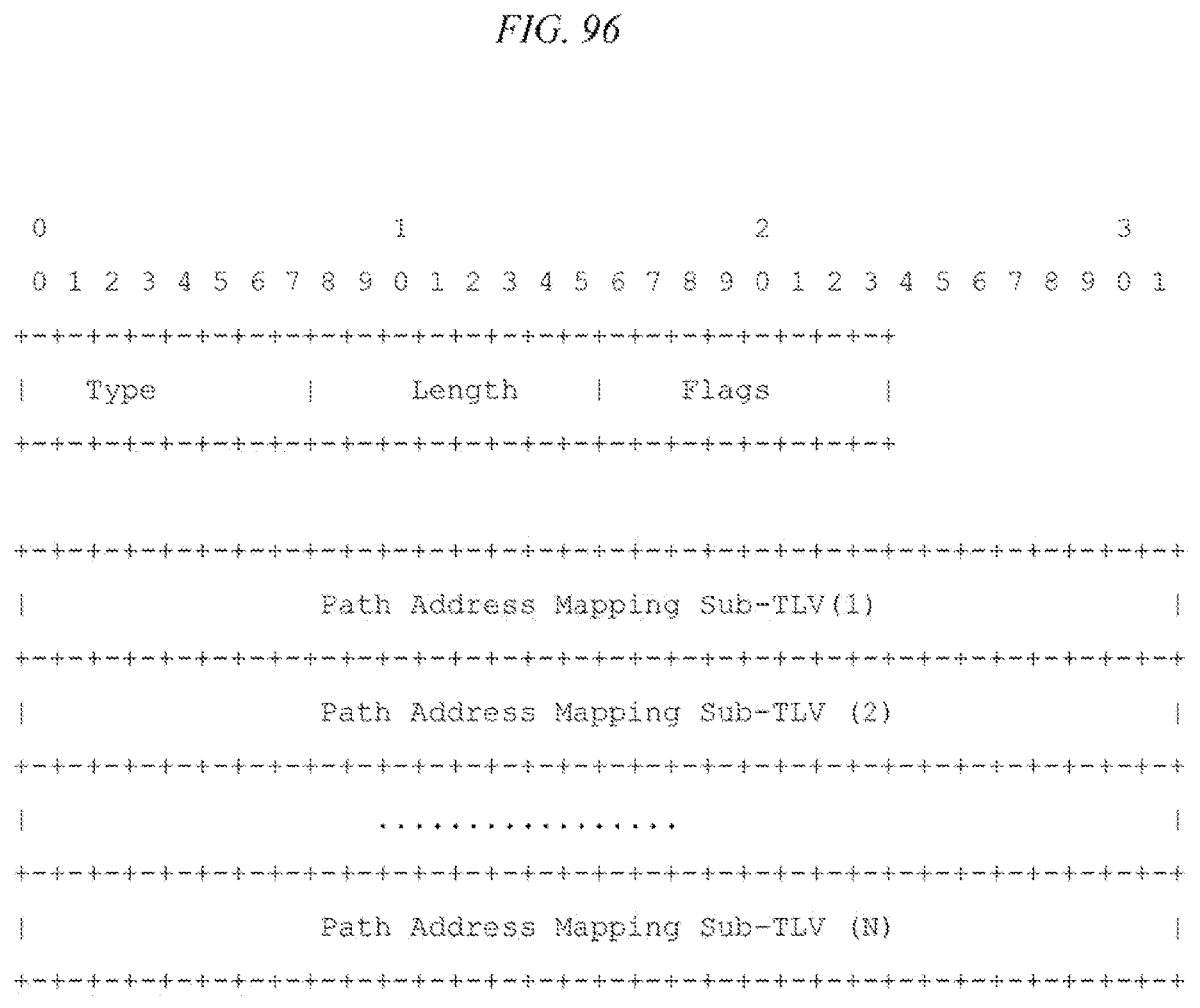

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|   Type        |     Length    |    Flags      |
+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                Path Address Mapping Sub-TLV(1)                |
+-+-+-+-+-+-+-+-+-+-+-+-+-+-+-+-+-+-+-+-+-+-+-+-+-+-+-+-+-+-+-+-+
|                Path Address Mapping Sub-TLV (2)               |
+-+-+-+-+-+-+-+-+-+-+-+-+-+-+-+-+-+-+-+-+-+-+-+-+-+-+-+-+-+-+-+-+
|                   .................                           |
+-+-+-+-+-+-+-+-+-+-+-+-+-+-+-+-+-+-+-+-+-+-+-+-+-+-+-+-+-+-+-+-+
|                Path Address Mapping Sub-TLV (N)               |
+-+-+-+-+-+-+-+-+-+-+-+-+-+-+-+-+-+-+-+-+-+-+-+-+-+-+-+-+-+-+-+-+
```

FIG. 97

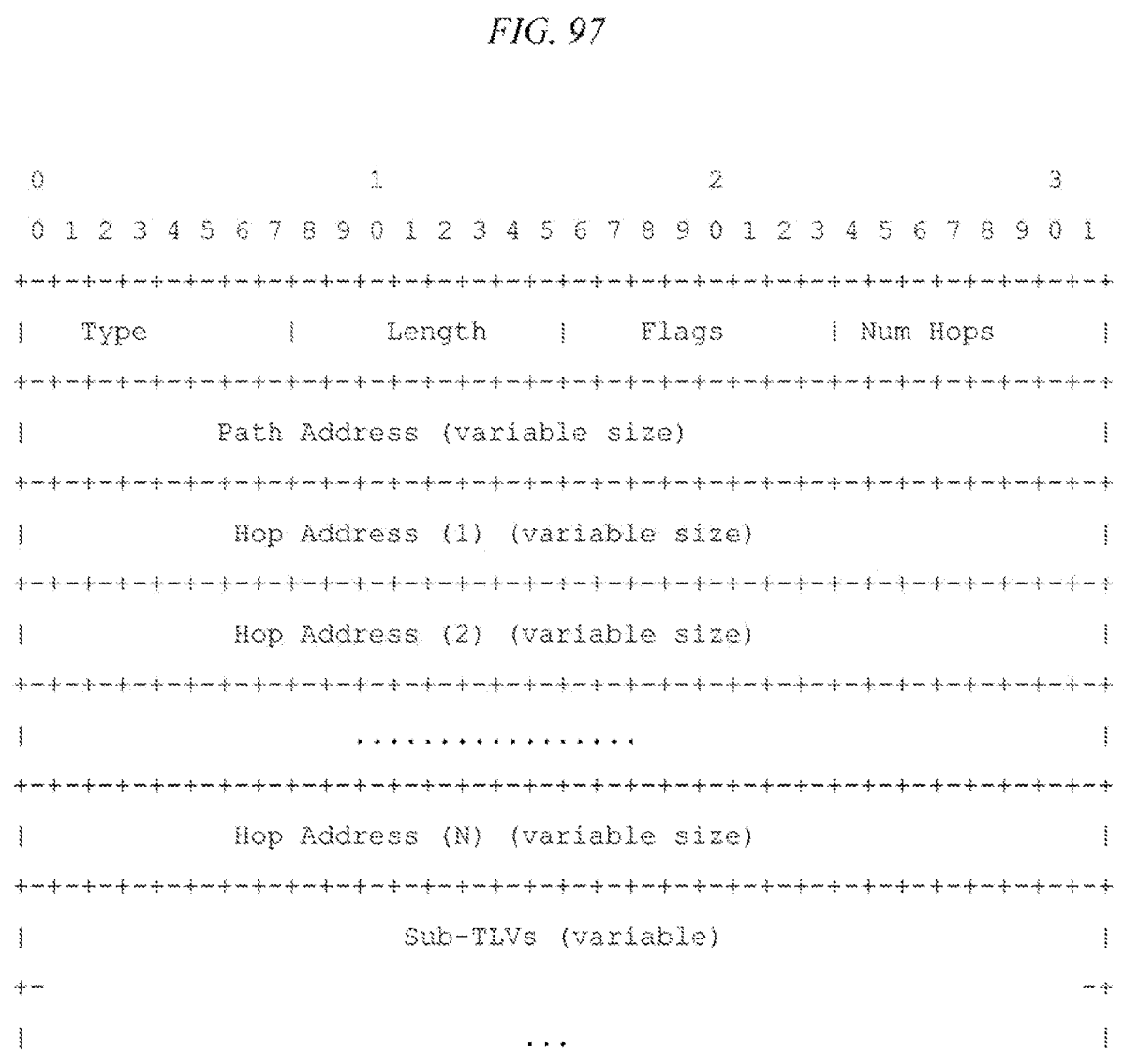

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type        |    Length     |    Flags      | Num Hops      |
+-+-+-+-+-+-+-+-+-+-+-+-+-+-+-+-+-+-+-+-+-+-+-+-+-+-+-+-+-+-+-+-+
|           Path Address (variable size)                        |
+-+-+-+-+-+-+-+-+-+-+-+-+-+-+-+-+-+-+-+-+-+-+-+-+-+-+-+-+-+-+-+-+
|            Hop Address (1) (variable size)                    |
+-+-+-+-+-+-+-+-+-+-+-+-+-+-+-+-+-+-+-+-+-+-+-+-+-+-+-+-+-+-+-+-+
|            Hop Address (2) (variable size)                    |
+-+-+-+-+-+-+-+-+-+-+-+-+-+-+-+-+-+-+-+-+-+-+-+-+-+-+-+-+-+-+-+-+
|                    .................                          |
+-+-+-+-+-+-+-+-+-+-+-+-+-+-+-+-+-+-+-+-+-+-+-+-+-+-+-+-+-+-+-+-+
|            Hop Address (N) (variable size)                    |
+-+-+-+-+-+-+-+-+-+-+-+-+-+-+-+-+-+-+-+-+-+-+-+-+-+-+-+-+-+-+-+-+
|                      Sub-TLVs (variable)                      |
+-                                                             -+
|                              ...                              |
```

FIG. 98

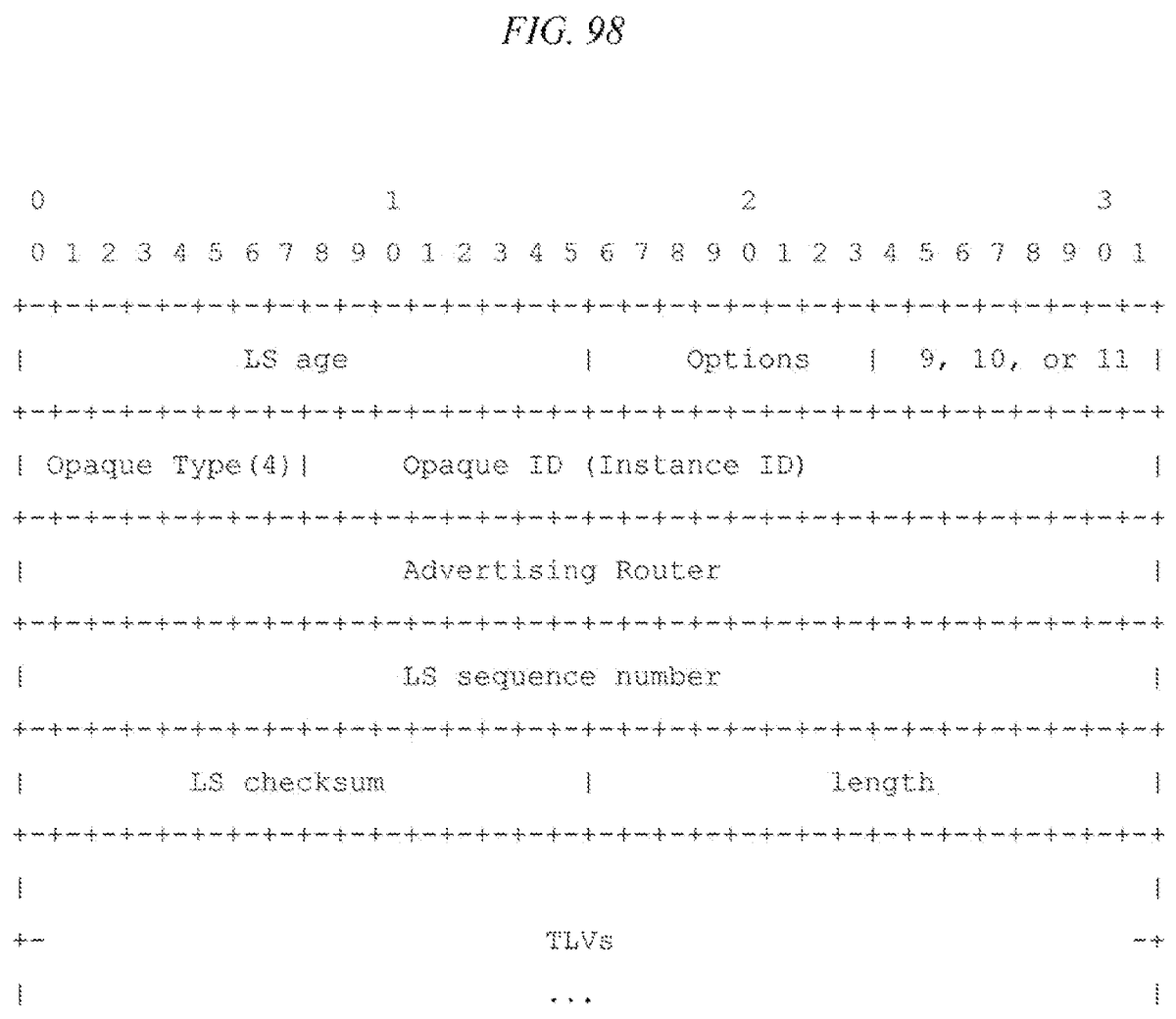

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |     Options   | 9, 10, or 11 |
+-+-+-+-+-+-+-+-+-+-+-+-+-+-+-+-+-+-+-+-+-+-+-+-+-+-+-+-+-+-+-+-+
| Opaque Type(4)|      Opaque ID (Instance ID)                  |
+-+-+-+-+-+-+-+-+-+-+-+-+-+-+-+-+-+-+-+-+-+-+-+-+-+-+-+-+-+-+-+-+
|                      Advertising Router                       |
+-+-+-+-+-+-+-+-+-+-+-+-+-+-+-+-+-+-+-+-+-+-+-+-+-+-+-+-+-+-+-+-+
|                      LS sequence number                       |
+-+-+-+-+-+-+-+-+-+-+-+-+-+-+-+-+-+-+-+-+-+-+-+-+-+-+-+-+-+-+-+-+
|         LS checksum           |             length            |
+-+-+-+-+-+-+-+-+-+-+-+-+-+-+-+-+-+-+-+-+-+-+-+-+-+-+-+-+-+-+-+-+
|                                                               |
+-                            TLVs                             -+
|                             ...                               |
```

FIG. 99

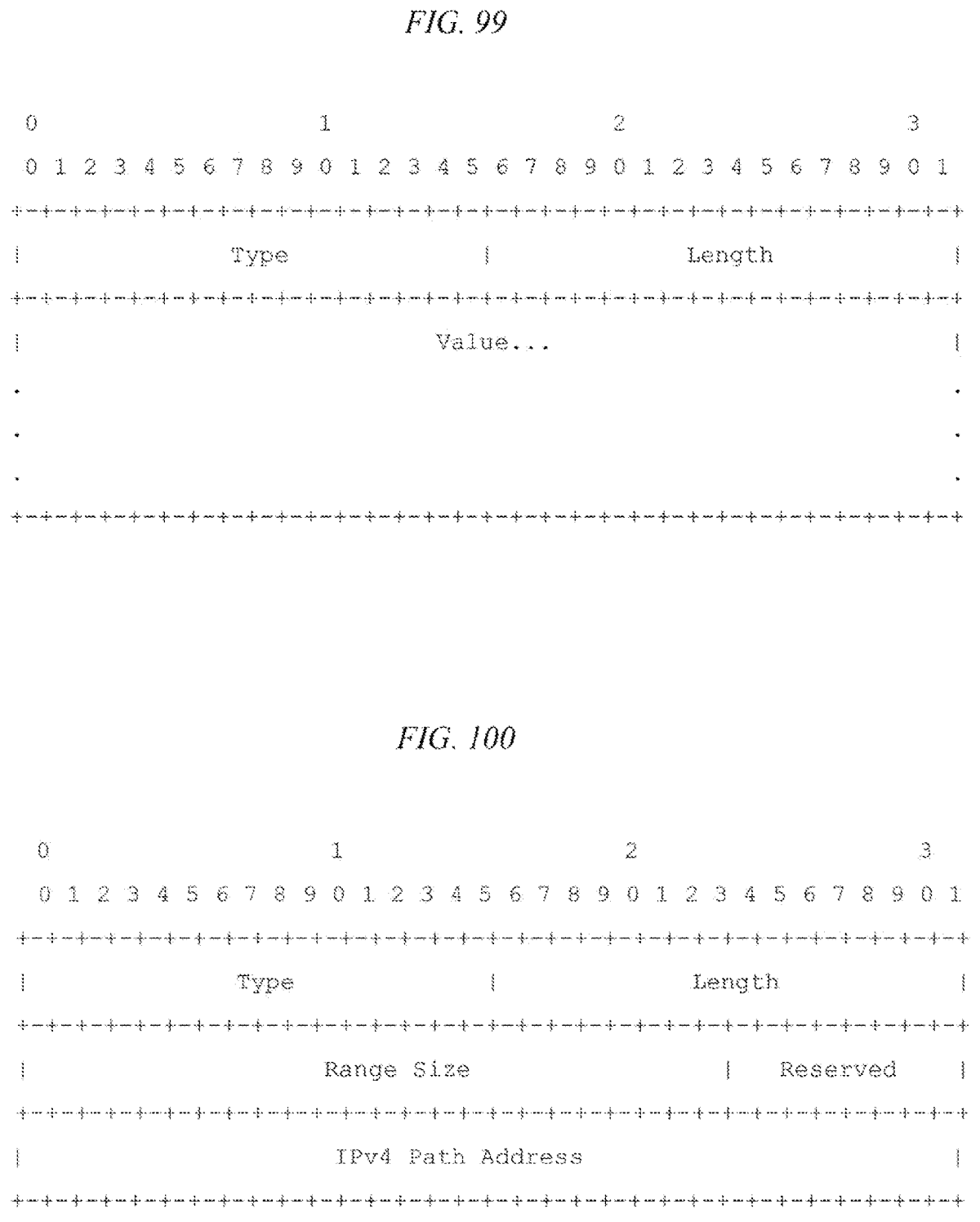

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                           Value...                            |
.                                                               .
.                                                               .
.                                                               .
+-+-+-+-+-+-+-+-+-+-+-+-+-+-+-+-+-+-+-+-+-+-+-+-+-+-+-+-+-+-+-+-+
```

FIG. 100

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                  Range Size                   |   Reserved    |
+-+-+-+-+-+-+-+-+-+-+-+-+-+-+-+-+-+-+-+-+-+-+-+-+-+-+-+-+-+-+-+-+
|                       IPv4 Path Address                       |
+-+-+-+-+-+-+-+-+-+-+-+-+-+-+-+-+-+-+-+-+-+-+-+-+-+-+-+-+-+-+-+-+
```

FIG. 101

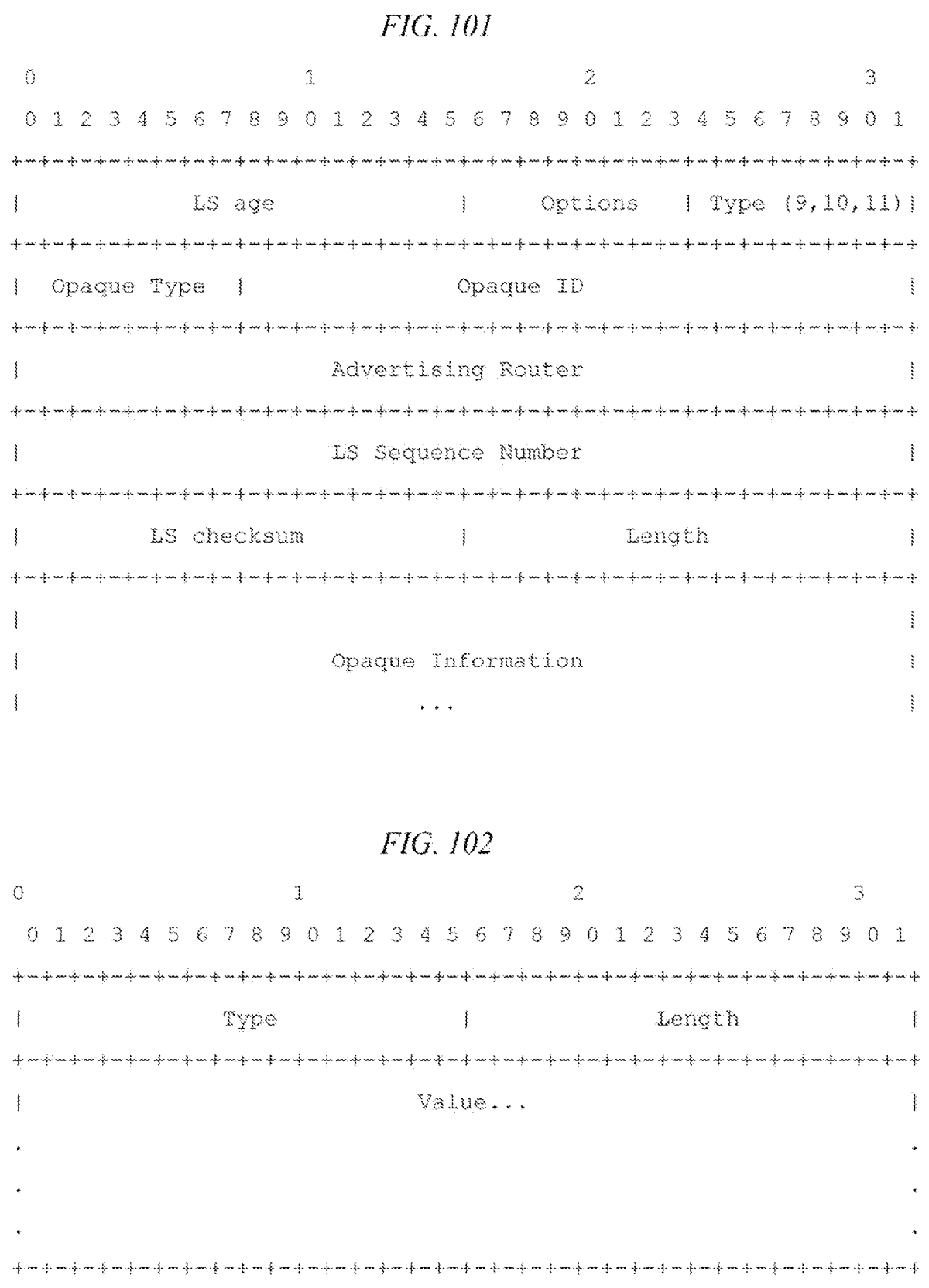

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |    Options    | Type (9,10,11)|
+-+-+-+-+-+-+-+-+-+-+-+-+-+-+-+-+-+-+-+-+-+-+-+-+-+-+-+-+-+-+-+-+
|  Opaque Type  |               Opaque ID                       |
+-+-+-+-+-+-+-+-+-+-+-+-+-+-+-+-+-+-+-+-+-+-+-+-+-+-+-+-+-+-+-+-+
|                      Advertising Router                       |
+-+-+-+-+-+-+-+-+-+-+-+-+-+-+-+-+-+-+-+-+-+-+-+-+-+-+-+-+-+-+-+-+
|                      LS Sequence Number                       |
+-+-+-+-+-+-+-+-+-+-+-+-+-+-+-+-+-+-+-+-+-+-+-+-+-+-+-+-+-+-+-+-+
|         LS checksum           |           Length              |
+-+-+-+-+-+-+-+-+-+-+-+-+-+-+-+-+-+-+-+-+-+-+-+-+-+-+-+-+-+-+-+-+
|                                                               |
|                      Opaque Information                       |
|                              ...                              |
```

FIG. 102

```
0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|                            Value...                           |
.                                                               .
.                                                               .
.                                                               .
+-+-+-+-+-+-+-+-+-+-+-+-+-+-+-+-+-+-+-+-+-+-+-+-+-+-+-+-+-+-+-+-+
```

FIG. 103

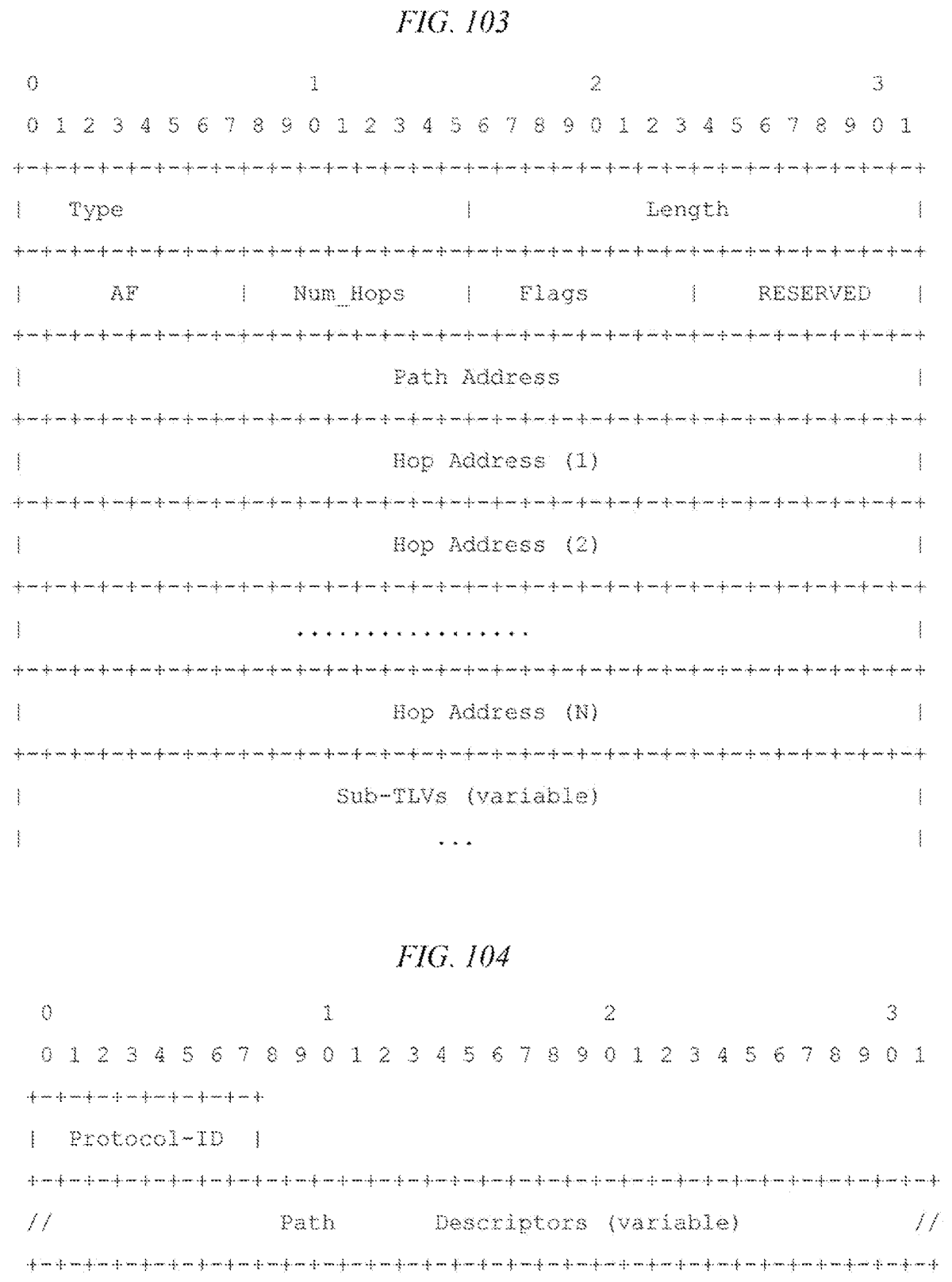

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type                        |           Length              |
+-+-+-+-+-+-+-+-+-+-+-+-+-+-+-+-+-+-+-+-+-+-+-+-+-+-+-+-+-+-+-+-+
|      AF       |   Num_Hops    |  Flags        |    RESERVED   |
+-+-+-+-+-+-+-+-+-+-+-+-+-+-+-+-+-+-+-+-+-+-+-+-+-+-+-+-+-+-+-+-+
|                         Path Address                          |
+-+-+-+-+-+-+-+-+-+-+-+-+-+-+-+-+-+-+-+-+-+-+-+-+-+-+-+-+-+-+-+-+
|                         Hop Address (1)                       |
+-+-+-+-+-+-+-+-+-+-+-+-+-+-+-+-+-+-+-+-+-+-+-+-+-+-+-+-+-+-+-+-+
|                         Hop Address (2)                       |
+-+-+-+-+-+-+-+-+-+-+-+-+-+-+-+-+-+-+-+-+-+-+-+-+-+-+-+-+-+-+-+-+
|                ................                               |
+-+-+-+-+-+-+-+-+-+-+-+-+-+-+-+-+-+-+-+-+-+-+-+-+-+-+-+-+-+-+-+-+
|                         Hop Address (N)                       |
+-+-+-+-+-+-+-+-+-+-+-+-+-+-+-+-+-+-+-+-+-+-+-+-+-+-+-+-+-+-+-+-+
|                     Sub-TLVs (variable)                       |
|                              ...                              |
```

FIG. 104

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|  Protocol-ID  |
+-+-+-+-+-+-+-+-+-+-+-+-+-+-+-+-+-+-+-+-+-+-+-+-+-+-+-+-+-+-+-+-+
//               Path       Descriptors (variable)             //
+-+-+-+-+-+-+-+-+-+-+-+-+-+-+-+-+-+-+-+-+-+-+-+-+-+-+-+-+-+-+-+-+
```

*FIG. 105*

```
+-+-+-+-+-+-+-+-+-+-+-+-+-+-+-+-+-+-+-+-+-+-+-+-+-+-+-+-+-+-+-+-+
|   Type                        |            Length             |
+-+-+-+-+-+-+-+-+-+-+-+-+-+-+-+-+-+-+-+-+-+-+-+-+-+-+-+-+-+-+-+-+
|   Num_Hops    |   Flags       |           RESERVED            |
+-+-+-+-+-+-+-+-+-+-+-+-+-+-+-+-+-+-+-+-+-+-+-+-+-+-+-+-+-+-+-+-+
|                          Path Address                         |
+-+-+-+-+-+-+-+-+-+-+-+-+-+-+-+-+-+-+-+-+-+-+-+-+-+-+-+-+-+-+-+-+
|                          Hop Address (1)                      |
+-+-+-+-+-+-+-+-+-+-+-+-+-+-+-+-+-+-+-+-+-+-+-+-+-+-+-+-+-+-+-+-+
|                          Hop Address (2)                      |
+-+-+-+-+-+-+-+-+-+-+-+-+-+-+-+-+-+-+-+-+-+-+-+-+-+-+-+-+-+-+-+-+
|                ..................                             |
+-+-+-+-+-+-+-+-+-+-+-+-+-+-+-+-+-+-+-+-+-+-+-+-+-+-+-+-+-+-+-+-+
|                          Hop Address (N)                      |
+-+-+-+-+-+-+-+-+-+-+-+-+-+-+-+-+-+-+-+-+-+-+-+-+-+-+-+-+-+-+-+-+
|                     Sub-TLVs (variable)                       |
+-                                                             -+
|                              ...                              |
```

*FIG. 106*

| Advertising Router | Path | Path Address |
|---|---|---|
| AREA: SELF | | |
| R1 | ………………… | ………………… |
| | ………………… | ………………… |
| R2 | {IP6-23, IP6-35, IP6-57} | IP6-2357 |
| | {IP6-25, IP6-56} | IP6-256 |
| R3 | ………………… | ………………… |
| | ………………… | ………………… |
| R4 | ………………… | ………………… |
| ………………………………………… | | |
| R9 | ………………… | ………………… |
| | ………………… | ………………… |
| AREA: OTHER | | |
| R10 | ………………… | ………………… |
| | ………………… | ………………… |
| R11 | ………………… | ………………… |
| | ………………… | ………………… |
| ………………………………………… | | |
| RN | ………………… | ………………… |
| | ………………… | ………………… |

FIG. 107

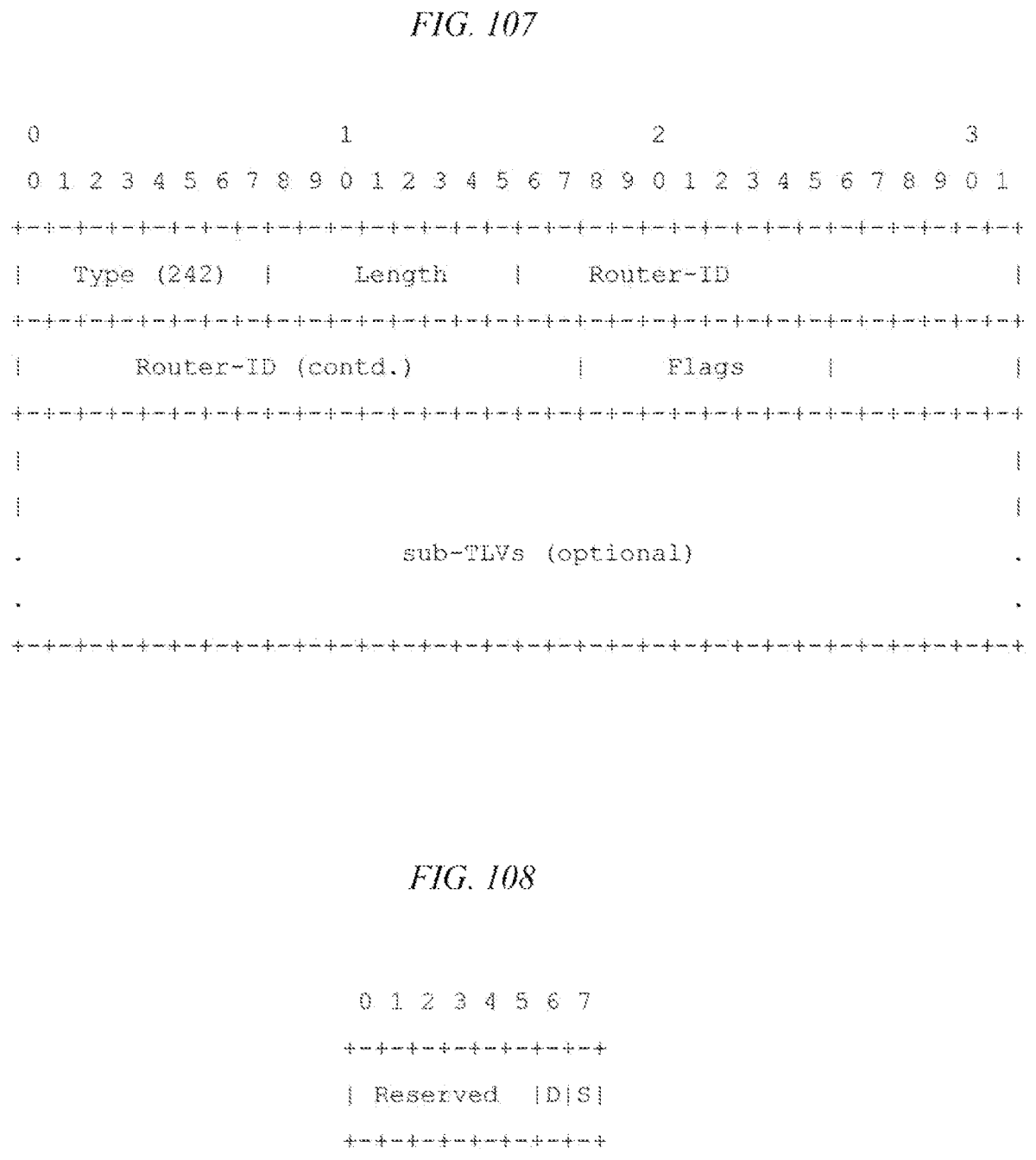

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type (242)  |     Length    |    Router-ID                  |
+-+-+-+-+-+-+-+-+-+-+-+-+-+-+-+-+-+-+-+-+-+-+-+-+-+-+-+-+-+-+-+-+
|       Router-ID (contd.)      |      Flags    |               |
+-+-+-+-+-+-+-+-+-+-+-+-+-+-+-+-+-+-+-+-+-+-+-+-+-+-+-+-+-+-+-+-+
|                                                               |
|                                                               |
.                      sub-TLVs (optional)                      .
.                                                               .
+-+-+-+-+-+-+-+-+-+-+-+-+-+-+-+-+-+-+-+-+-+-+-+-+-+-+-+-+-+-+-+-+
```

FIG. 108

```
 0 1 2 3 4 5 6 7
+-+-+-+-+-+-+-+-+
| Reserved  |D|S|
+-+-+-+-+-+-+-+-+
```

*FIG. 109*

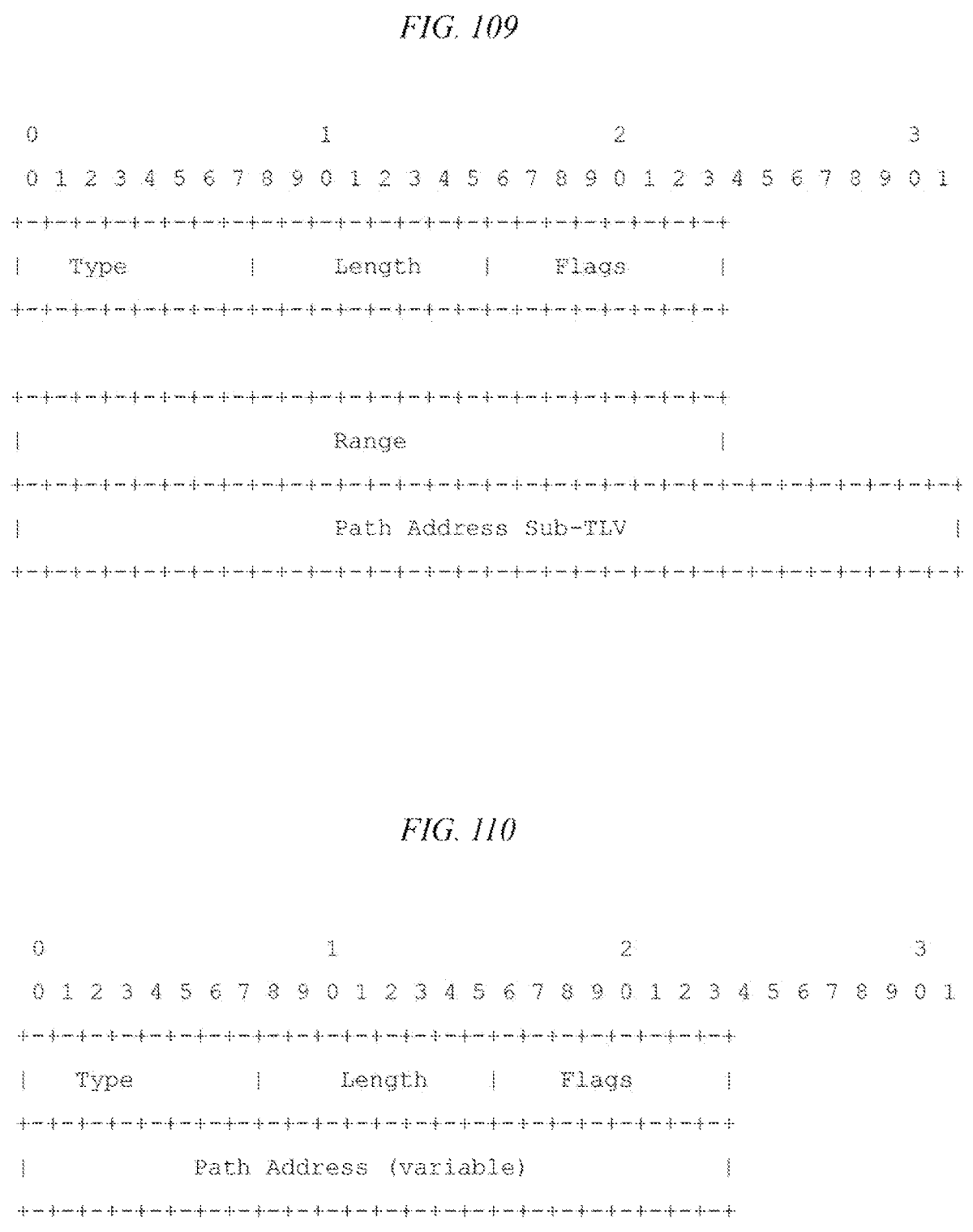

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|   Type        |    Length     |    Flags      |
+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+
|                    Range                      |
+-+-+-+-+-+-+-+-+-+-+-+-+-+-+-+-+-+-+-+-+-+-+-+-+-+-+-+-+-+-+-+-+
|                    Path Address Sub-TLV                       |
+-+-+-+-+-+-+-+-+-+-+-+-+-+-+-+-+-+-+-+-+-+-+-+-+-+-+-+-+-+-+-+-+
```

*FIG. 110*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|   Type        |    Length     |    Flags      |
+-+-+-+-+-+-+-+-+-+-+-+-+-+-+-+-+-+-+-+-+-+-+-+-+
|           Path Address (variable)             |
+-+-+-+-+-+-+-+-+-+-+-+-+-+-+-+-+-+-+-+-+-+-+-+-+
```

FIG. 111

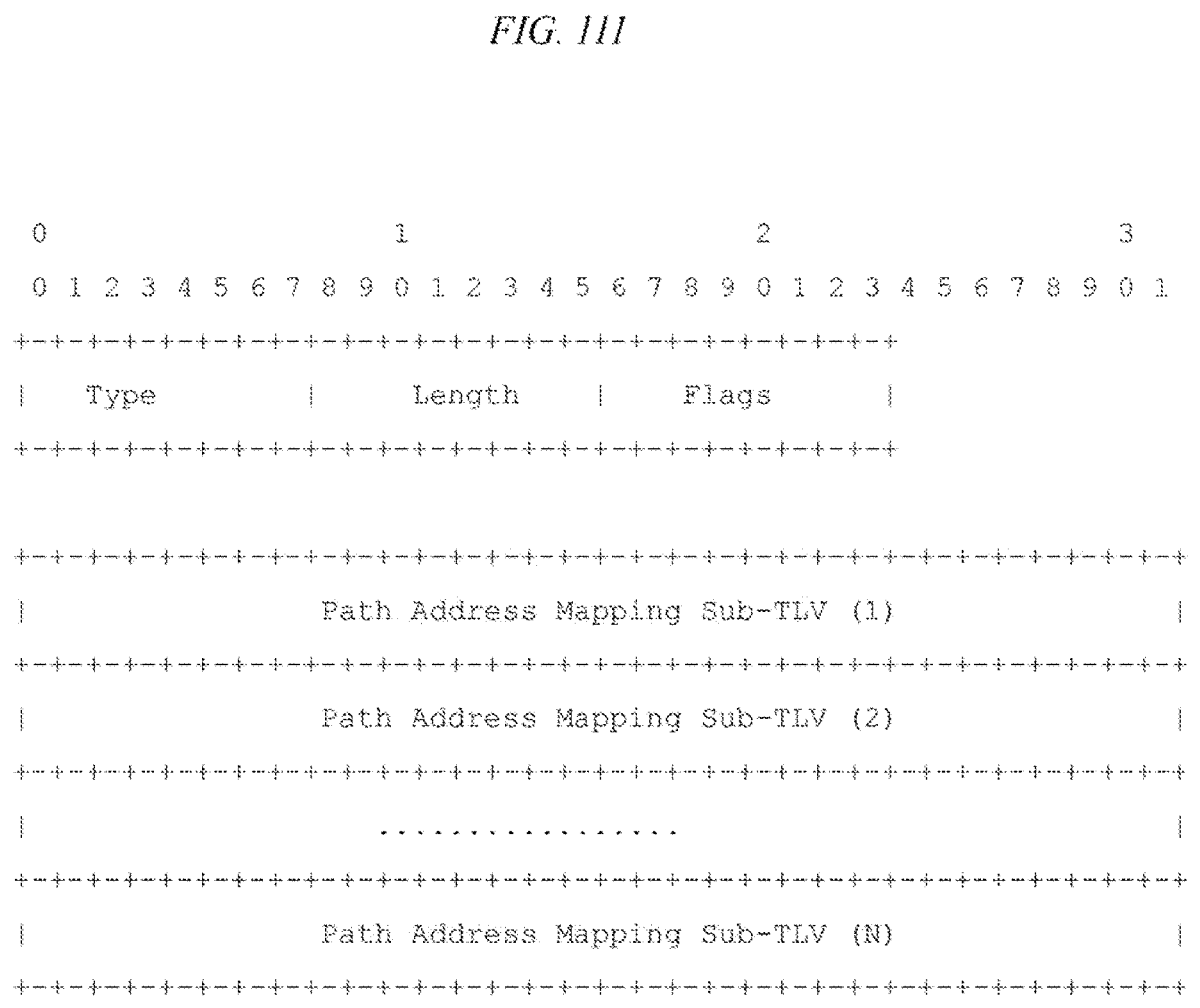

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|    Type       |     Length    |     Flags     |
+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                Path Address Mapping Sub-TLV (1)               |
+-+-+-+-+-+-+-+-+-+-+-+-+-+-+-+-+-+-+-+-+-+-+-+-+-+-+-+-+-+-+-+-+
|                Path Address Mapping Sub-TLV (2)               |
+-+-+-+-+-+-+-+-+-+-+-+-+-+-+-+-+-+-+-+-+-+-+-+-+-+-+-+-+-+-+-+-+
|                   .................                           |
+-+-+-+-+-+-+-+-+-+-+-+-+-+-+-+-+-+-+-+-+-+-+-+-+-+-+-+-+-+-+-+-+
|                Path Address Mapping Sub-TLV (N)               |
+-+-+-+-+-+-+-+-+-+-+-+-+-+-+-+-+-+-+-+-+-+-+-+-+-+-+-+-+-+-+-+-+
```

FIG. 112

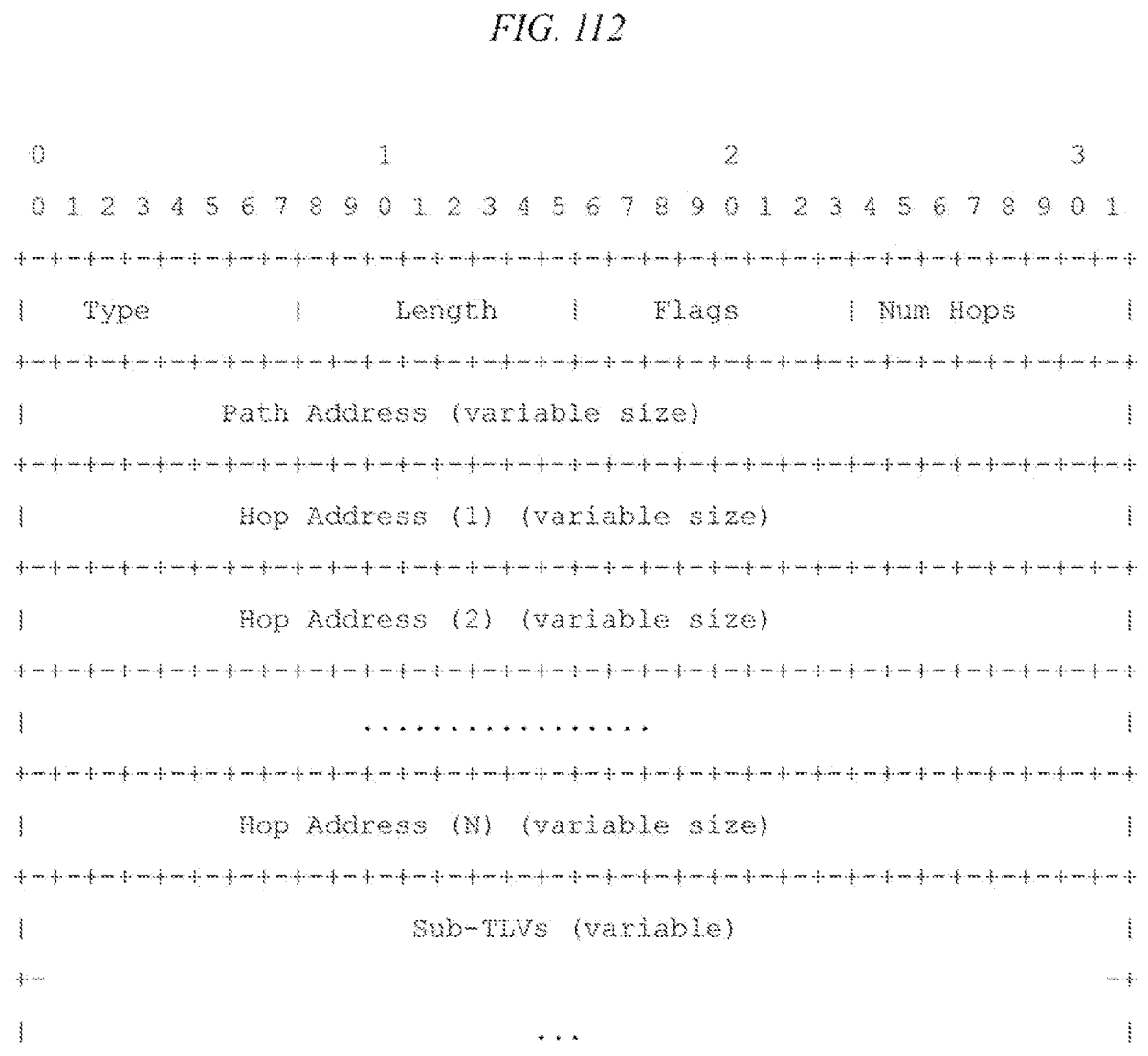

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type        |    Length     |    Flags      | Num Hops      |
+-+-+-+-+-+-+-+-+-+-+-+-+-+-+-+-+-+-+-+-+-+-+-+-+-+-+-+-+-+-+-+-+
|           Path Address (variable size)                        |
+-+-+-+-+-+-+-+-+-+-+-+-+-+-+-+-+-+-+-+-+-+-+-+-+-+-+-+-+-+-+-+-+
|            Hop Address (1) (variable size)                    |
+-+-+-+-+-+-+-+-+-+-+-+-+-+-+-+-+-+-+-+-+-+-+-+-+-+-+-+-+-+-+-+-+
|            Hop Address (2) (variable size)                    |
+-+-+-+-+-+-+-+-+-+-+-+-+-+-+-+-+-+-+-+-+-+-+-+-+-+-+-+-+-+-+-+-+
|                 .................                             |
+-+-+-+-+-+-+-+-+-+-+-+-+-+-+-+-+-+-+-+-+-+-+-+-+-+-+-+-+-+-+-+-+
|            Hop Address (N) (variable size)                    |
+-+-+-+-+-+-+-+-+-+-+-+-+-+-+-+-+-+-+-+-+-+-+-+-+-+-+-+-+-+-+-+-+
|                      Sub-TLVs (variable)                      |
+-                                                             -+
|                           ...                                 |
```

*FIG. 113*

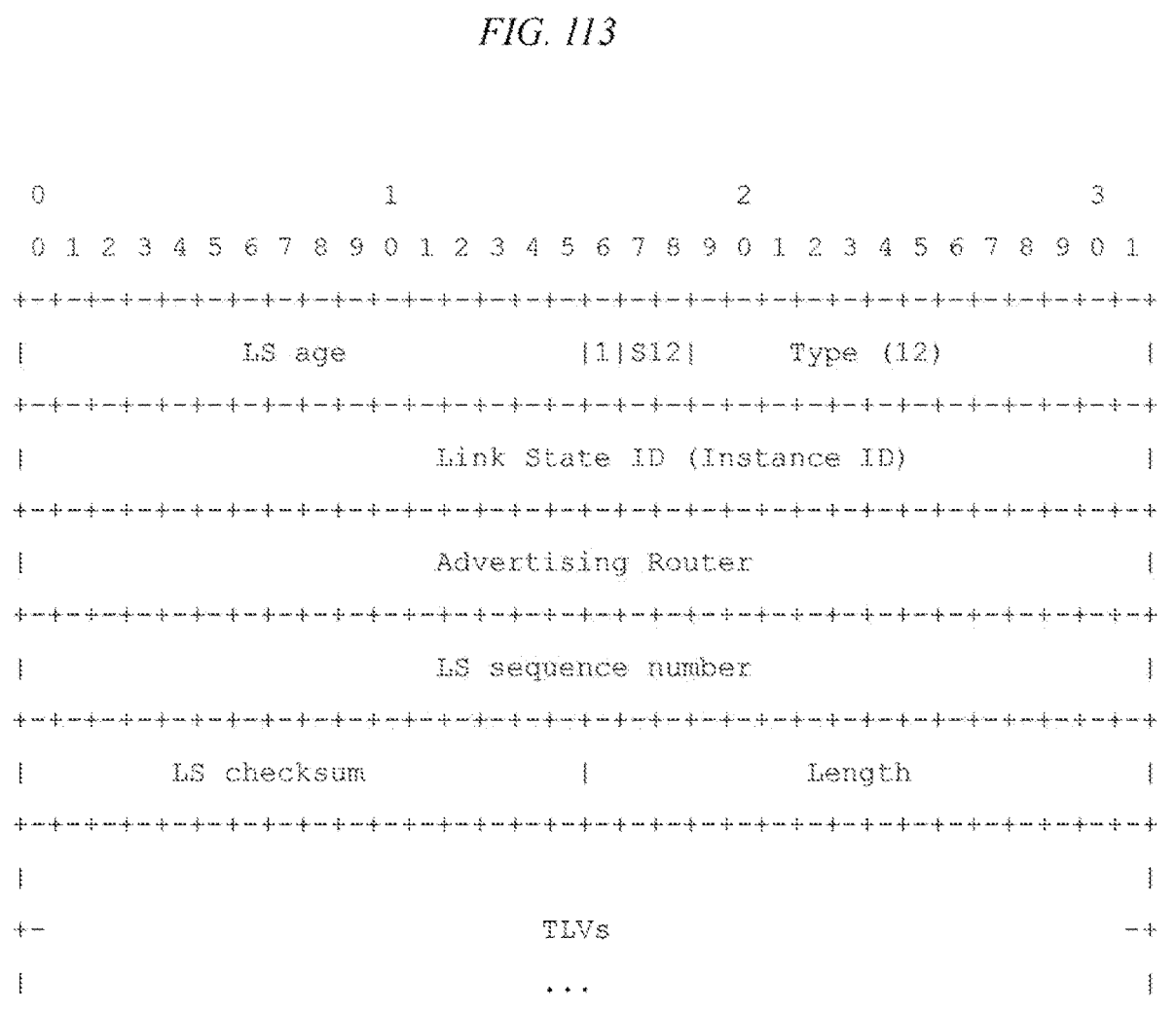

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           LS age            |1|S12|     Type (12)             |
+-+-+-+-+-+-+-+-+-+-+-+-+-+-+-+-+-+-+-+-+-+-+-+-+-+-+-+-+-+-+-+-+
|                    Link State ID (Instance ID)                |
+-+-+-+-+-+-+-+-+-+-+-+-+-+-+-+-+-+-+-+-+-+-+-+-+-+-+-+-+-+-+-+-+
|                    Advertising Router                         |
+-+-+-+-+-+-+-+-+-+-+-+-+-+-+-+-+-+-+-+-+-+-+-+-+-+-+-+-+-+-+-+-+
|                    LS sequence number                         |
+-+-+-+-+-+-+-+-+-+-+-+-+-+-+-+-+-+-+-+-+-+-+-+-+-+-+-+-+-+-+-+-+
|        LS checksum          |            Length               |
+-+-+-+-+-+-+-+-+-+-+-+-+-+-+-+-+-+-+-+-+-+-+-+-+-+-+-+-+-+-+-+-+
|                                                               |
+-                            TLVs                             -+
|                             ...                               |
```

*FIG. 114*

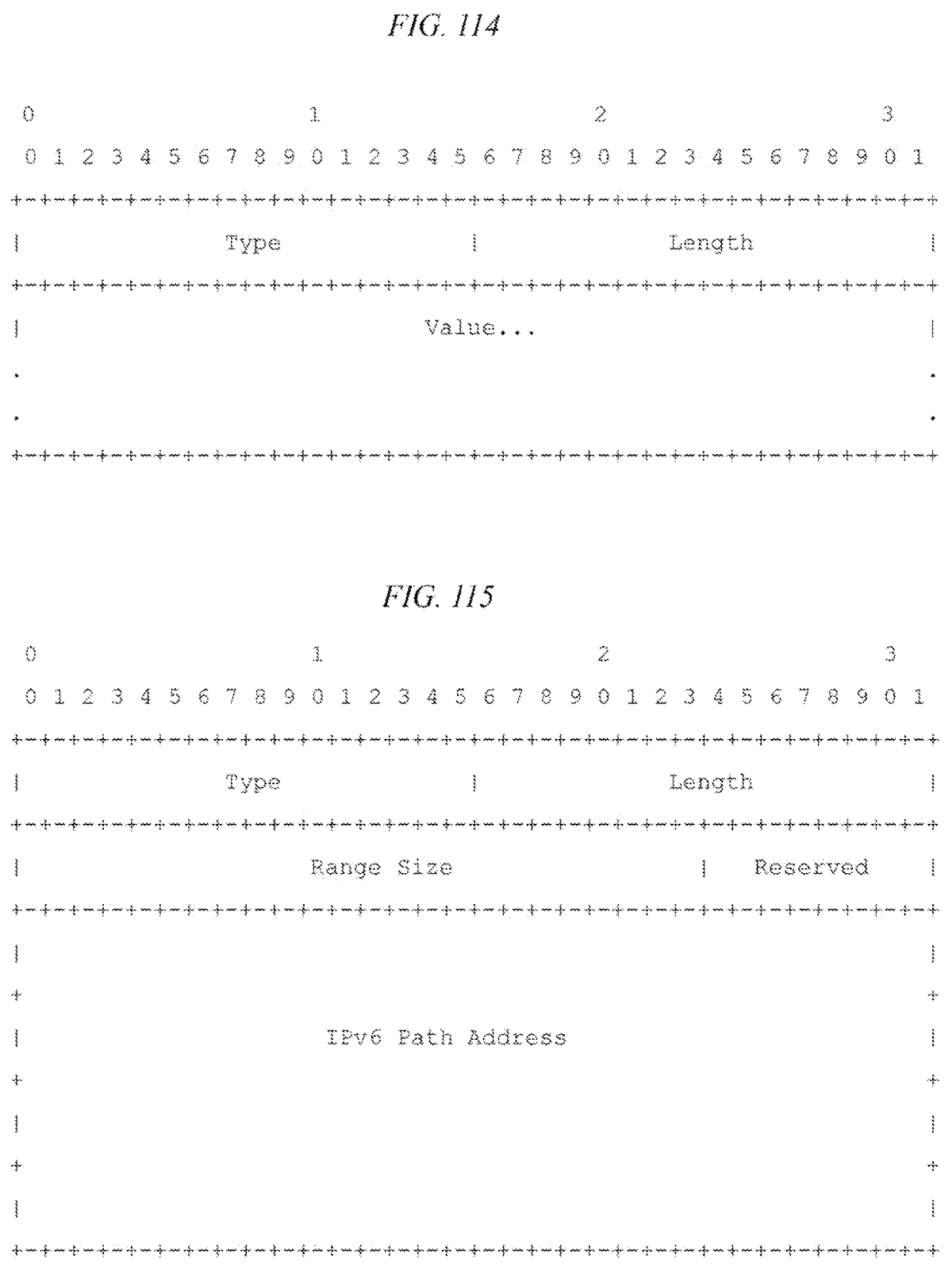

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                           Value...                            |
.                                                               .
.                                                               .
+-+-+-+-+-+-+-+-+-+-+-+-+-+-+-+-+-+-+-+-+-+-+-+-+-+-+-+-+-+-+-+-+
```

*FIG. 115*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                  Range Size                   |   Reserved    |
+-+-+-+-+-+-+-+-+-+-+-+-+-+-+-+-+-+-+-+-+-+-+-+-+-+-+-+-+-+-+-+-+
|                                                               |
+                                                               +
|                      IPv6 Path Address                        |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

FIG. 116

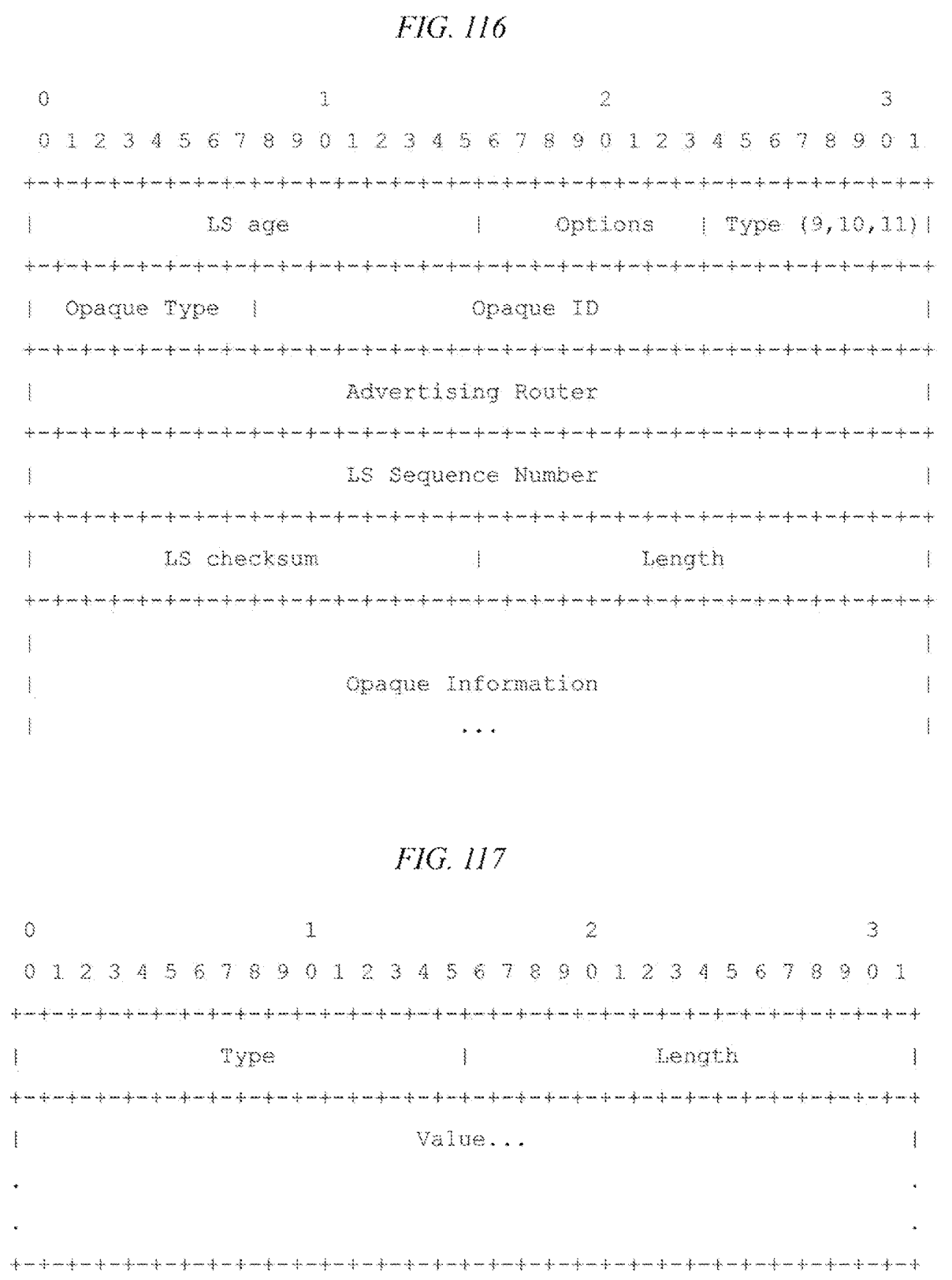

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |     Options   | Type (9,10,11)|
+-+-+-+-+-+-+-+-+-+-+-+-+-+-+-+-+-+-+-+-+-+-+-+-+-+-+-+-+-+-+-+-+
|  Opaque Type  |               Opaque ID                       |
+-+-+-+-+-+-+-+-+-+-+-+-+-+-+-+-+-+-+-+-+-+-+-+-+-+-+-+-+-+-+-+-+
|                      Advertising Router                       |
+-+-+-+-+-+-+-+-+-+-+-+-+-+-+-+-+-+-+-+-+-+-+-+-+-+-+-+-+-+-+-+-+
|                      LS Sequence Number                       |
+-+-+-+-+-+-+-+-+-+-+-+-+-+-+-+-+-+-+-+-+-+-+-+-+-+-+-+-+-+-+-+-+
|         LS checksum           |           Length              |
+-+-+-+-+-+-+-+-+-+-+-+-+-+-+-+-+-+-+-+-+-+-+-+-+-+-+-+-+-+-+-+-+
|                                                               |
|                      Opaque Information                       |
|                              ...                              |
```

FIG. 117

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|                            Value...                           |
.                                                               .
.                                                               .
+-+-+-+-+-+-+-+-+-+-+-+-+-+-+-+-+-+-+-+-+-+-+-+-+-+-+-+-+-+-+-+-+
```

FIG. 118

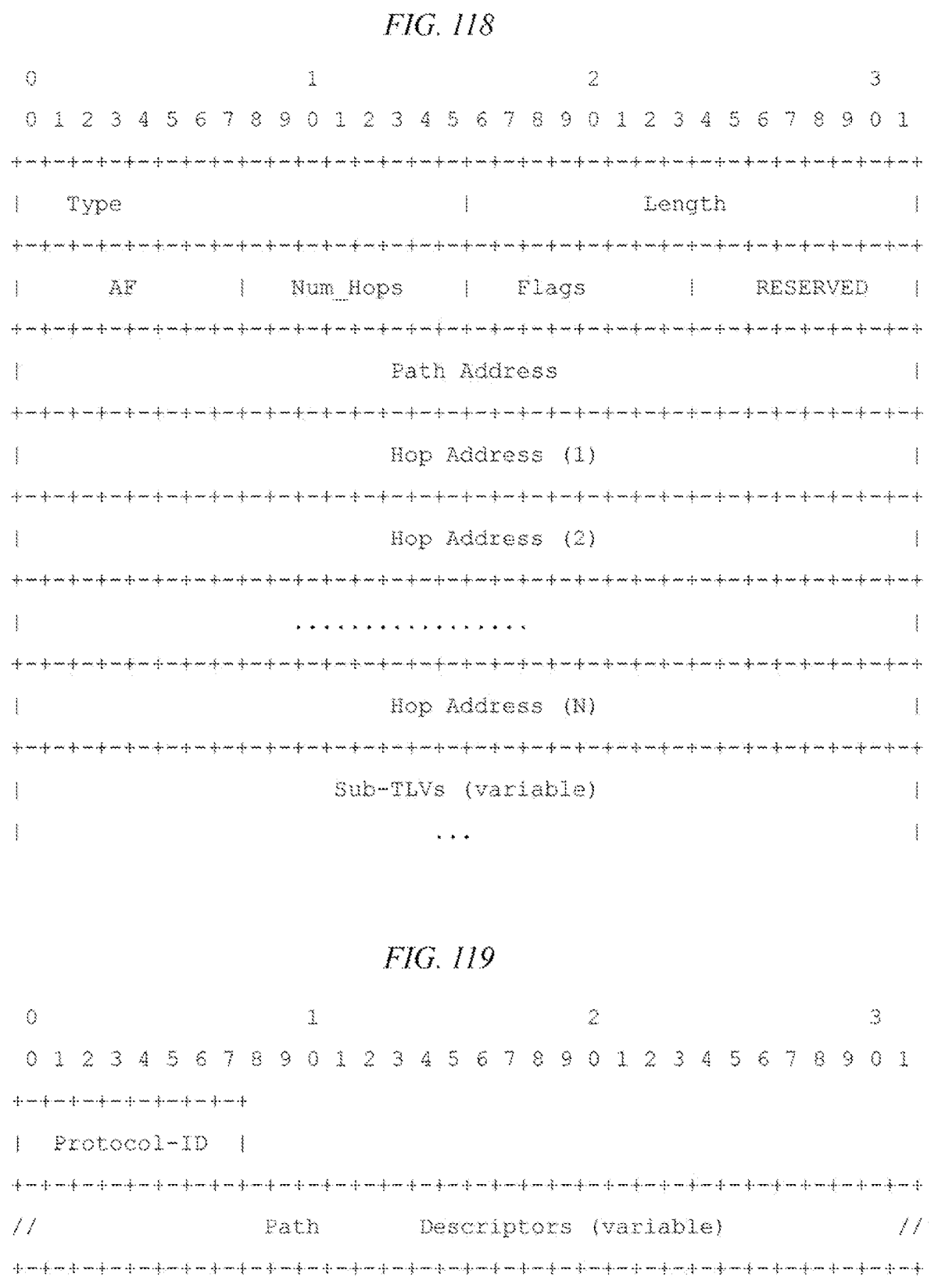

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type                        |             Length            |
+-+-+-+-+-+-+-+-+-+-+-+-+-+-+-+-+-+-+-+-+-+-+-+-+-+-+-+-+-+-+-+-+
|      AF       |   Num_Hops    |   Flags       |    RESERVED   |
+-+-+-+-+-+-+-+-+-+-+-+-+-+-+-+-+-+-+-+-+-+-+-+-+-+-+-+-+-+-+-+-+
|                         Path Address                          |
+-+-+-+-+-+-+-+-+-+-+-+-+-+-+-+-+-+-+-+-+-+-+-+-+-+-+-+-+-+-+-+-+
|                         Hop Address (1)                       |
+-+-+-+-+-+-+-+-+-+-+-+-+-+-+-+-+-+-+-+-+-+-+-+-+-+-+-+-+-+-+-+-+
|                         Hop Address (2)                       |
+-+-+-+-+-+-+-+-+-+-+-+-+-+-+-+-+-+-+-+-+-+-+-+-+-+-+-+-+-+-+-+-+
|                  .................                            |
+-+-+-+-+-+-+-+-+-+-+-+-+-+-+-+-+-+-+-+-+-+-+-+-+-+-+-+-+-+-+-+-+
|                         Hop Address (N)                       |
+-+-+-+-+-+-+-+-+-+-+-+-+-+-+-+-+-+-+-+-+-+-+-+-+-+-+-+-+-+-+-+-+
|                     Sub-TLVs (variable)                       |
|                               ...                             |
```

FIG. 119

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
| Protocol-ID   |
+-+-+-+-+-+-+-+-+-+-+-+-+-+-+-+-+-+-+-+-+-+-+-+-+-+-+-+-+-+-+-+-+
//               Path       Descriptors (variable)             //
+-+-+-+-+-+-+-+-+-+-+-+-+-+-+-+-+-+-+-+-+-+-+-+-+-+-+-+-+-+-+-+-+
```

*FIG. 120*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Type (=267)                 |            Length             |
+-+-+-+-+-+-+-+-+-+-+-+-+-+-+-+-+-+-+-+-+-+-+-+-+-+-+-+-+-+-+-+-+
|   Num_Hops    |   Flags       |           RESERVED            |
+-+-+-+-+-+-+-+-+-+-+-+-+-+-+-+-+-+-+-+-+-+-+-+-+-+-+-+-+-+-+-+-+
|                                                               |
+                                                               +
|                    IPv6 Path Address                          |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                    IPv6 Hop Address (1)                       |
+                                                               +
|                                                               |
+                                                               +
|                                                               |
~~~~~~~~~~~~~~~~~~~~~~~~~~~~~~~~~~~~~~~~~~~~~~~~~~~~~~~~~~~~~~~~~
```

*FIG. 120*
*CON'T*

```
+-+-+-+-+-+-+-+-+-+-+-+-+-+-+-+-+-+-+-+-+-+-+-+-+-+-+-+-+-+-+-+-+
|                                                               |
+                                                               +
|                     IPv6 Hop Address (2)                      |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                   ................                            |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                     IPv6 Hop Address (N)                      |
+                                                               +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                      Sub-TLVs (variable)                      |
|                              ...                              |
```

PATH COMPRESSION IN ROUTING OF SOURCE ROUTED PACKETS

CROSS-REFERENCE TO RELATED APPLICATIONS

This application is based on and claims the benefit of International Patent Application No. PCT/IB2018/000737, filed on Jun. 14, 2018, which is hereby incorporated herein by reference in its entirety.

TECHNICAL FIELD

Various example embodiments relate generally to communication networks and, more particularly but not exclusively, to supporting routing of source routed packets in communication networks.

BACKGROUND

In many communication networks, various combinations of communications technologies may be employed to support end-to-end communication of data.

SUMMARY

Various example embodiments relate generally to supporting routing of source routed packets in communication networks.

In at least some example embodiments, an apparatus is provided. The apparatus includes at least one processor. The apparatus includes at least one memory including computer program code. The at least one memory and the computer program code are configured to, with the at least one processor, cause the apparatus to at least handle a source routed packet associated with a source routing protocol, wherein the source routed packet includes a header and a payload, wherein the header includes an encoding of a path, wherein the header includes a path identifier representing a set of hops. In at least some example embodiments, the path identifier is included as an entry of a source route of the source routed packet. In at least some example embodiments, the source routing protocol includes a Multiprotocol Label Switching (MPLS) source routing protocol, wherein the path identifier includes a path label. In at least some example embodiments, the source routing protocol includes an Internet Protocol (IP) source routing protocol, wherein the path identifier includes a path address. In at least some example embodiments, the set of hops forms a path segment, wherein the path segment is a portion of the path. In at least some example embodiments, the path identifier is encoded within the header of the source routed packet as an entry of a source route of the source routed packet. In at least some example embodiments, to handle the source routed packet, the at least one memory and the computer program code are configured to, with the at least one processor, cause the apparatus to at least generate the header for the source routed packet, associate the header for the source routed packet with the payload for the source routed packet to form the source routed packet, and send the source routed packet toward a network element. In at least some example embodiments, the set of hops of the path segment includes a first hop and one or more additional hops and, to handle the source routed packet, the at least one memory and the computer program code are configured to, with the at least one processor, cause the apparatus to at least receive, at a network element that is the first hop of the path segment, the source routed packet, process, at the network element based on the path identifier, the source routed packet, and send the source routed packet toward a next hop of the path segment. In at least some example embodiments, to process the source routed packet, the at least one memory and the computer program code are configured to, with the at least one processor, cause the apparatus to at least determine, at the network element based on the path identifier, the first hop of the path segment and the one or more additional hops of the path segment and modify, at the network element, the header of the source routed packet to remove the path identifier and to insert an encoding of the one or more additional hops of the path segment. In at least some example embodiments, the path is a primary path including a set of primary path hops, wherein the set of hops forms a protection path configured to protect one of primary path hops of the primary path. In at least some example embodiments, an encoding of the one of the primary path hops of the primary path includes an indication that the one of the primary path hops of the primary path is protected by the protection path indicated by the path identifier. In at least some example embodiments, the encoding of the one of the primary path hops of the primary path includes an indication of a quantity of primary path hops in the set of primary path hops of the primary path to be skipped when the protection path is used for the source routed packet. In at least some example embodiments, an encoding of the protection path includes the path identifier. In at least some example embodiments, the encoding of the protection path includes an indication of the one of the primary path hops protected by the protection path. In at least some example embodiments, the encoding of the protection path includes an indication that the protection path is encoded using a single entry of a source route of the source routed packet. In at least some example embodiments, the encoding of the protection path includes an indication of a quantity of primary path hops in the set of primary path hops of the primary path to be skipped when the protection path is used for the source routed packet. In at least some example embodiments, the header includes an encoding of the set of primary path hops of the primary path. In at least some example embodiments, the source routing protocol includes a Multiprotocol Label Switching (MPLS) source routing protocol. In at least some example embodiments, each of the primary path hops of the primary path is encoded using a respective MPLS label. In at least some example embodiments, the one of the primary path hops of the primary path and the path identifier representing the protection path are encoded using a set of MPLS labels. In at least some example embodiments, the set of MPLS labels includes an MPLS label configured to indicate the encoding of the path identifier representing the protection path for the one of the primary path hops of the primary path, an MPLS label encoding the one of the primary path hops of the primary path, an MPLS label including an indication of a quantity of MPLS labels used to encode the path identifier representing the protection path and an indication of a quantity of primary path hops in the set of primary path hops of the primary path to be skipped when the protection path is used for the source routed packet, and an MPLS encoding the path identifier representing the protection path for the one of the primary path hops of the primary path. In at least some example embodiments, the source routing protocol includes an Internet Protocol (IP) source routing protocol. In at least some example embodiments, the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the primary path hops of the primary path and the path identifier representing the protection path are encoded using a set of fields of an IPv4 Options Header or a set of fields of an IPv4 Shim Header. In at least some example embodiments, the IP source routing protocol includes an IP version 6 (IPv6) source routing protocol, wherein the primary path hops of the primary path and the path identifier representing the protection path are encoded using a set of fields of an IPv6 Routing Header or a set of fields of an IPv6 Shim Header. In at least some example embodiments, the primary path hops of the primary path and the path identifier representing the protection path are encoded using a set of fields an IP Shim Header wherein the IP Shim Header is arranged between an IP Header and a header associated with a transport layer protocol. In at least some example embodiments, the primary path hops of the primary path and the path identifier representing the protection path are encoded using a set of explicit encoding elements. In at least some example embodiments, to handle the source routed packet, the at least one memory and the computer program code are configured to, with the at least one processor, cause the apparatus to at least generate the header for the source routed packet, associate the header for the source routed packet with a payload for the source routed packet to form the source routed packet, and send the source routed packet toward a network element. In at least some example embodiments, to handle the source routed packet, the at least one memory and the computer program code are configured to, with the at least one processor, cause the apparatus to at least receive the source routed packet, process the source routed packet, and send the source routed packet toward the one of the primary path hops of the primary path based on a determination that the one of the primary path hops of the primary path is reachable. In at least some example embodiments, to process the source routed packet, the at least one memory and the computer program code are configured to, with the at least one processor, cause the apparatus to at least remove the path identifier presenting the protection path from the header of the source routed packet. In at least some example embodiments, to handle the source routed packet, the at least one memory and the computer program code are configured to, with the at least one processor, cause the apparatus to at least receive the source routed packet, process the source routed packet, and send the source routed packet toward a first hop of the protection path, using a fast reroute operation based on the path identifier representing the protection path, based on a determination that the one of the primary path hops of the primary path is not reachable. In at least some example embodiments, the set of hops of the protection path includes a first hop and one or more additional hops and, to process the source routed packet, the at least one memory and the computer program code are configured to, with the at least one processor, cause the apparatus to at least determine, based on the path identifier, the first hop of the protection path and the one or more additional hops of the protection path and modify the header of the source routed packet to remove the path identifier and to insert an encoding of the one or more additional hops of the protection path. In at least some example embodiments, the at least one memory and the computer program code are configured to, with the at least one processor, cause the apparatus to at least support advertisement of control plane information configured to support use of the path identifier to represent the set of hops. In at least some example embodiments, the control plane information includes at least one of a capability of the apparatus to support use of the path identifier to represent the set of hops or path identifier information associated with use of the path identifier to represent the set of hops. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, to support advertisement of the control plane information configured to support use of the path identifier to represent the set of hops, the at least one memory and the computer program code are configured to, with the at least one processor, cause the apparatus to at least generate the control plane information and send the control plane information toward at least one network element. In at least some example embodiments, to support advertisement of the control plane information configured to support use of the path identifier to represent the set of hops, the at least one memory and the computer program code are configured to, with the at least one processor, cause the apparatus to at least receive the control plane information from at least one network element and use the control plane information to support use of the path identifier to represent the set of hops.

In at least some example embodiments, a method is provided. The method includes handling a source routed packet associated with a source routing protocol, wherein the source routed packet includes a header and a payload, wherein the header includes an encoding of a path, wherein the header includes a path identifier representing a set of hops. In at least some example embodiments, the path identifier is included as an entry of a source route of the source routed packet. In at least some example embodiments, the source routing protocol includes a Multiprotocol Label Switching (MPLS) source routing protocol, wherein the path identifier includes a path label. In at least some example embodiments, the source routing protocol includes an Internet Protocol (IP) source routing protocol, wherein the path identifier includes a path address. In at least some example embodiments, the set of hops forms a path segment, wherein the path segment is a portion of the path. In at least some example embodiments, the path identifier is encoded within the header of the source routed packet as an entry of a source route of the source routed packet. In at least some example embodiments, handling the source routed packet includes generating the header for the source routed packet, associating the header for the source routed packet with the payload for the source routed packet to form the source routed packet, and sending the source routed packet toward a network element. In at least some example embodiments, the set of hops of the path segment includes a first hop and one or more additional hops and handling the source routed packet includes receiving, at a network element that is the first hop of the path segment, the source routed packet, processing, at the network element based on the path identifier, the source routed packet, and sending the source routed packet toward a next hop of the path segment. In at least some example embodiments, processing the source routed packet includes determining, at the network element based on the path identifier, the first hop of the path segment and the one or more additional hops of the path segment and modifying, at the network element, the header of the source routed packet to remove the path identifier and to insert an encoding of the one or more additional hops of the path segment. In at least some example embodiments, the path is a primary path including a set of primary path hops, wherein the set of hops forms a protection path configured to protect one of primary path hops of the primary path. In at least some example embodiments, an encoding of the one of the primary path hops of the primary path includes an indication that the one of the primary path hops of the primary path is protected by the protection path indicated by the path identifier. In at least some example embodiments, the encoding of the one of the primary path hops of the primary path includes an indication of a quantity of primary path hops in the set of primary path hops of the primary path to be skipped when the protection path is used for the source routed packet. In at least some example embodiments, an encoding of the protection path includes the path identifier. In at least some example embodiments, the encoding of the protection path includes an indication of the one of the primary path hops protected by the protection path. In at least some example embodiments, the encoding of the protection path includes an indication that the protection path is encoded using a single entry of a source route of the source routed packet. In at least some example embodiments, the encoding of the protection path includes an indication of a quantity of primary path hops in the set of primary path hops of the primary path to be skipped when the protection path is used for the source routed packet. In at least some example embodiments, the header includes an encoding of the set of primary path hops of the primary path. In at least some example embodiments, the source routing protocol includes a Multiprotocol Label Switching (MPLS) source routing protocol. In at least some example embodiments, each of the primary path hops of the primary path is encoded using a respective MPLS label. In at least some example embodiments, the one of the primary path hops of the primary path and the path identifier representing the protection path are encoded using a set of MPLS labels. In at least some example embodiments, the set of MPLS labels includes an MPLS label configured to indicate the encoding of the path identifier representing the protection path for the one of the primary path hops of the primary path, an MPLS label encoding the one of the primary path hops of the primary path, an MPLS label including an indication of a quantity of MPLS labels used to encode the path identifier representing the protection path and an indication of a quantity of primary path hops in the set of primary path hops of the primary path to be skipped when the protection path is used for the source routed packet, and an MPLS encoding the path identifier representing the protection path for the one of the primary path hops of the primary path. In at least some example embodiments, the source routing protocol includes an Internet Protocol (IP) source routing protocol. In at least some example embodiments, the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the primary path hops of the primary path and the path identifier representing the protection path are encoded using a set of fields of an IPv4 Options Header or a set of fields of an IPv4 Shim Header. In at least some example embodiments, the IP source routing protocol includes an IP version 6 (IPv6) source routing protocol, wherein the primary path hops of the primary path and the path identifier representing the protection path are encoded using a set of fields of an IPv6 Routing Header or a set of fields of an IPv6 Shim Header. In at least some example embodiments, the primary path hops of the primary path and the path identifier representing the protection path are encoded using a set of fields an IP Shim Header wherein the IP Shim Header is arranged between an IP Header and a header associated with a transport layer protocol. In at least some example embodiments, the primary path hops of the primary path and the path identifier representing the protection path are encoded using a set of explicit encoding elements. In at least some example embodiments, handling the source routed packet includes generating the header for the source routed packet, associating the header for the source routed packet with a payload for the source routed packet to form the source routed packet, and sending the source routed packet toward a network element. In at least some example embodiments, handling the source routed packet includes receiving the source routed packet, processing the source routed packet, and sending the source routed packet toward the one of the primary path hops of the primary path based on a determination that the one of the primary path hops of the primary path is reachable. In at least some example embodiments, processing the source routed packet includes removing the path identifier presenting the protection path from the header of the source routed packet. In at least some example embodiments, handling the source routed packet includes receiving the source routed packet, processing the source routed packet, and sending the source routed packet toward a first hop of the protection path, using a fast reroute operation based on the path identifier representing the protection path, based on a determination that the one of the primary path hops of the primary path is not reachable. In at least some example embodiments, the set of hops of the protection path includes a first hop and one or more additional hops and processing the source routed packet includes determining, based on the path identifier, the first hop of the protection path and the one or more additional hops of the protection path and modifying the header of the source routed packet to remove the path identifier and to insert an encoding of the one or more additional hops of the protection path. In at least some example embodiments, the method includes supporting advertisement of control plane information configured to support use of the path identifier to represent the set of hops. In at least some example embodiments, the control plane information includes at least one of a capability of the apparatus to support use of the path identifier to represent the set of hops or path identifier information associated with use of the path identifier to represent the set of hops. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, supporting advertisement of the control plane information configured to support use of the path identifier to represent the set of hops includes generating the control plane information and sending the control plane information toward at least one network element. In at least some example embodiments, supporting advertisement of the control plane information configured to support use of the path identifier to represent the set of hops includes receiving the control plane information from at least one network element and using the control plane information to support use of the path identifier to represent the set of hops.

In at least some example embodiments, a non-transitory computer readable medium is provided. The non-transitory computer-readable medium includes program instructions for causing an apparatus to at least handle a source routed packet associated with a source routing protocol, wherein the source routed packet includes a header and a payload, wherein the header includes an encoding of a path, wherein the header includes a path identifier representing a set of hops. In at least some example embodiments, the path identifier is included as an entry of a source route of the source routed packet. In at least some example embodiments, the source routing protocol includes a Multiprotocol Label Switching (MPLS) source routing protocol, wherein the path identifier includes a path label. In at least some example embodiments, the source routing protocol includes an Internet Protocol (IP) source routing protocol, wherein the path identifier includes a path address. In at least some example embodiments, the set of hops forms a path segment, wherein the path segment is a portion of the path. In at least some example embodiments, the path identifier is encoded within the header of the source routed packet as an entry of a source route of the source routed packet. In at least some example embodiments, to handle the source routed packet, the non-transitory computer-readable medium includes program instructions for causing the apparatus to at least generate the header for the source routed packet, associate the header for the source routed packet with the payload for the source routed packet to form the source routed packet, and send the source routed packet toward a network element. In at least some example embodiments, the set of hops of the path segment includes a first hop and one or more additional hops and, to handle the source routed packet, the non-transitory computer-readable medium includes program instructions for causing the apparatus to at least receive, at a network element that is the first hop of the path segment, the source routed packet, process, at the network element based on the path identifier, the source routed packet, and send the source routed packet toward a next hop of the path segment. In at least some example embodiments, to process the source routed packet, the non-transitory computer-readable medium includes program instructions for causing the apparatus to at least determine, at the network element based on the path identifier, the first hop of the path segment and the one or more additional hops of the path segment and modify, at the network element, the header of the source routed packet to remove the path identifier and to insert an encoding of the one or more additional hops of the path segment. In at least some example embodiments, the path is a primary path including a set of primary path hops, wherein the set of hops forms a protection path configured to protect one of primary path hops of the primary path. In at least some example embodiments, an encoding of the one of the primary path hops of the primary path includes an indication that the one of the primary path hops of the primary path is protected by the protection path indicated by the path identifier. In at least some example embodiments, the encoding of the one of the primary path hops of the primary path includes an indication of a quantity of primary path hops in the set of primary path hops of the primary path to be skipped when the protection path is used for the source routed packet. In at least some example embodiments, an encoding of the protection path includes the path identifier. In at least some example embodiments, the encoding of the protection path includes an indication of the one of the primary path hops protected by the protection path. In at least some example embodiments, the encoding of the protection path includes an indication that the protection path is encoded using a single entry of a source route of the source routed packet. In at least some example embodiments, the encoding of the protection path includes an indication of a quantity of primary path hops in the set of primary path hops of the primary path to be skipped when the protection path is used for the source routed packet. In at least some example embodiments, the header includes an encoding of the set of primary path hops of the primary path. In at least some example embodiments, the source routing protocol includes a Multiprotocol Label Switching (MPLS) source routing protocol. In at least some example embodiments, each of the primary path hops of the primary path is encoded using a respective MPLS label. In at least some example embodiments, the one of the primary path hops of the primary path and the path identifier representing the protection path are encoded using a set of MPLS labels. In at least some example embodiments, the set of MPLS labels includes an MPLS label configured to indicate the encoding of the path identifier representing the protection path for the one of the primary path hops of the primary path, an MPLS label encoding the one of the primary path hops of the primary path, an MPLS label including an indication of a quantity of MPLS labels used to encode the path identifier representing the protection path and an indication of a quantity of primary path hops in the set of primary path hops of the primary path to be skipped when the protection path is used for the source routed packet, and an MPLS encoding the path identifier representing the protection path for the one of the primary path hops of the primary path. In at least some example embodiments, the source routing protocol includes an Internet Protocol (IP) source routing protocol. In at least some example embodiments, the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the primary path hops of the primary path and the path identifier representing the protection path are encoded using a set of fields of an IPv4 Options Header or a set of fields of an IPv4 Shim Header. In at least some example embodiments, the IP source routing protocol includes an IP version 6 (IPv6) source routing protocol, wherein the primary path hops of the primary path and the path identifier representing the protection path are encoded using a set of fields of an IPv6 Routing Header or a set of fields of an IPv6 Shim Header. In at least some example embodiments, the primary path hops of the primary path and the path identifier representing the protection path are encoded using a set of fields an IP Shim Header wherein the IP Shim Header is arranged between an IP Header and a header associated with a transport layer protocol. In at least some example embodiments, the primary path hops of the primary path and the path identifier representing the protection path are encoded using a set of explicit encoding elements. In at least some example embodiments, to handle the source routed packet, the non-transitory computer-readable medium includes program instructions for causing the apparatus to at least generate the header for the source routed packet, associate the header for the source routed packet with a payload for the source routed packet to form the source routed packet, and send the source routed packet toward a network element. In at least some example embodiments, to handle the source routed packet, the non-transitory computer-readable medium includes program instructions for causing the apparatus to at least receive the source routed packet, process the source routed packet, and send the source routed packet toward the one of the primary path hops of the primary path based on a determination that the one of the primary path hops of the primary path is reachable. In at least some example embodiments, to process the source routed packet, the non-transitory computer-readable medium includes program instructions for causing the apparatus to at least remove the path identifier presenting the protection path from the header of the source routed packet. In at least some example embodiments, to handle the source routed packet, the non-transitory computer-readable medium includes program instructions for causing the apparatus to at least receive the source routed packet, process the source routed packet, and send the source routed packet toward a first hop of the protection path, using a fast reroute operation based on the path identifier representing the protection path, based on a determination that the one of the primary path hops of the primary path is not reachable. In at least some example embodiments, the set of hops of the protection path includes a first hop and one or more additional hops and, to process the source routed packet, the non-transitory computer-readable medium includes program instructions for causing the apparatus to at least determine, based on the path identifier, the first hop of the protection path and the one or more additional hops of the protection path and modify the header of the source routed packet to remove the path identifier and to insert an encoding of the one or more additional hops of the protection path. In at least some example embodiments, the non-transitory computer-readable medium includes program instructions for causing the apparatus to at least support advertisement of control plane information configured to support use of the path identifier to represent the set of hops. In at least some example embodiments, the control plane information includes at least one of a capability of the apparatus to support use of the path identifier to represent the set of hops or path identifier information associated with use of the path identifier to represent the set of hops. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, to support advertisement of the control plane information configured to support use of the path identifier to represent the set of hops, the non-transitory computer-readable medium includes program instructions for causing the apparatus to at least generate the control plane information and send the control plane information toward at least one network element. In at least some example embodiments, to support advertisement of the control plane information configured to support use of the path identifier to represent the set of hops, the non-transitory computer-readable medium includes program instructions for causing the apparatus to at least receive the control plane information from at least one network element and use the control plane information to support use of the path identifier to represent the set of hops.

In at least some example embodiments, an apparatus is provided. The apparatus includes means for handling a source routed packet associated with a source routing protocol, wherein the source routed packet includes a header and a payload, wherein the header includes an encoding of a path, wherein the header includes a path identifier representing a set of hops. In at least some example embodiments, the path identifier is included as an entry of a source route of the source routed packet. In at least some example embodiments, the source routing protocol includes a Multiprotocol Label Switching (MPLS) source routing protocol, wherein the path identifier includes a path label. In at least some example embodiments, the source routing protocol includes an Internet Protocol (IP) source routing protocol, wherein the path identifier includes a path address. In at least some example embodiments, the set of hops forms a path segment, wherein the path segment is a portion of the path. In at least some example embodiments, the path identifier is encoded within the header of the source routed packet as an entry of a source route of the source routed packet. In at least some example embodiments, the means for handling the source routed packet includes means for generating the header for the source routed packet, means for associating the header for the source routed packet with the payload for the source routed packet to form the source routed packet, and means for sending the source routed packet toward a network element. In at least some example embodiments, the set of hops of the path segment includes a first hop and one or more additional hops and the means for handling the source routed packet includes means for receiving, at a network element that is the first hop of the path segment, the source routed packet, means for processing, at the network element based on the path identifier, the source routed packet, and means for sending the source routed packet toward a next hop of the path segment. In at least some example embodiments, the means for processing the source routed packet includes means for determining, at the network element based on the path identifier, the first hop of the path segment and the one or more additional hops of the path segment and means for modifying, at the network element, the header of the source routed packet to remove the path identifier and to insert an encoding of the one or more additional hops of the path segment. In at least some example embodiments, the path is a primary path including a set of primary path hops, wherein the set of hops forms a protection path configured to protect one of primary path hops of the primary path. In at least some example embodiments, an encoding of the one of the primary path hops of the primary path includes an indication that the one of the primary path hops of the primary path is protected by the protection path indicated by the path identifier. In at least some example embodiments, the encoding of the one of the primary path hops of the primary path includes an indication of a quantity of primary path hops in the set of primary path hops of the primary path to be skipped when the protection path is used for the source routed packet. In at least some example embodiments, an encoding of the protection path includes the path identifier. In at least some example embodiments, the encoding of the protection path includes an indication of the one of the primary path hops protected by the protection path. In at least some example embodiments, the encoding of the protection path includes an indication that the protection path is encoded using a single entry of a source route of the source routed packet. In at least some example embodiments, the encoding of the protection path includes an indication of a quantity of primary path hops in the set of primary path hops of the primary path to be skipped when the protection path is used for the source routed packet. In at least some example embodiments, the header includes an encoding of the set of primary path hops of the primary path. In at least some example embodiments, the source routing protocol includes a Multiprotocol Label Switching (MPLS) source routing protocol. In at least some example embodiments, each of the primary path hops of the primary path is encoded using a respective MPLS label. In at least some example embodiments, the one of the primary path hops of the primary path and the path identifier representing the protection path are encoded using a set of MPLS labels. In at least some example embodiments, the set of MPLS labels includes an MPLS label configured to indicate the encoding of the path identifier representing the protection path for the one of the primary path hops of the primary path, an MPLS label encoding the one of the primary path hops of the primary path, an MPLS label including an indication of a quantity of MPLS labels used to encode the path identifier representing the protection path and an indication of a quantity of primary path hops in the set of primary path hops of the primary path to be skipped when the protection path is used for the source routed packet, and an MPLS encoding the path identifier representing the protection path for the one of the primary path hops of the primary path. In at least some example embodiments, the source routing protocol includes an Internet Protocol (IP) source routing protocol. In at least some example embodiments, the IP source routing protocol includes an IP version 4 (IPv4) source routing protocol or an IP version 6 (IPv6) source routing protocol. In at least some example embodiments, the IP source routing protocol includes an IP version 4 (IPv4) source routing protocol, wherein the primary path hops of the primary path and the path identifier representing the protection path are encoded using a set of fields of an IPv4 Options Header or a set of fields of an IPv4 Shim Header. In at least some example embodiments, the IP source routing protocol includes an IP version 6 (IPv6) source routing protocol, wherein the primary path hops of the primary path and the path identifier representing the protection path are encoded using a set of fields of an IPv6 Routing Header or a set of fields of an IPv6 Shim Header. In at least some example embodiments, the primary path hops of the primary path and the path identifier representing the protection path are encoded using a set of fields an IP Shim Header wherein the IP Shim Header is arranged between an IP Header and a header associated with a transport layer protocol. In at least some example embodiments, the primary path hops of the primary path and the path identifier representing the protection path are encoded using a set of explicit encoding elements. In at least some example embodiments, the means for handling the source routed packet includes means for generating the header for the source routed packet, means for associating the header for the source routed packet with a payload for the source routed packet to form the source routed packet, and means for sending the source routed packet toward a network element. In at least some example embodiments, the means for handling the source routed packet includes means for receiving the source routed packet, means for processing the source routed packet, and means for sending the source routed packet toward the one of the primary path hops of the primary path based on a determination that the one of the primary path hops of the primary path is reachable. In at least some example embodiments, the means for processing the source routed packet includes means for removing the path identifier presenting the protection path from the header of the source routed packet. In at least some example embodiments, the means for handling the source routed packet includes means for receiving the source routed packet, means for processing the source routed packet, and means for sending the source routed packet toward a first hop of the protection path, using a fast reroute operation based on the path identifier representing the protection path, based on a determination that the one of the primary path hops of the primary path is not reachable. In at least some example embodiments, the set of hops of the protection path includes a first hop and one or more additional hops and the means for processing the source routed packet includes means for determining, based on the path identifier, the first hop of the protection path and the one or more additional hops of the protection path and means for modifying the header of the source routed packet to remove the path identifier and to insert an encoding of the one or more additional hops of the protection path. In at least some example embodiments, the apparatus includes means for supporting advertisement of control plane information configured to support use of the path identifier to represent the set of hops. In at least some example embodiments, the control plane information includes at least one of a capability of the apparatus to support use of the path identifier to represent the set of hops or path identifier information associated with use of the path identifier to represent the set of hops. In at least some example embodiments, the control plane information is advertised using at least one of Intermediate System to Intermediate System (IS-IS), Open Shortest Path First (OSPF), OSPF version 3 (OSPFv3), or Border Gateway Protocol (BGP)-Link State (BGP-LS). In at least some example embodiments, the means for supporting advertisement of the control plane information configured to support use of the path identifier to represent the set of hops includes means for generating the control plane information and means for sending the control plane information toward at least one network element. In at least some example embodiments, the means for supporting advertisement of the control plane information configured to support use of the path identifier to represent the set of hops includes means for receiving the control plane information from at least one network element and means for using the control plane information to support use of the path identifier to represent the set of hops.

BRIEF DESCRIPTION OF THE DRAWINGS

The teachings herein can be readily understood by considering the following detailed description in conjunction with the accompanying drawings, in which:

FIG. 18 depicts an example encoding of a Fast-Reroute Explicit Hop (FEH) Label Stack (FLS) for flow-specific fast rerouting of source routed packets in MPLS-based source routing;

FIG. 20 depicts an example encoding of the FLS for a particular flow in the example communication system of FIG. 17;

FIG. 21 depicts an example label stack included in a source routed packet sent by the source node to a second node for the particular flow of FIG. 20;

FIG. 22 depicts an example label stack included in a source routed packet sent by the second node of the example of FIG. 21 on a first link from the second node;

FIG. 23 depicts an example label stack included in a source routed packet sent by the second node of the example of FIG. 21 on a second link from the second node;

FIG. 24 depicts an example format of a Fast-Reroute Explicit Hop (FEH) Path Protection Element (FPPE) for flow-specific fast rerouting of source routed packets in IPv4-based source routing;

FIG. 26 depicts an example of an IPv4 Header, including IPv4 header options, which may be used for IPv4-based source routing;

FIG. 27 depicts an example of two IPv4 option definitions for IPv4 header options which may be used in an IPv4 Header for source routing;

FIG. 28 depicts an example format of an IPv4 header option supporting source routing for IPv4-based source routing;

FIG. 29 depicts an example format of a Route Data field for use in the IPv4 header option of FIG. 28;

FIG. 30 depicts an example of two IPv4 option definitions for encoding of an IPV4-FEH which may be used in an IPv4 Header for IPv4-based source routing;

FIG. 31 depicts an example of an IPv4 header option for encoding of an IPV4-FEH which may be used in an IPv4 Header for IPv4-based source routing;

FIG. 32 depicts an example format of a Flags field of an IPv4 header option which may be used in an IPv4 Header for IPv4-based source routing;

FIG. 33 depicts an example format of an IPV4-FEH which may be used in an IPv4 Header for IPv4-based source routing;

FIG. 34 depicts an example format of a Flags field of an IPV4-FEH which may be used in an IPv4 Header for IPv4-based source routing;

FIG. 35 depicts an example encoding of a source routed path on a packet from a source to a destination for a particular flow in the example communication system of FIG. 17;

FIG. 36 depicts an example encoding of an FPPE, including an IPV4-FEH, included in a source routed packet sent by the source node to a second node for the particular flow of FIG. 35;

FIG. 37 depicts an example encoding of a source route in a source routed packet sent by the source node to a second node for the particular flow of FIG. 35;

FIG. 38 depicts an example encoding of a source route included in a source routed packet sent by the second node of the example of FIG. 36 on a first link from the second node;

FIG. 39 depicts an example encoding of a source route included in a source routed packet sent by the second node of the example of FIG. 36 on a second link from the second node;

FIG. 40 depicts an example format of an IP-Shim Header for use in an IP-Shim Layer which may be used for IPv4-based source routing;

FIG. 41 depicts an example format of a Payload field of an IP-Shim Header for use in an IP-Shim Layer which may be used for IPv4-based source routing;

FIG. 42 depicts an example format of a Flags field of a Payload field of an IP-Shim Header for use in an IP-Shim Layer which may be used for IPv4-based source routing;

FIG. 43 depicts an example format of an IPV4-FEH configured for use in a Payload field of an IP-Shim Header for use in an IP-Shim Layer which may be used for IPv4-based source routing;

FIG. 44 depicts an example format of a Flags field of an IPV4-FEH configured for use in a Payload field of an IP-Shim Header for use in an IP-Shim Layer which may be used for IPv4-based source routing;

FIG. 45 depicts an example encoding of a source routed path on a packet from a source to a destination for a particular flow in the example communication system of FIG. 17;

FIG. 46 depicts an example encoding of an FPPE, including an IPV4-FEH, included in a source routed packet sent by the source node to a second node for the particular flow of FIG. 45;

FIG. 47 depicts an example encoding of a source route in a source routed packet sent by the source node to a second node for the particular flow of FIG. 45;

FIG. 48 depicts an example encoding of a source route included in a source routed packet sent by the second node of the example of FIG. 46 on a first link from the second node;

FIG. 49 depicts an example encoding of a source route included in a source routed packet sent by the second node of the example of FIG. 46 on a second link from the second node;

FIG. 50 depicts an example encoding of a Fast-Reroute Explicit Hop (FEH) Path Protection Element (FPPE) for flow-specific fast rerouting of source routed packets in IPv6-based source routing;

FIG. 52 depicts an example of a Routing Header, for use as an IPv6 Extension Header in an IPv6 Header, which may be used for IPv6-based source routing;

FIG. 53 depicts an example format of an FEH Routing Header which may be used in an IPv6 Header for IPv6-based source routing;

FIG. 54 depicts an example format of a Flags field for use in an FEH Routing Header which may be used in an IPv6 Header for IPv6-based source routing;

FIG. 55 depicts an example format of an IPV6-FEH for use in an FEH Routing Header which may be used in an IPv6 Header for IPv6-based source routing;

FIG. 56 depicts an example format of a Flags field of an IPV6-FEH for use in an FEH Routing Header which may be used in an IPv6 Header for IPv6-based source routing;

FIG. 57 depicts an example encoding of a source routed path on a packet from a source to a destination for a particular flow in the example communication system of FIG. 17;

FIG. 58 depicts an example encoding of an FPPE, including an IPV6-FEH, included in a source routed packet sent by the source node to a second node for the particular flow of FIG. 57;

FIG. 59 depicts an example encoding of a source route in a source routed packet sent by the source node to a second node for the particular flow of FIG. 57;

FIG. 60 depicts an example encoding of a source route included in a source routed packet sent by the second node of the example of FIG. 58 on a first link from the second node;

FIG. 61 depicts an example encoding of a source route included in a source routed packet sent by the second node of the example of FIG. 58 on a second link from the second node;

FIG. 62 depicts an example format of an IP-Shim Header for use in an IP-Shim Layer which may be used for IPv6-based source routing;

FIG. 63 depicts an example format of a Payload field of an IP-Shim Header for use in an IP-Shim Layer which may be used for IPv4-based source routing;

FIG. 64 depicts an example format of a Flags field of a Payload field of an IP-Shim Header for use in an IP-Shim Layer which may be used for IPv6-based source routing;

FIG. 65 depicts an example format of an IPV6-FEH configured for use in a Payload field of an IP-Shim Header for use in an IP-Shim Layer which may be used for IPv6-based source routing;

FIG. 66 depicts an example format of a Flags field of an IPV6-FEH configured for use in a Payload field of an IP-Shim Header for use in an IP-Shim Layer which may be used for IPv6-based source routing;

FIG. 67 depicts an example encoding of a source routed path on a packet from a source to a destination for a particular flow in the example communication system of FIG. 17;

FIG. 68 depicts an example encoding of an FPPE, including an IPV6-FEH, included in a source routed packet sent by the source node to a second node for the particular flow of FIG. 67;

FIG. 69 depicts an example encoding of a source route in a source routed packet sent by the source node to a second node for the particular flow of FIG. 67;

FIG. 70 depicts an example encoding of a source route included in a source routed packet sent by the second node of the example of FIG. 68 on a first link from the second node;

FIG. 71 depicts an example encoding of a source route included in a source routed packet sent by the second node of the example of FIG. 68 on a second link from the second node;

FIG. 72 depicts an example of a path label mapping database (PLMD) for a source router depicted in FIG. 1 when using path compression in MPLS-based source routing;

FIG. 73 depicts an example format of a Segment Routing Local Block (SRLB) Sub-TLV for use in advertising a path label range using an Intermediate-System-to-Intermediate-System (IS-IS) protocol when supporting routing of source routed packets using path compression in MPLS-based source routing;

FIG. 74 depicts an example format of a Path TLV for use in advertising a path label mapping using an IS-IS protocol when supporting routing of source routed packets using path compression in MPLS-based source routing;

FIG. 75 depicts an example format of a Path Address Mapping Sub-TLV, which may be carried within a Path TLV, for use in advertising a path label mapping using an IS-IS protocol when supporting routing of source routed packets using path compression in MPLS-based source routing;

FIG. 76 depicts an example format of a Path-SID Sub-TLV, which may be carried as a nested Sub-TLV within a Path Address Mapping Sub-TLV of a Path TLV, for use in advertising a path label mapping using an IS-IS protocol when supporting routing of source routed packets using path compression in MPLS-based source routing;

FIG. 77 depicts an example format of a Flags field of a Path-SID Sub-TLV, which may be carried as a nested Sub-TLV within a Path Address Mapping Sub-TLV of a Path TLV, for use in advertising a path label mapping using an IS-IS protocol when supporting routing of source routed packets using path compression in MPLS-based source routing;

FIG. 78 depicts an example format of a Segment Routing Local Block (SRLB) Sub-TLV for use in advertising a path label range using an Open Shortest Path First (OSPF) protocol when supporting routing of source routed packets using path compression in MPLS-based source routing;

FIG. 79 depicts an example format of a Path Link State Advertisement (LSA), which may be carried within an OSPF Opaque LSA, for use in advertising a path label range using an OSPF protocol when supporting routing of source routed packets using path compression in MPLS-based source routing;

FIG. 80 depicts an example format of a TLV, which may be included within Opaque Information of an Opaque LSA, for use in advertising a path label mapping using an OSPF protocol when supporting routing of source routed packets using path compression in MPLS-based source routing;

FIG. 81 depicts an example format of a Path Address Mapping TLV, which may be included within Opaque Information of an Opaque LSA, for use in advertising a path label mapping using an OSPF protocol when supporting routing of source routed packets using path compression in MPLS-based source routing;

FIG. 82 depicts an example format of a Path-SID Sub-TLV, which may be carried within a Path Address Mapping TLV, for use in advertising a path label mapping using an OSPF protocol when supporting routing of source routed packets using path compression in MPLS-based source routing;

FIG. 83 depicts an example format of a Flags field of a Path-SID Sub-TLV, which may be carried within a Path Address Mapping TLV, for use in advertising a path label mapping using an OSPF protocol when supporting routing of source routed packets using path compression in MPLS-based source routing;

FIG. 84 depicts an example format of a Path-SID Sub-TLV, which may be carried within a Path Address Mapping TLV, for use in advertising a path label mapping using an OSPF version 3 (OSPFv3) protocol when supporting routing of source routed packets using path compression in MPLS-based source routing;

FIG. 85 depicts an example format of a Flags field of a Path-SID Sub-TLV, which may be carried within a Path Address Mapping TLV, for use in advertising a path label mapping using an OSPFv3 protocol when supporting routing of source routed packets using path compression in MPLS-based source routing;

FIG. 86 depicts an example format of a Value portion of a Path Network Layer Reachability Information (NLRI) element for use in advertising path address mappings, received via different types of Interior Gateway Protocols (IGPs), using a Border Gateway Protocol-Link State (BGP-LS) protocol when supporting routing of source routed packets using path compression in MPLS-based source routing;

FIG. 87 depicts an example format of an IPv4 Path Address Mapping TLV for use in a Path Descriptor field of a Path NLRI for use in advertising path address mappings using a BGP-LS protocol when supporting routing of source routed packets using path compression in MPLS-based source routing;

FIG. 88 depicts an example format of an IPv6 Path Address Mapping TLV for use in a Path Descriptor field of a Path NLRI for use in advertising path address mappings using a BGP-LS protocol when supporting routing of source routed packets using path compression in MPLS-based source routing;

FIG. 89 depicts an example format of a Path-SID TLV for use in a Path Address Mapping TLV that may be used in a Path Descriptor field of a Path NLRI for use in advertising path address mappings using a BGP-LS protocol when supporting routing of source routed packets using path compression in MPLS-based source routing;

FIG. 90 depicts an example format of a Flags field of a Path-SID TLV for use in a Path Address Mapping TLV that may be used in a Path Descriptor field of a Path NLRI for use in advertising path address mappings using a BGP-LS protocol when supporting routing of source routed packets using path compression in MPLS-based source routing;

FIG. 91 depicts an example of a path address mapping database (PAMD) for a source router depicted in FIG. 1 when using path compression in IPv4-based source routing;

FIG. 92 depicts an example format of an Intermediate-System-to-Intermediate-System (IS-IS) Router Capability TLV for use in advertising a path address space using an IS-IS protocol when supporting routing of source routed packets using path compression in IPv4-based source routing;

FIG. 93 depicts an example format of a Flags field of an IS-IS Router Capability TLV for use in advertising a path address space using an IS-IS protocol when supporting routing of source routed packets using path compression in IPv4-based source routing;

FIG. 94 depicts an example format of a Path Address Block (PAB) Sub-TLV, which may be carried within an IS-IS Router Capability TLV, for use in advertising a path address space using an IS-IS protocol when supporting routing of source routed packets using path compression in IPv4-based source routing;

FIG. 95 depicts an example format of a Path Address Sub-TLV, which may be included within a PAB descriptor entry of a PAB Sub-TLV, for use in advertising a path address space using an IS-IS protocol when supporting routing of source routed packets using path compression in IPv4-based source routing;

FIG. 96 depicts an example format of a Path TLV, which may be carried within a Link State PDU (LSP), for use in advertising a path address mapping using an IS-IS protocol when supporting routing of source routed packets using path compression in IPv4-based source routing;

FIG. 97 depicts an example format of a Path Address Mapping Sub-TLV, which may be carried within a Path TLV of an LSP, for use in advertising a path address mapping using an IS-IS protocol when supporting routing of source routed packets using path compression in IPv4-based source routing;

FIG. 98 depicts an example format of a Router Information Opaque LSA, which may start with an LSA Header, for use in advertising a path address space using an OSPF protocol when supporting routing of source routed packets using path compression in IPv4-based source routing;

FIG. 99 depicts an example format of a TLV, which may be included within a Router Information Opaque LSA, for use in advertising a path address space using an OSPF protocol when supporting routing of source routed packets using path compression in IPv4-based source routing;

FIG. 100 depicts an example format of a PAB TLV, which may be carried within a Router Information Opaque LSA, for use in advertising a path address space using an OSPF protocol when supporting routing of source routed packets using path compression in IPv4-based source routing;

FIG. 101 depicts an example format of a Router Information Opaque LSA, which may start with an LSA Header, for use in advertising a path address mapping using an OSPF protocol when supporting routing of source routed packets using path compression in IPv4-based source routing;

FIG. 102 depicts an example format of a TLV, which may be included within a Router Information Opaque LSA, for use in advertising a path address mapping using an OSPF protocol when supporting routing of source routed packets using path compression in IPv4-based source routing;

FIG. 103 depicts an example format of an IPv4 Path Address Mapping TLV, which may be used as a TLV which may be included within a Router Information Opaque LSA, for use in advertising a path address mapping using an OSPF protocol when supporting routing of source routed packets using path compression in IPv4-based source routing;

FIG. 104 depicts an example format of a Value portion of a Path NLRI element for use in advertising path address mappings, received via different types of Interior Gateway Protocols (IGPs), using a BGP-LS protocol when supporting routing of source routed packets using path compression in IPv4-based source routing;

FIG. 105 depicts an example format of an IPv4 Path Address Mapping TLV for use in a Path Descriptor field of a Path NLRI for use in advertising path address mappings using a BGP-LS protocol when supporting routing of source routed packets using path compression in IPv4-based source routing;

FIG. 106 depicts an example of a path address mapping database (PAMD) for a source router depicted in FIG. 1 when using path compression in IPv6-based source routing;

FIG. 107 depicts an example format of an Intermediate-System-to-Intermediate-System (IS-IS) Router Capability TLV for use in advertising a path address space using an IS-IS protocol when supporting routing of source routed packets using path compression in IPv6-based source routing;

FIG. 108 depicts an example format of a Flags field of an IS-IS Router Capability TLV for use in advertising a path address space using an IS-IS protocol when supporting routing of source routed packets using path compression in IPv6-based source routing;

FIG. 109 depicts an example format of a Path Address Block (PAB) Sub-TLV, which may be carried within an IS-IS Router Capability TLV, for use in advertising a path address space using an IS-IS protocol when supporting routing of source routed packets using path compression in IPv6-based source routing;

FIG. 110 depicts an example format of a Path Address Sub-TLV, which may be included within a PAB descriptor entry of a PAB Sub-TLV, for use in advertising a path address space using an IS-IS protocol when supporting routing of source routed packets using path compression in IPv6-based source routing;

FIG. 111 depicts an example format of a Path TLV, which may be carried within a Link State PDU (LSP), for use in advertising a path address mapping using an IS-IS protocol when supporting routing of source routed packets using path compression in IPv6-based source routing;

FIG. 112 depicts an example format of a Path Address Mapping Sub-TLV, which may be carried within a Path TLV of an LSP, for use in advertising a path address mapping using an IS-IS protocol when supporting routing of source routed packets using path compression in IPv6-based source routing;

FIG. 113 depicts an example format of a Router Information LSA, which may start with an LSA Header, for use in advertising a path address space using an OSPFv3 protocol when supporting routing of source routed packets using path compression in IPv6-based source routing;

FIG. 114 depicts an example format of a TLV, which may be included within a Router Information Opaque LSA, for use in advertising a path address space using an OSPFv3 protocol when supporting routing of source routed packets using path compression in IPv6-based source routing;

FIG. 115 depicts an example format of a PAB TLV, which may be carried within a Router Information Opaque LSA, for use in advertising a path address space using an OSPFv3 protocol when supporting routing of source routed packets using path compression in IPv6-based source routing;

FIG. 116 depicts an example format of an Opaque LSA, which may start with an LSA Header, for use in advertising a path address mapping using an OSPF protocol when supporting routing of source routed packets using path compression in IPv6-based source routing;

FIG. 117 depicts an example format of a TLV, which may be included within an Opaque LSA, for use in advertising a path address mapping using an OSPF protocol when supporting routing of source routed packets using path compression in IPv6-based source routing;

FIG. 118 depicts an example format of an IPv6 Path Address Mapping TLV, which may be used as a TLV which may be included within an Opaque LSA, for use in advertising a path address mapping using an OSPF protocol when supporting routing of source routed packets using path compression in IPv6-based source routing;

FIG. 119 depicts an example format of a Value portion of a Path NLRI element for use in advertising path address mappings, received via different types of Interior Gateway Protocols (IGPs), using a BGP-LS protocol when supporting routing of source routed packets using path compression in IPv6-based source routing;

FIG. 120 depicts an example format of an IPv6 Path Address Mapping TLV for use in a Path Descriptor field of a Path NLRI for use in advertising path address mappings using a BGP-LS protocol when supporting routing of source routed packets using path compression in IPv6-based source routing;

FIG. 121 depicts an example embodiment of a method for use by a network element to generate and send control plane information for supporting flow-specific fast rerouting of source routed packets based on path compression;

FIG. 122 depicts an example embodiment of a method for use by a network element to receive and use control plane information for supporting flow-specific fast rerouting of source routed packets based on path compression; and FIG. 123 depicts a high-level block diagram of a computer suitable for use in performing various functions presented herein.

To facilitate understanding, identical reference numerals have been used, where possible, to designate identical elements that are common to the figures.

DETAILED DESCRIPTION

Figure 1:
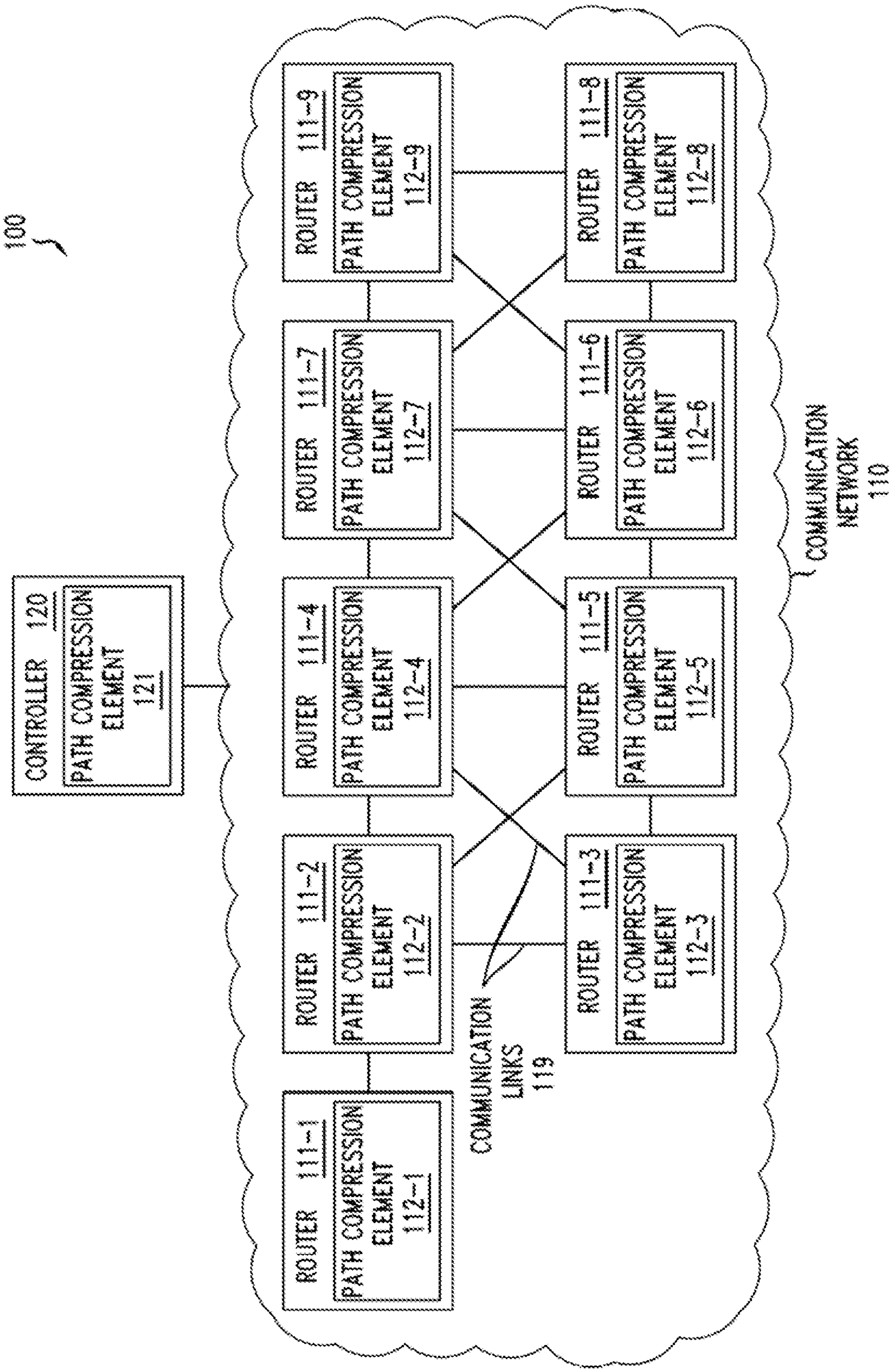
FIG. 1 depicts an example communication system configured to support path compression in routing of source routed packets.

Various example embodiments relate generally to supporting path compression in routing of source routed packets in communication networks. Various example embodiments for supporting path compression in routing of source routed packets may be configured to support path compression in routing of source routed packets based on use of various source routing protocols which may be based on various underlying communication protocols, such as Multiprotocol Label Switching (MPLS), Internet Protocol (IP) version 4 (IPv4), IP version 6 (IPv6), or the like, as well as various combinations thereof. Various example embodiments for supporting path compression in routing of source routed packets may be configured to support path compression in routing of source routed packets based on encoding of a set of hops within a header of a source routed packet using a path identifier (e.g., a path label, a path address, or the like) representing the set of hops (e.g., a set of hops providing a segment of the path, a set of hops providing a protection path configured to protect a portion of the path, or the like). Various example embodiments for supporting path compression in routing of source routed packets may be configured to support path compression in routing of source routed packets based on use of path compression to encode hops of the primary path (e.g., using a path identifier to encode a set of hops of the primary path that forms a segment of the primary path). Various example embodiments for supporting path compression in routing of source routed packets may be configured to support path compression in flow-specific fast rerouting (FRR) of source routed packets based on use of path compression to encode a set of hops of a protection path configured to protect a portion of the primary path (e.g., using a path identifier to encode the set of hops of the protection path that protects the portion of the primary path). The hops and sets of hops associated with a source routed packet may be encoded within the header of the source routed packet in various ways, which may vary depending on whether the set of hops provides a segment of a source routed path (e.g., encoding may include inclusion of the path identifier for the set of hops as an identifier within the source route or may use other types of encoding) or whether the set of hops provides a protection path configured to protect a hop of a source routed path (e.g., encoding may be based on use of Fast-Reroute Explicit Hop (FEH) elements or may use other types of encoding). It will be appreciated that path compression may be used in both non-FRR embodiments (e.g., for encoding one or more segments of the source routed path) and FRR embodiments (e.g., for encoding one or more segments of the source routed path, one or more protection paths for use in FRR operations, or a combination thereof). It is noted that these and various other example embodiments and potential advantages related to supporting path compression in routing of source routed packets in communication networks may be further understood by way of reference to the following description and the various figures which are discussed further below.

FIG. 1 depicts an example communication system configured to support path compression in routing of source routed packets.

The communication system 100 includes a communication network 110 and a controller 120. The communication network 110 is a packet-switched network including a set of routers 111-1-111-9 (collectively, routers 111, where a given router 111-*x* also may be referred to herein using the notation Rx) and a set of communication links 119 via which the routers 111 are communicatively connected. The communication network 110 is configured to support various data plane functions and control plane functions for supporting communication of traffic based on source routing. The controller 120 is configured to provide control functions for the communication network 110 (e.g., computing and installing routes within communication network 110, performing monitoring and rerouting functions for communication network 110, or the like, as well as various combinations thereof). The communication system 100 is configured to support various embodiments for supporting path compression in routing of source routed packets within the communication network 110. Various embodiments for supporting path compression in routing of source routed packets within the communication network 110 may be further understood by first considering various aspects of communication networks.

In general, many packet-switched networks, such as communication network 110, are built on mesh topologies in which there are multiple paths available to reach a given destination. The links in the mesh topology are point-to-point links between routers (illustratively, communication links 119 between routers 111). In general, a path to a destination may go through any number of routers 111, and the path may change at any time due to various conditions (e.g., traffic problems, failed links, failed nodes, or the like). In this type of environment, there are generally at least two possible packet-routing methods available: hop-by-hop destination-based routing and source routing.

In hop-by-hop destination-based routing, a packet has a source address (SA) and a destination address (DA) and, at each router along the route, the router checks the DA and makes a routing decision as to how to forward the packet based on the DA. Thus, decisions are made on a hop-by-hop basis in the network until the packet reaches its destination. In other words, this scheme is similar to getting directions along the way.

In source routing, also called explicit path addressing, a head-end router may partially or completely specify the route that the packet (referred to as a source routed packet) takes through the network. The head-end router discovers an explicit path for a packet flow through the network (e.g., locally or based on interaction with a controller) in advance of sending packets of the packet flow. The explicit path is "encoded" into the packet and transit routers forward the packet based on that explicit path. In general, as discussed further below, source routing may use a loose source route, a strict source route, or a combination thereof.

In general, source routing, as compared with hop-by-hop destination-based routing, reduces the states needed in transit nodes in order for the transit nodes to forward a packet, since each transit node typically maintains forwarding information to next-hop nodes (rather than maintaining forwarding information to each possible packet destination, as in hop-by-hop destination-based routing). A generic method of source routing is explained below with respect to FIG. 1.

In FIG. 1, R1 (the head-end router) decides to send a packet along the path R1-R2-R4-R7-R9. In this example, assume that R1, R2, R3 . . . , R9 are loopback addresses assigned as node/router identifiers. For example, in the IPv4 addressing scheme, R9 may be something like 1.1.1.1. So R1 encodes the explicit path with node identifiers as {R4, R7, R9} into the source routed packet and sends the source routed packet to R2. When R2 receives the source routed packet, it reads and pops the first hop in the explicit path, which is R4, and then forwards the source routed packet to R4 with the explicit path in the source routed packet as {R7, R9}. When R4 receives the source routed packet, it reads and pops the first hop in the explicit path, which is R7, and forwards the packet to R7 with the explicit path {R9}. When R7 receives the source routed packet, it reads and pops the first hop, which is R9, and forwards the source routed packet to R9 without any explicit path. The source routed packet may then be forwarded by destination based routing at R9 and onwards toward the ultimate destination for the source routed packet.

As indicated above, source routing may use a loose source route, in which an intermediate router can choose among multiple paths to reach a specified next hop. For example, if R2 finds that the "optimal" path to R4 is via R2-R3-R4, instead of R3-R4 then it will not pop R4 from the explicit path and would forward the source routed packet to R3 with the explicit path {R4, R7, R8}. When R3 receives the source routed packet, and finds the first hop in the path as R4, it pops R4 since R4 is the immediate next-hop for the source routed packet and sends the source routed packet to R4 with the explicit path {R7, R8}. In other words, when an explicit path includes one or more node identifiers then it may be considered a loose source route since a transit router, for a given node, can choose one among the available paths to reach the specified node (which is a loopback address of the node).

As indicated above, source routing may use a strict source route, in which the head-end router specifies the exact set of links to be taken by the source routed packet. For example, R1 encodes a set of next-hop identifiers such as {R2→R4, R4→R7, R7→R9} to specify the path to be taken by the source routed packet. A next-hop identifier can be represented by the next-hop address on a link. For example, R2→R4 can be encoded as the IP address on R2-R4 link at the R4 end (conversely, R4→R2 means the IP address on R2-R4 link at the R2 end). Using the IPv4 addressing scheme, it is possible to encode something like R2→R4=10.10.10.2 and R4→R2=10.10.10.1, where the R2-R4 link is assigned the subnet 10.10.10.1/30. It is noted that use of a strict source route may be preferable when a packet belonging to a service or application needs to strict QoS requirements or SLAs and, thus, needs to follow a strict path with links satisfying the QoS requirements or SLAs.

It is noted that source routing may use a combination of strict source routes and loose source routes. For example, R1 can specify a mix of strict and loose hops such as {R2→R4, R9}. Here, the source routed packet must traverse the R2→R4 next-hop to reach R4, but R4 may choose one of the available paths between R4 and R9.

A variant of strict source routing with constraints is called constraint-based source routing (CBSR), which generally works as follows. The network includes network elements (e.g., nodes and links) that are arranged in a topology. Various Traffic Engineering (TE) parameters are assigned into the network elements. For example, the TE parameters of a network element may describe characteristics such as cost, delay, throughput, available bandwidth, packet loss, or the like, as well as various combinations thereof. The topology and TE parameters of the network elements are learned by a path computation element (PCE) and are maintained in a centralized traffic engineering (TE) database (TEDB) hosted by the PCE. For example, the PCE may be an external agent such as an SDN controller, a server, or the like. The PCE can learn the topology and TE parameters by listening to link-state advertisements (LSAs) from one or more Interior Gateway Protocols (IGPs) (e.g., Intermediate System to Intermediate System (IS-IS), Open Shortest Path First (OSPF), OSPF version 3 (OSPFv3), or the like) running among the routers, by using a Border Gateway Protocol (BGP) (e.g., BGP-Link State (BGP-LS), e.g., as defined in RFC 7752, or the like), by using a push/pull mechanism to gather such information from the routers, or the like, as well as various combinations thereof. The head-end router classifies packets into flows based on an application or a service, where each flow may be associated with a specific QoS requirement or SLA. The head-end router sends a request to the PCE for the PCE to compute an explicit path (typically the optimal path) that meets specified QoS requirements or SLA. The PCE typically computes such a path by running a Constraint Shortest Path First (CSPF) process based on the TEDB. Once a path is allocated, the PCE updates the dynamic TE state (e.g., residual bandwidth) of the network elements along that path into the TEDB to reflect that TE resources allocated to the path have been reserved. The head-end router sends all packets belonging to a flow over the explicit path that meets the QoS requirement/SLA of the flow. The explicit path is encoded into the source routed packet as a strict source route. Thus, it is possible that packets of different flows to the same destination follow diverse paths. It is noted that, since per flow states are maintained at the head-end router, and the transit routers are agnostic of a flow (including the associated QoS requirement/SLA of the flow), this results in significant reduction of cost and complexity at the transit routers.

Source routing techniques may be used in conjunction with various different communication protocols. For example, as discussed further below, source routing techniques may be used in conjunction with MPLS (MPLS-based source routing), IPv4 (IPv4 source routing), IPv6 (IPv6 source routing), or the like, as well as various combinations thereof.

MPLS-based source routing provides a generic/unified mechanism for routing various protocol families with minimal overhead. Source Routing in MPLS can be achieved by stacking a list of labels on the source routed packet, where each label identifies a node or a next-hop along the explicit path. An MPLS label is 4 bytes in size and is encoded as follows. The MPLS label includes a Label Value field, an Experimental Use field (denoted as Exp), a Bottom of Stack field (denoted as S), and a Time to Live (TTL) field. The Label Value field is a 20-bit field that includes a 20-bit label value. The Experimental Use field is a 3-bit field for experimental use. The Bottom of Stack field is a 1-bit field which indicates whether this label is the last (oldest) label in the label stack. The Time to Live field is an 8-bit field that indicates a TTL value for the source routed packet. In other words, an MPLS label includes 4 bytes.

MPLS-based source routing, as noted above, provides a generic/unified mechanism for routing various protocols families with minimal overhead. For example, for an explicit path using IPv4 source routing based on RFC 791 (within SSR/LSR Option), 30 IPv4 hops will consume 143 bytes (which includes 20 bytes of IPv4 Header plus 123 bytes of IPv4 SSR/LSR Option (including 3 fixed header bytes and 30 four-byte IPv4 addresses)); however, if IPv4 packets are routed on the same path over MPLS, then the explicit path will consume just 30×4 bytes=120 bytes (which is approximately a 16.08% reduction). Similarly, for example, for an explicit path using IPv6 source routing based on RFC 2460 (with Routing Extension Header), 30 IPv6 hops will consume 528 bytes (which includes 40 bytes of IPv6 Header plus 488 bytes of Routing Extension Header (including 8 fixed header bytes and 30 sixteen-byte IPv6 addresses); however, if IPv6 packets are routed on the same path over MPLS, then the explicit path will consume just 30×4=120 bytes (which is about a 77.27% reduction). It is noted that, despite the significant potential reductions in overhead, some customers may still prefer native IPv6-based forwarding. It will be appreciated that MPLS may be used to route various other protocols.

MPLS-based source routing may be provided using Segment Routing (SR). SR as a method of source routing in MPLS is being developed in the IETF as "Segment Routing with MPLS Data Plane". In SR, an explicit hop is referred to as a "Segment"—which can be a Node Segment or an Adjacency (Next-Hop) Segment. A label is assigned to each segment. Each router in the SR domain initiates a Node Label that identifies one of its loopback addresses and a set of Adjacency Labels, where each Adjacency Label identifies a next-hop address on a link to an adjacent neighbor. Each router floods those label mappings across the SR domain as attributes to Link State Advertisements (LSA) using protocols such as IGPs (e.g., IS-IS, OSPF, OSPFv3, or the like), BGPs (e.g., BGP-LS or the like), or the like, as well as various combinations thereof. A Label Edge Router (LER), or the sender of a source routed MPLS packet, adds a stack of Node/Adjacency Labels on the source routed packet as the explicit path to be traversed by the source routed packet. A transit router looks up the first label in the stack (which identifies a next-hop node or a local adjacency), pops the first label (if it is a node label then the node label is popped only if it identifies the receiving node), and forwards the source routed packet to designated next-hop node or adjacency. This process continues at each transit router along the explicit path, until the label stack becomes empty.

MPLS-based source routing may be provided using CBSR. CBSR in MPLS, which also is referred to as SR-TE, is being developed in the IETF as "Segment Routing Policy for Traffic Engineering". SR-TE is expected to be the replacement of RSVP-TE, which is defined in RFC 3209. RSVP-TE is the state-full approach of explicit path routing, where an MPLS-TE LSP per flow is signaled across a path that meets its QoS requirement. Each transit router along the path maintains per flow/LSP states, both in the control plane and in the data plane. SR-TE is scalable over RSVP-TE under various conditions, such as (1) when head-end needs to set-up application aware flows at much finer granularity (with the RSVP-TE approach, this will require a very large number of LSPs), (2) when the head-end needs to set-up, teardown, re-optimize flows at short calls and as demanded by applications (e.g., in Web-Scale Data Centers), which is not possible with a signaling based approach, and (3) when there is a need or desire to minimize complexity and states in transit routers.

IPv4 source routing is defined in the original specification of the IPv4 Protocol, RFC 791. Namely, IPv4 source routing is described in Section 3.1 of RFC 791. IPv4 source routing may be provided using SR. A node or adjacency identifier in the explicit path is encoded as IPv4 address. Thus, the explicit path is a list of IPv4 addresses. IPv4 source routing may be provided via CBSR.

IPv6 source routing is defined in the original specification of the IPv6 Protocol, RFC 2460. Namely, IPv6 source routing is described in Section 4.4 of RFC 2460. IPv6 source routing may be provided using SR (e.g., based on the "Segment Routing in IPv6 Data Plane" defined by the IETF). A node or adjacency identifier in the explicit path is encoded as IPv6 address. Thus, the explicit path is a list of IPv6 addresses. IPv6 source routing may be provided via CBSR.

It is noted that, source routing, in addition to being deployed in decentralized paradigms as discussed above (e.g., with distributed distribution of state information using IGPs), also may be deployed within various centralized paradigms. For example, source routing (e.g., in MPLS, IPv4, IPv6, or the like) also may be deployed by a Software Defined Networking (SDN) paradigm, which can eliminate IGPs in transit nodes. SDN is gaining popularity in data-center networks where a centralized controller functions as an integrated control plane. The SDN controller is called upon to perform computations based on the network topology and current state of the connections within the network, including Traffic Engineering (TE) information. Each router reports its link/adjacency/TE status to the SDN controller. Such status exchange may be done using standard mechanisms like BGP-LS (as defined in RFC 7752) or through proprietary protocols. The SDN controller maintains the TE DB of the network. The SDN controller assigns node and adjacency labels for each node and adjacency in the network and, accordingly, programs the required node and adjacency labels in the nodes under its control. The head-end node (an LER or the sender of a source routed MPLS packet), generates a request to the controller to compute the optimal path to a destination that meets specified QoS of a flow. The SDN controller runs CSPF (or other related techniques) on the TE DB and responds to the head-end node with the explicit path containing the node/adjacency labels that meet the requested QoS. The head-end node then adds the explicit path label stack on top of the packet to form a source routed packet and sends the source routed packet across the network. The transit routers along the explicit path handle forwarding of the source routed packet based on the explicit path label stack.

In source routing, Fast Reroute (FRR) may be used to provide resiliency against various types of failures which may impact delivery of packets routed using source routing. In general, FRR is a mechanism for protecting traffic from link failures or node failures by locally repairing or rerouting traffic at a point of local repair (PLR), thereby allowing continuity of the impacted flows until the source node starts sending packets over the alternate path computed by the PCE. The use of FRR may be further understood by way of reference to an example based on FIG. 1. In FIG. 1, assume that R1 is sending packets for two flows as follows: flow A with the strict path {R2→R4, R4→R7, R7→R9} and flow B with the strict path {R2→R4, R4→R6, R6→R8, R8→R9}. If the R2→R4 link fails or the R4 node fails, then it could take several seconds to propagate the failure to the PCE, after which an alternate end-to-end path is re-computed by the PCE and R1 is notified of the alternate path so that R1 can begin sending packets over the alternate path. However, since a source routing paradigm is used to provide strict QoS requirement or SLA guarantees of an application or service (translated into flows), R2 should be able to "locally" re-route traffic of a flow around the failure (local repair), until the alternate path is re-computed by the PCE (global repair). As indicated above, this type of local rerouting may be provided using FRR.

In general, and as indicated above, FRR is a mechanism for protecting traffic from link failures or node failures by locally repairing or rerouting traffic at a PLR, thereby allowing continuity of the impacted flows until the source node starts sending packets over the alternate path computed by the PCE. In the example above, as indicated above, R2 would be the PLR which would apply FRR to protect the traffic from the failure (namely, when the R2→R4 link fails or the R4 node fails). It is noted that, in FRR, a PLR node typically is supposed to guarantee re-routing of traffic within 0-50 milliseconds (typically referred to as "sub-50 ms"), which is generally significantly faster than the time it takes for the PCE to re-compute an alternate path and to notify the head-end node of the alternate path. In general, FRR mechanisms are typically based on the principles of FRR computation, FRR programming, and FRR forwarding, each of which is discussed further below.

As indicated above, FRR is typically based on FRR computation. For each PLR, a protection path against a next-hop node or adjacency is precomputed for resiliency against failure of that next-hop or adjacency. A protection path is a detour, or bypass, around the failure. There are two types of protection paths: link protection and node protection.

A protection path configured for link protection is a path that bypasses a single link. In FIG. 1, for example, {R2→R3, R3→R4} is the link protection path that protects adjacency on link R2→R4. This protection path terminates at the node on the remote end of the protected link, which is R4. R4 is called the Merge Point (MP), as it is the node where the protection path merges with the primary path.

A protection path configured for node protection is a path that bypasses a next-hop node to protect against failure of that next-hop node. In FIG. 1, for example, {R2→R3, R3→R5, R5→R7} is one node protection path that can protect against failure of R4. It terminates at a node subsequent to the protected node, which is R7 (the MP). It is noted that a node protection path also provides protection from link failure (e.g., R2→R4 link failure in FIG. 1), which, in general, makes node protection a superior and preferred approach.

It is noted that FRR generally provides protection against single failure in the network, such that, if protection path also fails at the same time then traffic cannot be forwarded. The computation of a protection path is generally a complex procedure, and computation procedures generally build on proven IP-FRR concepts such as Loop Free Alternate (LFA) as defined in RFC 5286, Remote-LFA (RLFA) as defined in RFC 7490, Remote LFAs with Directed Forwarding (DLFA), Topology Independent LFA (TI-LFA), or the like, as well as various combinations thereof. These procedures generally try to compute a protection path that is "loop-free", meaning that it is guaranteed that a packet forwarded on the protection path will not be looped back towards the PLR.

As indicated above, FRR is typically based on FRR programming. The protection path is preprogramed in the data plane of a PLR. For example, assume that R2 decided to use the link protection path {R2→R3, R3→R4} to protect against failure of the R2→R4 link. In this example, R2 could preprogram the protection path {R2→R3, R3→R4} in the data plane as a "backup" of {R2→R4} for use in fast rerouting of traffic as soon as R2→R4 fails. It is noted that preprogramming of protection path increases the data plane state in the PLR node.

As indicated above, FRR is typically based on FRR forwarding. When the R2→R4 link fails, flow A and flow B are diverted along the link protection path {R2→R3, R3→R4}. On receiving a packet, R2 pops the first hop {R2→R4} from the explicit path list and finds that corresponding next-hop has failed. So, it decides to re-route along the protection path. R2 pushes the protection path (list of hops along the protection path) on top of the source routed packet and forwards the source routed packet to the first next-hop in the protection path. The PLR encodes the protection path in a way such that it is consistent with the forwarding state in the MP. For example, R2 diverts flow A and flow B to R3 with the updated paths as {R3→R4, R4→R7, R7→R9} and {R3→R4, R4→R6, R6→R8, R8→R9}, respectively. It is noted that the first hop in the protection path, i.e., {R2→R3}, does not need to be pushed onto the source routed packet by R2 as it is the immediate next-hop for R2 and, thus, R2 knows to send the source routed packets to R3.

Various example embodiments for supporting path compression in routing of source routed packets may be configured to support path compression in routing of source routed packets based on encoding of a set of hops within a header of a source routed packet using a path identifier (e.g., a path label, a path address, or the like) representing the set of hops (e.g., using path compression in the source routed path for a set of hops providing a segment of the source routed path based on a path identifier, using path compression in FRR for a set of hops providing a protection path configured to protect a portion of the source routed path based on a protection path identifier, or the like, as well as various combinations thereof).

The communication system 100 is configured to support various example embodiments of path compression based routing of source routed packets (e.g., in a source routed path, in a protection path protecting a portion of a source routed, or the like, as well as various combinations thereof). The routers 111-1-111-9 include path compression elements 112-1-112-9 (collectively, path compression elements 112), respectively. The path compression elements 112 of the routers 111 may be configured to provide various functions of various embodiments for supporting path compression based routing of source routed packets as presented herein (e.g., source node functions including generation of source routed packets based on path compression, transit node functions including handling of source routed packets based on path compression, or the like, as well as various combinations thereof). The controller 120 includes a path compression element 121. The path compression element 121 of the controller 120 may be configured to provide various functions of various embodiments for supporting path compression based routing as presented herein (e.g., source routing path computation, control plane functions, or the like, as well as various combinations thereof).

Various example embodiments for supporting path compression in routing of source routed packets may be configured to support path compression in routing of source routed packets based on configuration of source routed packets for supporting path compression in routing of source routed packets.

Various example embodiments for supporting path compression in routing of source routed packets may be configured to support path compression in routing of source routed packets by supporting a source routed packet configured as follows. The source routed packet includes a payload and a header. The header of the source routed packet includes an encoding of a source routed path composed of a set of hops. The header of the source routed packet includes an encoding of a set of hops. The set of hops may be a set of hops providing a segment of the source routed path (e.g., where the segment of the source routed path includes a subset of the hops of the source routed path). The set of hops may be a set of hops providing a protection path configured to protect a portion of the source routed path (e.g., one or more hops of the source routed path). The set of hops may be encoded using a path identifier configured to represent the set of hops. The path identifier may be used as a key into a table for identifying a first hop of the set of hops (which is the next-hop for the source routed packet) and a list of any remaining hops of the set of hops (which may then be explicitly encoded within the header of the source routed packet as explicit hops which may be used by nodes along the path for forwarding of the source routed packet). The entry of the table that is associated with the path identifier may include the first hop of the set of paths or may point to another table which may be used to identify the first hop of the set of hops. The entry of the table that is associated with the path identifier may include the remaining hops of the set of hops or may point to another table which may be used to identify the remaining hops of the set of hops. The path identifier may vary for different source routing protocols (e.g., a path label in MPLS, a path address in IPv4 and IPv6, or the like). The path identifier that is encoded within the header of the source routed packet may be encoded in various ways depending on whether the path identifier represents a segment of the source routed path (e.g., in which case encoding may be based on inclusion of the path identifier for the set of hops as an identifier within the source route) or whether the path identifier represents a protection path configured to protect a hop of the source routed path (e.g., in which case encoding may be based on use of FEH elements or may use other types of encoding. The path identifier that is encoded within the header of the source routed packet when the path identifier represents a protection path configured to protect a hop of the source routed path, where the encoding is based on FEH elements, may be encoded in various ways which may vary for different types of source routing protocols. For example, in MPLS-based source routing, as discussed further below, the FEH element used to encode a path identifier for a protection path may be a label in a label stack. For example, in IPv4 source routing, as discussed further below, the FEH element used to encode a path identifier for a protection path may be a field within an IPv4 Options Header, a field within an IPv4 Shim Header, or the like. For example, in IPv6 source routing, as discussed further below, the FEH element used to encode a path identifier for a protection path may be a field within an IPv6 Routing Header, a field within an IPv6 Shim Header, or the like. It will be appreciated that multiple such sets of hops may be encoded within the header of the source routed path (e.g., multiple path identifiers representing multiple segments of the source routed path, multiple path identifiers representing multiple protection paths protecting multiple portions of the source routed path, or the like, as well as various combinations thereof). The source routed packet may be generated by a source node and processed by nodes along the source routed path (e.g., for routing along the primary path in the case where path compression is used in the primary path, for routing along a protection path during a failure condition where path compression is used in the protection path, and so forth). The handling of source routed packets in this manner may be further understood by considering various functions supported by the source node, transit nodes, and destination node of the source routed path, as discussed further below.

Various example embodiments for supporting path compression in routing of source routed packets may be configured to support path compression in routing of source routed packets by supporting handling of a source routed packet by a network element. The handling of the source routed packet, as discussed further below, may depend on the node at which the source routed packet is being processed (e.g., a source node of the source routed path, a transit node of the source routed path, a destination node of the source routed path, or the like).

Figure 2:
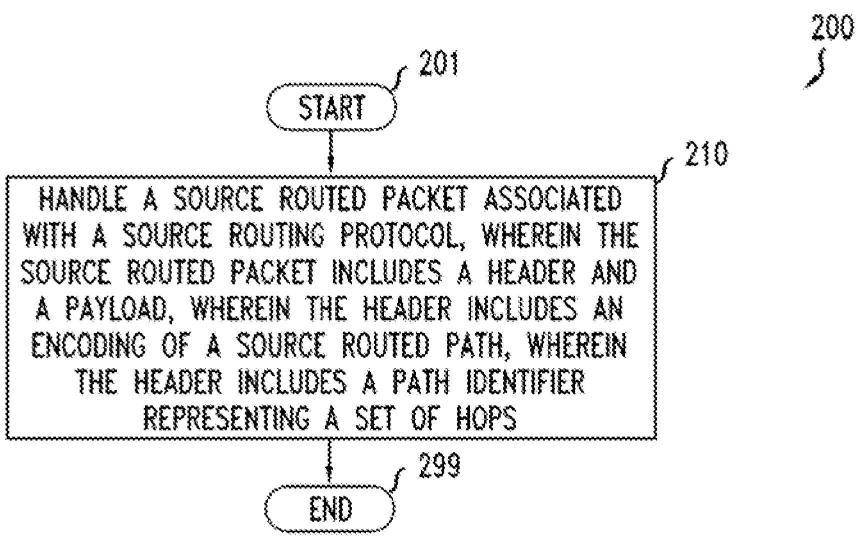
FIG. 2 depicts an example embodiment of a method for use by a network element to handle a source routed packet based on path compression.

FIG. 2 depicts an example embodiment of a method for use by a network element to handle a source routed packet based on path compression. It will be appreciated that the method 200 of FIG. 2 may be performed by a source node of the source routed path, a transit node of the source routed path, or a destination node of the source routed path. It will be appreciated that, although primarily presented herein as being performed serially, at least a portion of the functions of method 200 may be performed contemporaneously or in a different order than as presented in FIG. 2. At block 201, method 200 begins. At block 210, a source routed packet associated with a source routing protocol is handled. The source routed packet includes a header. The header includes an encoding of a source routed path. The header includes a path identifier representing a set of hops. The set of hops may be a set of hops providing a segment of the source routed path (e.g., where the segment of the path includes a subset of the hops of the path). The set of hops may be a set of hops providing a protection path configured to protect a portion of the source routed path (e.g., protecting one or more hops of the source routed path). The set of hops may be encoded using a path identifier configured to represent the set of hops. It will be appreciated that the handling of the source routed packet may depend on the role of the network element, such as whether the network element is operating as a source node for the source routed packet, a transit node for the source routed packet (and, for a transit node, whether the transit node is operating as a pass-through node on the primary path or the protection path, as a PLR for the primary path, or as an MP for the primary path), or a destination node for the source routed packet. For example, handling of the source routed packet when the network element is operating as a source node of the source routed path may include generating the source routed packet (e.g., obtaining the source routed path for the source routed packet, generating the header for the source routed packet including encoding the set of hops within the header using a path identifier and associating the header with a payload to form the source routed packet) and sending the source routed packet toward a next hop node. For example, handling of the source routed packet when the network element is operating as a transit node of the source routed path may include receiving the source routed packet, processing the source routed packet (e.g., determining handling of the source routed packet, modifying a header of the source routed packet, or the like, as well as various combinations thereof), and sending the source routed packet toward a next hop node (e.g., a next-hop node of the primary path where FRR is not used or a first hop node of the protection path where FRR is used). For example, handling of the source routed packet when the network element is operating as a destination node of the source routed packet may include receiving the source routed packet, processing the source routed packet (e.g., determining handling of the source routed packet, determining handling of the payload of the source routed packet, or the like, as well as various combinations thereof), and sending the payload of the source routed packet toward a downstream network element. At block 299, method 200 ends. It will be appreciated that, although primarily presented with respect to an embodiment in which the header of the source routed packet includes a single path identifier representing a single set of hops, the header of the source routed packet may include multiple path identifiers representing multiple sets of hops (e.g., one or more path identifiers encoding one or more segments of the source routed path, one or more path identifiers encoding one or more protection paths protecting one or more portions of the source routed path, or the like, as well as various combinations thereof).

In at least some embodiments, as indicated above, the handling of the source routed packet at a node may depend on the role of the node at which the source routed packet is being handled or processed (e.g., a source node of the source routed path, a transit node of the source routed path, or a destination node of the source routed packet).

In at least some embodiments for example, at the source node of the source routed path for the source routed packet, handling of the source routed packet may include generating the source routed packet and sending the source routed packet toward a network element. The source routed packet may be generated by generating the header for the source routed packet and associating the header with a payload to form the source routed packet. The header for the source routed packet, as indicated above and discussed further below, may include an encoding of a set of hops providing a segment of the source routed path (e.g., the source routed path where FRR is not supported for the source routed path or the primary path portion of the source routed path where FRR is supported for the source routed path), an encoding of a set of hops providing a protection path configured to protect a portion of the source routed path (e.g., where FRR is supported for the source routed path), or a combination thereof.

The header may be configured to support use of a path identifier to encode a set of hops providing a portion of the source routed path (which may be referred to as a segment of the source routed path). The header of the source routed packet to be routed along a source routed path, where a path identifier is used to represent a portion (e.g., segment) of the source routed path, may be generated by determining a set of hops of the source routed path for the source routed packet and encoding the set of hops of the source routed path within the packet header. If the source node is the head node in the portion of the source routed path that is represented by the path identifier, the source node may use the path identifier to determine the next-hop node to which the source routed packet is sent and to explicitly encode any remaining hops of the portion of the source routed path within the header of the source routed packet as explicit hop encodings. If the source node is not the head node in the portion of the source routed path that is represented by the path identifier, the source node may encode the path identifier within the header of the source routed packet to provide a compressed path-based encoding of that portion of the source routed path. It will be appreciated that multiple path identifiers may be used to represent multiple portions of the source routed path. It will be appreciated that the source node may generate a header including one or more explicit path encodings (using one or more path identifiers representing the respective portions of the source routed path) without including any explicit hop encodings. It will be appreciated that the source node may generate a header including one or more explicit path encodings (using one or more path identifiers representing the respective portions of the source routed path) and also including one or more explicit hop encodings representing one or more respective hops of the source routed path (where the explicit hop encodings may be associated with the beginning of the source routed path, the end of the source routed path, interspersed between explicit path encodings, or the like, as well as various combinations thereof). The hops and paths that are encoded within the header of the source routed packet, including explicit encodings of the one or more hops of the source routed path and path-based encodings of one or more portions (e.g., segments) of the source routed path, may be encoded in various ways (e.g., as lists of hop and path identifiers in a source route or the like) which, as indicated above and discussed further below, may vary for different types of source routing.

The header may be configured to support use of a path identifier to encode a set of hops providing a portion of the source routed path. The header of the source routed packet to be routed along a source routed path (which may be referred to as a primary portion of the source routed path or, more generally, as a primary path), where a path identifier is used to represent a protection path configured to protect a portion of the source routed path (e.g., protecting one or more hops of the source routed path), may be generated by determining a set of hops of the source routed path, determining a path identifier representing a protection path configured to protect a portion of the source routed path (e.g., protecting one or more hops of the source routed path), and encoding the hops of the source routed path within the header using explicit hop encodings representing the respective hops of the source routed path and encoding the protection path within the header using an explicit path encoding representing the protection path (namely, using the path identifier representing the protection path) rather than explicitly encoding the hops of the protection path as explicit hop encodings. The header may include path compression based path encodings of protection paths for one, some, or all of the hops of the primary path. The hops and paths that are encoded within the header of the source routed packet, including explicit encodings of the hops of the source routed path and path-based encoding of the protection path, may be encoded in various ways (e.g., using FEH elements or the like) which, as indicated above and discussed further below, may vary for different types of source routing.

It will be appreciated that the source node of the source routed path for the source routed packet may be configured to perform various other functions for supporting path compression for routing of the source routed packet.

Figure 3:
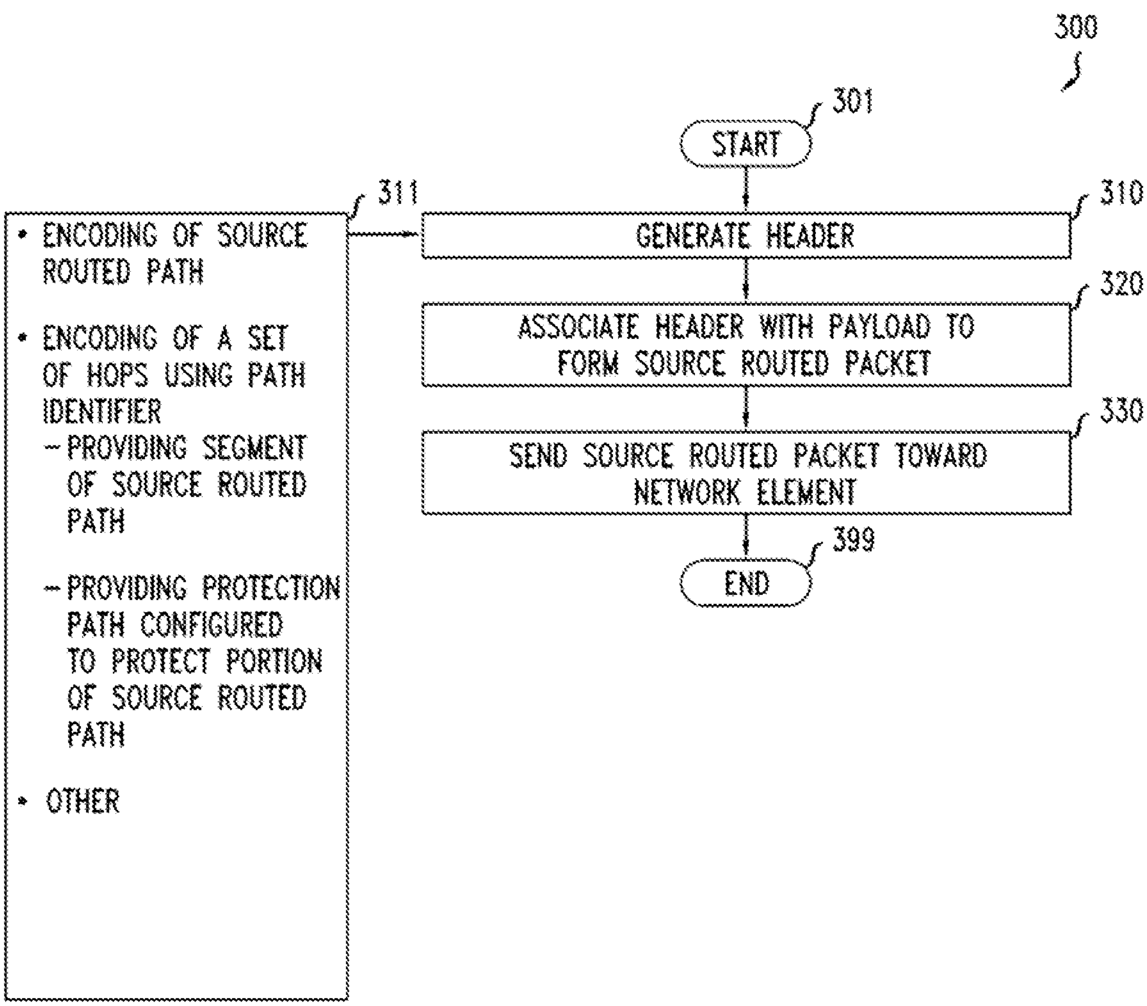
FIG. 3 depicts an example embodiment of a method for use by a source node to handle a source routed packet based on path compression.

FIG. 3 depicts an example embodiment of a method for use by a source node to handle a source routed packet based on path compression. It will be appreciated that, although primarily presented herein as being performed serially, at least a portion of the functions of method 300 may be performed contemporaneously or in a different order than as presented in FIG. 3. At block 301, method 300 begins. At block 310, a header is generated. As indicated by block 311, the header includes an encoding of a source routed path. As indicated by block 311, the header includes a path identifier representing a set of hops. The set of hops may be a set of hops providing a segment of the source routed path (e.g., where the segment of the source routed path includes a subset of the hops of the source routed path). The set of hops may be a set of hops providing a protection path configured to protect a portion of the source routed path. The path and path identifier may be determined by the source node in various ways (e.g., local computation by a PCE at the source node, obtained by the source node from a remote PCE (e.g., controller or other element), or the like). The set of hops may be encoded within the header in various ways, which may vary for different source routing protocols. It will be appreciated that the header may include various other information. At block 320, the header is associated with a payload to form a source routed packet. At block 330, the source routed packet is sent toward a network element. At block 399, method 300 ends. It will be appreciated that, although primarily presented with respect to example embodiments in which the header of source routed packet includes a path identifier encoding a set of hops, the source routed packet may not include such an encoding in certain situations (e.g., where the source node is part of the only segment of the source routed path and encoding of the remaining portions of the source routed path is based on explicit encoding of individual hops of the source routed path).

Figure 4:
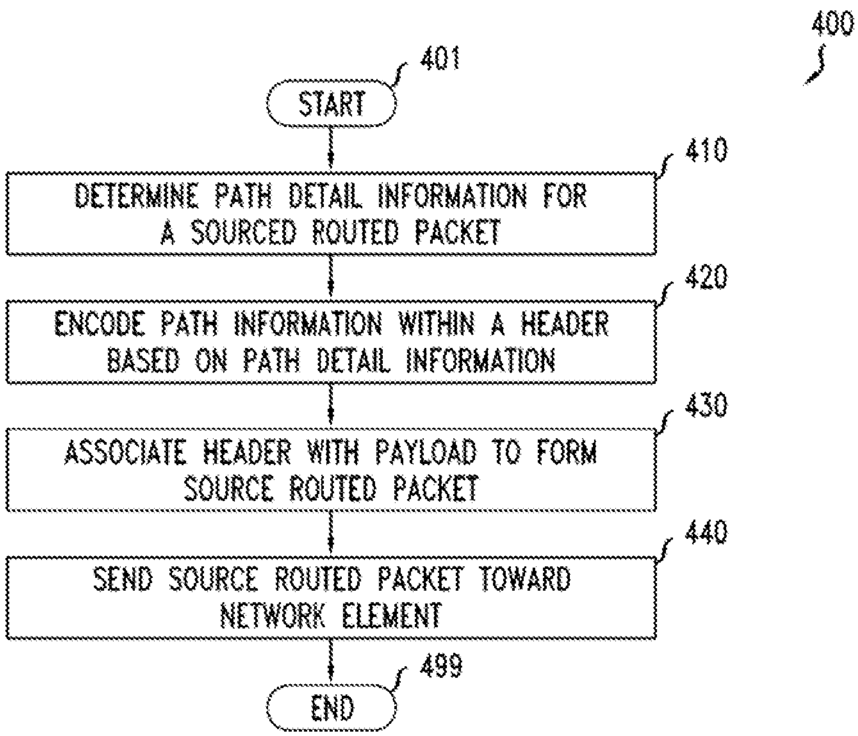
FIG. 4 depicts an example embodiment of a method for use by a source node to handle a source routed packet based on path compression.

FIG. 4 depicts an example embodiment of a method for use by a source node of a primary path to handle a source routed packet based on path compression. It will be appreciated that, although primarily presented herein as being performed serially, at least a portion of the functions of method 400 may be performed contemporaneously or in a different order than as presented in FIG. 4. At block 401, method 400 begins. At block 410, path detail information for a source routed packet is determined. The path detail information, where path encoding is used in the source routed path (e.g., for representing a segment of the source routed path), may include one or more of identification of hops of the source routed path, identification of path identifiers representing portions of the source routed path, or the like, as well as various combinations thereof. The path detail information, where path encoding is used for protection paths configured to protect portions of a primary path, may include primary path detail information (e.g., identification of the set of hops of the primary path) and protection path detail information for one or more protection paths (e.g., identification, for each of the one or more protection paths, of a respective path identifier representing the respective protection path). The source node may determine the path detail information by computing the path detail information (e.g., where the PCE is included on the source node), by obtaining the path detail information from a remote PCE (e.g., controller or other element), or the like, or the like, as well as various combinations thereof. At block 420, path information is encoded within a header based on the path detail information. The encoding of the path information, where path encoding is used in the source routed path (e.g., for representing a segment of the source routed path), may include one or more explicit path encodings representing one or more respective portions of the source routed path (using one or more path identifiers representing the respective portions of the source routed path). The encoding of the path information, where path encoding is used in the source routed path (e.g., for representing a segment of the source routed path), may include one or more explicit hop encodings representing one or more respective hops of the source routed path and one or more explicit path encodings representing one or more respective portions of the source routed path (using one or more path identifiers representing the respective portions of the source routed path). The encoding of the path information, where path encoding is used for protection paths configured to protect portions of a primary path, may include explicit encodings of the hops of the primary path and path-based encoding of one or more protection paths using one or more path identifiers representing the one or more protection paths. The path information may be encoded within the header in various ways, which may vary for different source routing protocols. At block 430, the header is associated with a payload to form the source routed packet. At block 440, the source routed packet is sent toward a network element. At block 499, method 400 ends. It will be appreciated that, although primarily presented with respect to example embodiments in which the header of source routed packet includes a path identifier encoding a set of hops, the source routed packet may not include such an encoding in certain situations (e.g., where the source node is part of the only segment of the source routed path and encoding of the remaining portions of the source routed path is based on explicit encoding of individual hops of the source routed path based on the path identifier).

It will be appreciated that various functions presented herein as being supported by a source node of a source routed path may be performed in various combinations for supporting various example embodiments of path compression for routing of source routed packets.

In at least some embodiments for example, at a transit node of the source routed path for the source routed packet where path encoding is used for encoding of a portion of the source routed path for the source routed packet, handling of the source routed packet may include receiving the source routed packet, processing the source routed packet, and sending the source routed packet toward a network element. The processing of the source routed packet may include determining a next hop for the source routed packet. The processing of the source routed packet may include modifying the header of the source routed packet (e.g., removing one or more encodings of one or more hops of the source routed path, removing a path identifier encoding a portion of the source routed path and inserting one or more encodings of one or more hops of the portion of the source routed path, modifying one or more fields associated with one or more encodings of one or more hops or sets of hops of the source routed path, or the like, as well as various combinations thereof). The manner in which the next hop for the source routed packet is determined is based on where the transit node is in the source routed path relative to the portion of the source path that is encoded in the source routed packet. The hops and paths that are encoded within the header of the source routed packet, including explicit encodings of the hops of the source routed path and path-based encoding of portions of the source routed path, may be encoded in various ways (e.g., within the source route or the like) which, as indicated above and discussed further below, may vary for different types of source routing.

In at least some embodiments for example, at a transit node of the source routed path for the source routed packet when the transit node is the first node in the portion of the source routed path represented by the path identifier, the next hop for the source routed packet may be determined based on an explicit path encoding within the header of the source routed packet (e.g., from the path identifier that represents the portion of the source routed path). The path identifier representing the set of hops of the portion of the source routed path may be used as a key into a table for identifying a first hop of the set of hops (which is the next-hop for the source routed packet) and a list of any remaining hops of the set of hops (which may then be explicitly encoded within the header of the source routed packet as explicit hops which may be used by nodes along the source routed path for forwarding of the source routed packet). The entry of the table that is associated with the path identifier may include the first hop of the set of hops or may point to another table which may be used to identify the first hop of the set of hops. The entry of the table that is associated with the path identifier may include the remaining hops of the set of hops or may point to another table which may be used to identify the remaining hops of the set of hops. The transit node may determine the hops of the portion of the source routed path based on a mapping between path identifier and the hops of the portion of the source routed path, which may be configured on the transit node based on mapping information received by the transit node from the associated PCE (e.g., the source node, a controller, or the like).

In at least some embodiments for example, at a transit node of the source routed path for the source routed packet when the transit node is not the first node in the portion of the source routed path represented by the path identifier, the next hop for the source routed packet may be determined based on an explicit encoding of the next hop within the header of the source routed packet. The explicit encoding of the next hop within the header of the source routed packet would have been previously encoded within the header of the source routed packet by an upstream node of the source routed path (e.g., the source node where the source node is the head node of the portion of the source routed path, an upstream transit node where the upstream transit node is the head node of the portion of the source routed path, or the like). The determination of the next hop for the source routed packet may be determined directly from the header of the source routed packet based on the explicit encoding of the next hop within the header of the source routed packet.

It will be appreciated that, at a transit node of the source routed path for the source routed packet where path encoding is used for encoding of a portion of the source routed path for the source routed packet, handling of the source routed packet at the transit node may include various other functions.

In at least some embodiments for example, at a transit node of the source routed path for the source routed packet where path encoding is used for encoding of a protection path configured to protect a portion of the source routed path, handling of the source routed packet may include receiving the source routed packet, processing the source routed packet, and sending the source routed packet toward a network element. The processing of the source routed packet may include determining a next hop for the source routed packet. The next hop for the source routed packet may be a hop on the primary path or a hop on the protection path. The processing of the source routed packet may include modifying a header of the source routed packet (e.g., removing one or more encodings of one or more hops of the primary path or the protection path, removing a path identifier encoding the protection path and inserting one or more encodings of one or more hops of the protection path for use by transit nodes on the protection path, modifying one or more fields associated with one or more encodings of one or more hops or sets of hops of the source routed path, or the like, as well as various combinations thereof). The processing of the source routed packet may depend on whether the transit node is a transit node of the primary path (e.g., where the processing may depend on whether or not the next hop is protected by a protection path and, if protected, whether or not the protection path is used based on an FRR operation) or a transit node of a protection path protecting the primary path (e.g., where the processing may depend on whether or not the transit node is an MP back to the primary path for the source routed packet). The hops and paths that are encoded within the header of the source routed packet, including explicit encodings of the hops of the source routed path and path-based encoding of the protection path, may be encoded in various ways (e.g., using FEH elements or the like) which, as indicated above and discussed further below, may vary for different types of source routing.

In at least some embodiments, for example, at a transit node of the primary path for the source routed packet where path encoding is used for encoding of a protection path using a path identifier, processing of the source routed packet may include determining forwarding of the source routed packet (e.g., determining whether the source routed packet is to be routed over the primary path or is to be directed onto a protection path associated with the primary path). The determining of the forwarding of the source routed packet may include determining, from the header of the source routed packet, a next hop of the primary path for the source routed packet, determining whether the next hop of the primary path is protected by a protection path, determining a status of the next hop of the primary path for the source routed packet, and determining forwarding of the source routed packet based on the status of the next hop of the primary path for the source routed packet.

The determining of the forwarding of the source routed packet may include determining that the source routed packet is to be forwarded via the primary path based on a determination that the next hop of the primary path is operational. The processing of the source routed packet, when the next hop of the primary path is protected by a protection path, may include modifying the header of the source routed packet to ensure that the protection path is not used for forwarding the source routed packet (e.g., remove the encoding of the hops of the protection path from the header). The source routed packet may then be forwarded toward the next hop of the primary path.

The determining of the forwarding of the source routed packet may include determining that the source routed packet is to be forwarded via the protection path based on a determination that the next hop of the primary path is not operational and that the next hop of the primary path is protected by the protection path. The determining of the forwarding of the source routed packet, when the source routed packet is forwarded via the protection path, may include determining a first hop in the protection path. The processing of the source routed packet, when the source routed packet is forwarded via the protection path, may include encoding remaining hops of the protection path (other than the first hop) as new hops in the primary path of the source routed packet. The next hop indicated by the first hop in the protection path and the remaining hops of the protection path may be determined based on the path identifier representing the protection path (e.g., using one or more tables which may be used to map the path identifier to the hops of the protection path). The processing of the source routed packet, when the source routed packet is forwarded via the protection path, may include updating one or more other fields in the header of the source routed packet (e.g., to indicate a number of protection hops left, to indicate that one or more hops of the primary path are to be ignored due to routing of the source routed packet via the protection path, or the like, as well as various combinations thereof). The source routed packet may then be forwarded toward the first hop in the protection path.

In at least some embodiments, for example, at a transit node of the protection path for the source routed packet where path encoding is used for encoding of a protection path using a path identifier, processing of the source routed packet may include determining handling of the source routed packet (e.g., determining whether the source routed packet is to be forwarded to an intermediate node of the protection path or is to be forwarded to a final hop of the protection path which is also a merge point back onto the primary path for the source routed packet). The determining of the handling of the source routed packet may include determining, from the header of the source routed packet, a hop of the protection path to be considered by the transit node in determining forwarding of the source routed packet. The processing of the source routed packet, based on a determination that the current hop in the protection path is not the final hop in the protection path (and, thus, that the source routed packet will continue along the protection path before re-converging with the primary path), may include updating one or more encodings of one or more other hops in the protection path. The processing of the source routed packet, based on a determination that the current hop in the protection path is the final hop in the protection path (and, thus, that the source routed packet will re-converge with the primary path at the next hop node), may include updating one or more encodings of one or more hops in the primary path (e.g., to indicate that one or more hops of the primary path are to be ignored due to routing along the protection path, to remove one or more hops of the primary path that are no longer needed due to routing along the protection path, or the like, as well as various combinations thereof). The forwarding of the source routed packet based on the hop of the protection path may include forwarding the source routed packet toward a next hop indicated by the hop of the protection path (which, again, may be a hop of the protection path or a hop that is an MP back into the primary path for the source routed packet).

It will be appreciated that, at a transit node of the source routed path for the source routed packet where path encoding is used for encoding of a protection path configured to protect a portion of the source routed path, handling of the source routed packet at the transit node may include various other functions.

It will be appreciated that transit nodes of the source routed path for the source routed packet may be configured to perform various other functions for supporting path encoding in routing of the source routed packet.

Figure 5:
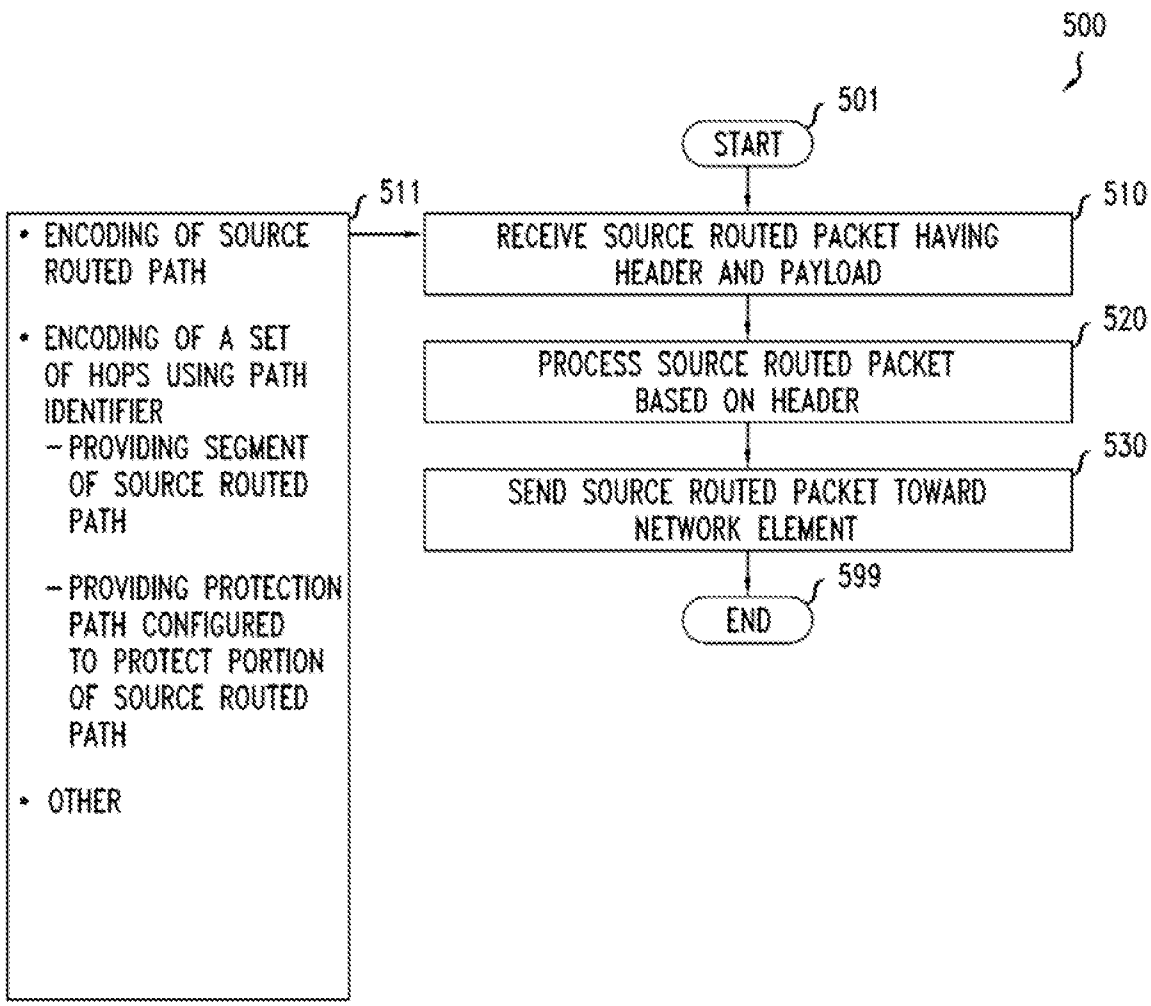
FIG. 5 depicts an example embodiment of a method for use by a transit node to handle a source routed packet based on path compression.

FIG. 5 depicts an example embodiment of a method for use by a transit node to handle a source routed packet based on path compression. It will be appreciated that, although primarily presented herein as being performed serially, at least a portion of the functions of method 500 may be performed contemporaneously or in a different order than as presented in FIG. 5. At block 501, method 500 begins. At block 510, a source routed packet is received. The source routed packet includes a header and a payload. As indicated by block 511, the header includes an encoding of a source routed path. As indicated by block 511, the header includes a path identifier representing a set of hops. The set of hops may be a set of hops providing a segment of the source routed path (e.g., where the segment of the path includes a subset of the hops of the source path). The set of hops may be a set of hops providing a protection path configured to protect a portion of the source routed path. The set of hops may be encoded using a path identifier configured to represent the set of hops. The set of hops may be encoded within the header in various ways, which may vary for different source routing protocols. It will be appreciated that the header may include various other information. At block 520, the source routed packet is processed based on the header. The processing of the source routed packet may include determining a next hop for the source routed packet, modifying a header of the source routed packet, or the like, as well as various combinations thereof. The processing of the source routed packet may depend on whether the transit node is a transit node of the primary path or a transit node of a protection path protecting the primary path. At block 530, the source routed packet is sent toward a network element. At block 599, method 500 ends. It will be appreciated that, although primarily presented with respect to example embodiments in which the received source routed packet still includes a path identifier encoding a set of hops, the source routed packet may not include such an encoding in certain situations (e.g., where the transit node is part of the final segment of the source routed path).

Figure 6:
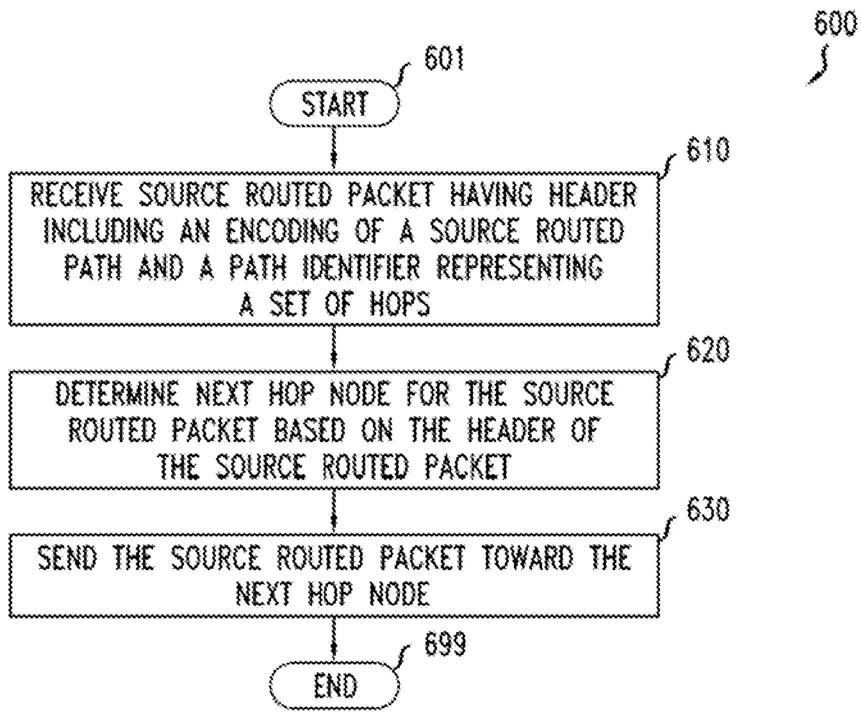
FIG. 6 depicts an example embodiment of a method for use by a transit node to handle a source routed packet based on path compression.

FIG. 6 depicts an example embodiment of a method for use by a transit node to handle a source routed packet based on path compression. It will be appreciated that, although primarily presented herein as being performed serially, at least a portion of the functions of method 600 may be performed contemporaneously or in a different order than as presented in FIG. 6. At block 601, method 600 begins. At block 610, a source routed packet is received. The header includes an encoding of a source routed path. The header includes a path identifier representing a set of hops. The set of hops may be a set of hops providing a segment of the source routed path (e.g., where the segment of the source routed path includes a subset of the hops of the source routed path). The set of hops may be a set of hops providing a protection path configured to protect a portion of the source routed path. The set of hops may be encoded using a path identifier configured to represent the set of hops. The set of hops may be encoded within the header in various ways, which may vary for different source routing protocols. It will be appreciated that the header may include various other information. At block 620, the next hop node for the source routed packet is determined based on the header of the source routed packet. It is noted that, where the set of hops is part of the source routed path, the determination of the next hop for the source routed packet may be determined from an explicit hop encoding within the header of the source routed packet (e.g., where the transit node is not the first hop of the set of hops), from an explicit path encoding within the header of the source routed packet (e.g., where the transit node is the first hop of the set of hops), or the like. It is noted that, where the set of hops is a protection path protecting a hop of the source routed path and the transit node is not the node upstream of the protected hop, the next hop node for the source routed packet may be determined from an explicit hop encoding within the header of the source routed packet. It is noted that, where the set of hops is a protection path protecting a hop of the source routed path and the transit node is the node upstream of the protected hop, the determination of the next hop node for the source routed packet may include a determination as to whether the protected hop is operational. For example, if the protected hop is operational then the next hop node for the source routed packet is the protected hop, and it will be appreciated that additional processing also may be performed by the transit node when the source routed packet is forwarded via the protected hop of the primary path (e.g., removing or popping the encoding of the protection path from the header of the source routed packet since the protection path is not needed or the like). For example, if the protected hop is not operational then the next hop is the first hop of the protection path, and it will be appreciated that additional processing also may be performed by the transit node when the source routed packet is forwarded via the protection path (e.g., determining the first hop of the protection path based on the path identifier representing the protection path, modifying encoding of hops within the header of the source routed packet such that any remaining hops of the protection path may be accessed and used by subsequent nodes along the protection path until the protection path remerges with the primary path, or the like, as well as various combinations thereof). At block 630, the source routed packet is sent toward the next hop node for the source routed packet. At block 699, method 600 ends. It will be appreciated that, although primarily presented with respect to example embodiments in which the received source routed packet still includes a path identifier encoding a set of hops, the source routed packet may not include such an encoding in certain situations (e.g., where the transit node is part of the final segment of the source routed path).

It will be appreciated that various functions presented herein as being supported by a transit node of a source routed path may be performed in various combinations for supporting various example embodiments of path compression in routing of source routed packets.

In at least some embodiments, for example, at the destination node of the source routed path for the source routed packet, handling of the source routed packet may include receiving the source routed packet, processing the source routed packet based on the header of the source routed packet to form a packet, and sending the packet toward a network element. The source routed packet includes a common header portion and a source routing portion. The processing of the source routed packet may include determining the handling of the source routed packet. The handling of the source routed packet may be based on fields of the header of the source routed packet. The processing of the source routed packet may include removing the source routing portion of the header of the source routed packet, updating the common header portion of the source routed packet, or the like, as well as various combinations thereof. The processing of the source routed packet, as noted above, produces a packet (including at least the common header portion of the source routed packet and the payload of the source routed packet) for further forwarding toward a network element. The packet is then forwarded toward the network element. It will be appreciated that the destination node of the source routed path for the source routed packet may be configured to perform various other functions for supporting flow-specific fast rerouting of the source routed packet. It will be appreciated that, since any path encodings are expected to have been removed from the source routed packet prior to the destination node receiving the source routed packet, the handling of the source routed packet by the destination node is not expected to be based on path identifiers.

Various example embodiments may be configured to provide improved routing within the context of source routing by supporting routing of source routed packets based on path compression.

Various example embodiments for supporting path compression in routing of source routed packets may be configured to support path compression in routing of source routed packets of a source routed path based on use of path compression to encode hops of the source routed path (e.g., using a path identifier to encode a set of hops of the source routed path that forms a segment of the source routed path).

Various example embodiments for supporting path compression in routing of source routed packets of a source routed path may be configured to support path compression in routing of source routed packets based on encoding of a set of hops of the source routed path (e.g., a set of hops providing a portion, or segment, of the source routed path) within a header of a source routed packet using a path identifier (e.g., a path label, a path address, or the like).

Various example embodiments for supporting path compression in routing of source routed packets of a source routed path based on encoding of a set of hops of the source routed path may be configured to support path compression in routing of source routed packets based on configuration of source routed packets for supporting path compression in routing of source routed packets.

Various example embodiments for supporting path compression in routing of source routed packets may be configured to support path compression in routing of source routed packets by supporting a source routed packet configured as follows. The source routed packet includes a payload and a header. The header of the source routed packet includes an encoding of a path composed of a set of hops. The header of the source routed packet includes an encoding of a set of hops forming a portion of the path (which may be referred to as a segment of the path). The set of hops forming the portion of the path may be encoded using a path identifier configured to represent the set of hops forming the portion of the path. The path identifier may be used as a key into a table for identifying a first hop of the set of hops (which is the next-hop for the source routed packet) and a list of any remaining hops of the set of paths (which may then be explicitly encoded within the header of the source routed packet as explicit hops which may be used by nodes along the path for forwarding of the source routed packet). The entry of the table that is associated with the path identifier may include the first hop of the set of paths or may point to another table which may be used to identify the first hop of the set of hops. The entry of the table that is associated with the path identifier may include the remaining hops of the set of hops or may point to another table which may be used to identify the remaining hops of the set of hops. The path identifier may vary for different source routing protocols (e.g., a path label in MPLS, a path address in IPv4 and IPv6, or the like). The path identifier that is encoded within the header of the source routed packet as part of a list of identifiers providing a source route for the source routed packet, which may vary for different types of source routing protocols (e.g., path labels for MPLS and path addresses for IPv4 and IPv6). The path identifier that is encoded within the header of the source routed packet may be encoded using an FEH element which may vary for different types of source routing protocols. For example, in MPLS-based source routing, as discussed further below, the FEH element may be a label in a label stack. For example, in IPv4 source routing, as discussed further below, the FEH element may be a field within an IPv4 Options Header, a field within an IPv4 Shim Header, or the like. For example, in IPv6 source routing, as discussed further below, the FEH element may be a field within an IPv6 Routing Header, a field within an IPv6 Shim Header, or the like. It will be appreciated that multiple such sets of hops may be encoded within the header of the source routed path (e.g., for multiple segments of the path). The source routed packet may be generated by a source node and handled by nodes along the source routed path (e.g., for routing along the source routed path where path compression is used in the source routed path). The handling of source routed packets in this manner may be further understood by considering various functions supported by the source node of the source routed path and various functions supported by transit nodes of the source routed path, as discussed further below.

Various example embodiments for supporting path compression in routing of source routed packets of a source routed path based on encoding of a set of hops of the source routed path may be configured to support path compression in routing of source routed packets by supporting handling of a source routed packet by a network element. The handling of the source routed packet, as discussed further below, may depend on the node at which the source routed packet is being processed (e.g., a source node of the source routed path, a transit node of the source routed path, a destination node of the source routed path, or the like).

Figure 7:
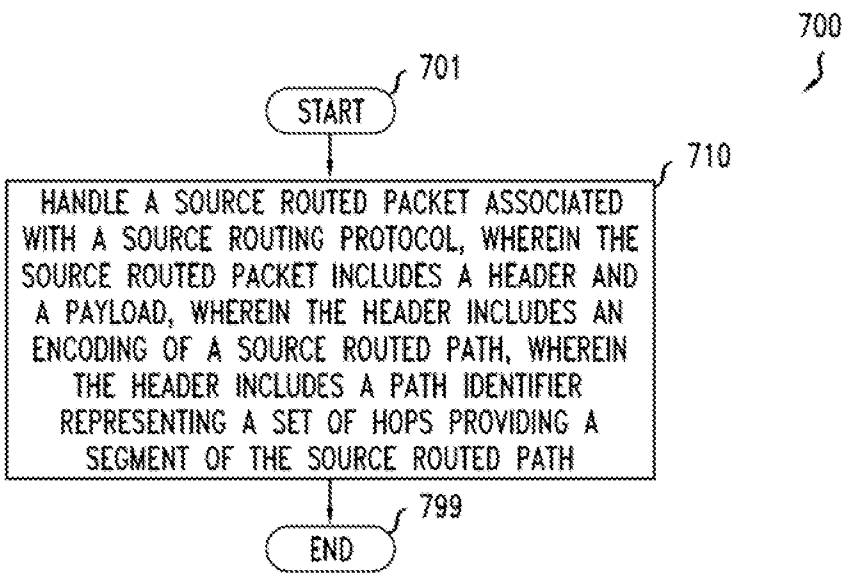
FIG. 7 depicts an example embodiment of a method for use by a network element to handle a source routed packet based on use of path compression in a source routed path.

FIG. 7 depicts an example embodiment of a method for use by a network element to handle a source routed packet based on use of path compression in a source routed path. It will be appreciated that the method 700 of FIG. 7 may be performed by a source node of the source routed path, a transit node of the source routed path, or a destination node of the source routed path. It will be appreciated that, although primarily presented herein as being performed serially, at least a portion of the functions of method 700 may be performed contemporaneously or in a different order than as presented in FIG. 7. At block 701, method 700 begins. At block 710, a source routed packet associated with a source routing protocol is handled. The source routed packet includes a header. The header includes an encoding of a source routed path. The header includes a path identifier representing a set of hops providing a segment of the source routed path (e.g., where the segment of the source routed path includes a subset of the hops of the source routed path). The set of hops may be encoded using a path identifier configured to represent the set of hops. It will be appreciated that the handling of the source routed packet may depend on the role of the network element, such as whether the network element is operating as a source node for the source routed packet, a transit node for the source routed packet, or a destination node for the source routed packet. For example, handling of the source routed packet when the network element is operating as a source node of the source routed path may include generating the source routed packet (e.g., obtaining the source routed path for the source routed packet, generating the header for the source routed packet including encoding the set of hops within the header using a path identifier and associating the header with a payload to form the source routed packet) and sending the source routed packet toward a next hop node. For example, handling of the source routed packet when the network element is operating as a transit node of the source routed path may include receiving the source routed packet, processing the source routed packet (e.g., determining handling of the source routed packet, modifying a header of the source routed packet, or the like, as well as various combinations thereof), and sending the source routed packet toward a next hop node of the source routed path. For example, handling of the source routed packet when the network element is operating as a destination node of the source routed packet may include receiving the source routed packet, processing the source routed packet (e.g., determining handling of the source routed packet, determining handling of the payload of the source routed packet, or the like, as well as various combinations thereof), and sending the payload of the source routed packet toward a downstream network element. At block 799, method 700 ends.

In at least some embodiments, as indicated above, the processing of the source routed packet may depend on the node at which the source routed packet is being processed (e.g., a source node of the source routed path, a transit node of the source routed path, a destination node of the source routed path, or the like).

In at least some embodiments for example, at the source node of the source routed path for the source routed packet where path encoding is used for encoding of a portion of the source routed path for the source routed packet, handling of the source routed packet may include generating the source routed packet and sending the source routed packet toward a network element. The source routed packet may be generated by generating the header for the source routed packet and associating the header with a payload to form the source routed packet. The header of the source routed packet to be routed along a source routed path, where a path identifier is used to represent a portion of the source routed path, may be generated by determining a set of hops of the source routed path for the source routed packet and encoding the set of hops of the source routed path within the packet header. If the source node is the head node in the portion of the source routed path, the source node may use the path identifier to determine the next-hop node to which the source routed packet is sent and to explicitly encode any remaining hops of the portion of the source routed path within the header of the source routed packet as explicit hop encodings. If the source node is not the head node in the portion of the source routed path, the source node may encode the path identifier within the header of the source routed packet to provide a compressed path-based encoding of that portion of the source routed path. It will be appreciated that multiple path identifiers may be used to represent multiple portions of the source routed path. It will be appreciated that the source node may generate a header including one or more explicit path encodings (using one or more path identifiers representing the respective portions of the source routed path) without including any explicit hop encodings. It will be appreciated that the source node may generate a header including one or more explicit path encodings (using one or more path identifiers representing the respective portions of the source routed path) and also including one or more explicit hop encodings representing one or more respective hops of the source routed path (where the explicit hop encodings may be associated with the beginning of the source routed path, the end of the source routed path, interspersed between explicit path encodings, or the like, as well as various combinations thereof).

It will be appreciated that the source node of the source routed path for the source routed packet may be configured to perform various other functions for supporting path compression for routing of the source routed packet.

Figure 8:
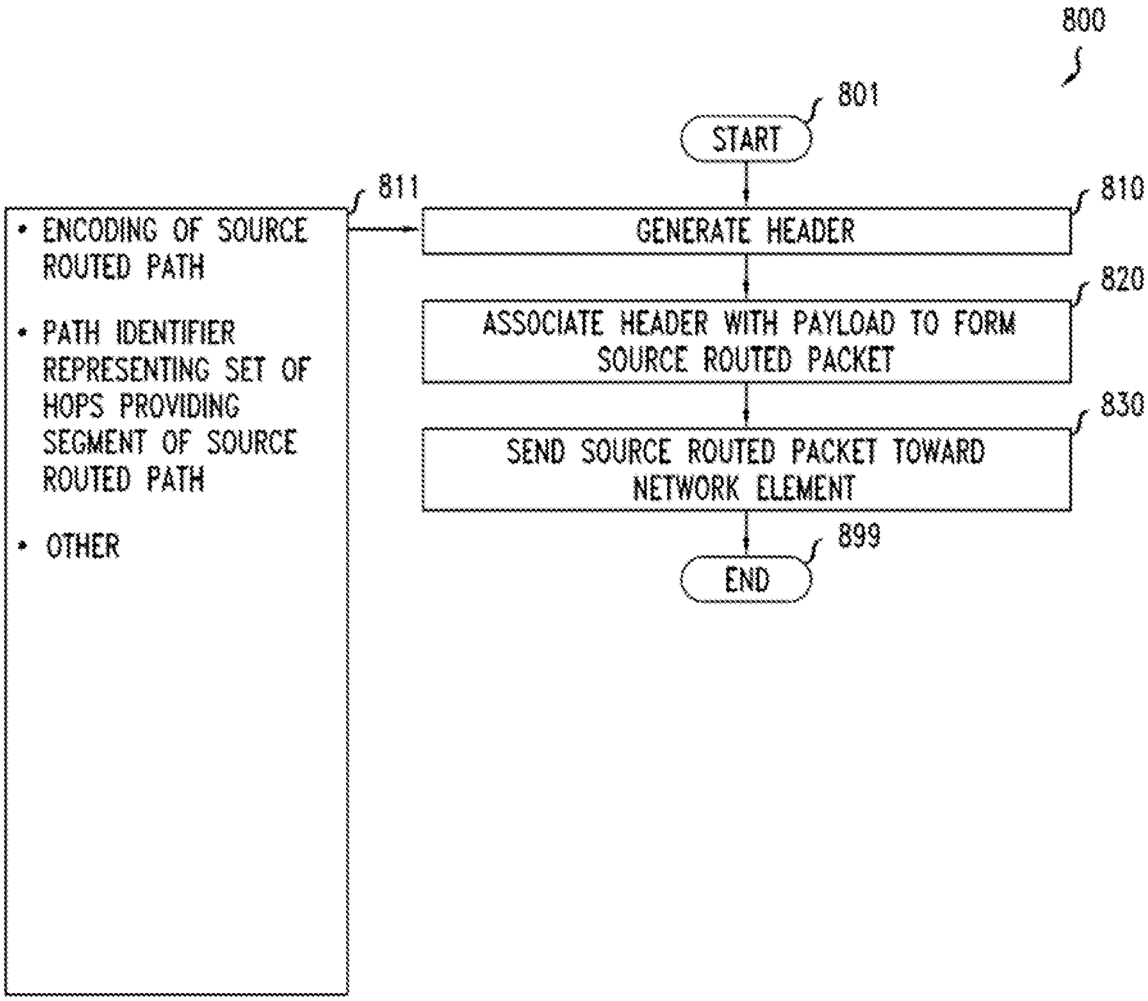
FIG. 8 depicts an example embodiment of a method for use by a source node to handle a source routed packet based on use of path compression in a source routed path.

FIG. 8 depicts an example embodiment of a method for use by a source node to handle a source routed packet based on use of path compression in a source routed path. It will be appreciated that, although primarily presented herein as being performed serially, at least a portion of the functions of method 800 may be performed contemporaneously or in a different order than as presented in FIG. 8. At block 801, method 800 begins. At block 810, a header is generated. As indicated by block 811, the header includes an encoding of a source routed path. As indicated by block 811, the header includes a path identifier representing a set of hops providing a segment of the source routed path (e.g., where the segment of the source path includes a subset of the hops of the path). The path and path identifier may be determined by the source node in various ways (e.g., local computation by a PCE at the source node, obtained by the source node from a remote PCE (e.g., controller or other element), or the like). The set of hops may be encoded within the header in various ways, which may vary for different source routing protocols. It will be appreciated that the header may include various other information. At block 820, the header is associated with a payload to form a source routed packet. At block 830, the source routed packet is sent toward a network element. At block 899, method 800 ends. It will be appreciated that, although primarily presented with respect to example embodiments in which the header of source routed packet includes a path identifier encoding a set of hops, the source routed packet may not include such an encoding in certain situations (e.g., where the source node is part of the only segment of the source routed path and encoding of the remaining portions of the source routed path is based on explicit encoding of individual hops of the source routed path).

It will be appreciated that various functions presented herein as being supported by a source node of a source routed path may be performed in various combinations for supporting various example embodiments of path compression for routing of source routed packets.

In at least some embodiments for example, at a transit node of the source routed path for the source routed packet where path encoding is used for encoding of a portion of the source routed path for the source routed packet, handling of the source routed packet may include receiving the source routed packet, processing the source routed packet, and sending the source routed packet toward a network element. The processing of the source routed packet may include determining a next hop for the source routed packet. The processing of the source routed packet may include modifying the header of the source routed packet (e.g., removing one or more encodings of one or more hops of the source routed path, removing a path identifier encoding a portion of the source routed path and inserting one or more encodings of one or more hops of the portion of the source routed path, modifying one or more fields associated with one or more encodings of one or more hops or sets of hops of the source routed path, or the like, as well as various combinations thereof). The manner in which the next hop for the source routed packet is determined is based on where the transit node is in the source routed path relative to the portion of the source path that is encoded in the source routed packet. The hops and paths that are encoded within the header of the source routed packet, including explicit encodings of the hops of the source routed path and path-based encoding of portions of the source routed path, may be encoded in various ways (e.g., within the source route or the like) which, as indicated above and discussed further below, may vary for different types of source routing.

It will be appreciated that transit nodes of the source routed path for the source routed packet may be configured to perform various other functions for supporting path encoding in routing of the source routed packet.

Figure 9:
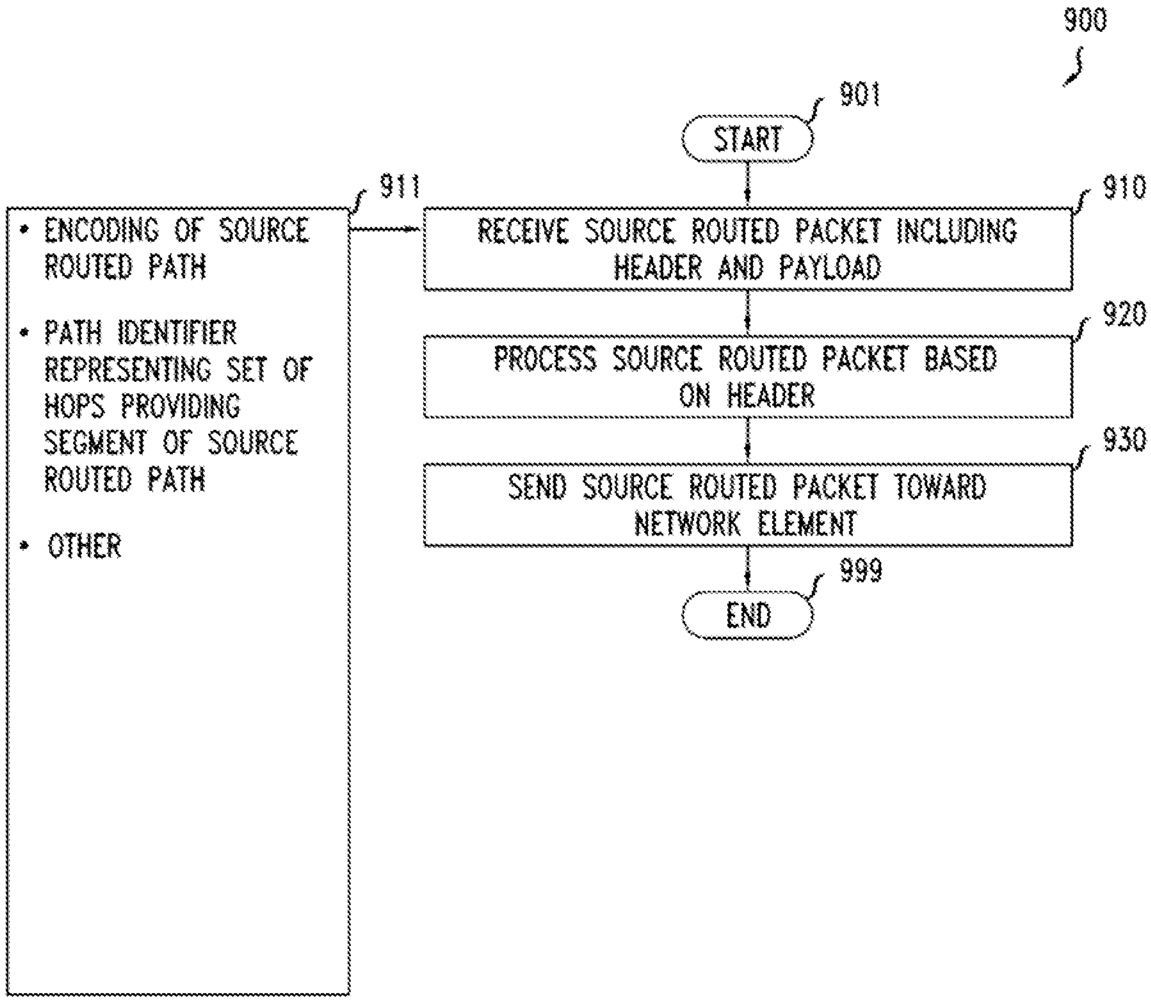
FIG. 9 depicts an example embodiment of a method for use by a transit node to handle a source routed packet based on use of path compression in a source routed path.

FIG. 9 depicts an example embodiment of a method for use by a transit node to handle a source routed packet based on path compression. It will be appreciated that, although primarily presented herein as being performed serially, at least a portion of the functions of method 900 may be performed contemporaneously or in a different order than as presented in FIG. 9. At block 901, method 900 begins. At block 910, a source routed packet is received. The source routed packet includes a header and a payload. As indicated by block 911, the header includes an encoding of a source routed path. As indicated by block 911, the header includes a path identifier representing a set of hops providing a segment of the path (e.g., where the segment of the path includes a subset of the hops of the path). The set of hops may be encoded within the header in various ways, which may vary for different source routing protocols. It will be appreciated that the header may include various other information. At block 920, the source routed packet is processed based on the header. The processing of the source routed packet may include determining a next hop for the source routed packet, modifying a header of the source routed packet, or the like, as well as various combinations thereof. The processing of the source routed packet may depend on whether the transit node is a first node of the portion of the path represented by the path identifier. At block 930, the source routed packet is sent toward a network element. At block 999, method 900 ends. It will be appreciated that, although primarily presented with respect to example embodiments in which the received source routed packet still includes a path identifier encoding a set of hops, the source routed packet may not include such an encoding in certain situations (e.g., where the transit node is part of the final segment of the source routed path).

It will be appreciated that various functions presented herein as being supported by a transit node of a source routed path may be performed in various combinations for supporting various example embodiments of path compression in routing of source routed packets.

The source routed packet, as discussed herein, may be based on various source routing protocols (e.g., MPLS, IPv4, IPv6, or the like) and, as such, supporting path compression in routing of source routed packets of a source routed path based on use of path compression to encode portions of the source routed path may be based on such source routing protocols (again, MPLS, IPv4, IPv6, or the like). Various example embodiments for using such protocols to support routing of source routed packets using path compression are discussed further below.

Figure 10:
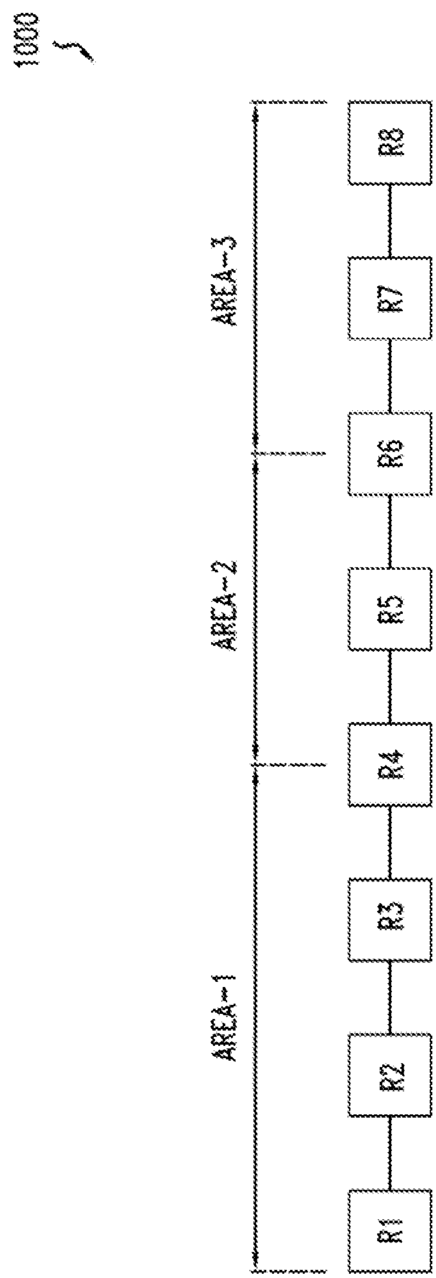
FIG. 10 depicts an example of a source routed path composed of a set of segments which may be encoded based on use of path compression.

Various example embodiments for supporting path compression in routing of source routed packets of a source routed path based on use of path compression to encode portions of the source routed path may be further understood by considering a source routed path composed of a set of segments which may be encoded based on use of path compression, an example of which is illustrated in FIG. 10 (which illustrates a portion of the routers 111 of the communication network 110 of FIG. 1). In FIG. 10, the source routed path is between R1 and R8 and has a source route of {R1→R2, R2→R3, R3→R4, R4→R5, R5→R6, R6→R7, R7→R8}. In the source routed path, the portion of the path between R1 and R4 is a first area (or segment) of the source routed path, the portion of the path between R4 and R6 is a second area (or segment) of the source routed path, and the portion of the path between R6 and R8 is a third area (or segment) of the source routed path. As indicated above and discussed further below, rather than encoding each hop of the source routed path within the source routed packet using explicit hop encoding, encoding of the source routed path within the source routed packet may include a mix of explicit hop encodings (based on an expansion of the path identifier for the first segment by the source node since it is the head node of the first segment of the source routed path) and explicit path encodings based on path identifiers representing subsequent segments of the source routed path (illustratively, the second segment and the third segment). As indicated above and discussed further below, the handling of source routed packets encoded in this manner may vary for different source routing protocols (again, MPLS, IPv4, IPv6, or the like).

Various example embodiments for supporting path compression in routing of source routed packets of a source routed path based on use of path compression to encode portions of the source routed path may be configured to support routing of source routed packets, based on path compression, in MPLS-based source routing.

Various example embodiments enable encoding of a segment of a source routed path, irrespective of the size of the segment of the source routed path (e.g., number of hops) using a single label (denoted herein as a path label or a path Segment Identifier (SID), i.e., path-SID). In this manner, irrespective of the size of the segment of the source routed path, the identifier used to encode the segment within the source routed packet may have a fixed size. The path label is locally significant to the head of the segment of the source routed packet (e.g., the path label may be allocated from the label space of the head node of the segment), where the path label for the segment is translated into the list of hops of the segment (with the first hop being used for forwarding the source routed packet from the head node of the segment to the second node of the segment and with the remaining hops of the segment being encoded within the source routed path as node/adjacency labels). In this manner, the path label for a segment gets expanded into the source route for the source routed packet by the head node of the segment. This may reduce the overhead of the source route in the source routed packet from O(P) to O(S), where P is the number of hops of the source routed path and S is the number of segments of the source routed path.

The example embodiments for supporting path compression in routing of source routed packets of a source routed path in MPLS-based source routing, based on use of path compression to encode portions of the source routed path, may be further understood by way of reference to the example of FIG. 10. In the example of FIG. 10, the source routed path from R1 to R8 is {R1→R2, R2→R3, R3→R4, R4→R5, R5→R6, R6→R7, R7→R8}. Here, let LXY denote the adjacency label of RX→RY.

In this example, without use of path labels, the source route would be encoded by R1 as the following label stack: {L23, L34, L45, L56, L67, L78} (where it is noted that L12 is not included in the label stack since L12 is the immediate next-hop for R1) and each transit router would then perform pop-n-forward operations based on the explicit hop encodings until the source routed packet reaches R8 with an empty label stack.

In this example, where path labels are used, assume that L1234, L456, and L678 are the path labels that are assigned to the path segments of area-1, area-2, and area-3, respectively. In this case, L1234={L12, L23, L34}, L456={L45, L56}, and L678={L67, L78}.

R1 is the source node of the source routed path and generates the source routed packet. R1 is the head node of area-1 and, thus, R1 uses the path label L1234 to determine that the first hop of the segment for area-1 is R1→R2 and has encoded the remaining hops of the segment for area-1 (namely, R2→R3 and R3→R4) within the source routed packet using associated hop-based labels (namely, L23 and L34, respectively). As such, R1 sends the source routed packet to R2 with the following "compressed" source route: {L23, L34, L456, L678}.

R2 receives the source routed packet with the following "compressed" source route: {L23, L34, L456, L678}. On receiving the source routed packet, R2 pops the top label L23 which identifies the adjacency R2→R3. So R2 sends the source routed packet to R3 with "compressed" source route: {L34, L456, L678}.

R3 receives the source routed packet with the following "compressed" source route: {L34, L456, L678}. On receiving the source routed packet, R3 pops the top label L34 which identifies the adjacency R3→R4. So R3 sends the source routed packet to R4 with "compressed" source route: {L456, L678}.

R4 receives the source routed packet with the following "compressed" source route: {L456, L678}. R4 pops the top label L456, which is a path label (since R4 is the head node of area-2). R4 uses the path label to determine the set of hops of the segment (namely, L456={L45, L56}). R4 identifies the first hop of the segment for area-2 (namely, R4→R5) based on the associated hop-based label (namely, L45) and identifies the remaining hops of the segment for area-2 (namely, R5→R6) based on the associated hop-based labels (namely, L56). R4 encodes the remaining hops of the segment for area-2 (namely, R5→R6) within the source routed packet using associated hop-based labels (namely, L56). As such, R4 sends the source routed packet to R5 with the following "compressed" source route: {L56, L678}.

R6 receives the source routed packet with the following "compressed" source route: {L678}. R6 pops the top label L678, which is a path label (since R6 is the head node of area-3). R6 uses the path label to determine the set of hops of the segment (namely, L678={L67, L78}). R6 identifies the first hop of the segment for area-3 (namely, R6→R7) based on the associated hop-based label (namely, L67) and identifies the remaining hops of the segment for area-3 (namely, R7→R8) based on the associated hop-based labels (namely, L78). R6 encodes the remaining hops of the segment for area-3 (namely, R7→R8) within the source routed packet using associated hop-based labels (namely, L78). As such, R6 sends the source routed packet to R7 with the following source route: {L78}.

R8 receives the source routed packet. R8 is the terminal node of the source routed path, so any further handling of the source routed packet is not based on source routing.

Figure 11:
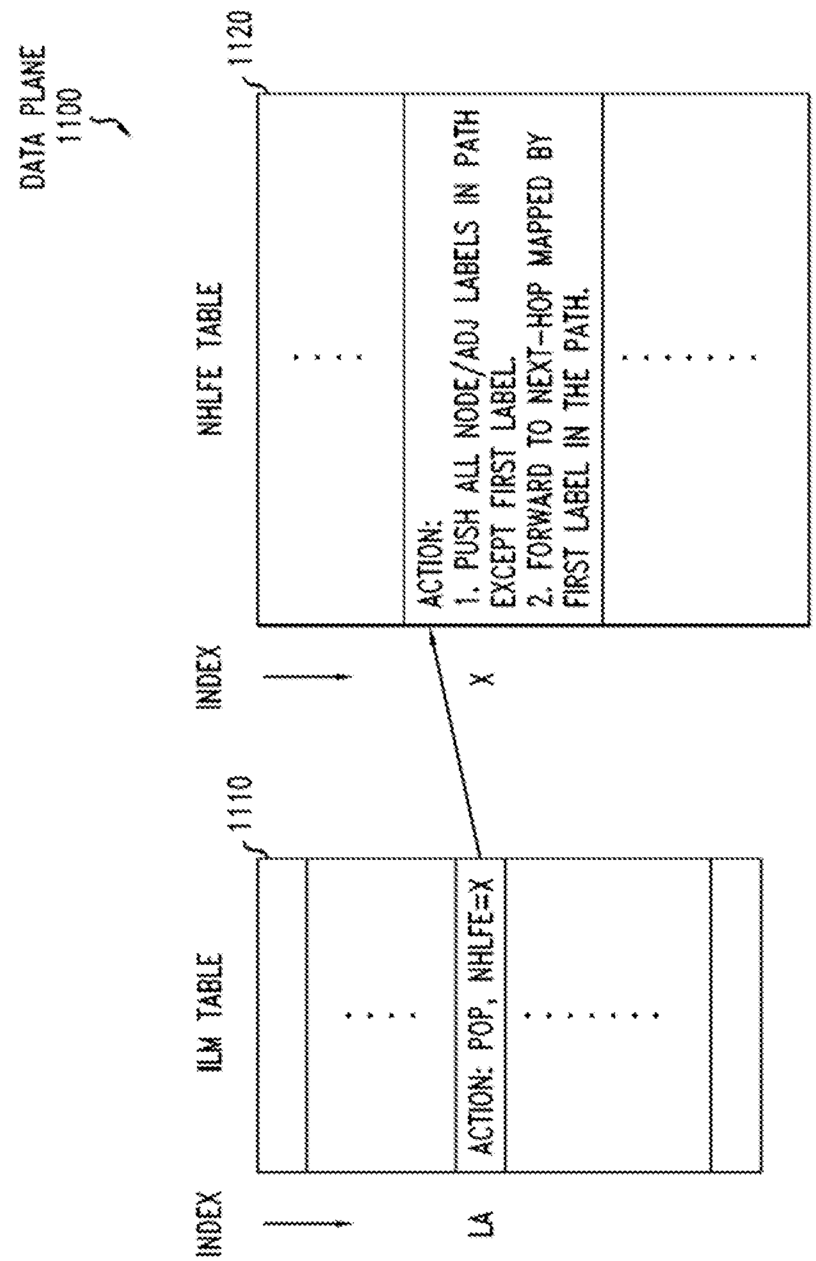
FIG. 11 depicts the data plane of the head-end router of a segment represented using a path label in MPLS-based source routing.

It is noted that the manner in which the head node of a segment uses a path label of a source routed packet to determine the set of hops of the segment, for identifying the first hop of the segment (which may be used to determine the next hop for the source routed packet) and identifying the remaining hops of the segment (which may be encoded within the source routed packet for source routing of the source routed packet based on the hops of the segment), may be further understood by way of reference to FIG. 11.

FIG. 11 depicts the data plane of the head-end router of a segment represented using a path label in MPLS-based source routing.

The data plane 1100 includes an ILM 1110 and an NHLFE 1120. The ILM 1110 and the NHLFE 1120 may be configured based on RFC 3031. The ILM 1110 includes, for each path label supported by the router on which the ILM 1110 is used, a mapping of the path label to an action to be performed for the path label (e.g., POP) and a pointer to an entry of the NHLFE 1120 for the path label. The NHLFE 1120 includes, for each path label supported by the router on which the NHLFE 1120 is used, a list of actions to be performed for the source routed packet based on the path label (e.g., identifying the first hop of the segment (which may be used to determine the next hop for the source routed packet), identifying the remaining hops of the segment (which may be encoded within the source routed packet for source routing of the source routed packet based on the hops of the segment), or the like, as well as various combinations thereof).

The data plane 1100, in the example of FIG. 11, is configured such that, if LA is the top label of a source route of a source routed packet that is to be processed by the head-end router of the segment, then the following operations are performed: (1) the ILM entry for label LA indicates that label LA is to be popped from the source routed packet so the label LA is popped and (2) the ILM entry for label LA points to an NHLFE entry X which includes the following instructions which are then performed: (a) push all node/adjacency labels of the path for the segment, except for the first label of the path for the segment, in the source routed packet and (b) forward the source routed packet to the next hop that is identified by the first label of the path for the segment.

Various example embodiments for supporting path compression in routing of source routed packets of a source routed path based on use of path compression to encode portions of the source routed path may be configured to support routing of source routed packets, based on path compression, in IPv4-based source routing.

Various example embodiments enable encoding of a segment of a source routed path, irrespective of the size of the segment of the source routed path (e.g., number of hops) using a single address (denoted herein as a path address). In this manner, irrespective of the size of the segment of the source routed path, the identifier used to encode the segment within the source routed packet may have a fixed size. The path address is locally significant to the head of the segment of the source routed packet (e.g., the path address may be allocated from the address space of the head node of the segment, such that path addresses assigned to paths originating from different head-end routers may overlap), where the path address for the segment is translated into the list of hops of the segment (with the first hop being used for forwarding the source routed packet from the head node of the segment to the second node of the segment and with the remaining hops of the segment being encoded within the source routed path as node addresses). In this manner, the path address for a segment gets expanded into the source route for the source routed packet by the head node of the segment. This may reduce the overhead of the source route in the source routed packet from O(P) to O(S), where P is the number of hops of the source routed path and S is the number of segments of the source routed path.

In IPv4-based source routing, the path address may be assigned from one of the private-use address blocks defined by the IANA (e.g., the private-use address blocks currently defined by the IANA for IPv4 include 10.0.0.0/8, 172.16.0.0/12, and 192.168.0.0/16).

The example embodiments for supporting path compression in routing of source routed packets of a source routed path in IPv4-based source routing, based on use of path compression to encode portions of the source routed path, may be further understood by way of reference to the example of FIG. 10. In the example of FIG. 10, the source routed path from R1 to R8 is {R1→R2, R2→R3, R3→R4, R4→R5, R5→R6, R6→R7, R7→R8}. Here, let IP-XY denote the adjacency address of RX→RY and let PA-XY denote the adjacency path address of RX→RY.

In this example, without use of path addresses, the source route would be encoded by R1 as the following list of IPv4 addresses: {IP-23, IP-34, IP-45, IP-56, IP-67, IP-78} (where it is noted that IP-12 is not included in the address list since IP-12 is the immediate next-hop for R1) and each transit router would then perform remove and forward operations based on the explicit hop encodings until the source routed packet reaches R8 with an empty label stack.

In this example, where path addresses are used, assume that PA-1234, PA-456, and PA-678 are the path addresses that are assigned to the path segments of area-1, area-2, and area-3, respectively. In this case, PA-1234={IP-12, IP-23, IP-34}, PA-456={IP-45, IP-56}, and PA-678={IP-67, IP-78}.

R1 is the source node of the source routed path and generates the source routed packet. R1 is the head node of area-1 and, thus, R1 uses the path address PA-1234 to determine that the first hop of the segment for area-1 is R1→R2 and has encoded the remaining hops of the segment for area-1 (namely, R2→R3 and R3→R4) within the source routed packet using associated hop-based addresses (namely, IP-23 and IP-34, respectively). As such, R1 sends the source routed packet to R2 with the following "compressed" source route: {IP-23, IP-34, PA-456, PA-678}.

R2 receives the source routed packet with the following "compressed" source route: {IP-23, IP-34, PA-456, PA-678}. When R2 receives the source routed packet, it looks up the top address, IP-23, which identifies the adjacency address on R2→R3. So, it removes the address IP-23 and sends the source routed packet to R3 over link R2→R3 with the following "compressed" source route: {IP-34, PA-456, PA-678}.

R3 receives the source routed packet with the following "compressed" source route: {IP-34, PA-456, PA-678}. When R3 receives the source routed packet, it looks up the top address, IP-34, which identifies the adjacency address on R3→R4. So, it removes the address IP-34 and sends the source routed packet to R4 over link R3→R4 with the following "compressed" source route: {PA-456, PA-678}.

R4 receives the source routed packet with the following "compressed" source route: {PA-456, PA-678}. R4 removes the top address, PA-456, which is a path address (since R4 is the head node of area-2). R4 uses the path address to determine the set of hops of the segment (namely, PA-456={IP-45, IP-56}). R4 identifies the first hop of the segment for area-2 (namely, R4→R5) based on the associated hop-based IP address (namely, IP45) and identifies the remaining hops of the segment for area-2 (namely, R5→R6) based on the associated hop-based IP address (namely, IP-56). R4 encodes the remaining hops of the segment for area-2 (namely, R5→R6) within the source routed packet using associated hop-based IP addresses (namely, IP-56). As such, R4 sends the source routed packet to R5 with the following "compressed" source route: {IP-56, PA-678}.

R6 receives the source routed packet with the following "compressed" source route: {PA-678}. R6 removes the top address, PA-678, which is a path address (since R6 is the head node of area-3). R6 uses the path address to determine the set of hops of the segment (namely, PA-678={IP-67, IP-78}). R6 identifies the first hop of the segment for area-3 (namely, R6→R7) based on the associated hop-based IP address (namely, IP-67) and identifies the remaining hops of the segment for area-3 (namely, R7→R8) based on the associated hop-based IP-address (namely, IP-78). R6 encodes the remaining hops of the segment for area-3 (namely, R7→R8) within the source routed packet using associated hop-based IP addresses (namely, IP-78). As such, R6 sends the source routed packet to R7 with the following source route: {IP-78}.

R8 receives the source routed packet. R8 is the terminal node of the source routed path, so any further handling of the source routed packet is not based on source routing.

Figure 12:
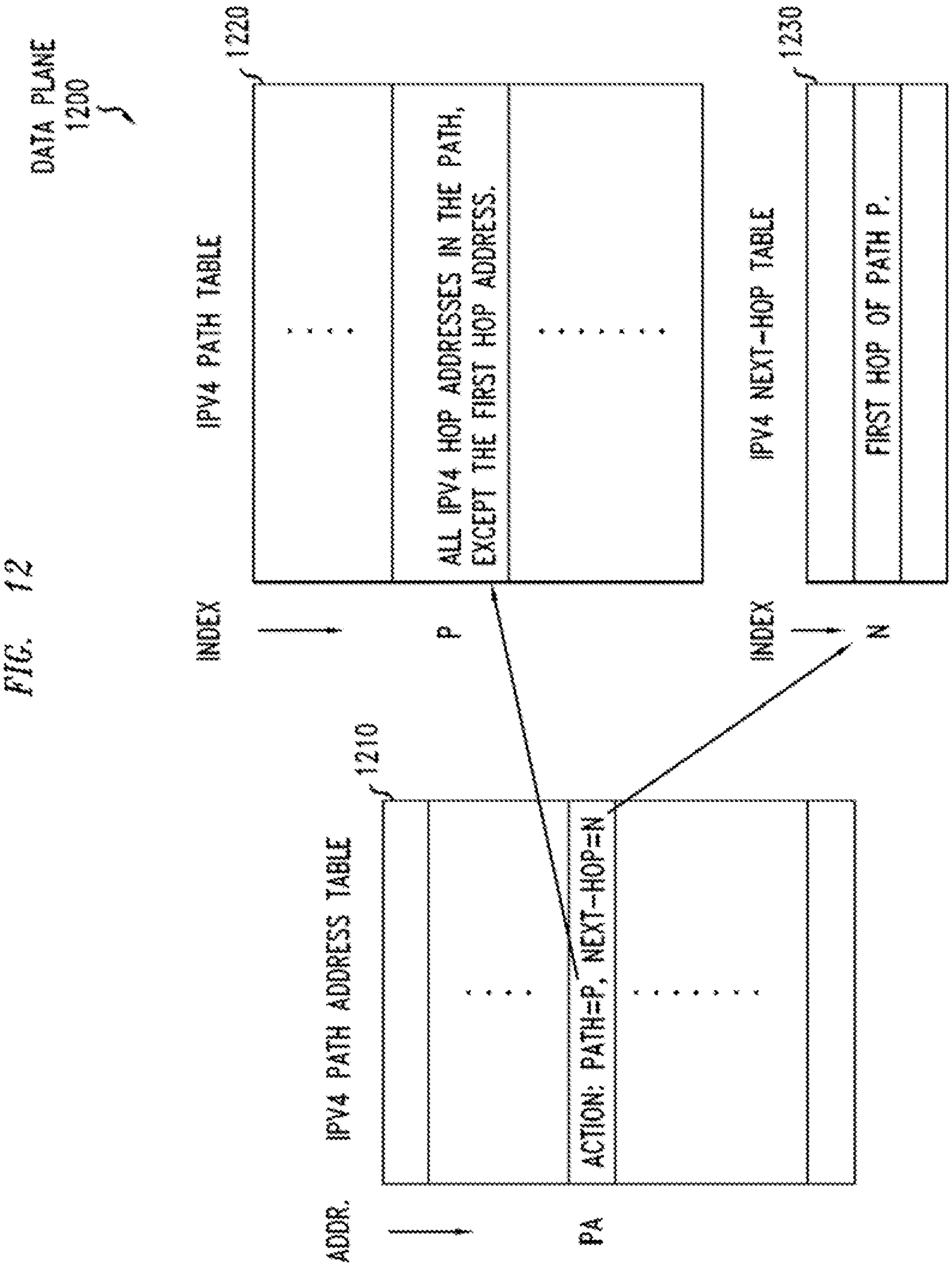
FIG. 12 depicts the data plane of the head-end router of a segment represented using a path address in IPv4 source routing.

It is noted that the manner in which the head node of a segment uses a path address of a source routed packet to determine the set of hops of the segment, for identifying the first hop of the segment (which may be used to determine the next hop for the source routed packet) and identifying the remaining hops of the segment (which may be encoded within the source routed packet for source routing of the source routed packet based on the hops of the segment), may be further understood by way of reference to FIG. 12.

FIG. 12 depicts the data plane of the head-end router of a segment represented using a path address in IPv4 source routing.

The data plane 1200 includes an IPv4 Path Address Table 1210, an IPv4 Path Table 1220, and an IPv4 Next-Hop Table 1230. The IPv4 Path Address Table 1210 includes, for each path address supported by the router on which the IPv4 Path Address Table 1210 is used, a mapping of the path address to the set of actions to be performed for the path address, including: (1) a pointer to an entry of the IPv4 Path Table 1220 where the entry of the IPv4 Path Table 1220 includes an instruction that the path address in the source route of the header of the source routed packet is to be replaced with the IPv4 addresses of the hops of the segment with the exception of the first hop of the segment (where the entry of the IPv4 Path Table 1220 includes the list of IPv4 addresses of the hops of the segment) and (2) a pointer to an entry of the IPv4 Next-Hop Table 1230 where the entry of the IPv4 Next-Hop Table 1230 includes an instruction that the source routed packet is to be forwarded to the first hop of the segment (where the IPv4 Next-Hop Table 1230 includes the IPv4 address of the first hop of the segment which is to be used by the router to forward the source routed packet).

The data plane 1200, in the example of FIG. 12, is configured such that, if PA is the top address of the source route of a source routed packet that is to be processed by the head-end router of the segment, then the following operations are performed: (1) the entry in IPv4 Path Address Table 1210 includes a pointer to an entry P in the IPv4 Path Table 1220 where that entry of the IPv4 Path Table 1220 includes an instruction that the path address in the source route of the header of the source routed packet is to be replaced with the IPv4 addresses of the hops of the segment with the exception of the first hop of the segment, so the router replaces the path address in the source route of the header of the source routed packet with the IPv4 addresses of the hops of the segment with the exception of the first hop of the segment and (2) the entry in IPv4 Path Address Table 1210 includes a pointer to an entry N in the IPv4 Next-Hop Table 1230 where that entry of the IPv4 Next-Hop Table 1230 includes an instruction that the source routed packet is to be forwarded to the first hop of the segment, so the router forwards the updated source routed packet (updated to include the remaining hops of that segment of the source routed path) to the next hop that is indicated in the entry N in the IPv4 Next-Hop Table 1230.

Various example embodiments for supporting path compression in routing of source routed packets of a source routed path based on use of path compression to encode portions of the source routed path may be configured to support routing of source routed packets, based on path compression, in IPv6-based source routing.

Various example embodiments enable encoding of a segment of a source routed path, irrespective of the size of the segment of the source routed path (e.g., number of hops) using a single address (denoted herein as a path address). In this manner, irrespective of the size of the segment of the source routed path, the identifier used to encode the segment within the source routed packet may have a fixed size. The path address is locally significant to the head of the segment of the source routed packet (e.g., the path address may be allocated from the address space of the head node of the segment, such that path addresses assigned to paths originating from different head-end routers may overlap), where the path address for the segment is translated into the list of hops for the segment (with the first hop being used for forwarding the source routed packet from the head node of the segment to the second node of the segment and with the remaining hops of the segment being encoded within the source routed path as node addresses). In this manner, the path address for a segment gets expanded into the source route for the source routed packet by the head node of the segment. This may reduce the overhead of the source route in the source routed packet from O(P) to O(S), where P is the number of hops of the source routed path and S is the number of segments of the source routed path.

In IPv6-based source routing, the path address may be assigned from the Unique Local Address (ULA) block defined by the IANA for IPv6 networks or from the private use address blocks defined by the IANA for IPv4 networks (e.g., the 10.0.0.0/8, 172.16.0.0/12, and 192.168.0.0/16 private use address blocks) where an IPv4 network is using an IPv4-mapped IPv6 addressing scheme.

If an IPv6 addressing scheme is used in the source route of a source routed packet, then the IPv6 path address may allocated from the ULA block which is reserved in the IANA registry of special purpose IPv6 addresses. Section 3 of RFC 4193 defines the ULA address block, which may be used in private/local communications within IPv6 networks, as FC00: :/7, where this ULA block includes 72 trillion IPv6 addresses.

If an IPV4-mapped IPv6 addressing scheme is used in the source route of a source routed packet, then the IPv6 path address may allocated from one of the private-use IPv4 Address blocks. Section 2.5.5.2 in RFC 4291 defines the concept and methods of IPv4-mapped IPv6 Addresses, which are regular IPv4 addresses that have been mapped into the IPv6 address space and are used for devices that are only IPv4 capable.

It will be appreciated, based on the above, that the IPv6 Path Address Space may be considered to include and, thus, used to denote, the ULA block and the blocks of private-use IPv4 mapped IPv6 addresses.

The example embodiments for supporting path compression in routing of source routed packets of a source routed path in IPv6-based source routing, based on use of path compression to encode portions of the source routed path, may be further understood by way of reference to the example of FIG. 10. In the example of FIG. 10, the source routed path from R1 to R8 is {R1→R2, R2→R3, R3→R4, R4→R5, R5→R6, R6→R7, R7→R8}. Here, let IP-XY denote the adjacency address of RX→RY and let PA-XY denote the adjacency path address of RX→RY.

In this example, without use of path addresses, the source route would be encoded by R1 as the following list of IPv6 addresses: {IP-23, IP-34, IP-45, IP-56, IP-67, IP-78} (where it is noted that IP-12 is not included in the address list since IP-12 is the immediate next-hop for R1) and each transit router would then perform remove and forward operations based on the explicit hop encodings until the source routed packet reaches R8 with an empty label stack.

In this example, where path addresses are used, assume that PA-1234, PA-456, and PA-678 are the path addresses that are assigned to the path segments of area-1, area-2, and area-3, respectively. In this case, PA-1234={IP-12, IP-23, IP-34}, PA-456={IP-45, IP-56}, and PA-678={IP-67, IP-78}.

R1 is the source node of the source routed path and generates the source routed packet. R1 is the head node of area-1 and, thus, R1 uses the path address PA-1234 to determine that the first hop of the segment for area-1 is R1→R2 and has encoded the remaining hops of the segment for area-1 (namely, R2→R3 and R3→R4) within the source routed packet using associated hop-based addresses (namely, IP-23 and IP-34, respectively). As such, R1 sends the source routed packet to R2 with the following "compressed" source route: {IP-23, IP-34, PA-456, PA-678}.

R2 receives the source routed packet with the following "compressed" source route: {IP-23, IP-34, PA-456, PA-678}. When R2 receives the source routed packet, it looks up the top address, IP-23, which identifies the adjacency address on R2→R3. So, it removes the address IP-23 and sends the source routed packet to R3 over link R2→R3 with the following "compressed" source route: {IP-34, PA-456, PA-678}.

R3 receives the source routed packet with the following "compressed" source route: {IP-34, PA-456, PA-678}. When R3 receives the source routed packet, it looks up the top address, IP-34, which identifies the adjacency address on R3→R4. So, it removes the address IP-34 and sends the source routed packet to R4 over link R3→R4 with the following "compressed" source route: {PA-456, PA-678}.

R4 receives the source routed packet with the following "compressed" source route: {PA-456, PA-678}. R4 removes the top address, PA-456, which is a path address (since R4 is the head node of area-2). R4 uses the path address to determine the set of hops of the segment (namely, PA-456={IP-45, IP-56}). R4 identifies the first hop of the segment for area-2 (namely, R4→R5) based on the associated hop-based IP address (namely, IP45) and identifies the remaining hops of the segment for area-2 (namely, R5→R6) based on the associated hop-based IP address (namely, IP-56). R4 encodes the remaining hops of the segment for area-2 (namely, R5→R6) within the source routed packet using associated hop-based IP addresses (namely, IP-56). As such, R4 sends the source routed packet to R5 with the following "compressed" source route: {IP-56, PA-678}.

R6 receives the source routed packet with the following "compressed" source route: {PA-678}. R6 removes the top address, PA-678, which is a path address (since R6 is the head node of area-3). R6 uses the path address to determine the set of hops of the segment (namely, PA-678={IP-67, IP-78}). R6 identifies the first hop of the segment for area-3 (namely, R6→R7) based on the associated hop-based IP address (namely, IP-67) and identifies the remaining hops of the segment for area-3 (namely, R7→R8) based on the associated hop-based IP-address (namely, IP-78). R6 encodes the remaining hops of the segment for area-3 (namely, R7→R8) within the source routed packet using associated hop-based IP addresses (namely, IP-78). As such, R6 sends the source routed packet to R7 with the following source route: {IP-78}.

R8 receives the source routed packet. R8 is the terminal node of the source routed path, so any further handling of the source routed packet is not based on source routing.

Figure 13:
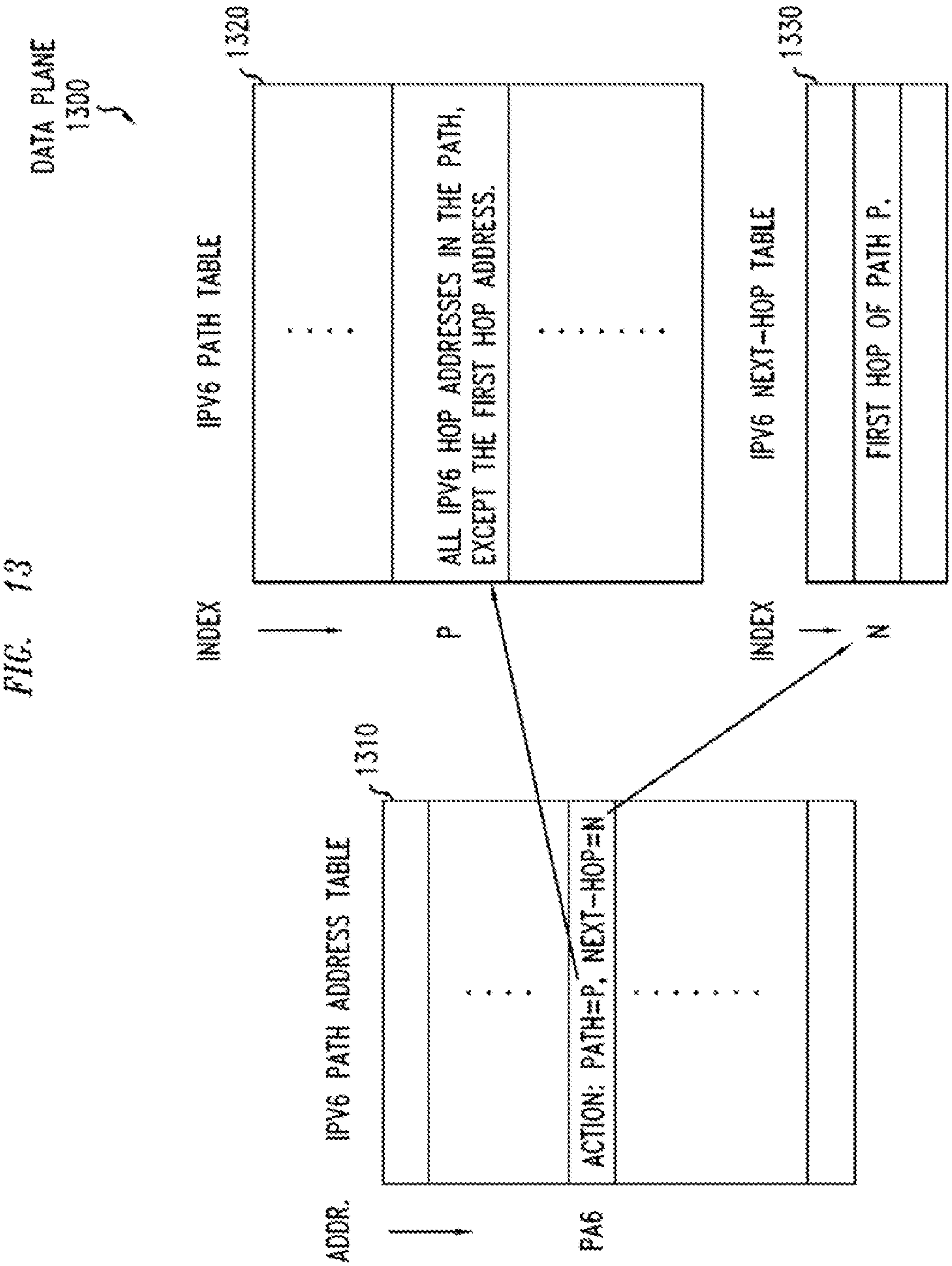
FIG. 13 depicts the data plane of the head-end router of a segment represented using a path address in IPv6 source routing.

It is noted that the manner in which the head node of a segment uses a path address of a source routed packet to determine the set of hops of the segment, for identifying the first hop of the segment (which may be used to determine the next hop for the source routed packet) and identifying the remaining hops of the segment (which may be encoded within the source routed packet for source routing of the source routed packet based on the hops of the segment), may be further understood by way of reference to FIG. 13.

FIG. 13 depicts the data plane of the head-end router of a segment represented using a path address in IPv6 source routing.

The data plane 1300 includes an IPv6 Path Address Table 1310, an IPv6 Path Table 1320, and an IPv6 Next-Hop Table 1330. The IPv6 Path Address Table 1310 includes, for each path address supported by the router on which the IPv6 Path Address Table 1310 is used, a mapping of the path address to the set of actions to be performed for the path address, including: (1) a pointer to an entry of the IPv6 Path Table 1320 where the entry of the IPv6 Path Table 1320 includes an instruction that the path address in the source route of the header of the source routed packet is to be replaced with the IPv6 addresses of the hops of the segment with the exception of the first hop of the segment (where the entry of the IPv6 Path Table 1320 includes the list of IPv6 addresses of the hops of the segment) and (2) a pointer to an entry of the IPv6 Next-Hop Table 1330 where the entry of the IPv6 Next-Hop Table 1330 includes an instruction that the source routed packet is to be forwarded to the first hop of the segment (where the IPv6 Next-Hop Table 1330 includes the IPv6 address of the first hop of the segment which is to be used by the router to forward the source routed packet).

The data plane 1300, in the example of FIG. 13, is configured such that, if PA is the top address of the source route of a source routed packet that is to be processed by the head-end router of the segment, then the following operations are performed: (1) the entry in IPv6 Path Address Table 1310 includes a pointer to an entry P in the IPv6 Path Table 1320 where that entry of the IPv6 Path Table 1320 includes an instruction that the path address in the source route of the header of the source routed packet is to be replaced with the IPv6 addresses of the hops of the segment with the exception of the first hop of the segment, so the router replaces the path address in the source route of the header of the source routed packet with the IPv6 addresses of the hops of the segment with the exception of the first hop of the segment and (2) the entry in IPv6 Path Address Table 1310 includes a pointer to an entry N in the IPv6 Next-Hop Table 1330 where that entry of the IPv6 Next-Hop Table 1330 includes an instruction that the source routed packet is to be forwarded to the first hop of the segment, so the router forwards the updated source routed packet (updated to include the remaining hops of that segment of the source routed path) to the next hop that is indicated in the entry N in the IPv6 Next-Hop Table 1330.

It will be appreciated that, although primarily presented herein with respect to embodiments in which the data planes of routers are configured in a particular manner (e.g., using specific numbers, types, and arrangements of tables) for handling of path identifiers such as path labels and path addresses, the data planes of routers may be configured in other ways (e.g., using other numbers, types, and/or arrangements of tables) for handling of path identifiers such as path labels and path addresses.

Various example embodiments may be configured to provide improved FRR within the context of source routing by supporting flow-specific FRR of source routed packets based on path compression.

Various example embodiments for supporting path compression in routing of source routed packets may be configured to support path compression in flow-specific FRR of source routed packets that uses a primary path and a protection path that is configured to protect at least a portion of the primary path (e.g., one or more hops or links of the primary path).

Various example embodiments for supporting path compression in routing of source routed packets may be configured to support path compression in flow-specific FRR of source routed packets based on use of path compression to encode a set of hops of a protection path configured to protect a portion of the primary path (e.g., using a path identifier to encode the set of hops of the protection path that protects the portion of the primary path).

Various example embodiments for supporting flow-specific FRR of source routed packets based on path compression may be configured to support flow-specific FRR of source routed packets in a manner that enables QoS requirements and SLAs of individual flows to be satisfied even during fast reroutes. In FRR solutions, the flows experiencing a common link failure are fast rerouted via a common protection path which is programmed at the PLR without awareness of the flows (e.g., applications or services) traversing the failed next-hop, such that the common protection path may not meet the QoS requirements and SLAs of the individual flows. This may be seen by considering an example based on FIG. 1 where, if flows A and B experience a common link failure and are fast rerouted via a common protection path {R2→R3, R3→R4}, the common protection path {R2→R3, R3→R4} may not meet the QoS requirements or SLA for both of the flows (e.g., protection path {R2→R3, R3→R4} may satisfy QoS for flow A but not for flow B, whereas {R2→R3, R3→R5, R5→R4} is another link protection path that is available and that could have satisfied the QoS for flow B but is not used for fast-routing of flow B). Additionally, it is noted that, in the source routing paradigm, it is generally not possible to program flow-specific protection paths at the PLR since the PLR is stateless and is agnostic of flow specifications at head-end nodes.

Various example embodiments for supporting flow-specific FRR of source routed packets based on path compression may be configured to support flow-specific FRR of source routed packets while tending to reduce or even minimize the complexity (e.g., computations, states, processing, or the like) at the transit nodes. Various example embodiments for supporting flow-specific FRR of source routed packets based on path compression, by encoding the protection paths within the source routed packets, obviate the need for the PLR to be preprogrammed with protection paths since the PLR is able to determine the protection paths from the source routed packets, thereby reducing or even minimizing the complexity (e.g., computations, states, processing, or the like) at the PLR (which may include any transit nodes along the path).

Various example embodiments for supporting flow-specific FRR of source routed packets based on path compression may be configured to support flow-specific FRR of source routed packets in a manner that provides both link protection and node protection. The ability of various example embodiments for supporting flow-specific FRR of source routed packets to provide node protection for source routed packets overcomes limitations of FRR methods (e.g., SR and SR-TE) that do not currently support node protection for source routed packets. This may be seen from the example of the failure of node R4. The problem here is that R2 is agnostic of the "next" next-hop (which decides the MP in case of a node failure) that a packet would take after traversing R4 (i.e., R4→R7 for flow A and R4→R6 for flow B). The semantics of the next-next-hop in the explicit path is meaningful to R4 alone. So, R2 is not aware that MP for flow A is R7 and MP for flow B is R6. This problem may be overcome by (1) programming a copy of the entire data plane state of R4 into R2, so that R2 is aware of each of the possible next-hops (candidates for MP) of R4 and (2) preprogramming into the data plane a node protection path to each candidate MP. In this case, the modified data plane at R2 would be: (1) Next-hop Entry R2→R4=>Neighbor R4 and (2) a data plane that includes: (a) [Next-hop Entry R4→R2=>Neighbor R2; Protection-path=None], (b) [Next-hop Entry R4→R3=>Neighbor R3; Protection-path={R2→R3}], (c) [Next-hop Entry R4→R5=>Neighbor R5; Protection-path={R2→R5}], (d) [Next-hop Entry R4→R6=>Neighbor R6; Protection-path={R2→R5, R5→R6}], and (e) [Next-hop Entry R4→R7=>Neighbor R7; Protection-path={R2→R5, R5→R7}]. In this example, assume that node R4 fails or the link R2→R4 fails, then for flow A: (1) R2 receives a packet for flow A with strict path {R2→R4, R4→R7, R7→R9}, (2) R2 pops R2→R4 and finds R2→R4 is down, (3) R2 looks up the next-next-hop R4→R7 in the copy of the data plane of R4, which returns the MP as R7 and the protection path {R2→R5, R5→R7}, and (4) the source routed packet is fast re-routed to R5 with the updated explicit path on the source routed packet as {R5→R7, R7→R9}. Similarly, in this example, assume that node R4 fails or the link R2→R4 fails, then for flow B: (1) R2 receives a packet for flow B with strict path {R2→R4, R4→R6, R6→R8, R8→R9}, (2) R2 pops R2→R4 and finds R2→R4 is down, (3) R2 looks up the next-next-hop R4→R6 in the copy of the data plane of R4, which returns the MP as R6 and protection path {R2→R5, R5→R6}, and (4) the source routed packet is fast re-routed to R5 with the updated path as {R5→R6, R6→R8, R8→R9}. It is noted that use of such a solution requires a PLR node to keep a copy of the forwarding database of each neighbor router such that, if there are N neighbors and each neighbor has on an average of M adjacencies, then the node needs to keep N×M additional states in data plane, which goes against the stateless approach to source routing. It is further noted that this solution requires that the PLR node be reprogrammed for every change happening in the forwarding databases of each neighbor, which leads to a ripple effect. It is further noted, since the PLR is agnostic of individual flow specifications, the PLR cannot determine the optimal node protection path for a flow (there may be multiple node protection paths to the same MP), such that this solution fails to provide flow-specific FRR.

Various example embodiments for supporting flow-specific FRR of source routed packets based on path compression may be configured to support flow-specific FR of source routed packets, for guaranteeing QoS/SLA per flow, in the event of a link failure or a node failure while still enabling the PLR to be agnostic of flow specifications and the associated QoS requirements/SLAs of those flows. Various example embodiments for supporting flow-specific FRR of source routed packets based on path compression may be configured to provide one-to-one protection of stateful flows in state-less source routing paradigms such as MPLS-based source routing, IPv4 source routing, IPv6 source routing, and so forth.

It is noted that the ability to use various types of source routing (e.g., MPLS-based source routing, IPv4 source routing, IPv6 source routing, or the like) in various deployment scenarios (e.g., decentralized deployment scenarios or centralized deployment scenarios as discussed above) may be generalized in various ways. The ability to use various types of source routing (e.g., MPLS-based source routing, IPv4 source routing, IPv6 source routing, or the like) in various deployment scenarios may be generalized by considering generalized availability of a PCE that is configured to compute source routed paths (e.g., where the PCE may be deployed on the source node of the path (e.g., in the case of a decentralized deployment), a centralized controller (e.g., in the case of a centralized deployment), or the like). The ability to use various types of source routing (e.g., MPLS-based source routing, IPv4 source routing, IPv6 source routing, or the like) in various deployment scenarios may be generalized by considering generalized availability of PLRs that are configured to perform flow-specific fast reroute operations on source routed paths. Various example embodiments for supporting flow-specific FRR of source routed packets based on path compression may be agnostic of whether explicit path computation is performed by the source node or by a centralized controller, since the source routed packets encode the protection paths which may be used at the PLRs for fast rerouting of source routed packets. Thus, in various example embodiments for supporting flow-specific FRR of source routed packets based on path compression, the term PCE may be used generically to refer to the entity that is responsible for explicit path computation and the term PLR may be used generically to refer to the entity that performs a fast reroute based on a protection path encoded within a source routed packet.

Various example embodiments for supporting flow-specific FRR of source routed packets based on path compression may be configured to support flow-specific FRR for various types of source routing (e.g., MPLS-based source routing, IPv4 source routing, IPv6 source routing, or the like, as well as various combinations thereof).

Various example embodiments for supporting flow-specific FRR of source routed packets based on path compression may be configured to support flow-specific FRR of source routed packets based on configuration of source routed packets for flow-specific FRR.

Various example embodiments for supporting flow-specific FRR of source routed packets based on path compression may be configured to support flow-specific FRR of a source routed packet by supporting a source routed packet configured as follows. The source routed packet includes a payload and a header. The header of the source routed packet includes an explicit encoding of a primary path composed of a set of hops. The explicit encoding of the primary path may be an explicit encoding of the hops of the primary path. The header of the source routed packet includes, for each of one or more hops of the primary path, an explicit encoding of a protection path, composed of a set of hops, configured to protect that hop of the primary path. The explicit encoding of the protection path for a hop of the primary path may include an identification of the hop of the primary path being protected by the protection path. The explicit encoding of the protection path may include an explicit encoding of the protection path using a path identifier to represent the protection path. The explicit encoding of the protection path may include an indication that the source routed packet includes an explicit encoding of a protection path, e.g., for enabling a receiving node to distinguish between the explicit encoding of the hops of the primary path and the explicit encoding of the protection path. The hops that are encoded within the header of the source routed packet, including hops of the primary path and hops of the protection path, may be encoded using FEH elements which, as indicated above, may vary for different types of source routing. The path identifier that is encoded within the header of the source routed packet for the protection path may be encoded using an FEH element (namely, the FEH element). The FEH elements may vary for different types of source routing protocols. For example, in MPLS-based source routing, as discussed further below, the FEH elements may be labels in a label stack. For example, in IPv4 source routing, as discussed further below, the FEH elements may be fields within an IPv4 Options Header, fields within an IPv4 Shim Header, or the like. For example, in IPv6 source routing, as discussed further below, the FEH elements may be fields within an IPv6 Routing Header, fields within an IPv6 Shim Header, or the like. The source routed packet may be generated by a source node and processed by nodes along the source routed path (e.g., for routing along the primary path in the absence of failure conditions, for routing along the protection path(s) during failure conditions, and so forth). The handling of source routed packets in this manner may be further understood by considering various functions supported by the source node of the source routed path and various functions supported by transit nodes of the source routed path, as discussed further below.

Various example embodiments for supporting FRR of source routed packets based on path compression may be configured to support FRR of source routed packets based on path compression by supporting handling of a source routed packet by a network element. The handling of the source routed packet, as discussed further below, may depend on the node at which the source routed packet is being processed (e.g., a source node of the source routed path, a transit node of the source routed path, a destination node of the source routed path, or the like).

Figure 14:
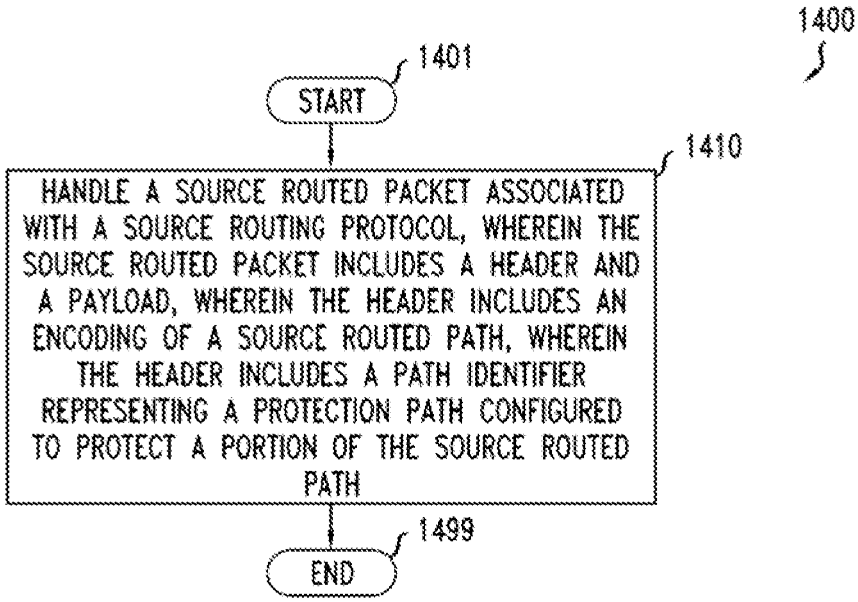
FIG. 14 depicts an example embodiment of a method for use by a network element to handle a source routed packet based on use of path compression for a protection path configured to protect a hop of the source routed path.

FIG. 14 depicts an example embodiment of a method for use by a network element to handle a source routed packet based on use of path compression for a protection path configured to protect a hop of the source routed path. It will be appreciated that the method 1400 of FIG. 14 may be performed by a source node of the source routed path or a transit node of the source routed path. It will be appreciated that, although primarily presented herein as being performed serially, at least a portion of the functions of method 1400 may be performed contemporaneously or in a different order than as presented in FIG. 14. At block 1401, method 1400 begins. At block 1410, a source routed packet associated with a source routing protocol is processed. The source routed packet includes a header. The header includes an encoding of a set of hops of a source routed path (the primary path). The header includes an encoding of a protection path configured to protect one of the hops of the source routed path. The protection path is encoded using a path identifier. The header may include encodings of protection paths for one, some, or all of the hops of the source routed path. It will be appreciated that the handling of the source routed packet may depend on the role of the network element, such as whether the network element is operating as a source node for the source routed packet, a transit node for the source routed packet (and, for a transit node, whether the transit node is operating as a pass-through node on the primary path or the protection path, as a PLR for the primary path, or as an MP for the primary path), or a destination node for the source routed packet. For example, handling of the source routed packet when the network element is operating as a source node of the source routed path may include generating the source routed packet (e.g., obtaining the source routed path for the source routed packet, generating the header for the source routed packet including encoding the set of hops within the header using a path identifier and associating the header with a payload to form the source routed packet) and sending the source routed packet toward a next hop node. For example, handling of the source routed packet when the network element is operating as a transit node of the source routed path may include receiving the source routed packet, processing the source routed packet (e.g., determining handling of the source routed packet, modifying a header of the source routed packet, or the like, as well as various combinations thereof), and sending the source routed packet toward a next hop node (e.g., a next-hop node of the primary path where FRR is not used or a first hop node of the protection path where FRR is used). For example, handling of the source routed packet when the network element is operating as a destination node of the source routed packet may include receiving the source routed packet, processing the source routed packet (e.g., determining handling of the source routed packet, determining handling of the payload of the source routed packet, or the like, as well as various combinations thereof), and sending the payload of the source routed packet toward a downstream network element. At block 1499, method 1400 ends.

In at least some embodiments, as indicated above, the processing of the source routed packet may depend on the node at which the source routed packet is being processed (e.g., a source node of the source routed path, a transit node of the source routed path, a destination node of the source routed path, or the like).

In at least some embodiments for example, at the source node of the source routed path for the source routed packet, handling of the source routed packet may include generating the source routed packet and sending the source routed packet toward a network element. The source routed packet may be generated by generating the header for the source routed packet and associating the header with a payload to form the source routed packet. The header of the source routed packet to be routed along a source routed path, where a path identifier is used to represent a protection path configured to protect a portion of the source routed path, may be generated by determining a set of hops of the source routed path, determining a path identifier representing a protection path configured to protect one of the hops of the source routed path, and encoding the hops of the source routed path within the header using explicit hop encodings representing the respective hops of the source routed path and encoding the protection path within the header using an explicit path encoding representing the protection path (namely, using the path identifier representing the protection path) rather than explicitly encoding the hops of the protection path as explicit hop encodings. The header may include path compression based path encodings of protection paths for one, some, or all of the hops of the source routed path. The hops and paths that are encoded within the header of the source routed packet, including explicit encodings of the hops of the source routed path and path-based encoding of the protection path, may be encoded in various ways (e.g., using FEH elements or the like) which, as indicated above and discussed further below, may vary for different types of source routing.

It will be appreciated that the source node of the source routed path for the source routed packet may be configured to perform various other functions for supporting path compression for FRR of the source routed packet.

Figure 15:
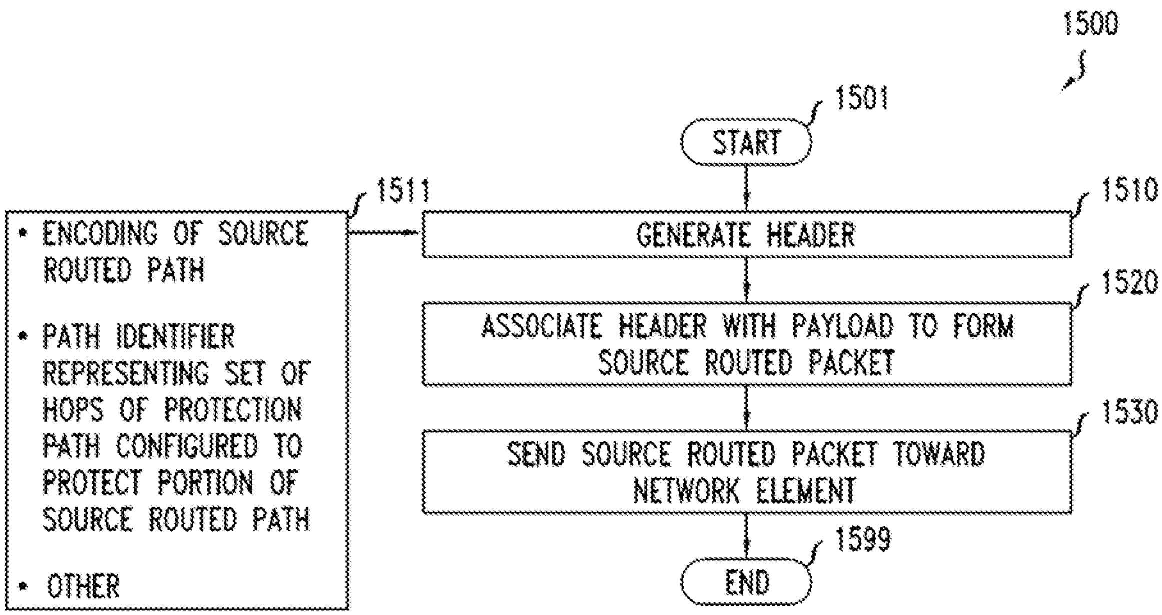
FIG. 15 depicts an example embodiment of a method for use by a source node to handle a source routed packet based on use of path compression for a protection path configured to protect a hop of the source routed path.

FIG. 15 depicts an example embodiment of a method for use by a source node to handle a source routed packet based on use of path compression for a protection path configured to protect a hop of the source routed path. It will be appreciated that, although primarily presented herein as being performed serially, at least a portion of the functions of method 1500 may be performed contemporaneously or in a different order than as presented in FIG. 15. At block 1501, method 1500 begins. At block 1510, a header is generated. As indicated by block 1511, the header includes an encoding of a set of hops of a source routed path (the primary path) and an encoding of a protection path configured to protect one of the hops of the source routed path. The hops of the source routed path are encoded using explicit hop encodings. The protection path is encoded using a path identifier configured to represent the set of hops of the protection path. The source routed path and the protection path may be determined by the source node in various ways (e.g., local computation by a PCE at the source node, obtained by the source node from a remote PCE (e.g., controller or other element), or the like. The hops of the source routed path and the protection path may be encoded within the header in various ways, which may vary for different source routing protocols. It will be appreciated that the header may include various other information. At block 1520, the header is associated with a payload to form a source routed packet. At block 1530, the source routed packet is sent toward a network element. At block 1599, method 1500 ends.

It will be appreciated that various functions presented herein as being supported by a source node of a source routed path may be performed in various combinations for supporting various example embodiments of flow-specific FRR of source routed packets based on path compression.

In at least some embodiments for example, at a transit node of the source routed path for the source routed packet where path encoding is used for encoding of a protection path configured to protect a portion of the source routed path, handling of the source routed packet may include receiving the source routed packet, processing the source routed packet, and sending the source routed packet toward a network element. The processing of the source routed packet may include determining a next hop for the source routed packet. The next hop for the source routed packet may be a hop on the primary path or a hop on the protection path. The processing of the source routed packet may include modifying a header of the source routed packet (e.g., removing one or more encodings of one or more hops of the primary path or the protection path, removing a path identifier encoding the protection path and inserting one or more encodings of one or more hops of the protection path for use by transit nodes on the protection path, modifying one or more fields associated with one or more encodings of one or more hops or sets of hops of the source routed path, or the like, as well as various combinations thereof). The processing of the source routed packet may depend on whether the transit node is a transit node of the primary path (e.g., where the processing may depend on whether or not the next hop is protected by a protection path and, if protected, whether or not the protection path is used based on an FRR operation) or a transit node of a protection path protecting the primary path (e.g., where the processing may depend on whether or not the transit node is an MP back to the primary path for the source routed packet). The hops and paths that are encoded within the header of the source routed packet, including explicit encodings of the hops of the source routed path and path-based encoding of the protection path, may be encoded in various ways (e.g., using FEH elements or the like) which, as indicated above and discussed further below, may vary for different types of source routing.

It will be appreciated that transit nodes of the source routed path for the source routed packet may be configured to perform various other functions for supporting flow-specific FRR of the source routed packet based on path compression.

Figure 16:
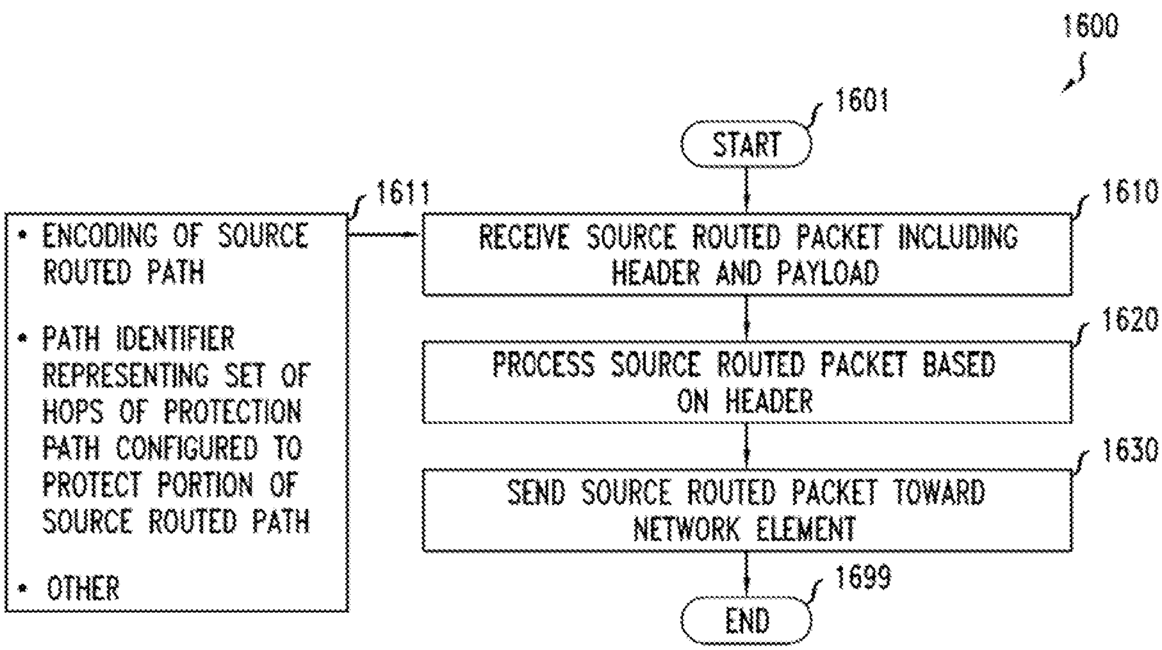
FIG. 16 depicts an example embodiment of a method for use by a transit node to handle a source routed packet based on use of path compression for a protection path configured to protect a hop of the source routed path.

FIG. 16 depicts an example embodiment of a method for use by a transit node to handle a source routed packet based on use of path compression for a protection path configured to protect a hop of the source routed path. It will be appreciated that, although primarily presented herein as being performed serially, at least a portion of the functions of method 1600 may be performed contemporaneously or in a different order than as presented in FIG. 16. At block 1601, method 1600 begins. At block 1610, a source routed packet is received. The source routed packet includes a header and a payload. As indicated by block 1611, the header includes an encoding of a set of hops of a source routed path (the primary path) and an encoding of a protection path configured to protect one of the hops of the source routed path. The hops of the source routed path are encoded using explicit hop encodings. The protection path is encoded using a path identifier configured to represent the set of hops of the protection path. The hops may be encoded within the header in various ways, which may vary for different source routing protocols. It will be appreciated that the header may include various other information. At block 1620, the source routed packet is processed based on the header. The processing of the source routed packet may include determining a next hop for the source routed packet, modifying a header of the source routed packet, or the like, as well as various combinations thereof. The processing of the source routed packet may depend on whether the transit node is a transit node of the primary path (e.g., where the processing may depend on whether or not the next hop is protected by a protection path and, if protected, whether or not the protection path is used based on an FRR operation) or a transit node of a protection path protecting the primary path (e.g., where the processing may depend on whether or not the transit node is an MP back to the primary path for the source routed packet). At block 1630, the source routed packet is sent toward a network element. At block 1699, method 1600 ends. It will be appreciated that, although primarily presented with respect to example embodiments in which the received source routed packet still includes a path identifier encoding a set of hops, the source routed packet may not include such an encoding in certain situations (e.g., where the transit node is part of the final segment of the source routed path).

It will be appreciated that various functions presented herein as being supported by a transit node of a source routed path may be performed in various combinations for supporting various example embodiments of flow-specific FRR of source routed packets based on path compression.

The source routed packet, as discussed herein, may be based on various source routing protocols (e.g., MPLS, IPv4, IPv6, or the like) and, as such, path-based encoding of protection path(s) for the source routed packet also may be based on such source routing protocols (again, MPLS, IPv4, IPv6, or the like). Various example embodiments for using such protocols to support flow-specific fast rerouting of source routed packets based on path compression are discussed further below.

Various example embodiments for supporting flow-specific FRR of source routed packets may be configured to support flow-specific FRR of source routed packets, based on path compression, in MPLS-based source routing.

Various example embodiments for supporting flow-specific FRR of source routed packets based on path compression in MPLS-based source routing are configured to enable the PLR to perform fast reroute along flow-specific protection paths (i.e., one-to-one protection) while maintaining a flow-agnostic approach at the PLR, obviate the need for a PLR to preprogram protection paths into the data plane (thereby reducing data plane complexity and states in the PLR and transit nodes), support both link and node protection for source routed packets, provide extensions to MPLS source routing capabilities, or the like, as well as various combinations thereof.

Various example embodiments for supporting flow-specific FRR of source routed packets based on path compression in MPLS-based source routing may be configured to encode a protection path using a single label, irrespective of the size (e.g., number of hops) of the protection path. The single label denoting the protection path is a special label which may be referred to herein as a protection path label (or protection path-SID). The protection path label is locally significant to the PLR, which is the head-end node for the protection path (and, thus, the protection path label is allocated from the label space of the PLR). The protection path label is removed from the source routed packet at the PLR when the source routed packet is forwarded along the primary path without being fast rerouted. The protection path label is translated into the set of hops of the protection path at the PLR (e.g., the protection path is expanded onto the source routed packet, such as by pushing node/adjacency labels of the hops of the protection path onto the source routed packet) when the PLR fast reroutes the source routed packet on the protection path (e.g., a failure of the protected hop). In this manner, the hops of the protection path may be obtained from the source routed packet when needed and are only explicitly encoded within the source routed packet when needed to perform a fast reroute operation (such that bandwidth needed to explicitly encode the hops of the protection path within the source routed packet is only used when the protection path is used, rather than being consumed for every source routed packet irrespective of a need to fast reroute the source routed packet). The protection label stack including the protection path label for a protection path, as discussed further below, may be of a fixed size of 4 labels (one of which specifies the protected hop that is protected by the protection path and one of which includes the path protection label associated with the protection path). In this manner, the overhead of the protection path in a source route is reduced from O(P) to O(1), where P is the number of hops in the protection path.

Various example embodiments for supporting flow-specific FRR of source routed packets based on path compression in MPLS-based source routing may be configured to support one or more of a generic concept of one-to-one (flow specific) FRR for source routed packets using a protection path label (or protection path-SID), capabilities for compression of a FRR protection path in an MPLS encoded source route using a protection path label scheme, capabilities for path label management by routers (e.g., in IS-IS, OSPF, OPSFv3, BGP-LS, or the like, as well as various combinations thereof), or the like, as well as various combinations thereof.

Various example embodiments for supporting flow-specific FRR of source routed packets based on path compression in MPLS-based source routing may be further understood by considering use of flow-specific FRR to provide node protection in MPLS source routing (although it will be appreciated that the principles also may be applied for providing link protection in MPLS source routing). This may be further understood by way of reference to the example communication network of FIG. 17, which illustrates the routers 111 of the communication network 110 of FIG. 1.

Figure 17:
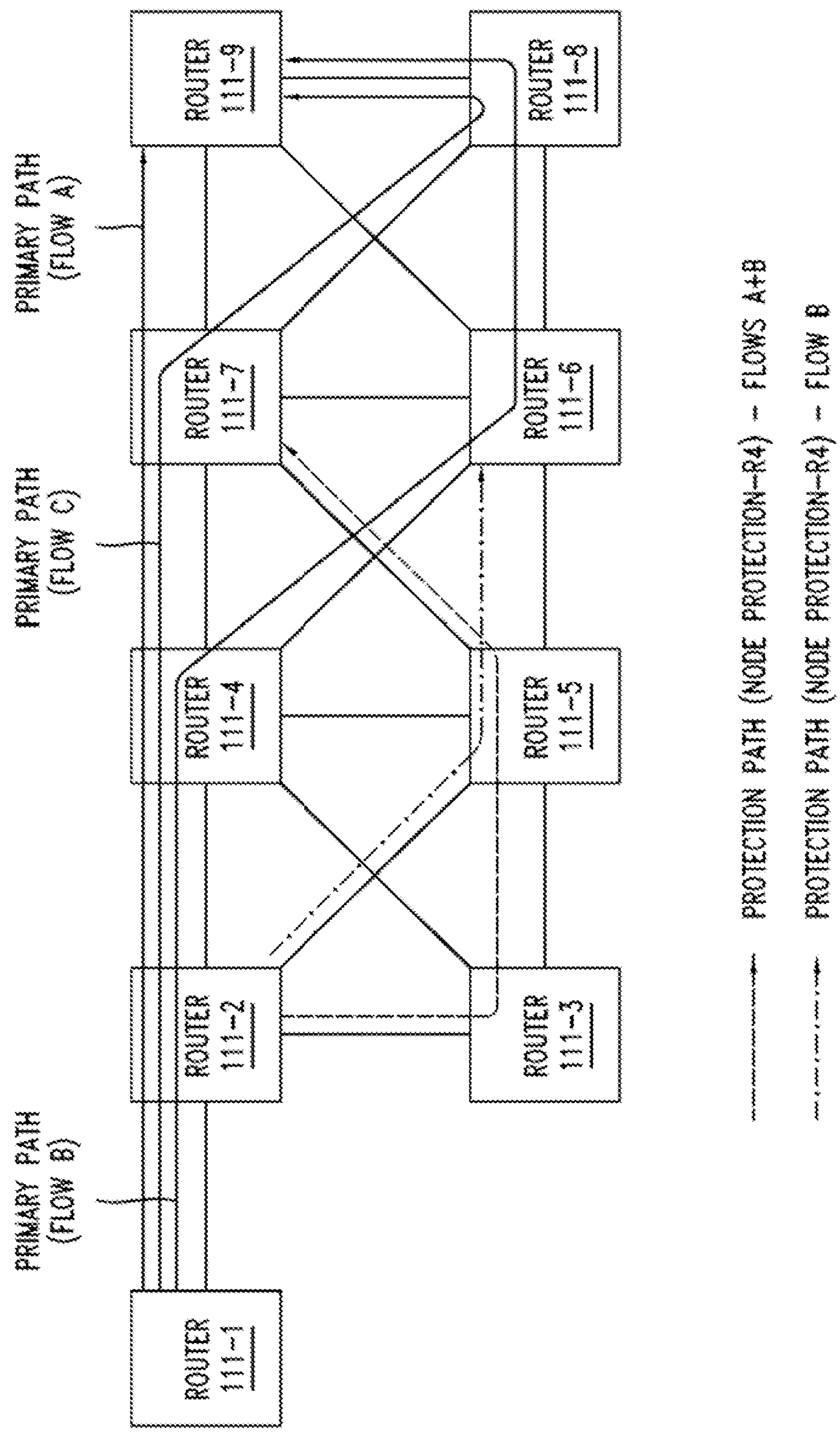
FIG. 17 depicts the communication network of the example communication system of FIG. 1 for illustrating primary paths and associated protection paths based on flow-specific fast rerouting of source routed packets.

Various example embodiments for supporting flow-specific FRR of source routed packets based on path compression in MPLS-based source routing, as noted above, may be described within the context of FIG. 17. It is noted that, in describing such embodiments, the following terminology is used: "X→Y" is used to indicate an adjacency between router "X' and router "Y", "LX" is used as the node Label for router "X", and "LXY" is used as the adjacency/next-hop label between "X→Y" (e.g., the node label for R1 is L1 and the Adjacency Label for R1→R2 is L12).

The PCE computes the explicit path that meets QoS or SLA of a flow. This path is denoted as E(<flow-id>). In FIG. 17, the paths for flow A, flow B, and flow C are computed as follows:

For flow A: E(A)={R1→R2, R2→R4, R4→R7, R7→R9}.

For flow B: E(B)={R1→R2, R2→R4, R4→R6, R6→R8, R8→R9}.

For flow C: E(C)={R1→R2, R2→R4, R4→R7, R7→R8, R8→R9}.

The PCE also computes a protection path for each hop listed in E, such that a protection path also meets the QoS or SLA of the flow. The protection path is denoted as P(<flow-id>, <protected-hop>). For example, to protect against failure of node R4, P is computed as follows:

For flow A: P(A,R4)={L23, L35, L57}.

For flow B: P(B,R4)={L25, L56}.

For flow C: P(C,R4)={L23, L35, L57}.

Various example embodiments for supporting flow-specific FRR for flow-specific FRR of source routed packets based on path compression in MPLS-based source routing may support a new "hop" type to be sent in the explicit path (in the source routed packet). This new "hop" type for flow-specific FRR in MPLS source routing is referred to herein as a "MPLS Fast-Reroutable Explicit Hop" (MPLS-FEH). The MPLS-FEH includes the following tuple:

MPLS-FEH=[<protected-hop>, <protection-path>, <skip-count>]

The <protected-hop> parameter identifies the protected hop. It may indicate a node identifier or link identifier, in the primary path, for which protection is provided. For example, R2→R4 is the protected hop in E(A), E(B), and E(C).

The <protection-path> parameter indicates the protection path that protects the protected hop (i.e., that protects <protected hop>). The protection path is a set of hops configured to protect the <protected hop>. The protection path may be indicated in the <protection-path> parameter using a protection path label. For example, if R2→R4 is the protected-hop then respective protection paths for flows A, B, and C are P(A,R4), P(B,R4), and P(C,R4), respectively.

The <skip-count> parameter indicates the number of hops (of the primary path) subsequent to the <protected-hop> that are bypassed by the <protection-path>. For example, P(A) and P(C) would skip R4→R7 after the protected hop R2→R4 and P(B) would skip R4→R6 after the protected hop R2→R4 and, thus, skip-count is 1 for each of the flows.

In FIG. 17, the encoding of the explicit paths sent by R1 for flows A, B, and C would be as follows:

E(A)={R1→R2, [R2→R4, P(A,R4), 1], R4→R7, R7→R9}.

E(B)={R1→R2, [R2→R4, P(B,R4), 1], R4→R6, R6→R8, R8→R9}.

E(C)={R1→R2, [R2→R4, P(C,R4), 1], R4→R7, R7→R8, R8→R9}.

It is noted that, for clarity, R1→R2 is shown as the first hop in E(A), E(B), and E(C); however, since it is the immediate next hop of R1, R1 would strip it before sending the source routed packet to R2.

In FIG. 17, the explicit path sent by ingress LER R1 on a packet is a stack of labels, which is as follows for flows A, B, and C:

E(A)={L12, [L24, P(A,R4), 1], L47, L79} where P(A,R4) is the MPLS-FEH with a protection path identifier that maps to a label stack of {L23, L35, L57}.

E(B)={L12, [L24, P(B, R4), 1], L46, L68, L89} where P(B, R4) is the MPLS-FEH with a protection path identifier that maps to a label stack of {L25, L56}.

E(C)={L12, [L24, P(C,R4), 1], L47, L79} where P(C,R4) is the MPLS-FEH with a protection path identifier that maps to a label stack of {L23, L35, L57}.

It is noted that, for clarity, L12 was shown as the first label in E(A), E(B), and E(C), but R1 would strip this label before sending the source routed packet to R2. Thus, R2 will receive the following label stacks on source routed packets for flows A, B, and C:

E(A)={[L24, P(A,R4), 1], L47, L79}.

E(B)={[L24, P(B,R4), 1], L46, L68, L89}.

E(C)={[L24, P(C,R4), 1], L47, L79}.

The operation of R2 upon receiving the source routed packet from R1 depends on whether the R2→R4 link is forwarding.

R2, upon receiving a packet from R1 when the R2→R4 link is forwarding (the R2→R4 link is active and R4 is active), takes the following actions.

If a packet arrives with E(A) when the R2→R4 link is forwarding, then R2 pops the first hop, which is MPLS-FEH=[R2→R4, P(A, R4), 1], and sends the source routed packet on the R2→R4 link with E(A)={R4→R7, R7→R9}.

If a packet arrives with E(B) when the R2→R4 link is forwarding, then R2 pops the first hop, which is MPLS-FEH=[R2→R4, P(B,R4), 1], and sends the source routed packet on R2→R4 with E(B)={R4→R6, R6→R8, R8→R9}.

R2, upon receiving a packet from R1 when the R2→R4 link is not forwarding (the R2→R4 link has failed or R4 has failed), takes the following actions.

If a packet arrives with E(A) when the R2→R4 link is not forwarding, then R2 takes the following actions: (1) R2 pops the first label, which is MPLS-FEH=[R2→R4, P(A, R4), 1], (2) R2, since the R2→R4 link has failed, decides to fast-reroute the source routed packet along protection path P(A, R4), (3) R2, since the skip-count is "1", also pops R4→R7 from the explicit path, (4) R2 determines the first hop in P(A, R4), which is R2→R3, based on the protection path label and, thus, decides to forward the source routed packet on the R2→R3 link, (5) R2 determines the remaining hops in P(A, R4), based on the protection path label, and pushes those remaining hops in P(A, R4) into the explicit path such that the explicit path becomes E(A)={R3→R5, R5→R7, R7→R9}, and (6) R2 sends the source routed packet out to R3.

If a packet arrives with E(B) when the R2→R4 link is not forwarding, then R2 takes the following actions: (1) R2 pops the first hop, which is MPLS-FEH=[R2→R4, P(B, R4), 1], (2) R2, since the R2→R4 link has failed, decides to fast-reroute the source routed packet along protection path P(B, R4), (3) R2, since the skip-count is "1", also pops R4→R6 from the explicit path, (4) R2 determines the first hop in P(B,R4), which is R2→R5, based on the protection path label and, thus, decides to forward the source routed packet on the R2→R5 link, (5) R2 determines the remaining hops in P(B,R4), based on the protection path label, and pushes those remaining hops in P(B, R4) into the explicit path such that the explicit path becomes E(B)={R5→R6, R6→R8, R7→R9}, and (6) R2 sends the source routed packet out to R5.

If a packet arrives with E(C) when the R2→R4 link is not forwarding, then R2 takes the following actions: (1) R2 pops the first label, which is MPLS-FEH=[R2→R4, P(C, R4), 1], (2) R2, since the R2→R4 link has failed, decides to fast-reroute the source routed packet along protection path P(C, R4), (3) R2, since the skip-count is "1", also pops R4→R7 from the explicit path, (4) R2 determines the first hop in P(C, R4), which is R2→R3, based on the protection path label and, thus, decides to forward the source routed packet on the R2→R3 link, (5) R2 determines the remaining hops in P(C, R4), based on the protection path label, and pushes those remaining hops in P(C, R4) into the explicit path such that the explicit path becomes E(C)={R3→R5, R5→R7, R7→R9}, and (6) R2 sends the source routed packet out to R3.

It is noted that, from these examples, it may be seen that flows A, B, and C are fast-rerouted along flow-specific protection paths upon failure of the common link R2→R4 or node R4. The PLR does not compute and program any protection-path against any of the next-hops of the PLR; rather, the protection path is indicated in the source routed packet itself by the source node such that the PLR can use local information to determine the hops of the protection path when the protection is needed for an FRR operation.

Various example embodiments for supporting flow-specific FRR of source routed packets based on path compression in MPLS-based source routing may be configured to support an FEH Label Stack (FLS). The FLS is a stack of labels of which the MPLS-FEH is composed. The encoding of the FLS may be as depicted in FIG. 18. As may be seen in FIG. 18, the FLS 1800 includes a number of fields including various labels as well as other information.

The FLS 1800 includes an FLSI label (first row depicted in FIG. 18). When R1 embeds the FLS within the explicit path MPLS label stack, a receiving LSR needs to be able to distinguish unambiguously between the FLS and non-FLS labels. To accomplish this, the label immediately preceding a FLS may be a "FLS Indicator (FLSI)" label, where preceding means closer to the top of the label stack (farther from the bottom of the stack). FLSI is a special label that is not expected to be used for any other purposes. If standardized in IETF, then a value of FLSI can be reserved at the IANA registry on Special-purpose label. Additionally, it is noted that, within the FLSI label, the associated EXP and TTL fields in the FLSI label will be set to same values as in the protected-hop label, and the S bit in the FLSI label will be set to 0.

The FLS 1800 includes a protected-hop label (second row depicted in FIG. 18). The protected-hop label immediately follows FLSI. The protected-hop label identifies the next-hop adjacency label on the primary path, which is being protected. For example, in MPLS-FEH [L24, P(A,R4), 1], the protected-hop label is L24.

The FLS 1800 includes a protection label stack descriptor (third row depicted in FIG. 18). This is a special label after the protected hop label. The protection label stack descriptor includes a Num_Prot_Label field, which is a 10-bit field that indicates the number of labels (hops) in the protection path. In this case, since the protection path is indicted using a single label (namely, the protection path label), the Num_Prot_Label field is set to one ("1"). The protection label stack descriptor includes a Skip_Count field, which is a 10-bit field which includes a value indicative of the number of labels after the FLS to be skipped if the source routed packet is forwarded on the protection path. The protection label stack descriptor includes an Exp field, which is expected to be unused and set to "0". The protection label stack descriptor includes an S field, which is expected to be set to "0". The protection label stack descriptor includes a TTL field, which is expected to be unused and set to "0". It is noted that it is expected that the protection label stack descriptor will not be used for any other purposes.

The FLS 1800 includes a protection path label. This is the label which identifies the protection path, which may be translated into the set of hops of the protection path by the PLR when the protection path is to be used.

It is noted that, when the PLR fast reroutes a source routed packet using the protection path indicated by the protection path label in the FLS, the PLR may replace the FLS with explicit encoding of each of the hops of the protection path (with the exception of the first hop of the protection path, which may be used by the PLR to forward the source routed packet).

Various example embodiments for supporting flow-specific FRR of source routed packets based on path compression in MPLS-based source routing may be further understood by considering operations performed by the PCE and by network elements along the source routed path (e.g., the source node, a transit node, a PLR, and so forth).

The PCE computes the explicit path that meets QoS or SLA of a flow. This path is denoted as E(<flow-id>). The PCE updates the dynamic TE state (e.g., residual bandwidth) of the network elements along that path into the TEDB, to reflect that TE resources allocated to the path have been reserved. Let LXY denote the Adjacency Label of RX→RY. In FIG. 17, the paths for flow A, flow B, and flow C are computed as follows:

For flow A: E(A)={R1→R2, R2→R4, R4→R7, R7→R9}.

For flow B: E(B)={R1→R2, R2→R4, R4→R6, R6→R8, R8→R9}.

For flow C: E(C)={R1→R2, R2→R4, R4→R7, R7→R8, R8→R9}.

The PCE also computes a protection path for each hop listed in E, such that a protection path also meets the QoS or SLA of the flow. The protection path is denoted as P(<flow-id>, <protected-hop>). The PCE updates the dynamic TE state (e.g., residual bandwidth) of the network elements along the protection path into the TEDB, to reflect that TE resources allocated to the path have been reserved. For example, to protect against failure of node R4, P is computed as follows:

For flow A: P(A,R4)={L23, L35, L57}.

For flow B: P(B,R4)={L25, L56}.

For flow C: P(C,R4)={L23, L35, L57}.

It is noted that, for simplicity, R4 is shown as the protected hop in E; however, it will be appreciated that the PCE may try to compute protection paths for other hops listed in E or even for every hop listed in E.

It is noted that the protection path for flows A and C is the same (P(A,R4)=P(C,R4)), because the protection path satisfies the QoS constraints of both the flows. For example, assume that flow B was set-up before flow C. As such, the TE resources along the protection path P(A,R4) have been reserved as per requirement of flow B such that, later when flow C has been set-up, the residual TE resources along the same protection path satisfies QoS of flow C.

It will be appreciated that E or P may be computed using any suitable path computation mechanisms, such as local path computation at the source router by running CSPF on TEDB or by other computational techniques, local configuration at the source, global path computation at a central controller by running CSPF on TEDB or other computational techniques, or the like.

The PCE initiates allocation of protection path labels to the protection paths (namely, the protection paths (P(A,R4), P(B,R4) and P(C,R4)) as follows:

P(A,R4)=P(C,R4)=L2357.

P(B,R4)=L256.

The protection path labels may be allocated to the protection paths by the PCE or by R2. The PCE may allocate the protection path labels to the protection paths if R2 provides the PCE with a label range of label values available for use as protection path labels. The PCE may request allocation of the protection path labels by R2 (e.g., by sending a request to R2, which may then allocate the protection path labels to the protection paths based on the request from the PCE and responds to the PCE with indications of the protection path labels that were allocated). The control plane procedures for allocation of protection path labels to protection paths are discussed in additional detail below.

The PCE, after the protection path labels have been allocated to the protection paths protecting R4, programs the protection path labels into the data plane of R2. This is illustrated in FIG. 19.

Figure 19:
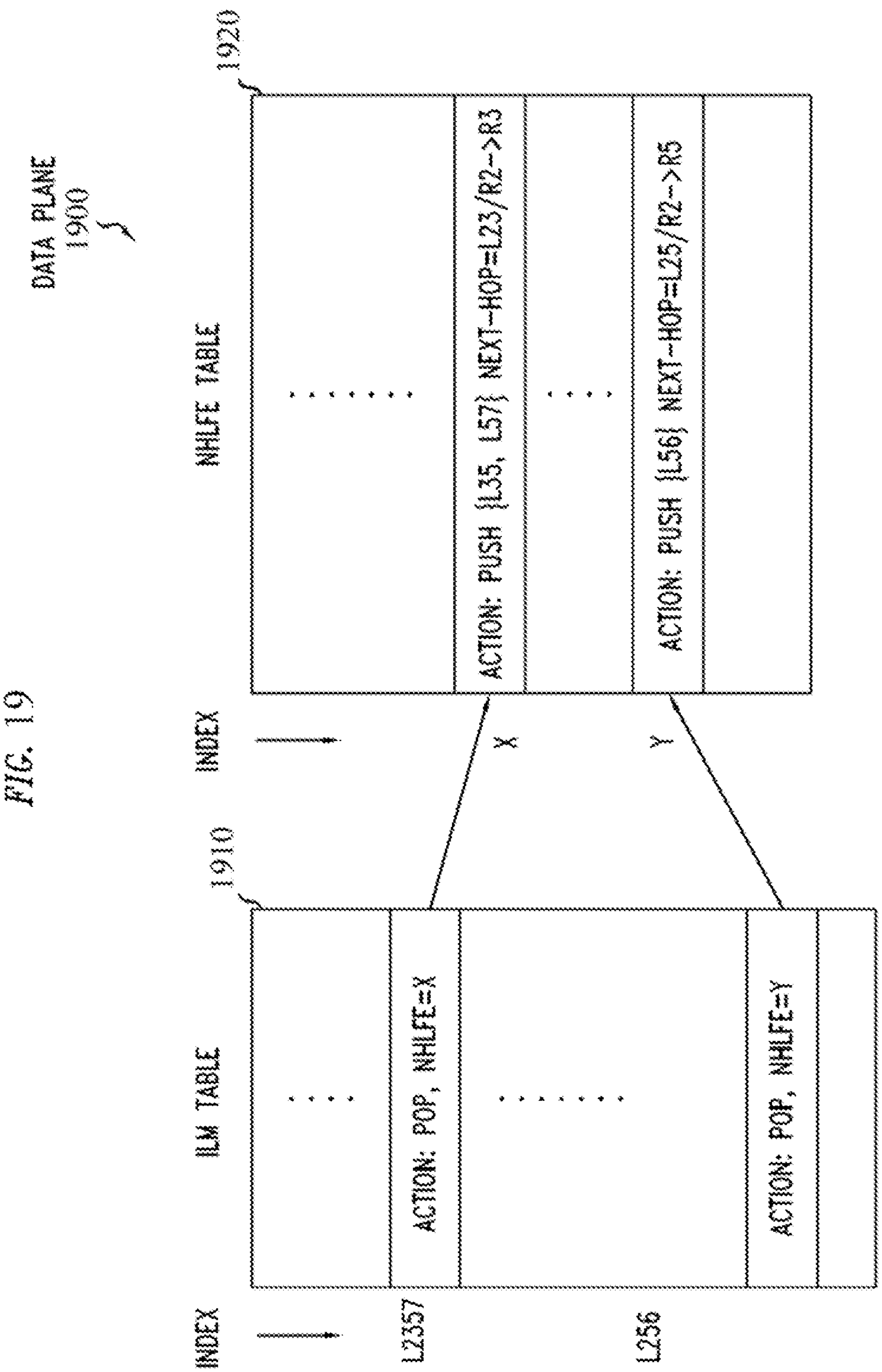
FIG. 19 depicts the data plane of a PLR router configured to support protection paths for flow-specific fast rerouting of source routed packets in MPLS-based source routing.

FIG. 19 depicts the data plane of a PLR router configured to support protection paths for flow-specific fast rerouting of source routed packets in MPLS-based source routing.

The data plane 1900 includes an ILM Table 1910 and an NHLFE Table 1920, which may be arranged in a manner similar to the ILM 1110 and the NHLFE 1120 of FIG. 11, respectively.

The entry of ILM Table 1910 for Label L2357 is indicative of instructions for pushing of label stack {L35, L57] onto the source routed packet and forwarding of the source routed packet on the next-hop identified by L23 (which is R2→R3).

The entry of ILM Table 1910 for Label L256 is indicative of instructions for pushing of label stack {L56] onto the source routed packet and forwarding of the source routed packet on the next-hop identified by L25 (which is R2→R5).

It is noted that pre-programming of the protection path label state in the data plane of PLRs increases the data plane state as compared to embodiments in which the hops of the protection path are explicitly encoded within the source routed packet, but are not expected to increase the data plane state as compared to traditional FRR in MPLS source routing.

The PCE provides the following path information to the head-end router R1 for use in generating headers for source routed packets of flows A, B, and C:

For flow A: E(A)={L12, L24, L47, L79}, P(A,R4)={L2357}.

For flow B: E(B)={L12, L24, L46, L68, L89}, P(B,R4)={L256}.

For flow C: E(C)={L12, L24, L47, L78, L89}, P(C,R4)={L2357}.

Let L(<flow-id>) be the label stack sent by R1 for the specified flow (flow-id). In FIG. 17, the MPLS-FEH encoded label stack sent by R1 for flows A, B, and C would be as follows (where P is the Num_Prot_Label field in the protection label stack descriptor (PLDS) and C is the Skip_Count field in the protection label stack descriptor):

L(A)={[FLSI, L24, PLDS (P=1, C=1), L2357], L47, L79}.

L(B)={[FLSI, L24, PLDS (P=1, C=1), L256], L46, L68, L89}.

L(C)={[FLSI, L24, PLDS (P=1, C=1), L2357], L47, L78, L89}.

It is noted that, while L12 was shown as the first label in E(A), E(B), and E(C), R1 would strip this label before sending the source routed packet to R2 (or not include the label in the first place), such that the label stack sent by R1 will not include L12.

The source node, as described above, sends a source routed packet including a source route that includes an explicit encoding of the hops of the source routed path and an explicit encoding of a protection path label indicative of a protection path configured to protect one of the hops of the source routed path.

The source node inserts an FLS in order to include an MPLS-FEH in an MPLS source routed path.

In the case of flow A, for example, the encoding of FLS including MPLS-FEH=[FLSI, L24, PLDS (P=1, C=1), L2357] is as depicted in FIG. 20.

In the case of flow A, for example, the label stack L(A) included in the source routed packet sent by R1 to R2 is configured as depicted in FIG. 21.

A receiver that receives an MPLS Label Stack with an FLS that indicates a MPLS-FEH in an MPLS source routed packet processes the MPLS Label Stack as follows. If the first label is not FLSI, then MPLS forwarding is performed as a result of a lookup of the first label in the ILM Table. If the first label is FLSI, then the FLSI label is popped from the stack (making the new top label the protected-hop label), the protected-hop label (now the top label) is looked up in the ILM Table to get the next-hop/forwarding information (denoted as NH) of the protected-hop label, the protected-hop label is popped (making the new top label the protection label stack descriptor), the Num_Prot_Label and Skip_Count values are read from the protection label stack descriptor (now the top label), and the protection label stack descriptor is popped. A determination is made as to whether the next-hop (NH) is operational. If the NH is operational, the number of labels specified in Num_Prot_Label is popped (thereby removing the entire protection label stack) and the source routed packet is forwarded to the NH. If the NH is not operational, the top label (which is now the first label in the protection label stack and which includes a protection path label identifying the protection path) is read from the stack and used to initiate fast rerouting of the source routed packet using the protection path. The hops of the protection path and the actions to be performed for fast rerouting along the protection are determined based on a lookup in the ILM Table using the protection path label (e.g., the protection path label is popped, the number of labels specified in Skip_Count is popped (thereby removing the subsequent hops in primary path which are bypassed by the protection path), a label stack including explicit encodings of the hops of the protection path with the exception of the first hop of the protection path is pushed, and the next-hop/forwarding information of the first hop of the protection path (denoted as NH2) is determined). The source routed packet is then handled based on whether NH2 is operational (either the source routed packet is forwarded to NH2 as an FRR operation if NH2 is operational or the source routed packet is dropped if NH2 is not operational).

The operation of R2 upon receiving the source routed packet, including the label stack L(A), from R1 depends on whether the R2→R4 link is forwarding.

R2, upon receiving a packet with L(A) from R1 when the R2→R4 link is forwarding (the R2→R4 link is active and R4 is active), processes the first hop, which is MPLS-FEH/FLS={FLSI, L24, PLDS (P=1, C=1), L2357}, as follows: (1) R2 pops FLSI, which indicates this is the start of an FLS, (2) R2 performs an ILM lookup of Protected Hop Label L24, which indicates a pop-n-forward action on R2→R4 link, (3) R2 pops L24 based on the pop-and-forward action indicted in the ILM, (3) R2 determines that R2→R4 is forwarding and, thus, ignores the protection path (i.e., pops {PLDS, L2357} without using these labels), and (4) R2 sends the source routed packet on the R2→R4 link with L(A)={L47, L79} as depicted in FIG. 22.

R2, upon receiving a packet with L(A) from R1 when the R2→R4 link is not forwarding (the R2→R4 link has failed or R4 has failed), processes the first hop, which is MPLS-FEH/FLS={FLSI, L24, PLDS (P=1, C=1), L2357}, as follows: (1) R2 pops FLSI, which indicates this is the start of an FLS, (2) R2 performs an ILM lookup of Protected Hop Label L24, which indicates a pop-n-forward action on R2→R4 link, (3) R2 pops L24 based on the pop-and-forward action indicted in the ILM, (3) R2 determines that R2→R4 is not forwarding and, thus, decides to fast reroute the source routed packet along the protection path, (4) R2, since the Skip_Count (C) is 1, also pops the next-hop following the MPLS-FEH/FLS (i.e., L47) from L(A) since this hop will be skipped due to the FRR operation, (5) R2 determines the hops of the protection path and the actions to be performed for fast rerouting along the protection based on a lookup in the ILM Table using the protection path label (i.e., L2357), (5) R2, based on the result of the lookup in the ILM Table using the protection path label, pops the protection path label L2357, pushes the label stack {L35, L57} (which are the hops of the protection path with the exception of the first hop of the protection path), and identifies a forward action on next-hop identified by L23 (i.e., R2→R3, which is the first hop of the protection path), and (6) R2 sends the source routed packet on the R2→R3 link with L(A)={L35, L57, L79} as depicted in FIG. 23.

It will be appreciated that various example embodiments for supporting flow-specific FRR of source routed packets may be configured to support flow-specific FRR of source routed packets, based on path compression, in MPLS-based source routing in various other ways.

Various example embodiments for supporting flow-specific FRR of source routed packets may be configured to support flow-specific FRR of source routed packets, based on path compression, in IPv4-based source routing.

Various example embodiments for supporting flow-specific FRR of source routed packets based on path compression in IPv4-based source routing are configured to enable the PLR to perform fast reroute along flow-specific protection paths (i.e., one-to-one protection) while maintaining a flow-agnostic approach at the PLR, obviate the need for a PLR to preprogram protection paths into the data plane (thereby reducing data plane complexity and states in the PLR and transit nodes), support both link and node protection for source routed packets, provide extensions to IPv4 source routing capabilities, or the like, as well as various combinations thereof.

Various example embodiments for supporting flow-specific FRR of source routed packets based on path compression in IPv4-based source routing may be configured to encode a protection path using a single IPV4-FEH, irrespective of the size (e.g., number of hops) of the protection path. The single IPV4-FEH denoting the protection path is a special address which may be referred to herein as a protection path address. The protection path address is locally significant to the PLR, which is the head-end node for the protection path (and, thus, the protection path address is allocated from the address space of the PLR). The protection path address is removed from the source routed packet at the PLR when the source routed packet is forwarded along the primary path without being fast rerouted. The protection path address is translated into the set of hops of the protection path at the PLR (e.g., the protection path is expanded onto the source routed packet, such as by pushing IPv4 addresses of the hops of the protection path onto the source routed packet) when the PLR fast reroutes the source routed packet on the protection path (e.g., a failure of the protected hop). In this manner, the hops of the protection path may be obtained from the source routed packet when needed and are only explicitly encoded within the source routed packet when needed to perform a fast reroute operation (such that bandwidth needed to explicitly encode the hops of the protection path within the source routed packet is only used when the protection path is used, rather than being consumed for every source routed packet irrespective of a need to fast reroute the source routed packet). The protection address list including the protection path address for a protection path, as discussed further below, may be of a fixed size (e.g., of 2×IPV4-FEHs (=1×IPV4-FEH for the protected hop+1×IPV4-FEH for the protection path). In this manner, the overhead of the protection path in a source route is reduced from O(P) to O(1), where P is the number of hops in the protection path.

Various example embodiments for supporting flow-specific FRR of source routed packets based on path compression in IPv4-based source routing may be configured to support one or more of a generic concept of one-to-one (flow specific) FRR for source routed packets using a protection path address (a single IPv4 address), capabilities for compression of a FRR protection path in an IPv4 encoded source route using a protection path address scheme, capabilities for path address management by routers (e.g., in IS-IS, OSPF, BGP-LS, or the like, as well as various combinations thereof), or the like, as well as various combinations thereof.

Various example embodiments for supporting flow-specific FRR of source routed packets based on path compression in IPv4-based source routing may be further understood by considering use of flow-specific FRR to provide node protection in IPv4 source routing (although it will be appreciated that the principles also may be applied for providing link protection in IPv4 source routing). This may be further understood by way of reference to the example communication network of FIG. 17, which illustrates the routers 111 of the communication network 110 of FIG. 1.

Various example embodiments for supporting flow-specific FRR of source routed packets based on path compression in IPv4-based source routing, as noted above, may be described within the context of FIG. 17. It is noted that, in describing these embodiments, the following terminology is used: "IP-X" is used as the loopback IP address in router "X", "IP-XY" is used as the IPv4 address at the Y end of link X→Y, and "IP-YX" is used as the IPv4 address at the X end of link Y→X. For example, the loopback address for R1 is IP-1, the address at the R2 end of R1→R2 is IP-12, and the address at the R1 end of R1→R2 is IP-21.

The PCE computes the explicit path that meets QoS or SLA of a flow. This path is denoted as E(<flow-id>). In FIG. 17, the paths for flow A, flow B, and flow C are computed as follows:

For flow A: E(A)={R1→R2, R2→R4, R4→R7, R7→R9}.

For flow B: E(B)={R1→R2, R2→R4, R4→R6, R6→R8, R8→R9}.

For flow C: E(C)={R1→R2, R2→R4, R4→R7, R7→R8, R8→R9}.

The PCE also computes a protection path for each hop listed in E, such that a protection path also meets the QoS or SLA of the flow. The protection path is denoted as P(<flow-id>, <protected-hop>). For example, to protect against failure of node R4, P is computed as follows:

For flow A: P(A,R4)={IP-23, IP-35, IP-57}.

For flow B: P(B,R4)={IP-25, IP-56}.

For flow C: P(C,R4)={IP-23, IP-35, IP-57}.

Various example embodiments for supporting flow-specific FRR for flow-specific FRR of source routed packets based on path compression in IPv4-based source routing may support a new "hop" type to be sent in the explicit path (in the source routed packet). This new "hop" type for flow-specific FRR in IPv4 source routing is referred to herein as a "IPv4 Fast-Reroutable Explicit Path" (IPV4-FEH). The IPV4-FEH includes the following tuple:

IPV4-FEH=[<protected-hop>, <protection-path>, <skip-count>]

The <protected-hop> parameter identifies the protected hop. It may indicate a node identifier or link identifier, in the primary path, for which protection is provided. For example, R2→R4 is the protected hop in E(A), E(B), and E(C).

The <protection-path> parameter indicates the protection path that protects the protected hop (i.e., that protects <protected hop>). The protection path is a set of hops configured to protect the <protected hop>. The protection path may be indicated in the <protection-path> parameter using a protection path address. For example, if R2→R4 is the protected-hop then respective protection paths for flows A, B, and C are P(A,R4), P(B,R4), and P(C,R4), respectively.

The <skip-count> parameter indicates the number of hops (of the primary path) subsequent to the <protected-hop> that are bypassed by the <protection-path>. For example, P(A) and P(C) would skip R4→R7 after the protected hop R2→R4 and P(B) would skip R4→R6 after the protected hop R2→R4 and, thus, skip-count is 1 for each of the flows.

In FIG. 17, the encoding of the explicit paths sent by R1 for flows A, B, and C would be as follows:

E(A)={R1→R2, [R2→R4, P(A,R4), 1], R4→R7, R7→R9}.

E(B)={R1→R2, [R2→R4, P(B,R4), 1], R4→R6, R6→R8, R8→R9}.

E(C)={R1→R2, [R2→R4, P(C,R4), 1], R4→R7, R7→R8, R8→R9}.

It is noted that, for clarity, R1→R2 is shown as the first hop in E(A), E(B), and E(C); however, since it is the immediate next hop of R1, R1 would strip it before sending the source routed packet to R2.

In FIG. 17, the explicit path sent by ingress router R1 on a packet is a list of IPv4 addresses, which is as follows for flows A, B, and C:

E(A)={IP-12, [IP-24, P(A,R4), 1], IP-47, IP-79} where P(A,R4) is the IPV4-FEH with a protection path identifier that maps to an address list of {IP-23, IP-35, IP-57}.

E(B)={IP-12, [IP-24, P(B,R4), 1], IP-46, IP-68, IP-89} where P(B,R4) is the IPV4-FEH with a protection path identifier that maps to an address list of {IP-25, IP-56}.

E(C)={IP-12, [IP-24, P(C,R4), 1], IP-47, IP-79} where P(C,R4) is the IPV4-FEH with a protection path identifier that maps to an address list of {IP-23, IP-35, IP-57}.

It is noted that, for clarity, IP-12 was shown as the first address in E(A), E(B), and E(C), but R1 would strip this address before sending the source routed packet to R2. Thus, R2 will receive the following address lists on source routed packets for flows A, B, and C:

E(A)={[IP-24, P(A,R4), 1], IP-47, IP-79}.

E(B)={[IP-24, P(B,R4), 1], IP-46, IP-68, IP-89}.

E(C)={[IP-24, P(C,R4), 1], IP-47, IP-79}.

The operation of R2 upon receiving the source routed packet from R1 depends on whether the R2→R4 link is forwarding.

R2, upon receiving a packet from R1 when the R2→R4 link is forwarding (the R2→R4 link is active and R4 is active), takes the following actions.

If a packet arrives with E(A) when the R2→R4 link is forwarding, then R2 pops the first hop, which is IPV4-FEH=[R2→R4, P(A, R4), 1], and sends the source routed packet on the R2→R4 link with E(A)=IP-47, IP-79}.

If a packet arrives with E(B) when the R2→R4 link is forwarding, then R2 pops the first hop, which is IPV4-FEH=[IP-24, P(B,R4), 1], and sends the source routed packet on R2→R4 with E(B) {IP-46, IP-68, IP-89}.

R2, upon receiving a packet from R1 when the R2→R4 link is not forwarding (the R2→R4 link has failed or R4 has failed), takes the following actions.

If a packet arrives with E(A) when the R2→R4 link is not forwarding, then R2 takes the following actions: (1) R2 pops the first hop, which is IPV4-FEH=[IP-24, P(A, R4), 1], (2) R2, since the R2→R4 link has failed, decides to fast-reroute the source routed packet along protection path P(A, R4), (3) R2, since the skip-count is "1", also pops IP-47 from the explicit path, (4) R2 determines the first hop in P(A, R4), which is R2→R3, based on the protection path address and, thus, decides to forward the source routed packet on the R2→R3 link, (5) R2 determines the remaining hops in P(A, R4), based on the protection path address, and pushes those remaining hops in P(A, R4) into the explicit path such that the explicit path becomes E(A)=IP-35, IP-57, IP-79}, and (6) R2 sends the source routed packet out to R3.

If a packet arrives with E(B) when the R2→R4 link is not forwarding, then R2 takes the following actions: (1) R2 pops the first hop, which is IPV4-FEH=[IP-24, P(B, R4), 1], (2) R2, since the R2→R4 link has failed, decides to fast-reroute the source routed packet along protection path P(B, R4), (3) R2, since the skip-count is "1", also pops IP-46 from the explicit path, (4) R2 determines the first hop in P(B,R4), which is IP-25, based on the protection path address and, thus, decides to forward the source routed packet on the R2→R5 link, (5) R2 determines the remaining hops in P(B,R4), based on the protection path address, and pushes those remaining hops in P(B, R4) into the explicit path such that the explicit path becomes E(B)={IP-56, IP-68, IP-79}, and (6) R2 sends the source routed packet out to R5.

If a packet arrives with E(C) when the R2→R4 link is not forwarding, then R2 takes the following actions: (1) R2 pops the first hop, which is IPV4-FEH=[IP-24, P(C, R4), 1], (2) R2, since the R2→R4 link has failed, decides to fast-reroute the source routed packet along protection path P(C, R4), (3) R2, since the skip-count is "1", also pops IP-47 from the explicit path, (4) R2 determines the first hop in P(C, R4), which is R2→R3, based on the protection path address and, thus, decides to forward the source routed packet on the R2→R3 link, (5) R2 determines the remaining hops in P(C, R4), based on the protection path address, and pushes those remaining hops in P(C, R4) into the explicit path such that the explicit path becomes E(C)={IP-35, IP-57, IP-79}, and (6) R2 sends the source routed packet out to R3.

It is noted that, from these examples, it may be seen that flows A, B, and C are fast-rerouted along flow-specific protection paths upon failure of the common link R2→R4 or node R4. The PLR does not compute and program any protection-path against any of the next-hops of the PLR; rather, the protection path is indicated in the source routed packet itself by the source node such that the PLR can use local information to determine the hops of the protection path when the protection is needed for an FRR operation.

Various example embodiments for supporting flow-specific FRR of source routed packets based on path compression in IPv4-based source routing may be configured to support an FEH Path Protection Element (FPPE). The FPPE encodes the (<protected-path>,<protection path>) tuple using two IPV4-FEHs as depicted in FIG. 24. As depicted in FIG. 24, the FPPE 2400 includes a number of fields including various addresses as well as other information.

The FPPE 2400 includes a first IPV4-FEH describing the protected hop (the first and second rows depicted in FIG. 24). The first IPV4-FEH includes a protected hop address descriptor (first row of the first IPV4-FEH) and the IPv4 address of the protected hop (second row of the first IPV4-FEH). The protected hop address descriptor includes a Num_Protection_Hops field, which is an 8-bit field that indicates the number of addresses (hops) specified for the protection path. In this case, since the protection path is indicted using a single address (namely, the protection path address), the Num_Protection_Hops field is set to one ("1"). The protected hop address descriptor includes a Skip_Count field, which is a 8-bit field which includes a value indicative of the number of hops after the FPPE 2400 to be skipped if the source routed packet is forwarded on the protection path (which is set to "0" since the protected hop is not used when the protection path is used). The protected hop address descriptor includes a Flags field, which may include various flags which may be set. The protected hop address descriptor includes a RESERVED field.

The FPPE 2400 includes a second IPV4-FEH indicating the protection path that is protecting the protected hop (the third and fourth rows depicted in FIG. 24). The second IPV4-FEH includes a protection path address descriptor (first row of the second IPV4-FEH) and the protection path address identifying the protection path that is protecting the protected hop (second row of the second IPV4-FEH). The protection path address descriptor includes a Num_Protection_Hops field, which is an 8-bit field that is set in a manner indicative that there are no protection hops since this IPV4-FEH includes a protection path address for a protection path (e.g., a value of "0" or other suitable value). The protection path address descriptor includes a Skip_Count field, which is a 8-bit field which includes a value indicative of the number of hops after the FPPE 2400 to be skipped if the source routed packet is forwarded on the protection path. The protection path address descriptor includes a Flags field, which may include various flags which may be set. The protection path address descriptor includes a RESERVED field.

It is noted that, when the PLR fast reroutes a source routed packet using the protection path indicated by the protection path address in the FPPE 2400, the PLR may replace the FPPE 2400 with explicit encoding of each of the hops of the protection path (with the exception of the first hop of the protection path, which may be used by the PLR to forward the source routed packet).

Various example embodiments for supporting flow-specific FRR of source routed packets based on path compression in IPv4-based source routing may be further understood by considering operations performed by the PCE and by network elements along the source routed path (e.g., the source node, a transit node, a PLR, and so forth).

The PCE computes the explicit path that meets QoS or SLA of a flow. This path is denoted as E(<flow-id>). The PCE updates the dynamic TE state (e.g., residual bandwidth) of the network elements along that path into the TEDB, to reflect that TE resources allocated to the path have been reserved. In FIG. 17, the paths for flow A, flow B, and flow C are computed as follows:

For flow A: E(A)={R1→R2, R2→R4, R4→R7, R7→R9}.

For flow B: E(B)={R1→R2, R2→R4, R4→R6, R6→R8, R8→R9}.

For flow C: E(C)={R1→R2, R2→R4, R4→R7, R7→R8, R8→R9}.

The PCE also computes a protection path for each hop listed in E, such that a protection path also meets the QoS or SLA of the flow. The protection path is denoted as P(<flow-id>, <protected-hop>). The PCE updates the dynamic TE state (e.g., residual bandwidth) of the network elements along the protection path into the TEDB, to reflect that TE resources allocated to the protection path have been reserved. For example, to protect against failure of node R4, P is computed as follows:

For flow A: P(A,R4)={R2→R3, R3→R5, R5→R7}.

For flow B: P(B,R4) {R2→R5, R5→R6}.

For flow C: P(C,R4)={R2→R3, R3→R5, R5→R7}.

It is noted that, for simplicity, R4 is shown as the protected hop in E; however, it will be appreciated that the PCE may try to compute protection paths for other hops listed in E or even for every hop listed in E.

It is noted that protection paths for P(A,R4)=P(C,R4), because the protection path satisfies QoS constraints of both of the flows. For example, assume that flow B was set-up before flow C. So, TE resources along the protection path P(A,R4) had been reserved as per the requirements of flow B. Later, when flow C has been set-up, the residual TE resources along the same protection path satisfy the QoS of flow C.

It will be appreciated that E or P may be computed using any suitable path computation mechanisms, such as local path computation at the source router by running CSPF on TEDB or by other computational techniques, local configuration at the source, global path computation at a central controller by running CSPF on TEDB or other computational techniques, or the like.

The PCE initiates allocation of protection path addresses to the protection paths (namely, the protection paths (P(A, R4), P(B,R4) and P(C,R4)) as follows:

P(A,R4)=P(C,R4)=IP-2357.

P(B,R4)=IP-256.

The protection path addresses may be allocated to the protection paths by the PCE or by R2. The PCE may allocate the protection path addresses to the protection paths if R2 provides the PCE with an address range of address values available for use as protection path addresses. The PCE may request allocation of the protection path addresses by R2 (e.g., by sending a request to R2, which may then allocate the protection path addresses to the protection paths based on the request from the PCE and responds to the PCE with indications of the protection path addresses that were allocated). The control plane procedures for allocation of protection path addresses to protection paths are discussed in additional detail below.

The PCE, after the protection path addresses have been allocated in R2 to the protection paths protecting R4, programs the protection path addresses into the data plane of R2. This is illustrated in FIG. 25.

Figure 25:
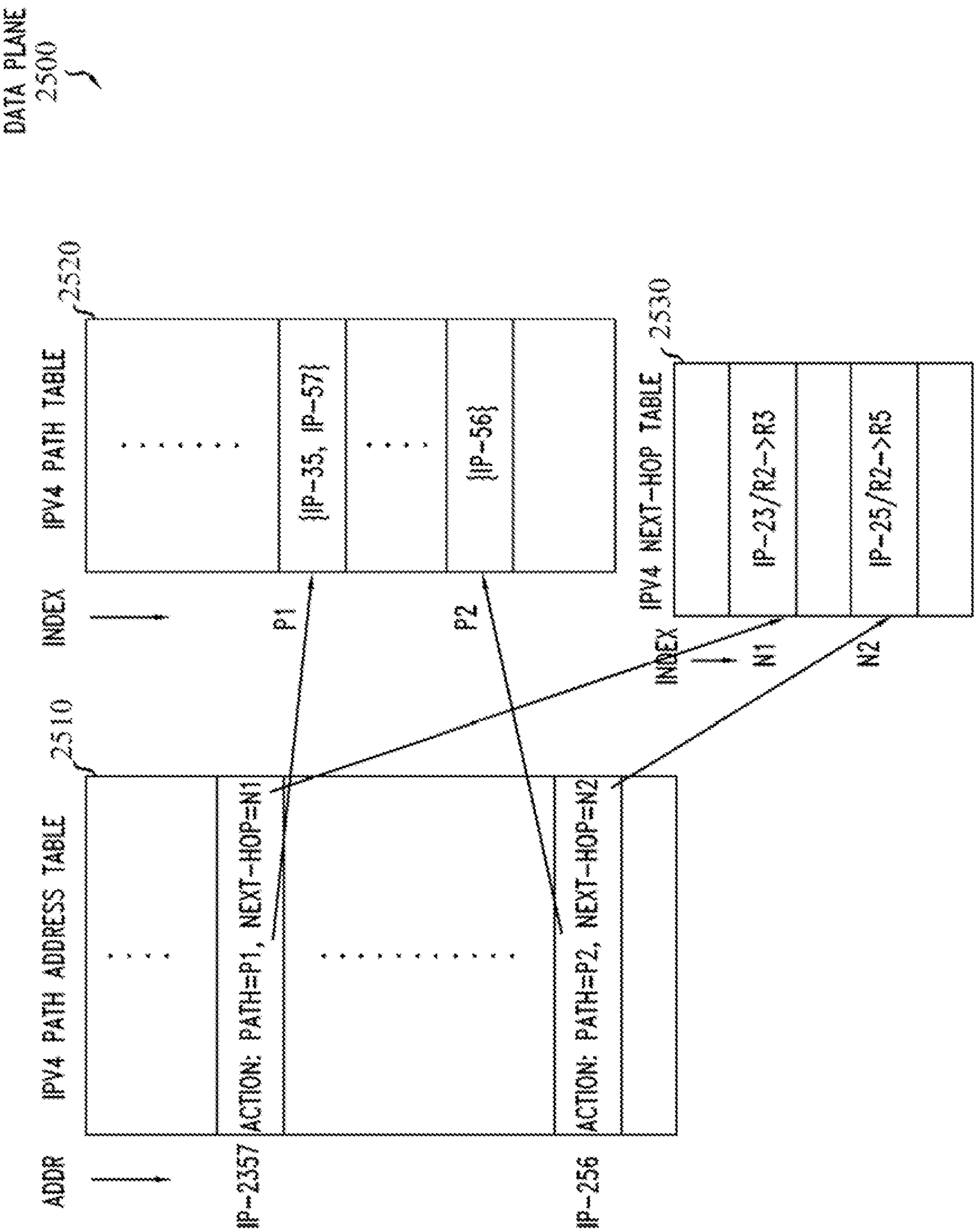
FIG. 25 depicts the data plane of a PLR router configured to support protection paths for flow-specific fast rerouting of source routed packets in IPv4-based source routing.

FIG. 25 depicts the data plane of a PLR router configured to support protection paths for flow-specific fast rerouting of source routed packets in IPv4-based source routing.

The data plane 2500 includes an IPv4 Path Address Table 2510, an IPv4 Path Table 2520, and an IPv4 Next-Hop Table 2530, which may be arranged in a manner similar to the IPv4 Path Address Table 1210, the IPv4 Path Table 1220, and the IPv4 Next-Hop Table 1230 of FIG. 12, respectively.

The entry of IPv4 Path Address Table 2510 for path address PA-2357 includes (1) a pointer to an entry of IPv4 Path Table 2520 that includes the hops of the protection path (namely, {IP-35, IP-57}) with the exception of the first hop of the protection path and (2) a pointer to an entry of IPv4 Next-Hop Table 2530 that includes the first hop of the protection path (namely, IP-23). In other words, the Prefix IP-2357/32 results in replacing {IP-2357} with addresses {IP-23, IP-57} onto the source routed packet and forwarding the source routed packet on next-hop identified by IP-23 (which is R2→R3).

The entry of IPv4 Path Address Table 2510 for path address PA-256 includes (1) a pointer to an entry of IPV4 Path Table 2520 that includes the hop of the protection path (namely, {IP-56}) with the exception of the first hop of the protection path and (2) a pointer to an entry of IPv4 Next-Hop Table 2530 that includes the first hop of the protection path (namely, IP-25). In other words, the Prefix IP-256/32 results in replacing {IP-256} with addresses {IP-56} onto the source routed packet and forwarding the source routed packet on next-hop identified by IP-25 (which is R2→R5).

It is noted that pre-programming of the protection path address state in the data plane of PLRs increases the data plane state as compared to embodiments in which the hops of the protection path are explicitly encoded within the source routed packet, but are not expected to increase the data plane state as compared to traditional FRR in IPv4 source routing.

The PCE provides the following path information to the head-end router R1 for use in generating headers for source routed packets of flows A, B, and C:

For flow A: E(A)={IP-12, IP-24, IP-47, IP-79}, P(A, R4)={IP-2357}.

For flow B: E(B)={IP-12, IP-24, IP-46, IP-68, IP-89}, P(B, R4)={IP-256}.

For flow C: E(C)={IP-12, IP-24, IP-47, IP-78, IP-89}, P(C, R4)={IP-2357}.

Let SR(<flow-id>) be the source route sent by R1 for the specified flow (flow-id). In FIG. 17, the IPV4-FEH encoded source route sent by R1 for flows A, B, and C would be as follows (where P is the Num_Protection_Hops field in the protection address list descriptor and S is the Skip_Count field):

SR(A)={[IP-24, P=1, S=0], [IP-2357, P=0, S=1], [IP-47, P=0, S=0], [IP-79, P=0, S=0]}.

SR(B)={[IP-24, P=1, S=0], [IP-256, P=0, S=1], [IP-46, P=0, S=0], [IP-68, P=0, S=0], [IP-89, P=0, S=0]}.

SR(C)={[IP-24, P=1, S=0], [IP-2357, P=0, S=1], [IP-47, P=0, S=0], [IP-78, P=0, S=0], [IP-89, P=0, S=0]}.

It is noted that, while IP-12 was shown as the first address in E(A), E(B), and E(C), R1 would not include IP-12 in the source route; rather, R1 would send the packets of the respective flows on R1→R2 with IP-12 as the Destination Address (DA) in the IPv4 Header.

Various example embodiments for supporting flow-specific FRR of source routed packets based on path compression for IPV4-based source routing may be configured to support encoding of the IPV4-FEH for use in supporting flow-specific FRR for source routed IPv4 packets. In at least some embodiments, as discussed further below, encoding of the IPV4-FEH may be performed using a new IPv4 Header Options, as an IP-Shim Layer Protocol, or the like, as well as various combinations thereof. It will be appreciated that such embodiments may be further understood by first considering various aspects of IPv4 source routing. The use of such mechanisms to support encoding of the IPV4-FEH for use in supporting flow-specific FRR for source routed IPv4 packets based on path compression may be further understood by first considering various aspects of IPv4 source routing.

In general, IPv4 source routing is defined in RFC 791. RFC 791 describes several Options that can be appended to the IPv4 Header, as depicted in FIG. 26.

The IPv4 Options provide for control functions that are needed or useful in some situations, but which may be unnecessary for most common communications. For example, the Options include provisions for timestamps, security, special routing, and so forth. The Options start with a 1-octet Type field followed by type-specific encoding that is based on the Type field. Options are of variable length. Thus, the minimum size of an Option is 1-octet (e.g., a 1-octet Type field) if it does not have any type specific data. By contrast, the maximum size of an Option is limited by the maximum permissible value of the IHL field in the IPv4 Header. The 1-octet Type is viewed as having 3 fields as follows: (1) a 1-bit copied flag field, which indicates whether the Option is to be copied into all fragments on fragmentation (i.e., "0"=not copied and "1"=copied), (2) a 2-bit options class field configured to support four options classes (e.g., 0=control, 1=reserved for future use, 2=debugging and measurement, and 3=reserved for future use), and (3) a 5-bit options number field that includes the value of the option. RFC 791 defines the following two IPv4 options to be used for Source Routing, which are as depicted in FIG. 27.

It is noted that both the LSR and SSR options provide means for the source of an IPv4 packet to supply routing information to be used by the intermediate routers in forwarding the packet to the destination, and to record the route information. The encoding of the LSR and SSR options are is as depicted in FIG. 28.

In the LSR and SSR options illustrated in FIG. 28, the option includes a Type field, a Length field, a Pointer field, and a Route Data field. The Type field is a 1-octet field that indicates LSR or SSR type option in tuples of COPY, CLASS and NUMBER. The Length field is a 1-octet field that indicates the length of the option (including the Type octet, the Length octet, the Pointer octet, and the octets of the Route Data). The Pointer field is a 1-octet field that indicates the octet in Route Data which begins the next source address to be processed by the receiving router. The pointer is relative to this option, and the smallest legal value for the Pointer is 4, which points to the first IPv4 source address in the Route Data field. The Route Data field is composed of a series of IPv4 addresses, where each address is 32 bits or 4 octets, as depicted in FIG. 29.

If the Pointer is greater than the Length, the source route is considered as empty (and the recorded route is full) and the routing is to be based on the Destination Address field in the IPv4 Header. If the address in Destination Address field has been reached and the Pointer is not greater than the Length, the next address in the source route replaces the address in the Destination Address field, the recorded route address replaces the source address just used (i.e., the previous destination address is the recorded address), and the Pointer is increased by four. Thus, the packet gets forwarded along each hop specified in the route data.

The use of the LSR and SSR options may be further understood by way of an example. In FIG. 17, assume that R1 wants to send a packet with Source Address(SA)=S to Destination Address(DA)=D along the path {IP-12, IP-24, IP-47, IP-79}. In this case, R1 sends the source routed packet on R1→R2 as: SA=S, DA=IP-12, Option Type=SSR, Length=19, Pointer=4, Route-Data={IP-24, IP-47, IP-79, D}. When R2 receives the source routed packet, it finds that DA=IP-12 is local (and, thus, reached). Since the source routed packet carries the SSR option and Pointer<Length, R2 swaps DA with the next address IP-24 in the Route-Data. The Pointer is increased by 4 to point to the next address (IP-47) in the Route Data. R2 sends the source routed packet on R2→R4 as: SA=S, DA=IP-24, Option Type=SSR, Length=19, Pointer=8, Route-Data={IP-12, IP-47, IP-79, D}. Similarly, R4 forwards the source routed packet on R4→R7 as: SA=S, DA=IP-47, Option Type=SSR, Length=19, Pointer=12, Route-Data={IP-12, IP-24, IP-79, D}. Similarly, R7 forwards the source routed packet to R7→R9 as: SA=S, DA=IP-79, Option Type=SSR, Length=19, Pointer=16, Route-Data={IP-12, IP-24, IP-47, D}. Similarly, R9 forwards the source routed packet to D as: SA=S, DA=D, Option Type=SSR, Length=19, Pointer=20, Route-Data={IP-12, IP-24, IP-47, IP-79}. When the source routed packet leaves R9, it may be seen that Route-Data contains the explicit path traversed by the source routed packet (Recorded-Route). The subsequent nodes would find that Pointer> Length, so packet forwarding would continue based on DA=D alone.

Various example embodiments for supporting flow-specific fast rerouting of source routed packets based on path compression in IPV4-based source routing may be configured to support encoding of the IPV4-FEH using new IPv4 Header Options.

In at least some embodiments, the Options for encoding of the IPV4-FEH may be defined as depicted in FIG. 30.

It will be appreciated that the new IPv4 Header Options, although primarily indicated as having specific numbers, may use any other suitable numbers (e.g., any suitable numbers assigned from the unallocated values in IANA registry).

Figure 31:
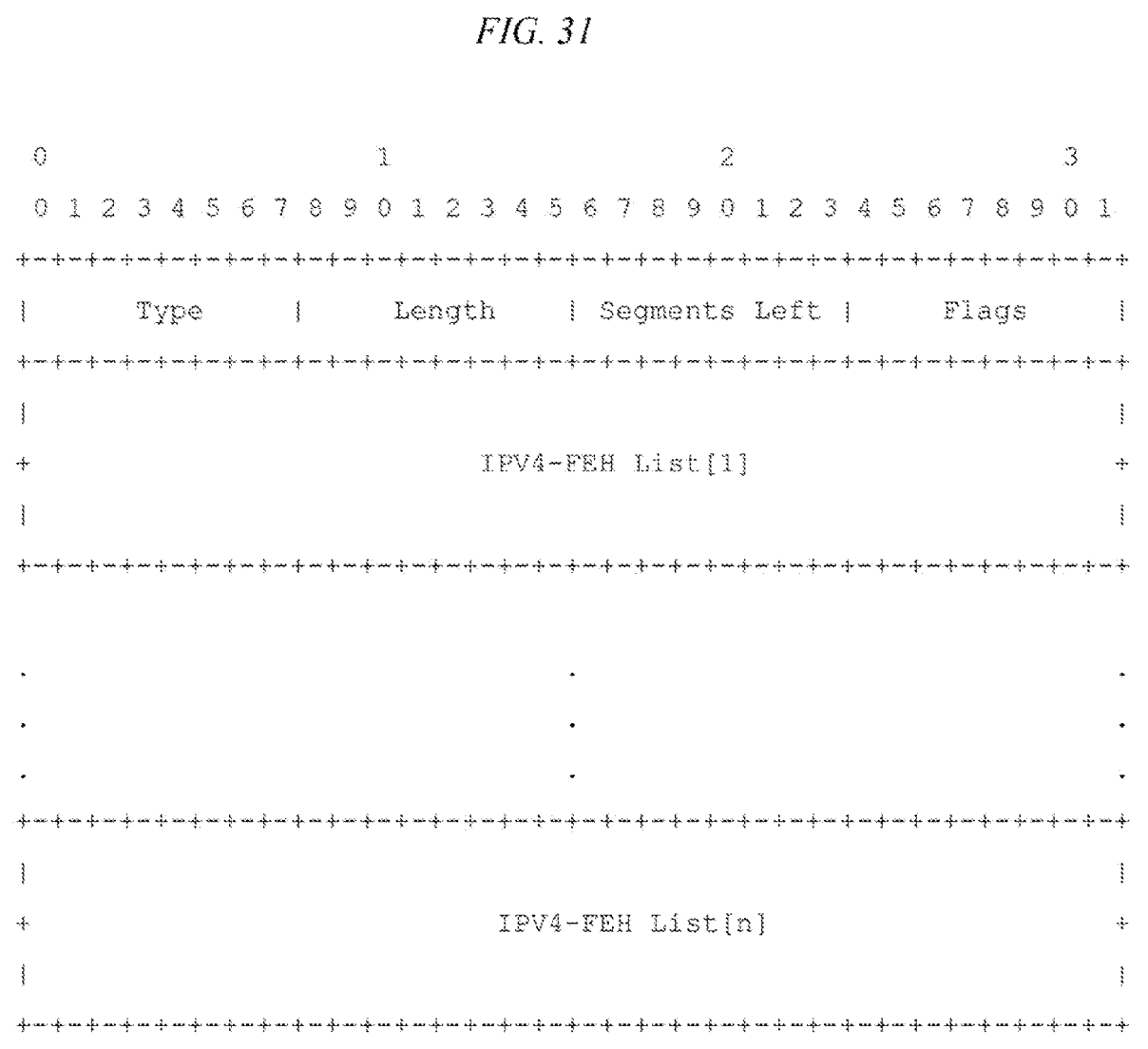

In at least some embodiments, the IPv4 Header Options for encoding of the IPV4-FEH may be formatted as depicted in FIG. 31.

The IPV4 Header Options for encoding of the IPV4-FEH, as depicted in FIG. 31, includes a Type field, a Length field, a Segments Left field, a Flags field, and an IPV4-FEH List (from IPV4-FEH List[1] to IPV4-FEH List[n]).

The Type field of the IPv4 Header Options is a 1-octet field that indicates FEH-LSR or FEH-SSR type option in tuples of COPY, CLASS and NUMBER.

The Length field of the IPv4 Header Options is a 1-octet field that indicates length of this option (including the Type octet, the Length octet, the Segments Left octet, the Flags octet, and all octets of the IPV4-FEH-List.

The Segments Left field of the IPv4 Header Options is a 1-octet field that includes the index, in the IPV4-FEH List, of the next hop to inspect. The Segments Left value is decremented at each IPV4-FEH. If the Segments Left field in the Option is 0, the source route is considered as empty (and the recorded route is full) and the routing is to be based on the Destination Address field in the IPv4 Header. If the address in Destination Address field has been reached and the Segments Left is not 0, the next IPV4-FEH indexed by the Segments Left field is processed and the forwarding decision is made based on that IPV4-FEH.

The Flags field of the IPv4 Header Options is a 1-octet field that includes a set of one-bit flags configured to indicate various capabilities. The Flags field of the IPv4 Header Options has the format as depicted in FIG. 32. The 1-octet Flags field, as depicted in FIG. 32, includes a set of one-bit flags including an O Flag and a U Flag. The O Flag is the operations and management (OAM) flag which is configured such that, if set (e.g., equal to "1"), then it indicates that this packet is an OAM packet. The U Flag is unused and for future use and, thus, should be unset on transmission and ignored on receipt.

The IPV4-FEH List is a list of n IPV4-FEHs (denoted as IPV4-FEH List[1] to IPV4-FEH List[n]). In the list, IPV4-FEH List[n] is the IPV4-FEH that represents n-th element in the IPV4-FEH list. The IPV4-FEH list is encoded starting from the last hop of the path (i.e., the first element of the IPV4-FEH List (IPV4-FEH List [1]) includes the last hop of the path while the last hop of the IPV4-FEH List (IPV4-FEH List[n]) includes the first hop of the path). The index in the "Segments Left" field identifies the current hop. An IPV4-FEH is 8-octets in size and is defined as depicted in FIG. 33.

Figures 33, 34:
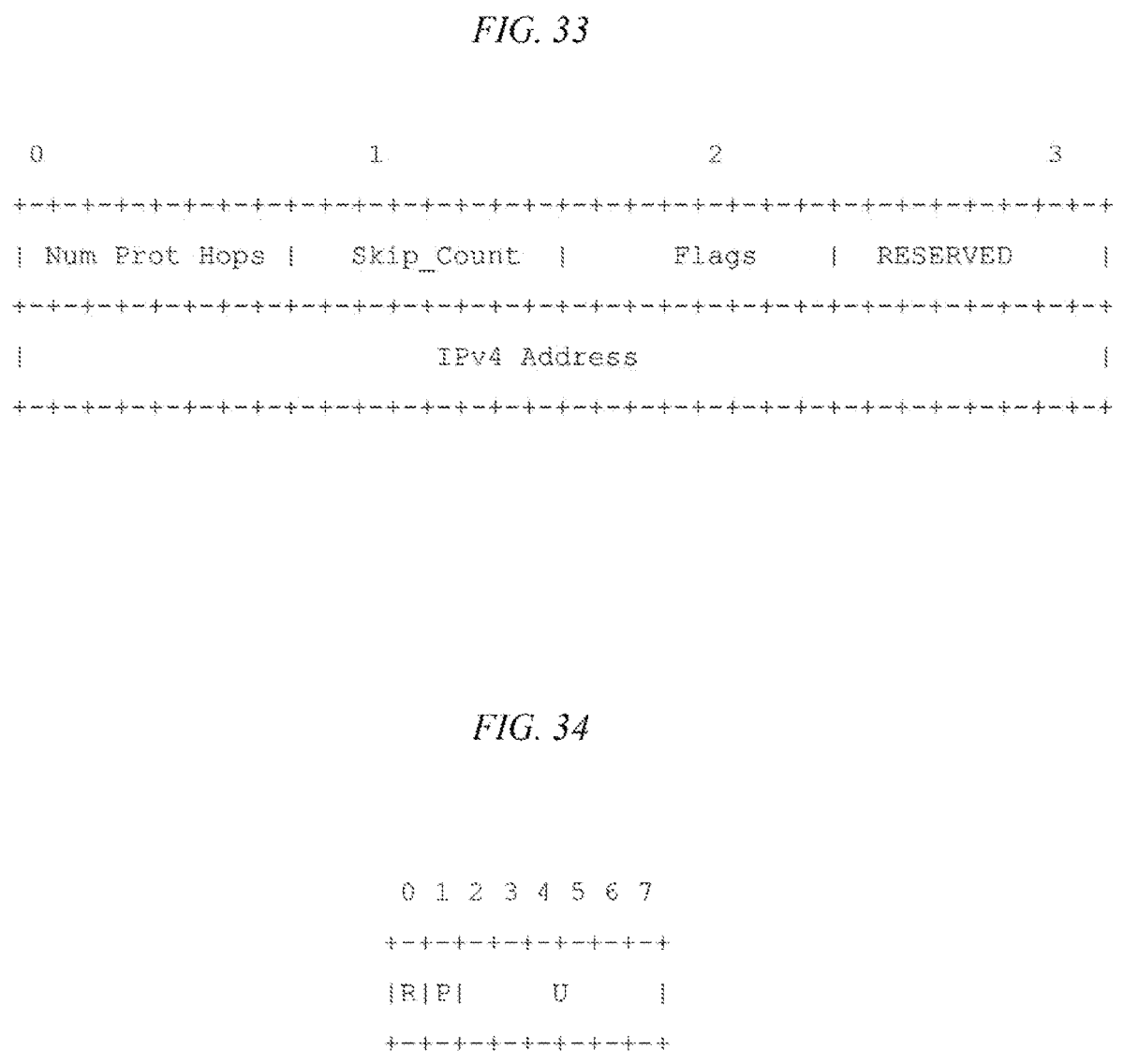

The IPV4-FEH List, depicted in FIG. 31, is a list of n IPV4-FEHs where each of the IPV4-FEHs in the list of IPV4-FEHs is formatted as depicted in FIG. 33. The 8-octet IPV4-FEH includes a Number of Protection Hops field, a Skip_Count field, a Flags field, a RESERVED field, and an IPv4 Address field.

The Number of Protection Hops field of the IPV4-FEH is a 1-octet field that indicates the number of subsequent IPV4-FEHs that are protecting this IPV4-FEH. If the value of the Number of Protection Hops field is set to a value of one "1"), then it means that the subsequent IPV4-FEH immediately following that IPV4-FEH identifies the protection path of that IPV4-FEH. If the value of the Number of Protection Hops field is set to 0, then it means that there is no protection path for that IPV4-FEH. Additionally, if the IPV4-FEH belongs to a protection path then the value of the Number of Protection Hops field will be set to 0 (since the protection path itself is not protected).

The Skip_Count field of the IPV4-FEH is a 1-octet field that indicates the number of subsequent IPV4-FEHs to be skipped after processing this IPV4-FEH. This is set to 0 for all IPV4-FEHs, except for the IPV4-FEH which includes the protection path address of the protection path.

The Flags field of the IPV4-FEH is a 1-octet field that includes a set of one-bit flags configured to indicate various capabilities. The Flags field of the IPV4-FEH has the format as depicted in FIG. 34. The 1-octet Flags field, as depicted in FIG. 34, includes an R Flag, a P Flag, and a U Flag. The R Flag is a Recorded Route bit that indicates that this IPV4-FEH has been traversed by the source routed packet (and is set to 0 by the originator of this IPV4-FEH). The P Flag is a protected flag that indicates that this hop is part of a protection path. The U Flag is unused and for future use and, thus, unset on transmission and ignored on receipt.

The RESERVED field of the IPV4-FEH is unused and is reserved for future use. This should be unset on transmission and ignored on receipt.

The IPv4 Address field of the IPV4-FEH includes the 32-bit IPv4 Address representing a hop in primary path or a protection path address identifying a protection path for a hop of the primary path, and should not be a multicast address.

It is noted that the encoding and processing rules may be the same for FEH-LSR and FEH-SSR; however, for purposes of clarity, various example embodiments for supporting flow-specific fast rerouting of source routed packets for flow-specific FRR in IPv4-based source routing are primarily presented herein in terms of FEH-SSR.

Various example embodiments for supporting flow-specific fast rerouting of source routed packets for flow-specific FRR in IPv4-based source routing are configured to support appending of FEH-LSR and FEH-SSR to the IPv4 Header by the head-end router.

The head-end router may be configured to perform the following operations while appending FEH-SSR to the IPv4 Header.

The DA in IPv4 Header is set with the IPv4 Address of the first primary hop in the explicit path. The original DA in the IPv4 Header is preserved in IPV4-FEH[1] (as discussed further below).

The Length field in FEH-SSR is set to the total number of octets in Type, Length, Segments Left, Flags and IPV4-FEH-List.

The Segments Left field is set to n, where n is the number of elements in the IPV4-FEH List.

The IPV4-FEH List is encoded in the reverse order of the path. Let n be the number of IPV4-FEH entries. The IPV4-FEH[1] is the last hop in the primary path (the final DA of the source routed packet) and the IPV4-FEH[n] is the first hop. The entries in the list are ordered in units of sub-groups, where each subgroup contains an IPV4-FEH for a primary-hop followed by the IPV4-FEH entry including the protection path address for the associated protection path. This is further explained as follows.

When encoding the IPV4-FEH List, if IPV4-FEH List[x] is an unprotected primary hop, then IPV4-FEH List[x] is encoded with Num_Protection Hops=0, Skip_Count=0, and Flags=0 to indicate that no protection path follows after this entry and, thus, IPV4-FEH List[x−1] is the subsequent primary hop.

When encoding the IPV4-FEH List, if IPV4-FEH List[x] is a protected primary hop, then the protection path address of the protection path also is encoded (in the IPV4-FEH List[x−1] entry). The IPV4-FEH List[x] entry is encoded with Num_Protection_Hops=1, Skip_Count=0, and Flags=0, which means that IPV4-FEH List[x−1] is composed of the protection path address indicative of the protection path. Subsequent primary hops start at IPV4-FEH List[x−2]. The IPV4-FEH List[x−1] entry is encoded with Num_Protection_Hops=0, because the protection path is not protected. The IPV4-FEH List[x−1] entry is encoded with the P Flag set to 1. The IPV4-FEH List[x−1] entry is encoded with Skip_Count=C, where C is the number of subsequent primary hops to be skipped (i.e., from IPV4-FEH List [x−2] through IPV4-FEH List[x-2-c]) if the source routed packet is being forwarded on a node protection path.

It is noted that this encoding rule may be iterated over each sub-group of the IPV4-FEH List (i.e., where each sub-group is an FPPE).

The head-end router then sends the source routed packet toward the DA indicated in the source routed packet.

The appending of the FEH-SSR to the IPv4 Header may be further understood by way of reference to the following example. For example, consider the path for flow A in FIG. 17, as follows: E(A)={IP-12, [IP-24, P(A,R4), 1], IP-47, IP-79} where P(A,R4) is the protection path={IP-23, IP-35, IP-57} that is indicted by the protection path address IP-2357. In this example, the source routed path (denoted as SR(A)) is encoded on a packet from source S to destination D as depicted in FIG. 35.

Various example embodiments for supporting flow-specific FRR of source routed packets based on path compression for flow-specific FRR in IPv4-based source routing are configured to support processing of FEH-LSR and FEH-SSR of the IPv4 Header by the transit router.

The transit router may be configured to perform the following operations while processing the FEH-SSR of the IPv4 Header.

It is noted that the node that is supposed to inspect the FEH-SSR option is the node corresponding to DA of the source routed packet. The other transit nodes should not inspect these options and should forward the source routed packet toward the DA according to the IPv4 Routing Table.

The transit router corresponding to the DA, upon receiving the FEH-SSR of the IPv4 Header, may process the FEH-SSR of the IPv4 Header as follows.

If Segments Left=0, the next layer in the source routed packet, whose type is identified by the Protocol Field in the IPv4 Header, is processed.

If Segments Left≠0, then i is set equal to the index of the next IPV4-FEH to be visited in the IPV4-FEH list (=Segments Left). The Segments Left value is decremented by 1. From this point on, the Segments Left value points to IPV4-FEH[i−1]. The IPV4-FEH[i] is processed as discussed further below.

If the address of the IPV4-FEH[i] is a multicast address, then the source routed packet may be discarded.

If the address of the IPV4-FEH[i] is a path address, then the source routed packet may be discarded.

If the address of IPV4-FEH[i] is a not multicast address, then IPV4-FEH[i] is further processed as follows: (1) if the TTL in the IPv4 Header is less than or equal to 1, swap the IPv4 DA and Address of IPV4-FEH[i], set the R Flag in IPV4-FEH[i]=1 to indicate that it has been traversed by the source routed packet, send an ICMP Time Exceeded—TTL Exceeded in Transit message to the source address and discard the source routed packet or (2) if the TTL in the IPv4 Header is not less than or equal to 1, then IPV4-FEH[i] is further processed by checking the reachability of the address of IPV4-FEH[i].

If the address of IPV4-FEH[i] is reachable, swap the IPv4 DA and the IPv4 address of IPV4-FEH[i] and set the R Flag in IPV4-FEH[i]=1 to indicate that this hop has been traversed by the source routed packet. The following processing is performed: (1) if Num_Protection_Hops in IPV4-FEH [i]>0, decrement Segments Left by Num_Protection_Hops in IPV4-FEH[i] (this means that the hops in protection path have been skipped since the source routed packet is not being forwarded along the protection path) or (2) if Skip_Count in IPV4-FEH[i]>0, decrement Segments Left by Skip_Count in IPV4-FEH[i] (this means that the hops in the primary path have been skipped, i.e., bypassed by the protection path). The source routed packet is then resubmitted to the IPv4 module for transmission to the new destination.

If the address of IPV4-FEH[i] is not reachable and if the Num_Protection_Hops in IPV4-FEH[i]=0 (this means that the hop is neither operational nor protected and, thus, that the packet cannot be forwarded), the IPv4 DA and the address of IPV4-FEH[i] are swapped, the R Flag in IPV4-FEH[i] is set equal to 1 to indicate that this hop has been traversed by the source routed packet, an ICMP Unreachable message (including a snapshot of the IPv4 Header) is sent to the Source Address, and the packet is discarded. The transit router may choose to remove the IPv4 Header Option (i.e., FEH-LSR/SSR Option) from the snapshot of the IPv4 header. If the IPv4 Header Option is removed, then the original IPv4 DA is restored from the IPV4-FEH[1] since the source is now unaware that source routing is being used.

If the address of IPV4-FEH[i] is not reachable and if Num_Protection_Hops in IPV4-FEH[i] !=0 (this means that the hop is unreachable but is protected, so the source routed packet is to be fast-rerouted via protection path), the Segments Left value is decremented by 1 (such that it now points to IPV4-FEH[i−2]), the IPv4 DA address and the address of IPV4-FEH[i−1](i.e., the first entry in the protection path) are swapped, the R Flag in IPV4-FEH[i−1] is set equal to 1 to indicate that this hop has been traversed by the source routed packet, and the source routed packet is then resubmitted to the IPv4 module for transmission to the new destination.

If the address of IPV4-FEH[i−1] is a path address, then the following processing is performed. The protection path address is looked up in the IPv4 Path Address Table to determine the IPv4 address hop list of the protection path. Here, assume that the hop list of the protection path includes P hops as follows: {H1, H2, H3, . . . , Hp}. The IPV4-FEH [i−1] is replaced with {H2, H3, . . . Hp}, with each of the hops being encoded using an IPV4-FEH, respectively. The IPV4-FEH[i−1] is encoded with Hp and IPV4-FEH[i+p−2] is encoded with H2. The Segments_Left field is updated to point to the IPV4-FEH[i+p−2]. The DA is recorded at IPV4-FEH[i+p−1]. The R Flag is set equal to one in IPV4-FEH[i+p−1], to indicate that it has been traversed by the source routed packet. The DA in the IPv4 header is set to H1 (i.e., the first hop in the protection path, as this is the next hop for the source routed packet).

It is noted that the encoding and processing rules may be the same for FEH-LSR and FEH-SSR; however, for purposes of clarity, various example embodiments for supporting flow-specific FRR of source routed packets based on path compression for flow-specific FRR in IPv4-based source routing are primarily presented herein in terms of FEH-SSR.

Various example embodiments for supporting flow-specific fast rerouting of source routed packets for flow-specific FRR in IPv4-based source routing, based on use of Options, may be further understood by considering an example in which source router R1 sends a packet from source S to destination D with explicit path E(A).

The source node, as described above, sends a source routed packet including a source route that includes an explicit encoding of the hops of the source routed path and an explicit encoding of a protection path address indicative of a protection path configured to protect one of the hops of the source routed path.

The source node inserts an FPPE in order to include an IPV4-FEH in an IPv4 source routed path.

In the case of flow A, for example, the encoding of an FPPE including IPV4-FEH=[IP-24, (P=1, C=1), IP-2357] is as depicted in FIG. 36.

In the case of flow A, for example, the source route SR(A) included in the source routed packet sent by R1 to R2 is configured as depicted in FIG. 37.

A receiver that receives an FPPE (i.e., Segments Left points to the first IPV4-FEH of FPPE) may process the IPV4-FEHs of the FPPE as follows. The receiver processes the first hop in the FPPE, which is an IPV4-FEH of the protected hop. The IPV4-FEH of the protected hop includes an IPv4 address of the protected hop. The receiver looks up the IPv4 address of the protected hop in the IPv4 Route Table to get the next-hop/forwarding information (denoted as NH) of the protected hop. The IPV4-FEH of the protected hop is removed from the list of IPV4-FEHs of the source routed packet. The Num_Protection_Hops value is read from the IPV4-FEH of the protected hop (in this case, since the first hop is a protected hop that is protected by a protection path, the Num_Protection_Hops value is set to one ("1") to indicate that the next IPV4-FEH of the FPPE includes the protection path address of the protection path for the protected hop. A determination is made as to whether the next-hop (NH) is operational. If the NH is operational, the number of IPV4-FEHs specified by the Num_Protection_Hops value is removed from the list of IPV4-FEHs of the source routed packet (thereby removing the IPV4-FEH of the protection path from the list of IPV4-FEHs of the source routed packet, since it is not going to be used) and the source routed packet is forwarded to the NH. If the NH is not operational, the subsequent hop (which includes a protection path address identifying the protection path) is processed and used to initiate fast rerouting of the source routed packet using the protection path. The hops of the protection path and actions to be performed for fast rerouting along the protection path are determined based on a table lookup using the protection path address (e.g., the IPV4-FEH of the protection path is removed from the list of IPV4-FEHs of the source routed packet, the hops of the protection path with the exception of the first hop of the protection path are encoded within the list of IPV4-FEHs of the source route in the source routed packet, and the next-hop/forwarding information of the first hop of the protection path (denoted as NH2) is determined). The Segments Left value is adjusted to point to the IPV4-FEH that encodes the second hop of the protection path. The source routed packet is then handled based on whether NH2 is operational (either the source routed packet is forwarded to NH2 as an FRR operation if NH2 is operational or the source routed packet is dropped if NH2 is not operational).

The operation of R2 upon receiving the source routed packet, including the source route SR(A), from R1 depends on whether the R2→R4 link is forwarding.

R2, upon receiving a packet with SR(A) and DA=IP-12 from R1 when the R2→R4 link is forwarding (the R2→R4 link is active and R4 is active), processes the first hop, which is IPV4-FEH [4]={[IP-24, P=1, S=0]}, as follows: (1) R2 performs an IPv4 Route Table lookup using IP-24, which results in forward action on the R2→R4 link, (2) R2 determines that R2→R4 is forwarding and, thus, ignores the Protection Path IPV4-FEH [3] and updates Segments Left=2 (namely, the hop for IP-47 and the hop for IP-79), (3) R2 swaps the DA and IPV4-FEH[4], marks the R Flag (Recorded Route) to 1, and sets the new DA=IP-24 (i.e., the next hop in the source routed path), and (4) R2 sends the source routed packet on the R2→R4 link with the format for SR(A) as depicted in FIG. 38.

R2, upon receiving a packet with SR(A) and DA=IP-12 from R1 when the R2→R4 link is not forwarding (the R2→R4 link has failed or R4 has failed), processes the first hop, which is IPV4-FEH [4]={[IP-24, P=1, S=0]}, as follows: (1) R2 performs an IPv4 Route Table lookup using IP-24, which results in forward action on the R2→R4 link, (2) R2 determines that R2→R4 is not forwarding, (3) R2 determines that R2→R4 has a protection path and decides to fast reroute the source routed packet along the protection path, (4) R2 processes the protection path, which is IPV4-FEH [3]={[IP-2357, P=0, S=1], including looking up the protection path address (namely, IP-2357) in the IPv4 Path Address Table, which results in expansion of each of the hops of the protection path with the exception of the first hop of the protection path into the source route of the source routed packet (namely, the protection path address {IP-2357} is replaced with the addresses {IP-23, IP-57}) and a forwarding action on the next-hop identified by the first hop of the protection path (identified by IP-23, which is R2→R3), (5) R2 swaps the DA and IPV4-FEH[4], marks the R Flag (Recorded Route) to 1, and sets the new DA=IP-23 (i.e., the first hop of the protection path), (6) R2 updates Segments Left to point to first hop in the encoded protection path (i.e., IPV4-FEH[4]) and carries the Skip_Count received in the Protection Path IPV4-FEH over to the last hop in the expanded protection path (i.e., IPV4-FEH[3]), and (7) R2 sends the source routed packet on R2→R3 link with the format for SR(A) as depicted in FIG. 39.

Various example embodiments for supporting flow-specific FRR of source routed packets based on path compression for IPV4-based source routing, as indicated above, may be configured to support encoding of the IPV4-FEH using new IPv4 Header Options in various other ways.

Various example embodiments for supporting flow-specific FRR of source routed packets based on path compression in IPV4-based source routing may be configured to support encoding of the IPV4-FEH using an IP-Shim Layer Protocol.

The Internet Header Length (IHL) field in the IPv4 header has 4 bits, which represent the number of 32-bit words on the IPv4 header, including the variable number of IPv4 options. As a 4-bit field, the maximum value is 15 words (15×32 bits, or 480 bits=60 bytes). The minimum value of IHL is 5 which indicates a length of 5×32=160 bits=20 bytes, i.e., the fixed size of the IPv4 header excluding the options. This means that the maximum size of the options can be 60–20=40 bytes, which limits the number of IPV4-FEHs that can be included within FEH-LSR and FEH-SSR options. In at least some embodiments, the limits imposed by the IHL field of the IPv4 header on the number of IPV4-FEHs that can be carried as Options may be removed by using a generic IP-Shim Layer.

The generic IP-Shim Layer, as indicated above, may be configured to support encoding of IPV4-FEHs in support of flow-specific FRR of source routed packets, based on path compression, for IPV4-based source routing. The generic IP-Shim Layer may be inserted between the IPv4 header and the transport/upper layer protocol header (e.g., TCP, UDP, ICMP, or the like). The IP-Shim Layer may be carried using a new IP Protocol number in the IPV4 Header, which can be reserved from the registry maintained by IANA (e.g., a value of 145 is suggested; however, any suitable numbers assigned from the unallocated values in IANA registry may be used). The IP-Shim Layer is defined as generic in that it can carry any "enhancement" related to the IP layer. It is expected that the node that is allowed to inspect the IP-Shim Header is the node corresponding to the DA of the source routed packet (or if the Router Alert Option is set in the IPv4 Header as defined in RFC 2113). The IP-Shim Layer may use the IP-Shim Header as depicted in FIG. 40.

The IP-Shim Header for use at the IP-Shim Layer, as depicted in FIG. 40, includes a Type field, a Length field, a Next Header field, and a Payload field.

The Type field of the IP-Shim Header is an 8-bit field that indicates the type of the IP-Shim header. As indicated above, the IP-Shim Protocol is defined as generic and, thus, may support multiple types. For transport of IPV4-FEHs, an IPV4-FEH type is defined (e.g., Type=1, or using any other suitable value). Herein, references to the IPV4-FEH-Shim Header will be understood to mean the IP-Shim Header having a type indicative that the IP-Shim Header is for IPV4-FEH (e.g., Type=1, or using any other suitable value).

The Length field of the IP-Shim Header is a 16-bit field that indicates the length of the payload in octets. It is noted that the octets of the Type field, the Length field, and the Next Header fields are excluded.

The Next Header field of the IP-Shim Header is an 8-bit field that indicates the IP protocol type of the header next to the IP-Shim Header (e.g., TCP, UDP, ICMP, or the like).

The Payload field of the IP-Shim Header is a variable-length field that includes the payload in a type-specific format. The Payload field of the IPV4-FEH-Shim Header is formatted as depicted in FIG. 41.

The Payload field of the IPV4-FEH-Shim Header, depicted in FIG. 41, includes a Segments Left field, a Flags field, a Reserved field, and an IPV4-FEH List (from IPV4-FEH List[1] to IPV4-FEH List[n]).

The Segments Left field of the Payload field of the IPV4-FEH-Shim Header is a 16-bit field that includes the index, in the IPV4-FEH List, of the next hop to inspect. The Segments Left value is decremented at each IPV4-FEH.

The Flags field of the Payload field of the IPV4-FEH-Shim Header is a 1-octet field that includes a set of one-bit flags configured to indicate various capabilities. The Flags field of the Payload field of the IPV4-FEH-Shim Header has the format as depicted in FIG. 42. The 1-octet Flags field, as depicted in FIG. 42, includes a set of one-bit flags including an O Flag, a C Flag, and a U Flag. The O Flag is the operations and management (OAM) flag which is configured such that, if set (e.g., equal to "1"), then it indicates that this packet is an OAM packet. The C Flag is the Carry flag which is configured such that: (1) when not set (e.g., equal to "0"), this means that the IP-Shim Header is removed when Segments Left becomes 0 and (2) when set (e.g., equal to "1"), this means that IP-Shim Header is carried forward in the source routed packet. The U Flag is unused and for future use and, thus, should be unset on transmission and ignored on receipt.

The IPV4-FEH List is a list of n IPV4-FEHs (denoted as IPV4-FEH List[1] to IPV4-FEH List[n]). In the list, IPV4-FEH List[n] is the IPV4-FEH that represents n-th element in the IPV4-FEH list. The IPV4-FEH list is encoded starting from the last hop of the path (i.e., the first element of the IPV4-FEH List (IPV4-FEH List [1]) includes the last hop of the path while the last element of the IPV4-FEH List (IPV4-FEH List[n]) includes the first hop of the path). The index in the "Segments Left" field identifies the current hop. An IPV4-FEH is 8-octets in size and is defined as depicted in FIG. 43.

The IPV4-FEH List, as depicted in FIG. 41, is a list of n IPV4-FEH where each of the IPV4-FEHs in the list of IPV4-FEHs is formatted depicted in FIG. 43. The 8-octet IPV4-FEH includes a Number of Protection Hops field, a Skip_Count field, a Flags field, a Reserved field, and an IPv4 Address field.

The Number of Protection Hops field of the IPV4-FEH is a 1-octet field that indicates the number of subsequent IPV4-FEHs that are protecting this IPV4-FEH. If the value of the Number of Protection Hops field is set to a value of one "1"), then it means that the subsequent IPV4-FEH immediately following that IPV4-FEH identifies the protection path of that IPV4-FEH. If the value of the Number of Protection Hops field is set to 0, then it means that there is no protection path for that IPV4-FEH. Additionally, if the IPV4-FEH belongs to a protection path then the value of the Number of Protection Hops field will be set to 0 (since the protection path itself is not protected).

The Skip_Count field of the IPV4-FEH is a 1-octet field that indicates the number of subsequent IPV4-FEHs to be skipped after processing this IPV4-FEH. This is set to 0 for all IPV4-FEHs, except for the IPV4-FEH which includes the protection path address of the protection path.

The Flags field of the IPV4-FEH is a 1-octet field that includes a set of one-bit flags configured to indicate various capabilities. The Flags field of the IPV4-FEH has the format as depicted in FIG. 44. The 1-octet Flags field, as depicted in FIG. 44, includes an R Flag, a P Flag, and a U Flag. The R Flag is a Recorded Route bit that indicates that this IPV4-FEH has been traversed by the source routed packet (and is set to 0 by the originator of this IPV4-FEH). The P Flag is a protected flag that indicates that this hop is part of a protection path. The U Flag is unused and for future use and, thus, unset on transmission and ignored on receipt.

The RESERVED field of the IPV4-FEH is unused and is reserved for future use. This should be unset on transmission and ignored on receipt.

The IPv4 Address field of the IPV4-FEH includes the 32-bit IPv4 Address representing a hop in primary path or a protection path address identifying a protection path for a hop of the primary path, and should not be a multicast address.

It is noted that the encoding and processing rules may be the same for FEH-LSR and FEH-SSR; however, for purposes of clarity, various example embodiments for supporting flow-specific fast rerouting of source routed packets for flow-specific FRR in IPv4-based source routing are primarily presented herein in terms of FEH-SSR.

Various example embodiments for supporting flow-specific fast rerouting of source routed packets for flow-specific FRR in IPv4-based source routing are configured to support insertion of an IPV4-FEH-Shim Header between the IPV4 Header and the upper layer(s) by the head-end router.

The head-end router may be configured to perform the following operations while inserting an IPV4-FEH-Shim Header between the IPv4 Header and the upper layer(s).

The DA in the IPv4 Header is set with the IPv4 Address of the first primary hop in the explicit path. The original DA in IPv4 Header is preserved in IPV4-FEH[1] (as discussed further below).

The Type field in the IPV4-FEH-Shim Header is set to 1.

The Length field in the IPV4-FEH-Shim is set to the total number of octets in Segments Left, Flags, RESERVED, and IPV4-FEH-List.

The Next Header field in the IPV4-FEH-Shim Header is set to the value in Protocol field in the IPv4 Header. The Protocol field in the IPv4 Header is set to a value (e.g., 145, or another suitable value) that indicates the IP-Shim as the upper layer protocol (from the perspective of the IP layer).

The Segments Left field is set to n, where n is the number of elements in the IPV4-FEH List.

The C flag in Flags field is set to a value (e.g., 0) that indicates that the last hop in the explicit hop is to remove the IPV4-FEH-Shim Header prior to further forwarding of the source routed packet.

The IPV4-FEH List is encoded in the reverse order of the path. Let n be the number of IPV4-FEH entries. The IPV4-FEH[1] is the last hop in the primary path (the final DA of the source routed packet) and the IPV4-FEH[n] is the first hop. The entries in the list are ordered in units of sub-groups, where each subgroup contains an IPV4-FEH for a primary-hop followed by the IPV4-FEH entry including the protection path address for the associated protection path.

This is further explained as follows.

When encoding the IPV4-FEH List, if IPV4-FEH List[x] is an unprotected primary hop, then IPV4-FEH List[x] is encoded with Num_Protection_Hops=0, Skip_Count=0, and Flags=0 to indicate that no protection path follows after this entry and, thus, IPV4-FEH List[x−1] is the subsequent primary hop.

When encoding the IPV4-FEH List, if IPV4-FEH List[x] is a protected primary hop, then the protection path address of the protection path also is encoded (in the IPV4-FEH List[x−1] entry). The IPV4-FEH List[x] entry is encoded with Num_Protection_Hops=1, Skip_Count=0, and Flags=0, which means that IPV4-FEH List[x−1] is composed of the protection path address indicative of the protection path. Subsequent primary hops start at IPV4-FEH List[x−2]. The IPV4-FEH List[x−1] entry is encoded with Num_Protection_Hops=0, because the protection path is not protected. The IPV4-FEH List[x−1] entry is encoded with the P Flag set to 1. The IPV4-FEH List[x−1] entry is encoded with Skip_Count=C, where C is the number of subsequent primary hops to be skipped (i.e., from IPV4-FEH List [x−2] through IPV4-FEH List[x−2-c]) if the source routed packet is being forwarded on a node protection path.

It is noted that this encoding rule may be iterated over each sub-group of the IPV4-FEH List.

The head-end router then sends the packet toward the DA indicated in the source routed packet.

The insertion of an IPV4-FEH-Shim Header between the IPv4 Header and the upper layer(s) by the head-end router may be further understood by way of reference to the following example. For example, consider the path for flow A in FIG. 17, as follows: E(A)={IP-12, [IP-24, P(A,R4), 1], IP-47, IP-79} where P(A,R4) is the protection path={IP-23, IP-35, IP-57}. In this example, the path is encoded on a packet from source S to destination D (here, the upper layer is TCP and, thus, the Protocol field in the IPv4 Header before encoding the path was 6) as depicted in FIG. 45.

In the example above, it is noted that the IP-Shim Header is inserted between IPv4 Header and TCP Header. As a result, Protocol in the IPv4 Header becomes 145 (=IP-Shim Protocol) and the Next-Header in IP-Shim Header becomes 6(=TCP).

Various example embodiments for supporting flow-specific fast rerouting of source routed packets for flow-specific FRR in IPv4-based source routing are configured to support processing of the IPV4-FEH-Shim Header of the IPv4 Header by the transit router.

The transit router may be configured to perform the following operations while processing the IPV4-FEH-Shim Header of the IPv4 Header.

It is noted that, as stipulated in the IP-Shim Layer definition, the node that is supposed to inspect the IP-Shim Header is the node corresponding to DA of the source routed packet (or if the Router Alert Option is set in the IPv4 Header as defined in RFC 2113); however, since the IPV4-FEH-Shim Header is not sent with Router Alert Option, the node that is allowed to inspect IPV4-FEH-Shim Header will be the node corresponding to DA of the source routed packet. The other transit nodes should not inspect the IPV4-FEH-Shim Header and should forward the source routed packet toward the DA according to the IPv4 Routing Table.

The transit router corresponding to the DA, upon receiving the IPV4-FEH-Shim Header of the IPv4 Header, may process the IPV4-FEH-Shim Header of the IPv4 Header as follows.

If Segments Left=0, the next layer in the source routed packet, whose type is identified by the Next Header field in the IPV4-FEH-Shim Header, is processed.

If Segments Left f 0, then i is set equal to the index of the next IPV4-FEH to be visited in the IPV4-FEH list (=Segments Left). The Segments Left value is decremented by 1. From this point on, the Segments Left value points to IPV4-FEH[i−1]. The IPV4-FEH[i] is processed as discussed further below.

If the address of IPV4-FEH[i] is a multicast address, then the source routed packet may be discarded.

If the address of the IPV4-FEH[i] is a path address, then the source routed packet may be discarded.

If the address of IPV4-FEH[i] is a not multicast address, then IPV4-FEH[i] is further processed based on the TTL in the IPv4 Header as follows.

If the TTL in the IPv4 Header is less than or equal to 1, the following actions are performed. The IPv4 DA and the Address of IPV4-FEH[i] are swapped. The R Flag in IPV4-FEH[i] is set equal to 1 to indicate that it has been traversed by the source routed packet. If the C Flag in the IPV4-FEH-Shim Header=0, then swap the IPv4 DA and the Address of IPV4-FEH[1], restore the Protocol Field in the IPv4 Header from the Next Header field in the IPV4-FEH-Shim Header, and remove the IPV4-FEH-Shim Header. An ICMP Time Exceeded—TTL Exceeded in Transit message (including a snapshot of the IPv4 Header including the original destination address, since the source is unaware that source routing is being used) is sent to the source address and the source routed packet is discarded.

If the TTL in the IPv4 Header is not less than or equal to 1, then IPV4-FEH[i] is further processed by checking reachability of the address of IPV4-FEH[i].

If the address of IPV4-FEH[i] is reachable, swap the IPv4 DA and the IPv4 address of IPV4-FEH[i] and set the R Flag in IPV4-FEH[i]=1 to indicate that this hop has been traversed by the source routed packet. The following processing is performed: (1) if Num_Protection_Hops in IPV4-FEH [i]>0, decrement Segments Left by Num_Protection_Hops in IPV4-FEH[i] (this means that the hops in protection path have been skipped since the source routed packet is not being forwarded along the protection path) or (2) if Skip_Count in IPV4-FEH[i]>0, decrement Segments Left by Skip_Count in IPV4-FEH[i] (this means that the hops in the primary path have been skipped, i.e., bypassed by the protection path). If Segments Left=0 and the C Flag in the IPV4-FEH-Shim Header=0, restore the Protocol field in the IPv4 Header from the Next Header field in the IPV4-FEH-Shim Header and remove the IPV4-FEH-Shim Header. The source routed packet is then resubmitted to the IPv4 module for transmission to the new destination.

If the address of IPV4-FEH[i] is not reachable and if the Num_Protection_Hops in IPV4-FEH[i]=0 (this means cannot forward the source routed packet as there is no protection path), the IPv4 DA address and the address of IPV4-FEH[i] are swapped and the R Flag in IPV4-FEH[i] is set equal to 1 to indicate that this hop has been traversed by the source routed packet.

If the C Flag in the IPV4-FEH-Shim Header=0, restore the Protocol field in the IPv4 Header from the Next Header field in the IPV4-FEH-Shim Header and remove the IPV4-FEH-Shim Header. An ICMP Unreachable message is sent to the Source Address (including a snapshot of the IPv4 Header including the original destination address, since the source is unaware that source routing is being used) and the source routed packet is discarded.

If the address of IPV4-FEH[i] is not reachable and if Num_Protection_Hops in IPV4-FEH[i] !=0 (this means the next-hop is protected by a protection path and need to forward the source routed packet the source routed packet on protection path), then the Segments Left value is decremented by 1 (such that it now points to IPV4-FEH[i−2]), the IPv4 DA address and the address of IPV4-FEH[i−1] (i.e., the first entry in the protection path) are swapped, and the R Flag in IPV4-FEH[i−1] is set equal to 1 to indicate that this hop has been traversed by the source routed packet. If Segments Left=0 and the C Flag in the IPV4-FEH-Shim Header=0, restore the Protocol field in the IPv4 Header from the Next Header field in the IPV4-FEH-Shim Header and remove the IPV4-FEH-Shim Header. The source routed packet is then resubmitted to the IPv4 module for transmission to the new destination.

If the address of IPV4-FEH[i−1] is a path address, then the following processing is performed. The protection path address is looked up in the IPv4 Path Address Table to determine the IPv4 address hop list of the protection path. Here, assume that the hop list of the protection path includes P hops as follows: {H1, H2, H3, . . . , Hp}. The IPV4-FEH [i−1] is replaced with {H2, H3, . . . Hp}, with each of the hops being encoded using an IPV4-FEH, respectively. The IPV4-FEH[i−1] is encoded with Hp and IPV4-FEH[i+p−2] is encoded with H2. The Segments_Left field is updated to point to the IPV4-FEH[i+p−2]. The DA is recorded at IPV4-FEH[i+p−1]. The R Flag is set equal to one in IPV4-FEH[i+p−1], to indicate that it has been traversed by the source routed packet. The DA in the IPv4 Header is set to H1 (i.e., the first hop in the protection path, as this is the next hop for the source routed packet).

Various example embodiments for supporting flow-specific FRR of source routed packets for flow-specific FRR based on path compression in IPv4-based source routing, based on use of an IP-Shim layer, may be further understood by considering an example in which source router R1 sends a packet from source S to destination D with explicit path E(A). Here, the upper layer is TCP and, thus, the Protocol field in the IPv4 Header before encoding the path was 6.

The source node, as described above, sends a source routed packet including a source route that includes an explicit encoding of the hops of the source routed path and an explicit encoding of a protection path address indicative of a protection path configured to protect one of the hops of the source routed path.

The source node inserts an FPPE in order to include an IPV4-FEH in an IPv4 source routed path.

In the case of flow A, for example, the encoding of an FPPE including IPV4-FEH=[IP-24, (P=1, C=1), IP-2357] is as depicted in FIG. 46.

In the case of flow A, for example, the source route SR(A) included in the source routed packet sent by R1 to R2 is configured as depicted in FIG. 47.

A receiver that receives an FPPE (i.e., Segments Left points to the first IPV4-FEH of the FPPE) may process the IPV4-FEHs of the FPPE as follows. The receiver processes the first hop in the FPPE, which is an IPV4-FEH of the protected hop. The IPV4-FEH of the protected hop includes an IPv4 address of the protected hop. The receiver looks up the IPv4 address of the protected hop in the IPv4 Route Table to get the next-hop/forwarding information (denoted as NH) of the protected hop. The IPV4-FEH of the protected hop is removed from the list of IPV4-FEHs of the source routed packet. The Num_Protection_Hops value is read from the IPV4-FEH of the protected hop (in this case, since the first hop is a protected hop that is protected by a protection path, the Num_Protection_Hops value is set to one ("1") to indicate that the next IPV4-FEH of the FPPE includes the protection path address of the protection path for the protected hop. A determination is made as to whether the next-hop (NH) is operational. If the NH is operational, the number of IPV4-FEHs specified by the Num_Protection_Hops value is removed from the list of IPV4-FEHs of the source routed packet (thereby removing the IPV4-FEH of the protection path from the list of IPV4-FEHs of the source routed packet, since it is not going to be used) and the source routed packet is forwarded to the NH. If the NH is not operational, the subsequent hop (which includes a protection path address identifying the protection path) is processed and used to initiate fast rerouting of the source routed packet using the protection path. The hops of the protection path and actions to be performed for fast rerouting along the protection path are determined based on a table lookup using the protection path address (e.g., the IPV4-FEH of the protection path is removed from the list of IPV4-FEHs of the source routed packet, the hops of the protection path with the exception of the first hop of the protection path are encoded within the list of IPV4-FEHs of the source route in the source routed packet, and the next-hop/forwarding information of the first hop of the protection path (denoted as NH2) is determined). The Segments Left value is adjusted to point to the IPV4-FEH that encodes the second hop in the protection path. The source routed packet is then handled based on whether NH2 is operational (either the source routed packet is forwarded to NH2 as an FRR operation if NH2 is operational or the source routed packet is dropped if NH2 is not operational).

The operation of R2 upon receiving the source routed packet, including the source route SR(A), from R1 depends on whether the R2→R4 link is forwarding.

R2, upon receiving a packet with SR(A) and DA=IP-12 from R1 when the R2→R4 link is forwarding (the R2→R4 link is active and R4 is active), processes the first hop, which is IPV4-FEH [4]={[IP-24, P=1, S=0]}, as follows: (1) R2 performs an IPv4 Route Table lookup using IP-24, which results in forward action on the R2→R4 link, (2) R2 determines that R2→R4 is forwarding and, thus, ignores the Protection Path IPV4-FEH [3] and updates Segments Left=2 (namely, the hop for IP-47 and the hop for IP-79), (3) R2 swaps the DA and IPV4-FEH[4], marks the R Flag (Recorded Route) to 1, and sets the new DA=IP-24 (i.e., the next hop in the source routed path), and (4) R2 sends the source routed packet on the R2→R4 link with the format for SR(A) as depicted in FIG. 48.

R2, upon receiving a packet with SR(A) and DA=IP-12 from R1 when the R2→R4 link is not forwarding (the R2→R4 link has failed or R4 has failed), processes the first hop, which is IPV4-FEH [4]={[IP-24, P=1, S=0]}, as follows: (1) R2 performs an IPv4 Route Table lookup using IP-24, which results in forward action on the R2→R4 link, (2) R2 determines that R2→R4 is not forwarding, (3) R2 determines that R2→R4 has a protection path and decides to fast reroute the source routed packet along the protection path, (4) R2 processes the protection path, which is IPV4-FEH [3]={[IP-2357, P=0, S=1], including looking up the protection path address (namely, IP-2357) in the IPv4 Path Address Table, which results in expansion of each of the hops of the protection path with the exception of the first hop of the protection path into the source route of the source routed packet (namely, the protection path address {IP-2357} is replaced with the addresses {IP-23, IP-57}) and a forwarding action on the next-hop identified by the first hop of the protection path (identified by IP-23, which is R2→R3), (5) R2 swaps the DA and IPV4-FEH[4], marks the R Flag (Recorded Route) to 1, and sets the new DA=IP-23 (i.e., the first hop of the protection path), (6) R2 updates Segments Left to point to first hop in the encoded protection path (i.e., IPV4-FEH[4]) and carries the Skip_Count received in the Protection Path IPV4-FEH over to the last hop in the expanded protection path (i.e., IPV4-FEH[3]), and (7) R2 sends the source routed packet on R2→R3 link with the format for SR(A) as depicted in FIG. 49.

Various example embodiments for supporting flow-specific FRR of source routed packets based on path compression in IPV4-based source routing, as indicated above, may be configured to support encoding of the IPV4-FEH using an IP-Shim Layer in various other ways.

It will be appreciated that various example embodiments for supporting flow-specific FRR of source routed packets may be configured to support flow-specific FRR of source routed packets, based on path compression, in IPv4-based source routing in various other ways.

Various example embodiments for supporting flow-specific FRR of source routed packets may be configured to support flow-specific FRR of source routed packets, based on path compression, in IPv6-based source routing.

Various example embodiments for supporting flow-specific FRR of source routed packets based on path compression in IPv6-based source routing are configured to enable the PLR to perform fast reroute along flow-specific protection paths (i.e., one-to-one protection) while maintaining a flow-agnostic approach at the PLR, obviate the need for a PLR to preprogram protection paths into the data plane (thereby reducing data plane complexity and states in the PLR and transit nodes), support both link and node protection for source routed packets, provide extensions to IPv6 source routing capabilities, or the like, as well as various combinations thereof.

Various example embodiments for supporting flow-specific FRR of source routed packets based on path compression in IPv6-based source routing may be configured to encode a protection path using a single IPV6-FEH, irrespective of the size (e.g., number of hops) of the protection path. The single IPV6-FEH denoting the protection path is a special address which may be referred to herein as a protection path address. The protection path address is locally significant to the PLR, which is the head-end node for the protection path (and, thus, the protection path address is allocated from the address space of the PLR). The protection path address is removed from the source routed packet at the PLR when the source routed packet is forwarded along the primary path without being fast rerouted. The protection path address is translated into the set of hops of the protection path at the PLR (e.g., the protection path is expanded onto the source routed packet, such as by pushing IPv6 addresses of the hops of the protection path onto the source routed packet) when the PLR fast reroutes the source routed packet on the protection path (e.g., a failure of the protected hop). In this manner, the hops of the protection path may be obtained from the source routed packet when needed and are only explicitly encoded within the source routed packet when needed to perform a fast reroute operation (such that bandwidth needed to explicitly encode the hops of the protection path within the source routed packet is only used when the protection path is used, rather than being consumed for every source routed packet irrespective of a need to fast reroute the source routed packet). The protection address list including the protection path address for a protection path, as discussed further below, may be of a fixed size (e.g., of 2×IPV6-FEHs (=1×IPV6-FEH for the protected hop+1×IPV6-FEH for the protection path). In this manner, the overhead of the protection path in a source route is reduced from O(P) to O(1), where P is the number of hops in the protection path.

Various example embodiments for supporting flow-specific FRR of source routed packets based on path compression in IPv6-based source routing may be configured to support one or more of a generic concept of one-to-one (flow specific) FRR for source routed packets using a protection path address (a single IPv6 address), capabilities for compression of a FRR protection path in an IPv6 encoded source route using a protection path address scheme, capabilities for path address management by routers (e.g., in IS-IS, OSPFv3, BGP-LS, or the like, as well as various combinations thereof), or the like, as well as various combinations thereof.

Various example embodiments for supporting flow-specific FRR of source routed packets based on path compression in IPv6-based source routing may be further understood by considering use of flow-specific FRR to provide node protection in IPv6 source routing (although it will be appreciated that the principles also may be applied for providing link protection in IPv6 source routing). This may be further understood by way of reference to the example communication network of FIG. 17, which illustrates the routers 111 of the communication network 110 of FIG. 1.

Various example embodiments for supporting flow-specific FRR of source routed packets based on path compression in IPv6-based source routing, as noted above, may be described within the context of FIG. 17. It is noted that, in describing these embodiments, the following terminology is used: "IP6-X" is used as the loopback IP address in router "X", "IP6-XY" is used as the IPv6 address at the Y end of link X→Y, and "IP6-YX" is used as the IPv6 address at the X end of link Y→X. For example, the loopback address for R1 is IP6-1, the address at the R2 end of R1→R2 is IP6-12, and the address at the R1 end of R1→R2 is IP6-21.

The PCE computes the explicit path that meets QoS or SLA of a flow. This path is denoted as E(<flow-id>). In FIG. 17, the paths for flow A, flow B, and flow C are computed as follows:

For flow A: E(A)={R1→R2, R2→R4, R4→R7, R7→R9}.

For flow B: E(B)={R1→R2, R2→R4, R4→R6, R6→R8, R8→R9}.

For flow C: E(C)={R1→R2, R2→R4, R4→R7, R7→R8, R8→R9}.

The PCE also computes a protection path for each hop listed in E, such that a protection path also meets the QoS or SLA of the flow. The protection path is denoted as P(<flow-id>, <protected-hop>). For example, to protect against failure of node R4, P is computed as follows:

For flow A: P(A,R4)={R2→R3, R3→R5, R5→R7}.

For flow B: P(B,R4)={R2→R5, R5→R6}.

For flow C: P(C,R4)={R2→R3, R3→R5, R5→R7}.

Various example embodiments for supporting flow-specific FRR for flow-specific FRR of source routed packets based on path compression in IPv6-based source routing may support a new "hop" type to be sent in the explicit path (in the source routed packet). This new "hop" type for flow-specific FRR in IPv6 source routing is referred to herein as a "IPv6 Fast-Reroutable Explicit Path" (IPV6-FEH). The IPV6-FEH includes the following tuple:

IPV6-FEH=[<protected-hop>, <protection-path>, <skip-count>]

The <protected-hop> parameter identifies the protected hop. It may indicate a node identifier or link identifier, in the primary path, for which protection is provided. For example, R2→R4 is the protected hop in E(A), E(B), and E(C) which is encoded in IPV6-FEH with link identifier IP6-24.

The <protection-path> parameter indicates the protection path that protects the protected hop (i.e., that protects <protected hop>). The protection path is a set of hops configured to protect the <protected hop>. The protection path may be indicated in the <protection-path> parameter using a protection path address. For example, if R2→R4 is the protected-hop then respective protection paths for flows A, B, and C are P(A,R4), P(B,R4), and P(C,R4), respectively.

The <skip-count> parameter indicates the number of hops (of the primary path) subsequent to the <protected-hop> that are bypassed by the <protection-path>. For example, P(A) and P(C) would skip R4→R7 after the protected hop R2→R4 and P(B) would skip R4→R6 after the protected hop R2→R4 and, thus, skip-count is 1 for each of the flows.

In FIG. 17, the encoding of the explicit paths sent by R1 for flows A, B, and C would be as follows:

E(A)={IP6-12, [IP6-24, P(A,R4), 1], IP6-47, IP6-79}.

E(B)={IP6-12, [IP6-24, P(B,R4), 1], IP6-46, IP6-68, IP6-89}.

E(C)={IP6-12, [IP6-24, P(C,R4), 1], IP6-47, IP6-78, IP6-89}.

It is noted that, for clarity, IP-12 is shown as the first hop in E(A), E(B), and E(C); however, since it is the immediate next hop of R1, R1 would strip it before sending the source routed packet to R2.

In FIG. 17, the explicit path sent by ingress router R1 on a packet is a list of IPv6 addresses, which is as follows for flows A, B, and C:

E(A)={IP6-12, [IP6-24, P(A,R4), 1], IP6-47, IP6-79} where P(A,R4) is the IPV6-FEH with a protection path identifier that maps to an address list of {IP6-23, IP6-35, IP6-57}.

E(B)={IP6-12, [IP6-24, P(B,R4), 1], IP6-46, IP6-68, IP6-89} where P(B,R4) is the IPV6-FEH with a protection path identifier that maps to an address list of {IP6-25, IP6-56}.

E(C)={IP6-12, [IP6-24, P(C,R4), 1], IP6-47, IP6-79} where P(C,R4) is the IPV6-FEH with a protection path identifier that maps to an address list of {IP6-23, IP6-35, IP6-57}.

It is noted that, for clarity, IP6-12 was shown as the first address in E(A), E(B), and E(C), but R1 would strip this address before sending the source routed packet to R2. Thus, R2 will receive the following address lists on source routed packets for flows A, B, and C:

E(A)={[IP6-24, P(A,R4), 1], IP6-47, IP6-79}.

E(B)={[IP6-24, P(B,R4), 1], IP6-46, IP6-68, IP6-89}.

E(C)={[IP6-24, P(C,R4), 1], IP6-47, IP6-79}.

The operation of R2 upon receiving the source routed packet from R1 depends on whether the R2→R4 link is forwarding.

R2, upon receiving a packet from R1 when the R2→R4 link is forwarding (the R2→R4 link is active and R4 is active), takes the following actions.

If a packet arrives with E(A) when the R2→R4 link is forwarding, then R2 pops the first hop, which is IPV6-FEH=[IP6-24, P(A,R4), 1], and sends the source routed packet on the R2→R4 link with E(A)={IP6-47, IP-79}.

If a packet arrives with E(B) when the R2→R4 link is forwarding, then R2 pops the first hop, which is IPV6-FEH=[IP6-24, P(B,R4), 1], and sends the source routed packet on R2→R4 with E(B)={IP6-46, IP6-68, IP6-89}.

R2, upon receiving a packet from R1 when the R2→R4 link is not forwarding (the R2→R4 link has failed or R4 has failed), takes the following actions.

If a packet arrives with E(A) when the R2→R4 link is not forwarding, then R2 takes the following actions: (1) R2 pops the first hop, which is IPV6-FEH=[IP6-24, P(A,R4), 1], (2) R2, since the R2→R4 link has failed, decides to fast-reroute the source routed packet along protection path P(A, R4), (3) R2, since the skip-count is "1", also pops IP6-47 from the explicit path, (4) R2 determines the first hop in P(A,R4), which is R2→R3, based on the protection path address and, thus, decides to forward the source routed packet on the R2→R3 link, (5) R2 determines the remaining hops in P(A,R4), based on the protection path address, and pushes those remaining hops in P(A,R4) into the explicit path such that the explicit path becomes E(A)=IP6-35, IP6-57, IP6-79}, and (6) R2 sends the source routed packet out to R3.

If a packet arrives with E(B) when the R2→R4 link is not forwarding, then R2 takes the following actions: (1) R2 pops the first hop, which is IPV6-FEH=[IP6-24, P(B,R4), 1], (2) R2, since the R2→R4 link has failed, decides to fast-reroute the source routed packet along protection path P(B,R4), (3) R2, since the skip-count is "1", also pops IP6-46 from the explicit path, (4) R2 determines the first hop in P(B,R4), which is R2→R5, based on the protection path address and, thus, decides to forward the source routed packet on the R2→R5 link, (5) R2 determines the remaining hops in P(B,R4), based on the protection path address, and pushes those remaining hops in P(B,R4) into the explicit path such that the explicit path becomes E(B)={IP6-56, IP6-68, IP6-79}, and (6) R2 sends the source routed packet out to R5.

If a packet arrives with E(C) when the R2→R4 link is not forwarding, then R2 takes the following actions: (1) R2 pops the first hop, which is IPV6-FEH=[IP6-24, P(C,R4), 1], (2) R2, since the R2→R4 link has failed, decides to fast-reroute the source routed packet along protection path P(C,R4), (3) R2, since the skip-count is "1", also pops IP6-47 from the explicit path, (4) R2 determines the first hop in P(C,R4), which is R2→R3, based on the protection path address and, thus, decides to forward the source routed packet on the R2→R3 link, (5) R2 determines the remaining hops in P(C,R4), based on the protection path address, and pushes those remaining hops in P(C,R4) into the explicit path such that the explicit path becomes E(C)={IP6-35, IP6-57, IP6-79}, and (6) R2 sends the source routed packet out to R3.

It is noted that, from these examples, it may be seen that flows A, B, and C are fast-rerouted along flow-specific protection paths upon failure of the common link R2→R4 or node R4. The PLR does not compute and program any protection-path against any of the next-hops of the PLR; rather, the protection path is indicated in the source routed packet itself by the source node such that the PLR can use local information to determine the hops of the protection path when the protection is needed for an FRR operation.

Various example embodiments for supporting flow-specific FRR of source routed packets based on path compression in IPv6-based source routing may be configured to support an FEH Path Protection Element (FPPE). The FPPE encodes the (<protected-path>,<protection path>) tuple using two IPV6-FEHs as depicted in FIG. 50.

As depicted in FIG. 50, the FPPE includes a number of fields including various addresses as well as other information.

The FPPE includes a first IPV6-FEH describing the protected hop (the first and second rows depicted in FIG. 50). The first IPV6-FEH includes a protected hop address descriptor (first row of the first IPV6-FEH) and the IPv6 address of the protected hop (second row of the first IPV6-FEH). The protected hop address descriptor includes a Num_Protection_Hops field, which is an 8-bit field that indicates the number of addresses (hops) specified for the protection path. In this case, since the protection path is indicted using a single address (namely, the protection path address), the Num_Protection_Hops field is set to one ("1"). The protected hop address descriptor includes a Skip_Count field, which is an 8-bit field which includes a value indicative of the number of hops after the FPPE to be skipped if the source routed packet is forwarded on the protection path (which is set to "0" since the protected hop is not used when the protection path is used). The protected hop address descriptor includes a Flags field, which may include various flags which may be set. The protected hop address descriptor includes a RESERVED field.

The FPPE includes a second IPV6-FEH indicating the protection path that is protecting the protected hop (the third and fourth rows depicted in FIG. 50). The second IPV6-FEH includes a protection path address descriptor (first row of the second IPV6-FEH) and the protection path address identifying the protection path that is protecting the protected hop (second row of the second IPV6-FEH). The protection path address descriptor includes a Num_Protection_Hops field, which is an 8-bit field that is set in a manner indicative that there are no protection hops since this IPV6-FEH includes a protection path address for a protection path (e.g., a value of "0" or other suitable value). The protection path address descriptor includes a Skip_Count field, which is an 8-bit field which includes a value indicative of the number of hops after the FPPE to be skipped if the source routed packet is forwarded on the protection path. The protection path address descriptor includes a Flags field, which may include various flags which may be set. The protection path address descriptor includes a RESERVED field.

It is noted that, when the PLR fast reroutes a source routed packet using the protection path indicated by the protection path address in the FPPE, the PLR may replace the FPPE with explicit encoding of each of the hops of the protection path (with the exception of the first hop of the protection path, which may be used by the PLR to forward the source routed packet).

Various example embodiments for supporting flow-specific FRR of source routed packets based on path compression in IPv6-based source routing may be further understood by considering operations performed by the PCE and by network elements along the source routed path (e.g., the source node, a transit node, a PLR, and so forth).

The PCE computes the explicit path that meets QoS or SLA of a flow. This path is denoted as E(<flow-id>). The PCE updates the dynamic TE state (e.g., residual bandwidth) of the network elements along that path into the TEDB, to reflect that TE resources allocated to the path have been reserved. In FIG. 17, the paths for flow A, flow B, and flow C are computed as follows:

For flow A: E(A)={R1→R2, R2→R4, R4→R7, R7→R9}.

For flow B: E(B)={R1→R2, R2→R4, R4→R6, R6→R8, R8→R9}.

For flow C: E(C)={R1→R2, R2→R4, R4→R7, R7→R8, R8→R9}.

The PCE also computes a protection path for each hop listed in E, such that a protection path also meets the QoS or SLA of the flow. The protection path is denoted as P(<flow-id>, <protected-hop>). The PCE updates the dynamic TE state (e.g., residual bandwidth) of the network elements along the protection path into the TEDB, to reflect that TE resources allocated to the protection path have been reserved. For example, to protect against failure of node R4, P is computed as follows:

For flow A: P(A,R4)={R2→R3, R3→R5, R5→R7}.

For flow B: P(B,R4)={R2→R5, R5→R6}.

For flow C: P(C,R4)={R2→R3, R3→R5, R5→R7}.

It is noted that, for simplicity, R4 is shown as the protected hop in E; however, it will be appreciated that the PCE may try to compute protection paths for other hops listed in E or even for every hop listed in E.

It is noted that protection paths for P(A,R4)=P(C,R4), because the protection path satisfies QoS constraints of both of the flows. For example, assume that flow B was set-up before flow C. So, TE resources along the protection path P(A,R4) had been reserved as per the requirements of flow B. Later, when flow C has been set-up, the residual TE resources along the same protection path satisfy the QoS of flow C.

It will be appreciated that E or P may be computed using any suitable path computation mechanisms, such as local path computation at the source router by running CSPF on TEDB or by other computational techniques, local configuration at the source, global path computation at a central controller by running CSPF on TEDB or other computational techniques, or the like.

The PCE initiates allocation of protection path addresses to the protection paths (namely, the protection paths (P (A, R4), P (B, R4) and P (C, R4)) as follows:

P(A,R4)=P(C,R4)=IP6-2357.

P(B,R4)=IP6-256.

The protection path addresses may be allocated to the protection paths by the PCE or by R2. The PCE may allocate the protection path addresses to the protection paths if R2 provides the PCE with an address range of address values available for use as protection path addresses. The PCE may request allocation of the protection path addresses by R2 (e.g., by sending a request to R2, which may then allocate the protection path addresses to the protection paths based on the request from the PCE and responds to the PCE with indications of the protection path addresses that were allocated). The control plane procedures for allocation of protection path addresses to protection paths are discussed in additional detail below.

The PCE, after the protection path addresses have been allocated to the protection paths protecting R4, programs the protection path addresses into the data plane of R2. This is illustrated in FIG. 51.

Figure 51:
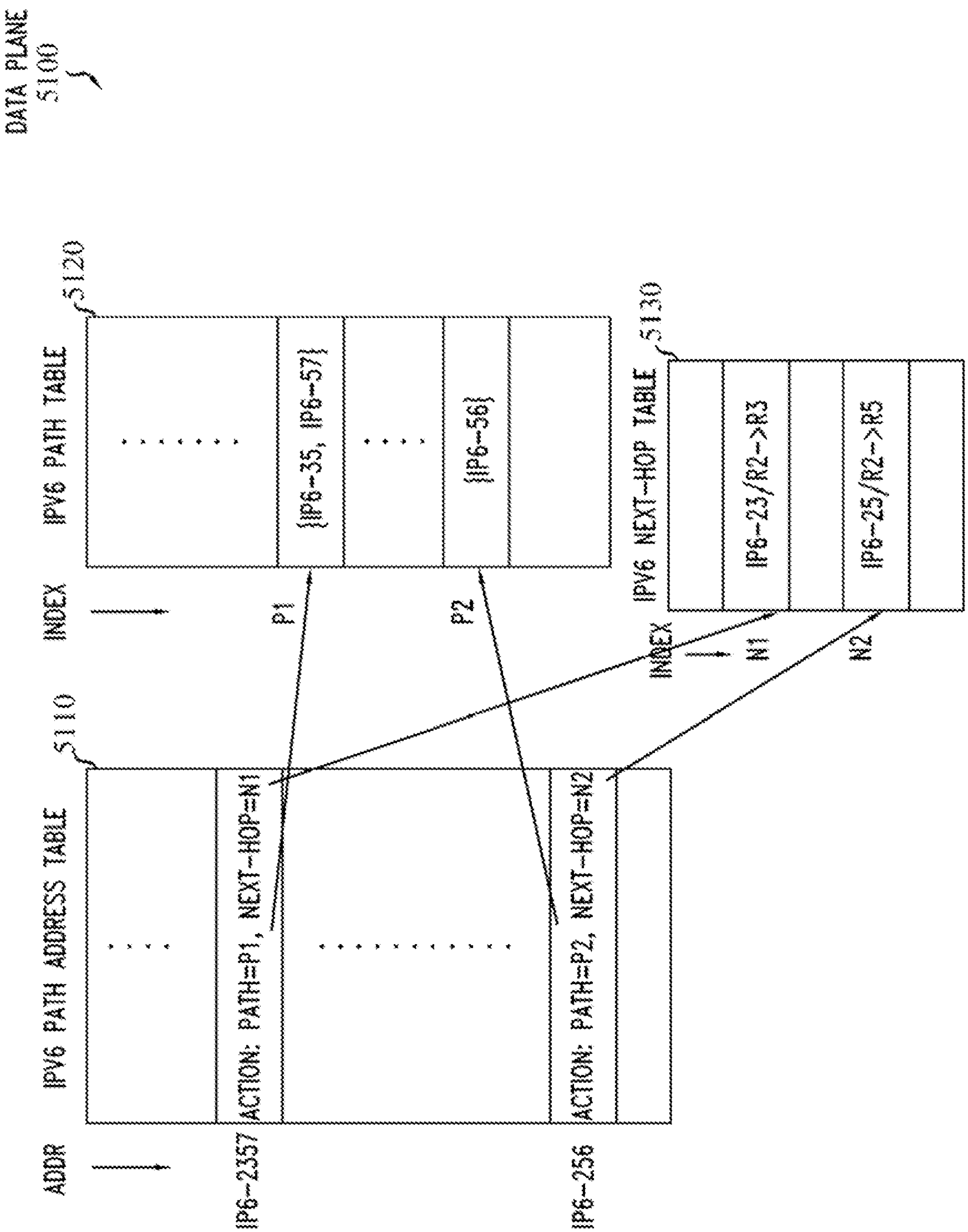
FIG. 51 depicts the data plane of a PLR router configured to support protection paths for flow-specific fast rerouting of source routed packets in IPv6-based source routing.

FIG. 51 depicts the data plane of a PLR router configured to support protection paths for flow-specific fast rerouting of source routed packets in IPv6-based source routing.

The data plane 5100 includes an IPv6 Path Address Table 5110, an IPv6 Path Table 5120, and an IPv6 Next-Hop Table 5130, which may be arranged in a manner similar to the IPv6 Path Address Table 1310, the IPv6 Path Table 1320, and the IPv6 Next-Hop Table 1330 of FIG. 13, respectively.

The entry of IPv6 Path Address Table 5110 for path address IP6-2357 includes (1) a pointer to an entry of IPv6 Path Table 5120 that includes the hops of the protection path (namely, {IP6-35, IP6-57}) with the exception of the first hop of the protection path and (2) a pointer to an entry of IPv6 Next-Hop Table 5130 that includes the first hop of the protection path (namely, IP6-23). In other words, the Prefix IP6-2357/32 results in replacing {IP6-2357} with addresses {IP6-35, IP6-57} onto the source routed packet and forwarding the source routed packet on next-hop identified by IP6-23 (which is R2→R3).

The entry of IPv6 Path Address Table 5110 for path address IP6-256 includes (1) a pointer to an entry of IPv6 Path Table 5120 that includes the hop of the protection path (namely, {IP6-56}) with the exception of the first hop of the protection path and (2) a pointer to an entry of IPv6 Next-Hop Table 5130 that includes the first hop of the protection path (namely, IP6-25).

In other words, the Prefix IP6-256/32 results in replacing {IP6-256} with addresses {IP6-56} onto the source routed packet and forwarding the source routed packet on next-hop identified by IP6-25 (which is R2→R5).

It is noted that pre-programming of the protection path address state in the data plane of PLRs increases the data plane state as compared to embodiments in which the hops of the protection path are explicitly encoded within the source routed packet, but are not expected to increase the data plane state as compared to traditional FRR in IPv6 source routing.

The PCE provides the following path information to the head-end router R1 for use in generating headers for source routed packets of flows A, B, and C:

For flow A: E(A)={IP6-12, IP6-24, IP6-47, IP6-79}, P(A,R4)={IP6-2357}.

For flow B: E(B)={IP6-12, IP6-24, IP6-46, IP6-68, IP6-89}, P(B,R4)={IP6-256}.

For flow C: E(C)={IP6-12, IP6-24, IP6-47, IP6-78, IP6-89}, P(C,R4)={IP6-2357}.

Let SR(<flow-id>) be the source route sent by R1 for the specified flow (flow-id). In FIG. 17, the IPV6-FEH encoded source route sent by R1 for flows A, B, and C would be as follows (where P is the Num_Protection_Hops field in the protection address list descriptor and S is the Skip_Count field):

SR(A)={[IP6-24, P=1, S=0], [IP6-2357, P=0, S=1], [IP6-47, P=0, S=0], [IP6-79, P=0, S=0]}.

SR(B)={[IP6-24, P=1, S=0], [IP6-256, P=0, S=1], [IP6-46, P=0, S=0], [IP6-68, P=0, S=0], [IP6-89, P=0, S=0]}.

SR(C)={[IP6-24, P=1, S=0], [IP6-2357, P=0, S=1], [IP6-47, P=0, S=0], [IP6-78, P=0, S=0], [IP6-89, P=0, S=0]}.

It is noted that, while IP6-12 was shown as the first address in E(A), E(B), and E(C), R1 would not include IP6-12 in the source route; rather, R1 would send the source routed packets of the respective flows on R1→R2 with IP6-12 as the Destination Address (DA) in the IPv6 Header.

Various example embodiments for supporting flow-specific FRR of source routed packets based on path compression for IPV6-based source routing may be configured to support encoding of the IPV6-FEH for use in supporting flow-specific FRR for source routed IPv6 packets. In at least some embodiments, as discussed further below, encoding of the IPV6-FEH may be performed using a new Routing Type in a Routing Header, as an IP-Shim Layer Protocol, or the like, as well as various combinations thereof. It will be appreciated that such embodiments may be further understood by first considering various aspects of IPv6 source routing. The use of such mechanisms to support encoding of the IPV6-FEH for use in supporting flow-specific FRR for source routed IPv6 packets based on path compression may be further understood by first considering various aspects of IPv6 source routing.

In general, IPv6 source routing is defined in RFC 2460. Section 4 in RFC 2460 describes several IPv6 Extension Headers (EHs) that can be appended to an IPv6 header (and which may be chained within IPv6 packets). The main IPv6 header remains fixed in size (40 bytes) to which customized FEHs are added as needed. The FEHs provide for control functions needed or useful in some situations, but which typically are unnecessary for the most common communications. The FEHs include provisions for timestamps, security, and special routing. Section 4.4 in RFC 2460 defines an FEH type 0 (referred to as a "Routing Header") which is used for source routing in IPV6. The format of the Routing Header is as depicted in FIG. 52.

The Routing Header, as depicted in FIG. 52, includes a Next Header field, a Header Extension Length field, a Routing Type field, a Segments Left field, a Reserved field, and a set of n Address fields (Address[1] through Address [n]).

The Next Header field of the Routing Header is a 8-bit selector that identified the type of header immediately following the Routing Header. It uses the same values as the IPv6 Protocol field (e.g., as defined in RFC 1700).

The Header Extension Length (Hdr Ext Len) field of the Routing Header is an 8-bit unsigned integer that specifies the length of the Routing Header in 8-octet units (excluding the first 8 octets). For the Type 0 Routing Header, Header Extension Length is equal to two times the number of addresses in the header.

The Routing Type field is a 1-octet field that specifies the type of the header. In this case, the Type is 0, which indicates that the header is a Routing Header.

The Segments Left field of the Routing Header is an 8-bit unsigned integer that specifies the number of route segments remaining (i.e., the number of explicitly listed intermediate nodes that still need to be visited before reaching the final destination).

The RESERVED field of the Routing Header is a 32-bit field that is initialized to zero for transmission and that is ignored on reception.

The set of n Address fields of the Routing Header is a vector of n 128-bit addresses, numbered 1 (Address[1]) to n (Address[n]).

If Segments Left is 0, the source route is considered as empty (and the recorded route is full) and the routing is to be based on the Destination Address field in IPv6 Header.

If the address in Destination Address field has been reached and the Segments Left is not 0, the next address in the source route (=Address [n-Segments_Left+1]) replaces the address in the Destination Address field, and the replaced Destination Address is recorded in Address[n-Segments_Left+1], and Segments_Left is decremented by 1. Thus, the source routed packet gets forwarded along each hop specified in the Address[ ] vector.

The use of the Routing Header may be further understood by way of an example. In FIG. 17, assume that R1 wants to send a packet with Source Address(SA)=S to Destination Address(DA)=D along the path {IP6-12, IP6-24, IP6-47, IP6-79}. In this case, R1 sends the source routed packet on R1→R2 as: SA=S, DA=IP6-12, FEH Type=Routing Header, Hdr_Ext_Len=8, Routing Type=0, Segments_Left=4, Address [ ]={IP6-24, IP6-47, IP6-79, D}. When R2 receives the source routed packet, it finds that DA=IP6-12 is local (and, thus, reached). Since the source routed packet carries the Routing Header option and Segments Left>0, R2 swaps DA with the next address IP6-24 in Address[1]. The Segments Left is decremented by 1 to point to the next address (IP6-47) in the Address[2]. R2 sends the source routed packet on R2→R4 as: SA=S, DA=IP6-24, FEH Type=Routing Header, Hdr_Ext_Len=8, Routing Type=0, Segments_Left=3, Address [ ]={IP6-12, IP6-47, IP6-79, D}. Similarly, R4 forwards the source routed packet on R4→R7 as: SA=S, DA=IP6-47, FEH Type=Routing Header, Hdr_Ext_Len=8, Routing Type=0, Segments_Left=2, Address [ ]={IP6-12, IP6-24, IP6-79, D}. Similarly, R7 forwards the source routed packet to R7→R9 as: SA=S, DA=IP6-79, FEH Type=Routing Header, Hdr_Ext_Len=8, Routing Type=0, Segments_Left=1, Address [ ]={IP6-12, IP6-24, IP6-47, D}. Similarly, R9 forwards the source routed packet to D as: SA=S, DA=D, FEH Type=Routing Header, Hdr_Ext_Len=8, Routing Type=0, Segments_Left=0, Address [ ]={IP6-12, IP6-24, IP6-47, IP6-79}. When the source routed packet leaves R9, it may be seen that Address[ ] contains the explicit path traversed by the source routed packet (Recorded-Route). The subsequent nodes would find that Segments Left=0, so packet forwarding would continue based on DA=D alone.

It is noted that ongoing work in the IETF on IPv6 Segment Routing defines another Routing Type (Routing Type 4) which makes minor enhancement to the encoding of Routing Type 0. The functionalities of IPv6 Source Routing with Routing Type 4 is the same as defined for Routing Type 0.

It is noted the Routing Types in Routing Header may not be sufficient to encode an IPV6-FEH as described here and, thus, as indicated above, encoding of the IPV6-FEH may be performed using a new Routing Type in a Routing Header, as an IP-Shim Layer Protocol, or the like, as well as various combinations thereof.

Various example embodiments for supporting flow-specific FRR of source routed packets for flow-specific FRR based on path compression in IPv6-based source routing are configured to support encoding of the IPV6-FEH using a new Routing Type in a Routing Header.

Various example embodiments for supporting flow-specific FRR of source routed packets for flow-specific FRR based on path compression in IPv6-based source routing are configured to support encoding of the IPV6-FEH using a new FEH—Routing Header. The FEH—Routing Header may have a new Routing Type assigned thereto, which can be assigned from unallocated values in the IANA registry (e.g., Routing Type 5 is suggested; however, any suitable numbers assigned from the unallocated values in IANA registry may be used). The format of the FEH—Routing Header is as depicted in FIG. 53.

Figure 53:
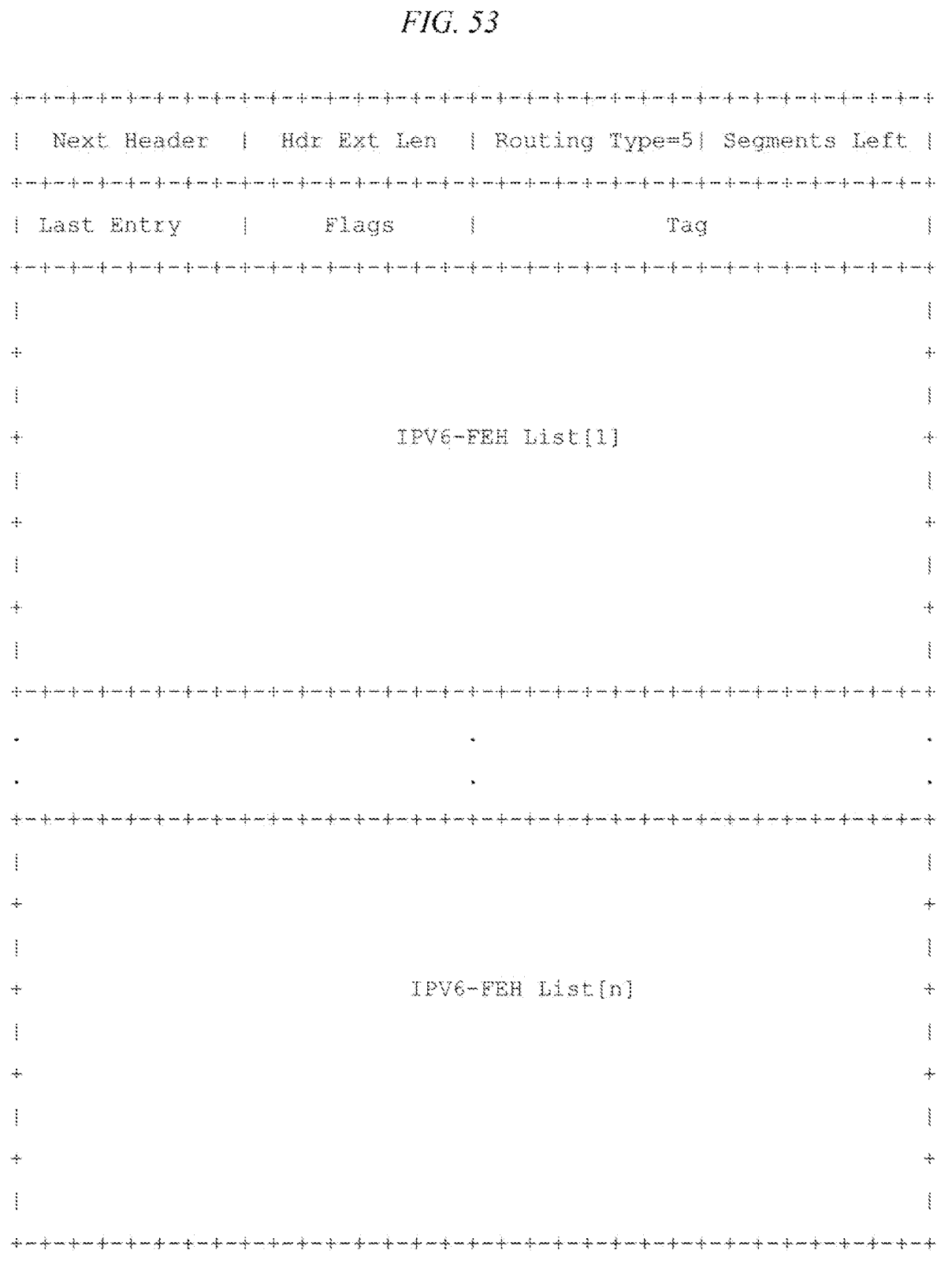

The FEH—Routing Header, as depicted in FIG. 53, includes a Next Header field, a Header Extension Length field, a Routing Type field, a Segments Left field, a Last Entry field, a Flags field, a Tag field, and an IPV6-FEH List (from IPV6-FEH List[1] to IPV6-FEH List[n]).

The Next Header field of the FEH—Routing Header is an 8-bit selector that identified the type of header immediately following the FEH—Routing Header.

The Header Extension Length (Hdr Ext Len) field is an 8-bit unsigned integer that specifies the length of the FEH—Routing Header in 10-octet units (excluding the first 8 octets). For the FEH—Routing Header, Header Extension Length is equal to two times the number of IPV6-FEHs in the header.

The Routing Type field of the FEH—Routing Header is a 1-octet field that specifies the type of the header. In this case, the Routing Type field indicates that the header is an FEH—Routing Header (e.g., Type=5).

The Segments Left field of the FEH—Routing Header is 1-octet field that includes the index, in the IPV6-FEH List, of the next IPV6-FEH to inspect. The Segments Left is decremented at each IPV6-FEH visited by the source routed packet.

The Last Entry field of the FEH—Routing Header includes the index, in the IPV6-FEH List, of the first IPV6-FEH of the path (which is, in fact, the last element of the IPV6-FEH List).

Figures 54, 55, 56:
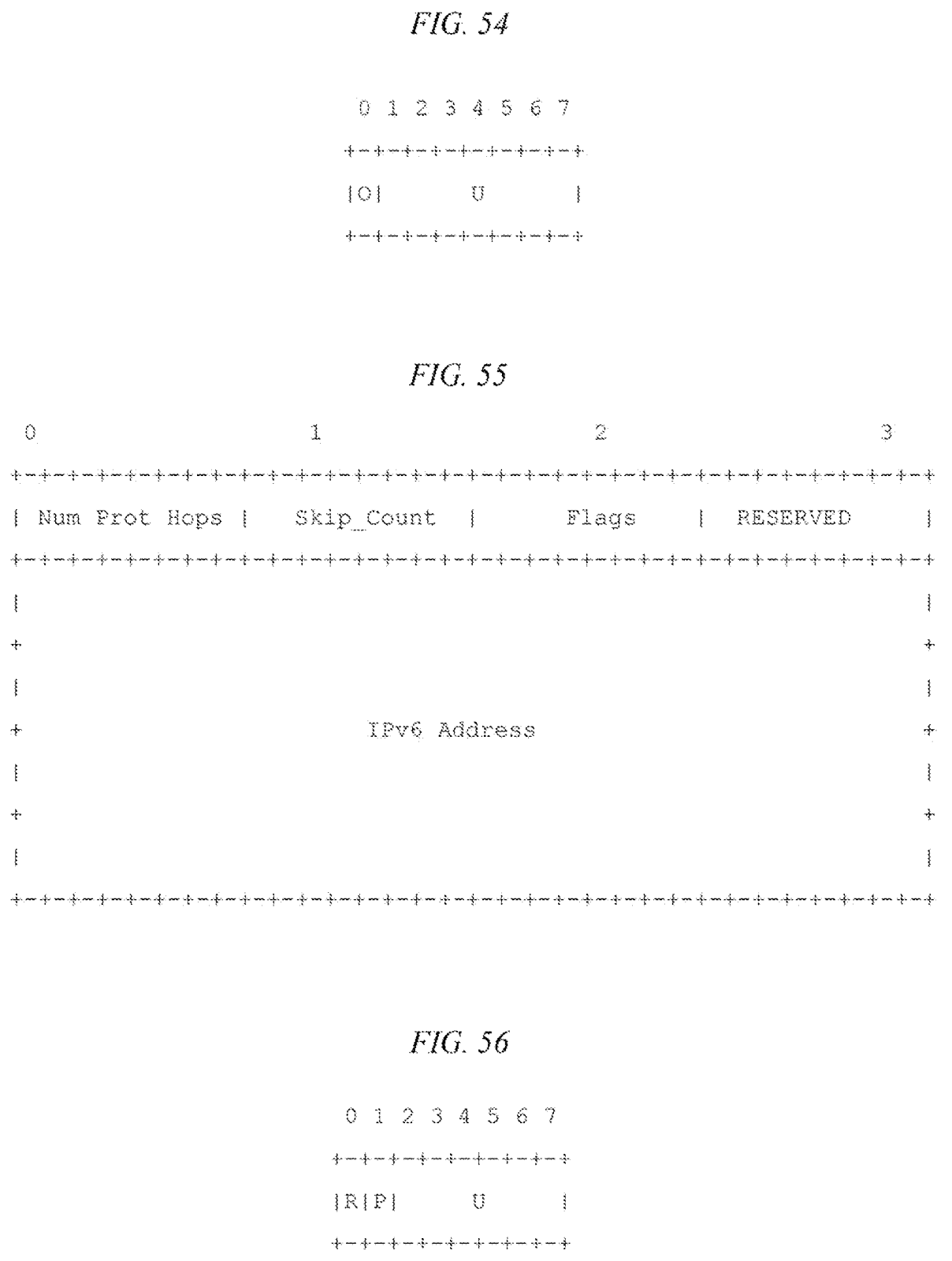

The Flags field of the FEH—Routing Header is a 1-octet field that includes a set of one-bit flags configured to indicate various capabilities. The Flags field of the FEH—Routing Header has the format as depicted in FIG. 54. The 1-octet Flags field, as depicted in FIG. 54, includes an O Flag and a U Flag. The O Flag is the operations and management (OAM) flag which is configured such that, if set (e.g., equal to "1"), then it indicates that this packet is an OAM packet. The U Flag is unused and for future use and, thus, should be unset on transmission and ignored on receipt.

The Tag field of the FEH—Routing Header is a 2-octet field configured for use in tagging a packet as being part of a class or group of packets (e.g., packets sharing the same set of properties).

The IPV6-FEH List of the FEH—Routing Header is a list of n IPV6-FEHs (denoted as IPV6-FEH List[1] to IPV6-FEH List[n]). In the list, IPV6-FEH List[n] is the IPV6-FEH that represents the n-th element in the IPV6-FEH list. The IPV6-FEH list is encoded starting from the last hop of the path (i.e., the first element of the IPV6-FEH List (IPV6-FEH List [1]) includes the last hop of the path while the last element of the IPV6-FEH List (IPV6-FEH List[n]) includes the first hop of the path). The index in the "Segments Left" field identifies the current hop. An IPV6-FEH is 20-octets in size and is defined as depicted in FIG. 55.

The IPV6-FEH List, as depicted in FIG. 53, is a list of n IPV6-FEHs where each of the IPV6-FEHs in the list of IPV6-FEHs is formatted as depicted in FIG. 55. The 20-octet IPV6-FEH includes a Number of Protection Hops field, a Skip_Count field, a Flags field, a Reserved field, and an IPv6 Address field.

The Number of Protection Hops field of the IPV6-FEH is a 1-octet field that indicates the number of subsequent IPV6-FEHs that are protecting this IPV6-FEH. If the value of the Number of Protection Hops field is set to a value of one ("1"), then it means that the subsequent IPV6-FEH immediately following that IPV6-FEH identifies the protection path of that IPV6-FEH. If the value of the Number of Protection Hops field is set to 0, then it means that there is no protection path for that IPV6-FEH. Additionally, if the IPV6-FEH belongs to a protection path then the value of the Number of Protection Hops field will be set to 0 (since the protection path itself is not protected).

The Skip_Count field of the IPV6-FEH is an 8-bit field that indicates the number of subsequent IPV6-FEHs to be skipped after processing this IPV6-FEH. This is set to 0 for all IPV6-FEHs, except for the IPV6-FEH which includes the protection path address of the protection path.

The Flags field of the IPV6-FEH is a 1-octet field that includes a set of one-bit flags configured to indicate various capabilities. The Flags field of the IPV6-FEH has the format as depicted in FIG. 56. The 1-octet Flags field, as depicted in FIG. 56, includes an R Flag, a P Flag, and a U Flag. The R Flag is a Recorded Route bit that indicates that this IPV6-FEH has been traversed by the source routed packet (and is set to 0 by the originator of this IPV6-FEH). The P Flag is a protected flag that indicates that this hop is part of a protection path. The U Flag is unused and for future use and, thus, unset on transmission and ignored on receipt.

The RESERVED field of the IPV6-FEH is unused and is reserved for future use. This should be unset on transmission and ignored on receipt.

The IPv6 Address field of the IPV6-FEH includes the 128-bit IPv6 Address representing a hop to be traversed by the source routed packet.

It is noted that it is expected that the FEH—Routing Header will appear once in the source routed packet and, thus, that there will not be two FEH—Routing Headers in the same packet.

It is noted that the router whose address is in the DA field of the source routed packet header needs to inspect the FEH Routing Header, which implies that IPv6 address of the next IPV6-FEH is to be moved into DA of the source routed packet. The DA of the source routed packet changes at each IPV6-FEH termination/completion and, therefore, the final DA will be encoded as the last IPV6-FEH in the source routed packet.

It is noted that, if the Segments Left field is 0, the source route is considered as empty (and the recorded route is full) and the routing is to be based on the Destination Address field in IPv6 Header.

It is noted that, if the address in Destination Address field has been reached and the Segments Left is not zero, the next IPV6-FEH indexed by the Segments Left is processed and forwarding decision is made based on that IPV6-FEH.

Various example embodiments for supporting flow-specific fast rerouting of source routed packets for flow-specific FRR in IPv6-based source routing are configured to support chaining of the FEH—Routing Header to the IPv6 Header by the head-end router.

The head-end router may be configured to perform the following operations while supporting chaining of the FEH—Routing Header to the IPv6 Header.

The DA in IPv6 Header is set with the IPv6 Address of the first primary hop in the explicit path. The original DA in IPv6 Header is preserved in IPV6-FEH[1] (as discussed further below).

The Header Extension Length field in FEH—Routing Header is set to the total number of 10-octet units in Type, Length, Segments Left, Flags and IPV6-FEH-List.

The Segments Left field is set to n, where n is the number of elements in the IPV6-FEH List.

The IPV6-FEH List is encoded in the reverse order of the path. Let n be the number of IPV6-FEH entries. The IPV6-FEH[1] is the last hop in primary path (the final DA of the source routed packet) and the IPV6-FEH[n] is the first hop. The entries in the list are ordered in units of sub-groups, where each sub-group contains an IPV6-FEH for a primary hop followed by the IPV6-FEH entry including the protection path address for the associated protection path. This is further explained as follows.

When encoding the IPV6-FEH List, if IPV6-FEH List[x] is a protected primary hop, then the protection path address of the protection path also is encoded (in the IPV6-FEH List[x−1] entry). The IPV6-FEH List[x] entry is encoded with Num_Protection_Hops=1, Skip_Count=0, and Flags=0, which means that IPV6-FEH List[x−1] is composed of the protection path address indicative of the protection path. Subsequent primary hops start at IPV6-FEH List[x−2]. The IPV6-FEH List[x−1] entry is encoded with Num_Protection_Hops=0, because the protection path is not protected. The IPV6-FEH List[x−1] entry is encoded with the P Flag set to 1. The IPV6-FEH List[x−1] entry is encoded with Skip_Count=C, where C is the number of subsequent primary hops to be skipped (i.e., from IPV6-FEH List [x−2] through IPV6-FEH List[x−2-c]) if the source routed packet is being forwarded on a node protection path.

It is noted that this encoding rule may be iterated over each sub-group of the IPV6-FEH List.

The head-end router then sends the source routed packet toward the DA indicated in the source routed packet.

The chaining of the FEH—Routing Header to the IPv6 Header by the head-end router may be further understood by way of reference to the following example. For example, consider the path for flow A in FIG. 17, as follows: E(A)={IP6-12, [IP6-24, P (A, R4), 1], IP6-47, IP6-79} where P(A,R4) is the protection path={IP6-23, IP6-35, IP6-57}

Figure 57:
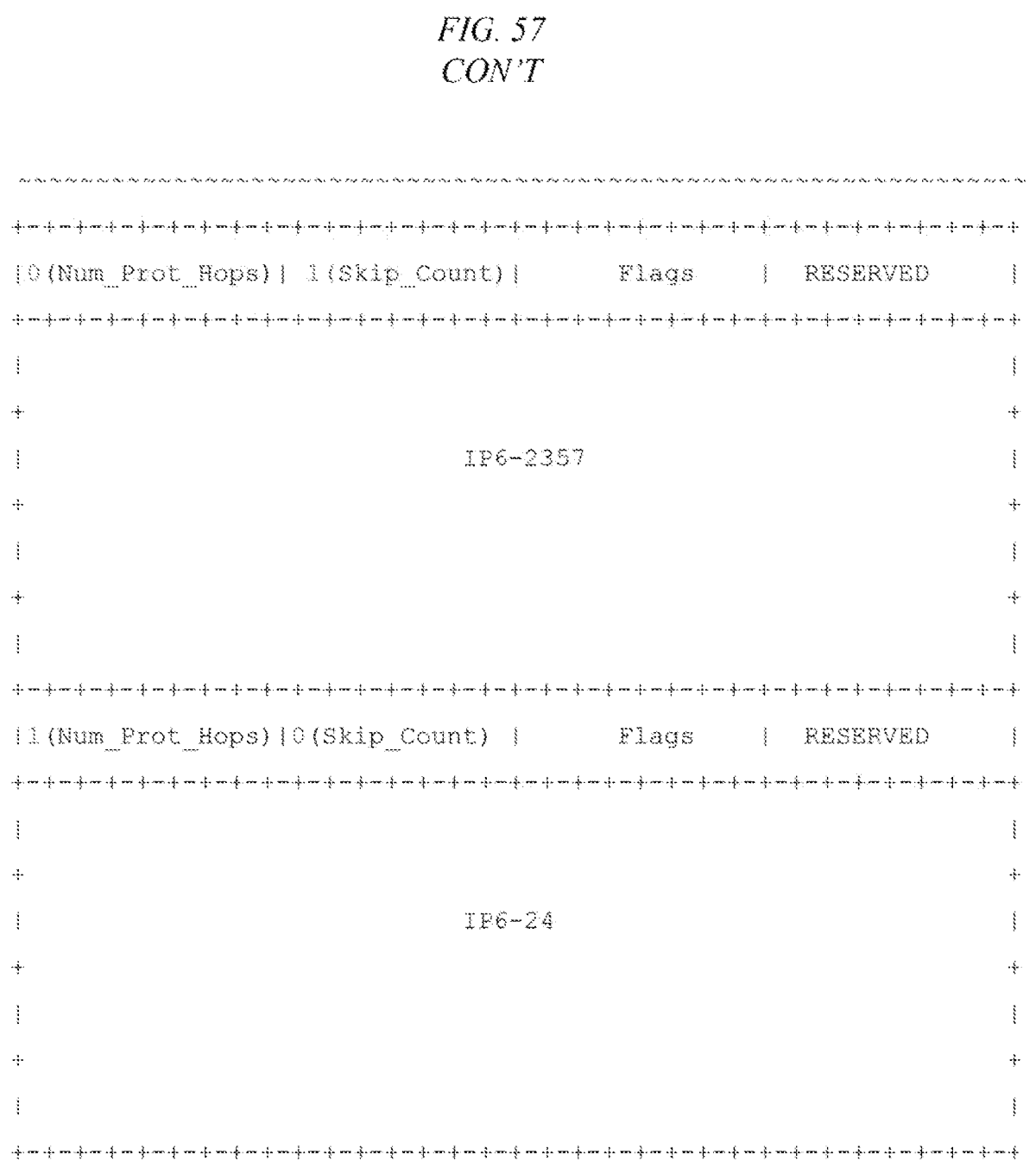

In this example, the path is encoded on a packet from source S to destination D as depicted in FIG. 57.

Various example embodiments for supporting flow-specific FRR of source routed packets for flow-specific FRR based on path compression in IPv6-based source routing are configured to support processing of the FEH—Routing Header of the IPv6 Header by the transit router.

The transit router may be configured to perform the following operations while processing the FEH—Routing Header of the IPv6 Header.

It is noted that the node that is supposed to inspect the FEH—Routing Header is the node corresponding to DA of the source routed packet. The other transit nodes should not inspect these options and should forward the source routed packet toward the DA according to the IPv6 Routing Table.

The transit router corresponding to the DA, upon receiving the FEH—Routing Header of the IPv6 Header, may process the FEH—Routing Header of the IPv6 Header as follows.

If Segments Left=0, the next layer in the source routed packet, whose type is identified by the Next Header Field in the FEH—Routing Header, is processed.

If Segments Left≠0, then i is set equal to the index of the next IPV6-FEH to be visited in the IPV6-FEH list (=Segments Left). The Segments Left value is decremented by 1. From this point on, the Segments Left value points to IPV6-FEH[i−1]. The IPV6-FEH[i] is processed as discussed further below.

If the address of IPV6-FEH[i] is a multicast address, then the source routed packet may be discarded.

If the address of the IPV6-FEH[i] is a path address, then the source routed packet may be discarded.

If the address of IPV6-FEH[i] is a not multicast address, then IPV6-FEH[i] is further processed as follows: (1) if the Hop Limit in the IPv6 Header is less than or equal to 1, swap the IPv6 DA and Address of IPV6-FEH[i], set the R Flag in IPV6-FEH[i]=1 to indicate that it has been traversed by the source routed packet, send an ICMP Time Exceeded—TTL Exceeded in Transit message to the source address, and discard the source routed packet or (2) if the Hop Limit in the IPv6 Header is not less than or equal to 1, then IPV6-FEH[i] is further processed by checking the reachability of the address of IPV6-FEH[i].

If the address of IPV6-FEH[i] is reachable, swap the IPv6 DA and the IPv6 address of IPV6-FEH[i] and set the R Flag in IPV6-FEH[i]=1 to indicate that this hop has been traversed by the source routed packet. The following processing is performed: (1) if Num_Protection_Hops in IPV6-FEH [i]>0, decrement Segments Left by Num_Protection_Hops in IPV6-FEH[i] (this means that the hops in protection path have been skipped since the source routed packet is not being forwarded along the protection path) or (2) if Skip_Count in IPV6-FEH[i]>0, decrement Segments Left by Skip_Count in IPV6-FEH[i] (this means that the hops in the primary path have been skipped, i.e., bypassed by the protection path). The source routed packet is then resubmitted to the IPv6 module for transmission to the new destination.

If the address of IPV6-FEH[i] is not reachable and if the Num_Protection_Hops in IPV6-FEH[i]=0 (this means the next-hop is neither operational nor protected and, thus, that the source routed packet is to be dropped), then the IPv6 DA address and the address of IPV6-FEH[i] are swapped, the R Flag in IPV6-FEH[i] is set equal to 1 to indicate that this hop has been traversed by the source routed packet, an ICMP Unreachable message (including a snapshot of the IPv6 header including the original destination address, since the source is unaware that source routing is being used) is sent to the Source Address, and the source routed packet is discarded.

If the address of IPV6-FEH[i] is not reachable and if the Num_Protection_Hops in IPV6-FEH[i] !=0 (this means the next-hop is not operational but protected by a protection path), then Segments Left value is decremented by 1 (such that it now points to IPV6-FEH[i−2]), the IPv6 DA address and the address of IPV6-FEH[i−1] (i.e., the first entry in the protection path) are swapped, the R Flag in IPV6-FEH[i] is set equal to 1 to indicate that this hop has been traversed by the source routed packet, and the source routed packet is then resubmitted to the IPv6 module for transmission to the new destination.

If the address of IPV6-FEH[i−1] is a path address, then the following processing is performed. The protection path address is looked up in the IPv6 Path Address Table to determine the IPv6 address hop list of the protection path. Here, assume that the hop list of the protection path includes P hops as follows: {H1, H2, H3, . . . , Hp}. The IPV6-FEH [i−1] is replaced with {H2, H3, . . . Hp}, with each of the hops being encoded using an IPV6-FEH, respectively. The IPV6-FEH[i−1] is encoded with Hp and IPV6-FEH[i+p−2] is encoded with H2. The Segments_Left field is updated to point to the IPV6-FEH[i+p−2]. The DA is recorded at IPV6-FEH[i+p−1]. The R Flag is set equal to one in IPV6-FEH[i+p−1], to indicate that it has been traversed by the source routed packet. The DA in the IPv6 header is set to H1 (i.e., the first hop in the protection path, as this is the next hop for the source routed packet).

Various example embodiments for supporting flow-specific FRR of source routed packets for flow-specific FRR based on path compression in IPv6-based source routing, based on use of an FEH—Routing Header, may be further understood by considering an example in which source router R1 sends a packet from source S to destination D with explicit path E(A).

The source node, as described above, sends a source routed packet including a source route that includes an explicit encoding of the hops of the source routed path and an explicit encoding of a protection path address indicative of a protection path configured to protect one of the hops of the source routed path.

The source node inserts an FPPE in order to include an IPV6-FEH in an IPv6 source routed path.

In the case of flow A, for example, the encoding of an FPPE including IPV6-FEH=[[IP6-24, P (A, R4), 1], IP-2357] is as depicted in FIG. 58.

Figure 59:
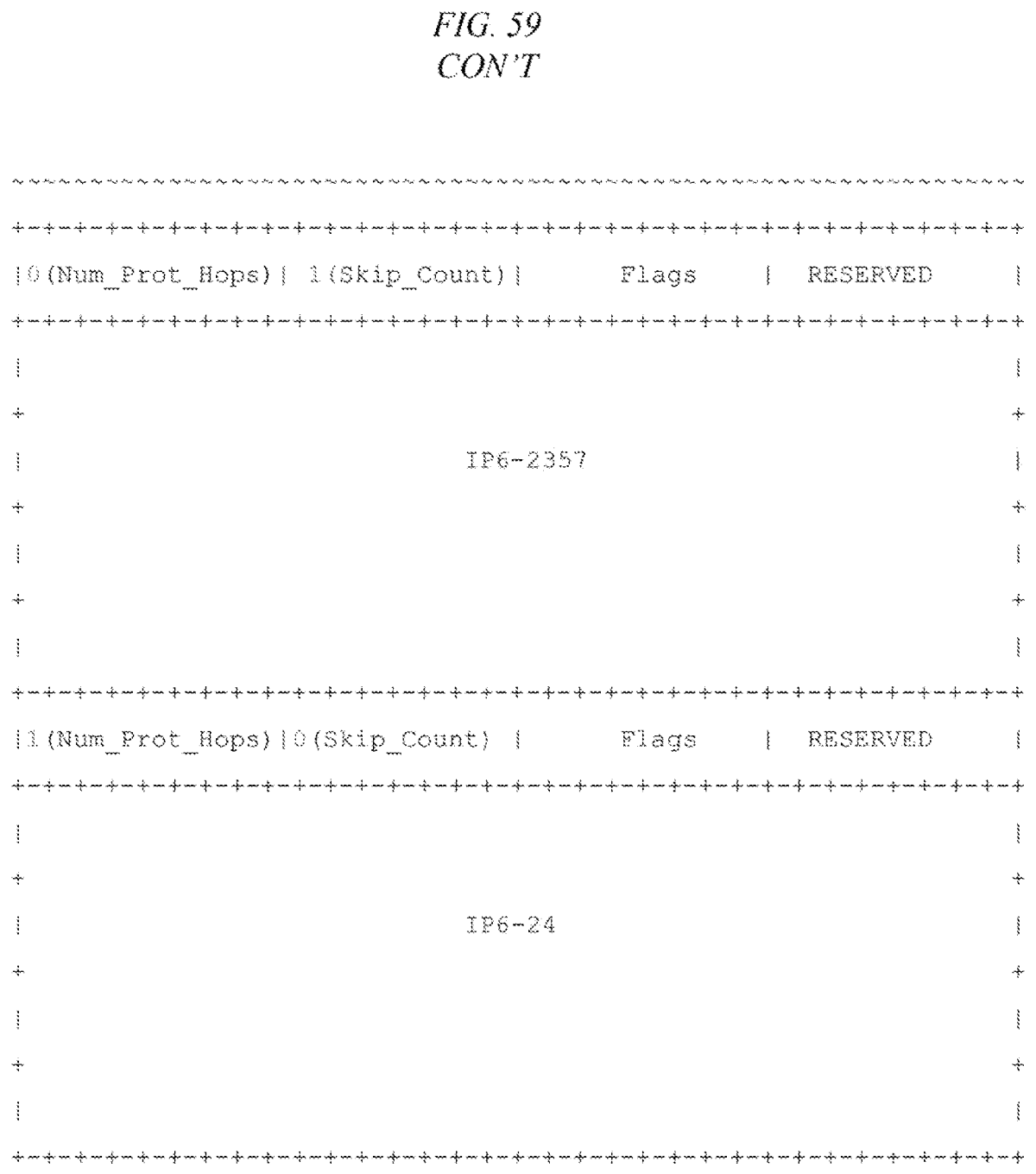

In the case of flow A, for example, the source route SR(A) included in the source routed packet sent by R1 to R2 is configured as depicted in FIG. 59.

A receiver that receives an FPPE (i.e., Segments Left points to the first IPV6-FEH of FPPE) may process the IPV6-FEHs of the FPPE as follows. The receiver processes the first hop in the FPPE, which is an IPV6-FEH of the protected hop. The IPV6-FEH of the protected hop includes an IPv6 address of the protected hop. The receiver looks up the IPv6 address of the protected hop in the IPv6 Route Table to get the next-hop/forwarding information (denoted as NH) for the protected hop. The IPV6-FEH of the protected hop is removed from the list of IPV6-FEHs of the source routed packet. The Num_Protection_Hops value is read from the IPV6-FEH of the protected hop (in this case, since the first hop is a protected hop that is protected by a protection path, the Num_Protection_Hops value is set to one ("1") to indicate that the next IPV6-FEH of the FPPE includes the protection path address of the protection path for the protected hop. A determination is made as to whether the next-hop (NH) is operational. If the NH is operational, the number of IPV6-FEHs specified by the Num_Protection_Hops value is removed from the list of IPV6-FEHs of the source routed packet (thereby removing the IPV6-FEH of the protection path from the list of IPV6-FEHs of the source routed packet, since it is not going to be used) and the source routed packet is forwarded to the NH. If the NH is not operational, the top hop (which is now the first hop in the list of IPV6-FEHs and which includes a protection path address identifying the protection path) is processed and used to initiate fast rerouting of the source routed packet using the protection path. The hops of the protection path and actions to be performed for fast rerouting along the protection path are determined based on a table lookup using the protection path address (e.g., the IPV6-FEH of the protection path is removed from the list of IPV6-FEHs of the source routed packet, the hops of the protection path with the exception of the first hop of the protection path are encoded within the list of IPV6-FEHs of the source route in the source routed packet, and the next-hop/forwarding information of the first hop of the protection path (denoted as NH2) is determined). The source routed packet is then handled based on whether NH2 is operational (either the source routed packet is forwarded to NH2 as an FRR operation if NH2 is operational or the source routed packet is dropped if NH2 is not operational).

The operation of R2 upon receiving the source routed packet, including the source route SR(A), from R1 depends on whether the R2→R4 link is forwarding.

Figure 60:
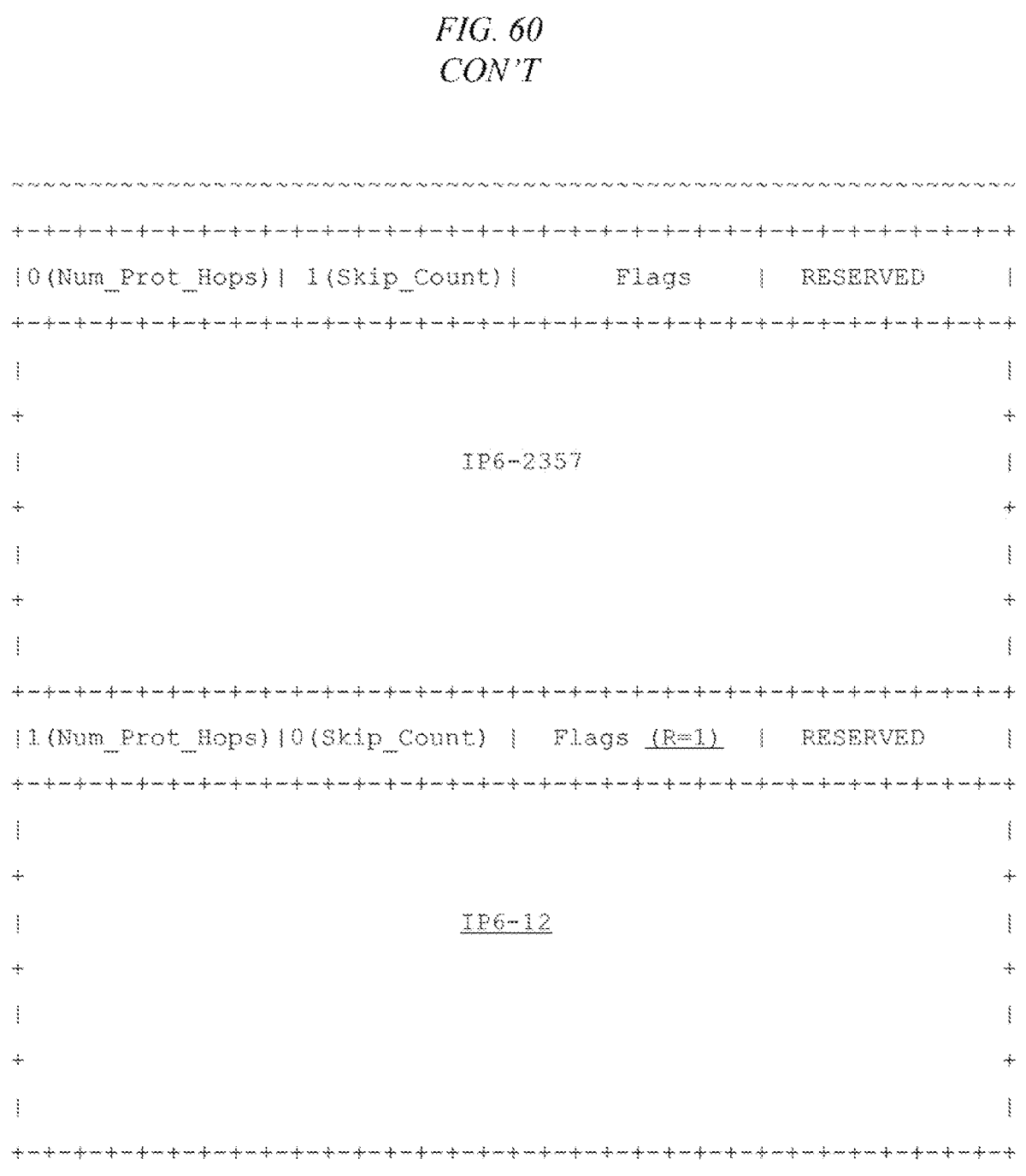

R2, upon receiving a packet with SR(A) and DA=IP6-12 from R1 when the R2→R4 link is forwarding (the R2→R4 link is active and R4 is active), processes the first hop, which is IPV6-FEH [4]={[IP6-24, P=1, S=0]}, as follows: (1) R2 performs an IPv6 Route Table lookup using IP6-24, which results in forward action on the R2→R4 link, (2) R2 determines that R2→R4 is forwarding and, thus, ignores the Protection Path IPV6-FEH [3] and updates Segments Left=2 (namely, the hop for IP6-47 and the hop for IP6-79), (3) R2 swaps the DA and IPV6-FEH[4], marks the R Flag (Recorded Route) to 1, and sets the new DA=IP6-24 (i.e., the next hop in the source routed path), and (4) R2 sends the source routed packet on the R2→R4 link with the format for SR(A) as is depicted in FIG. 60.

R2, upon receiving a packet with SR(A) and DA=IP6-12 from R1 when the R2→R4 link is not forwarding (the R2→R4 link has failed or R4 has failed), processes the first hop, which is IPV6-FEH [4]={[IP6-24, P=1, S=0]}, as follows: (1) R2 performs an IPv6 Route Table lookup using IP6-24, which results in forward action on the R2→R4 link, (2) R2 determines that R2→R4 is not forwarding, (3) R2 determines that R2→R4 has a protection path and decides to fast reroute the source routed packet along the protection path, (4) R2 processes the protection path, which is IPV6-FEH [3]={[IP6-2357, P=0, S=1], including looking up the protection path address (namely, IP6-2357) in IPv6 Path Address Table, which results in expansion of each of the hops of the protection path with the exception of the first hop of the protection path into the source route of the source routed packet (namely, the protection path address {IP6-2357} is replaced with the addresses {IP6-23, IP6-57}) and a forwarding action on the next-hop identified by the first hop of the protection path (identified by IP6-23, which is R2→R3), (5) R2 swaps the DA and IPV6-FEH[4], marks the R Flag (Recorded Route) to 1, and sets the new DA=IP6-23 (i.e., the first hop of the protection path), (6) R2 updates Segments Left to point to the first hop in the encoded protection path (i.e., IPV6-FEH[4]) and carries the Skip_Count received in the Protection Path IPV6-FEH over to the last hop in the expanded protection path (i.e., IPV6-FEH [3]), and (7) R2 sends the source routed packet on R2→R3 link with the format for SR(A) as is depicted in FIG. 61.

Various example embodiments for supporting flow-specific FRR of source routed packets based on path compression for IPV6-based source routing, as indicated above, may be configured to support encoding of the IPV6-FEH using the FEH—Routing Header in various other ways.

Various example embodiments for supporting flow-specific FRR of source routed packets based on path compression for IPV6-based source routing may be configured to support encoding of the IPV6-FEH using an IP-Shim Layer Protocol.

Various example embodiments for supporting flow-specific FRR of source routed packets based on path compression for IPV6-based source routing may be configured to support encoding of the IPV6-FEH using a generic IP-Shim Layer which may be configured to support encoding of IPV6-FEHs in support of flow-specific FRR of source routed packets based on path compression for IPV6-based source routing. The generic IP-Shim Layer may be inserted between the IPv6 header and the transport/upper layer protocol header (e.g., TCP, UDP, ICMP, or the like). The IP-Shim Layer may be carried using a new IP Protocol number in the IPv6 Header, which can be reserved from the registry maintained by IANA (e.g., a value of 145 is suggested; however, any suitable numbers assigned from the unallocated values in IANA registry may be used). The IP-Shim Layer may be indicated in the IPv6 Header. The IP-Shim Layer is defined as generic in that it can carry any "enhancement" related to the IP layer. It is expected that the node that is allowed to inspect the IP-Shim Header is the node corresponding to the DA of the source routed packet. The IP-Shim Layer may use the IP-Shim Header as is depicted in FIG. 62.

The IP-Shim Header for use at the IP-Shim Layer, as depicted in FIG. 62, includes a Type field, a Length field, a Next Header field, and a Payload field.

The Type field of the IP-Shim Header is an 8-bit field that indicates the type of the IP-Shim header. As indicated above, the IP-Shim Protocol is defined as generic and, thus, may support multiple types. For transport of IPV6-FEHs, an IPV6-FEH type is defined (e.g., Type=2, or using any other suitable value). Herein, references to the IPV6-FEH-Shim Header will be understood to mean the IP-Shim Header having a type indicative that the IP-Shim Header is for IPV6-FEH (e.g., Type=2, or using any other suitable value).

The Length field of the IP-Shim Header is a 16-bit field that indicates the length of the payload in octets. It is noted that the octets of the Type field, the Length field, and the Next Header fields are excluded.

The Next Header field of the IP-Shim Header is an 8-bit field that indicates the IP protocol type of the header next to the IP-Shim Header (e.g., TCP, UDP, ICMP, or the like).

The Payload field of the IP-Shim Header is a variable-length field that includes the payload in a type-specific format. The payload format for the IP-Shim Header is as depicted in FIG. 63.

The Payload field of the IPV6-FEH-Shim Header, as depicted in FIG. 63, includes a Segments Left field, a Flags field, a Reserved field, and an IPV6-FEH List (from IPV6-FEH List[1] to IPV6-FEH List[n]).

The Segments Left field of the Payload field of the IPV6-FEH-Shim Header is a 16-bit field that includes the index, in the IPV6-FEH List, of the next hop to inspect. The Segments Left value is decremented at each IPV6-FEH.

The Flags field of the Payload field of the IPV6-FEH-Shim Header is a 1-octet field that includes a set of one-bit flags configured to indicate various capabilities. The Flags field of the Payload field of the IPV6-FEH-Shim Header has the format as depicted in FIG. 64. The Flags field of the Payload field of the IPV6-FEH-Shim Header, as depicted in FIG. 64, includes a set of one-bit flags including an O Flag, a C Flag, and U Flag. The O Flag is the operations and management (OAM) flag which is configured such that, if set (e.g., equal to "1"), then it indicates that this packet is an OAM packet. The C Flag is the Carry flag which is configured such that: (1) when not set (e.g., equal to "0"), this means that the IP-Shim Header is removed when Segments Left becomes 0 and (2) when set (e.g., equal to "1"), this means that IP-Shim Header is carried forward in the source routed packet. The U Flag is unused and for future use and, thus, should be unset on transmission and ignored on receipt.

The IPV6-FEH List is a list ofn IPV6-FEHs (denoted as IPV6-FEH List[I] to IPV6-FEH List[n]). In the list, IPV6-FEH List[n] is the IPV6-FEH that represents n-th element in the IPV6-FEH list. The IPV6-FEH list is encoded starting from the last hop of the path (i.e., the first element of the IPV6-FEH List (IPV6-FEH List [1]) includes the last hop of the path while the last element of the IPV6-FEH List (IPV6-FEH List[n]) includes the first hop of the path). The index in the "Segments Left" field identifies the current hop. An IPV6-FEH is 20-octets in size and is defined as depicted in FIG. 65.

The IPV6-FEH List, as depicted in FIG. 63, is a list of n IPV6-FEH where each of the IPV6-FEHs in the list of IPV6-FEHs is formatted as depicted in FIG. 65. The 20-octet IPV6-FEH includes a Number of Protection Hops field, a Skip_Count field, a Flags field, a RESERVED field, and an IPv6 Address field.

The Number of Protection Hops field of the IPV6-FEH is a 1-octet field that indicates the number of subsequent IPV6-FEHs that are protecting this IPV6-FEH. If the value of the Number of Protection Hops field is set to a value of one ("1"), then it means that the subsequent IPV6-FEH immediately following that IPV6-FEH identifies the protection path of that IPV6-FEH. If the value of the Number of Protection Hops field is set to 0, then it means that there is no protection path for that IPV6-FEH. Additionally, if the IPV6-FEH belongs to a protection path then the value of the Number of Protection Hops field will be set to 0 (since the protection path itself is not protected).

The Skip_Count field of the IPV6-FEH is a 1-octet field that indicates the number of subsequent IPV6-FEHs to be skipped after processing this IPV6-FEH. This is set to 0 for all IPV6-FEHs, except for the IPV6-FEH which includes the protection path address of the protection path.

The Flags field of the IPV6-FEH is a 1-octet field that includes a set of one-bit flags configured to indicate various capabilities. The flags of the Flags field have the following format and are defined as depicted in FIG. 66. The Flags field of the IPV6-FEH, as depicted in FIG. 66, includes an R Flag, a P Flag, and a U Flag. The R Flag is a Recorded Route bit that indicates that this IPV6-FEH has been traversed by the source routed packet (and is set to 0 by the originator of this IPV6-FEH). The P Flag is a protected flag that indicates that this hop is part of a protection path. The U Flag is unused and for future use and, thus, unset on transmission and ignored on receipt.

The RESERVED field of the IPV6-FEH is unused and is reserved for future use. This should be unset on transmission and ignored on receipt.

The IPv6 Address field of the IPV6-FEH includes the 128-bit IPv6 Address representing a hop in primary path or a protection path address identifying a protection path for a hop of the primary path, and should not be a multicast address.

Various example embodiments for supporting flow-specific FRR of source routed packets based on path compression for flow-specific FRR in IPv6-based source routing are configured to support insertion of an IPV6-FEH-Shim Header between the IPv6 Header and the upper layer(s) by the head-end router.

The head-end router may be configured to perform the following operations while inserting an IPV6-FEH-Shim Header between the IPv6 Header and the upper layer(s).

The DA in the IPv6 Header is set with the IPv6 Address of the first primary hop in the explicit path. The original DA in IPv6 Header is preserved in IPV6-FEH[1] (as discussed further below).

The Type field in the IPV6-FEH-Shim Header is set to 2.

The Length field in the IPV6-FEH-Shim is set to the total number of octets in Segments Left, Flags, RESERVED, and IPV6-FEH-List.

The Next Header field in the in the IPV6-FEH-Shim Header is set to the value in Protocol field in the IPv6 Header Protocol field in IPv6 Header is set to a value (e.g., 145, or another suitable value) that indicates the IP-Shim as the upper layer protocol (from the perspective of the IP layer).

The Segments Left field is set to n, where n is the number of elements in the IPV6-FEH List.

The C flag in Flags field is set to a value (e.g., 0) that indicates that the last hop in the explicit hop needs to remove the IPV6-FEH-Shim Header prior to further forwarding of the source routed packet.

The IPV6-FEH List is encoded in the reverse order of the path. Let n be the number of IPV6-FEH entries. The IPV6-FEH[1] is the last hop in primary path (the final DA of the source routed packet) and the IPV6-FEH[n] is the first hop. The entries in the list are ordered in units of sub-groups, where each sub-group contains an IPV6-FEH for a primary-hop followed by the IPV6-FEH entry including the protection path address for the associated protection path. This is further explained as follows.

When encoding the IPV6-FEH List, if IPV6-FEH List[x] is an unprotected primary hop, then IPV6-FEH List[x] is encoded with Num_Protection_Hops=0, Skip_Count=0, and Flags=0 to indicate that no protection path follows after this entry and, thus, IPV6-FEH List[x−1] is the subsequent primary hop.

When encoding the IPV6-FEH List, if IPV6-FEH List[x] is a protected primary hop, then the protection path address of the protection path also is encoded (in the IPV6-FEH List[x−1] entry). The IPV6-FEH List[x] entry is encoded with Num_Protection_Hops=1, Skip_Count=0, and Flags=0, which means that IPV6-FEH List[x−1] is composed of the protection path address indicative of the protection path. Subsequent primary hops start at IPV6-FEH List[x−2]. The IPV6-FEH List[x−1] entry is encoded with Num_Protection_Hops=0, because the protection path is not protected. The IPV6-FEH List[x−1] entry is encoded with the P Flag set to 1. The IPV6-FEH List[x−1] entry is encoded with Skip_Count=C, where C is the number of subsequent primary hops to be skipped (i.e., from IPV6-FEH List [x−2] through IPV6-FEH List[x-2-c]) if the source routed packet is being forwarded on a node protection path.

It is noted that this encoding rule may be iterated over each sub-group of the IPV6-FEH List.

The head-end router then sends the source routed packet toward the DA indicated in the source routed packet.

Figure 67:
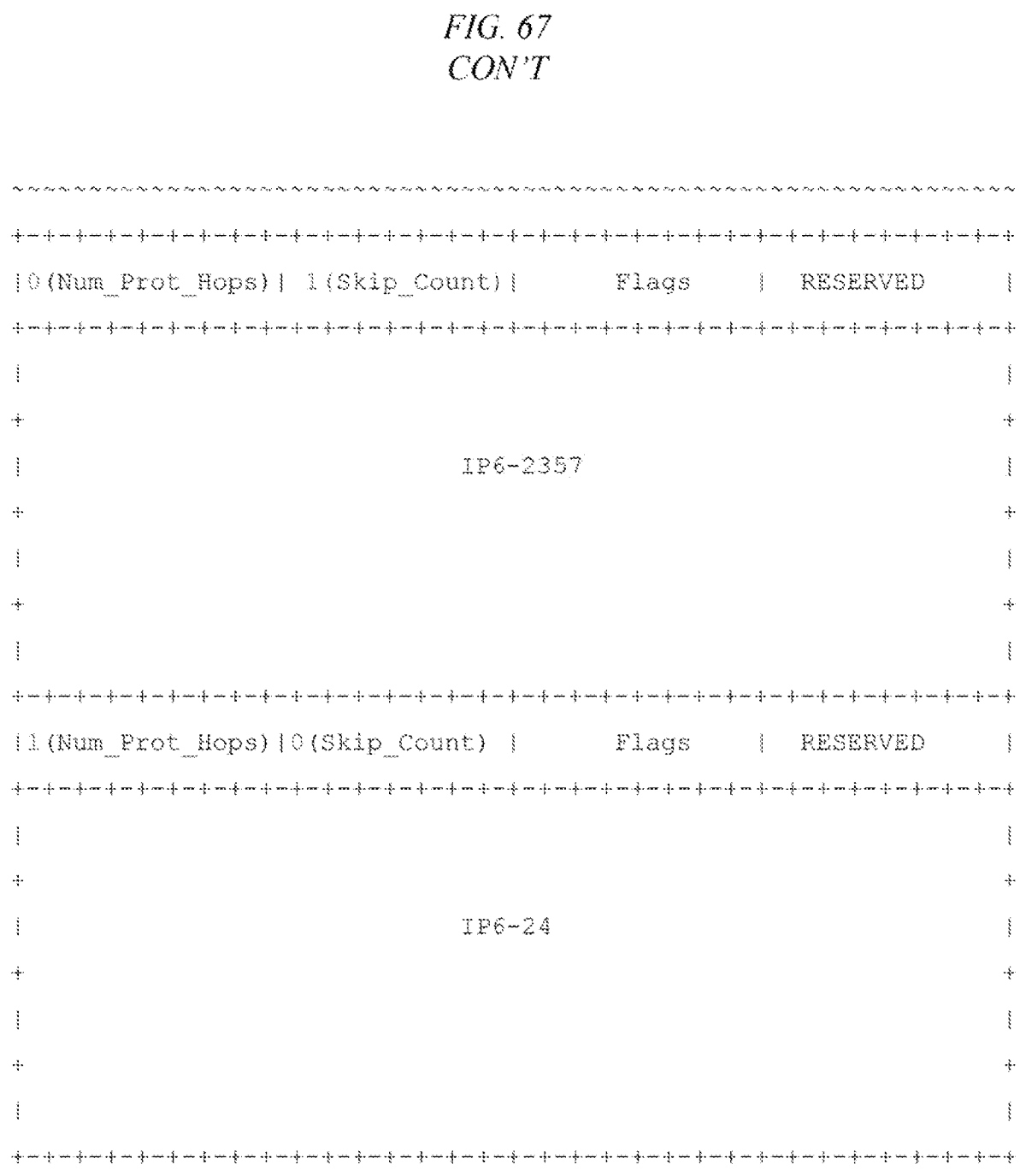

The insertion of an IPV6-FEH-Shim Header between the IPv6 Header and the upper layer(s) by the head-end router may be further understood by way of reference to the following example. For example, consider the path for flow A in FIG. 17, as follows: E(A)={IP6-12, [IP6-24, P (A, R4), 1], IP6-47, IP6-79} where P (A, R4) is the protection path={IP6-23, IP6-35, IP6-57}. In this example, the path is encoded on a packet from source S to destination D (where upper layer was TCP before encoding of the path) as depicted in FIG. 67.

In the example above, it is noted that the IP-Shim Header is inserted between IPv6 Header and TCP Header. As a result, the Protocol in the IPv6 Header becomes 146(=IP-Shim Protocol) and the Next-Header in IP-Shim Header becomes 6(=TCP).

Various example embodiments for supporting flow-specific FRR of source routed packets based on path compression for flow-specific FRR in IPv6-based source routing are configured to support processing of the IPV6-FEH-Shim Header of the IPv6 Header by the transit router.

The transit router may be configured to perform the following operations while processing the IPV6-FEH-Shim Header of the IPv6 Header.

It is noted that, as stipulated in the IP-Shim Layer definition, the node that is supposed to inspect the IP-Shim Header is the node corresponding to DA of the source routed packet. The other transit nodes should not inspect the IPV6-FEH-Shim Header and should forward the source routed packet toward the DA according to the IPv6 Routing Table.

The transit router corresponding to the DA, upon receiving the IPV6-FEH-Shim Header of the IPv6 Header, may process the IPV6-FEH-Shim Header of the IPv6 Header as follows.

If Segments Left=0, the next layer in the source routed packet, whose type is identified by the Next Header field in the IPV6-FEH-Shim Header, is processed.

If Segments Left≠0, then i is set equal to the index of the next IPV6-FEH to be visited in the IPV6-FEH list (=Segments Left). The Segments Left value is decremented by 1. From this point on, the Segments Left value points to IPV6-FEH[i−1]. The IPV6-FEH[i] is processed as discussed further below.

If the address of IPV6-FEH[i] is a multicast address, then the source routed packet may be discarded.

If the address of the IPV6-FEH[i] is a path address, then the source routed packet may be discarded.

If the address of IPV6-FEH[i] is a not multicast address, then IPV6-FEH[i] is further processed based on the Hop Limit in the IPv6 Header as follows.

If the Hop Limit in the IPv6 Header is less than or equal to 1, the following actions are performed. The IPv6 DA and the Address of IPV6-FEH[i] are swapped. The R Flag in IPV6-FEH[i] is set equal to 1 to indicate that it has been traversed by the packet. If the C Flag in the IPV6-FEH-Shim Header=0, then swap the IPv6 DA and the Address of IPV6-FEH[1] (i.e., the final destination address will be restored as the IPv6 DA), restore the Protocol Field in the IPv6 Header from the Next Header field in the IPV6-FEH-Shim Header, and remove the IPV6-FEH-Shim Header. An ICMPv6 Time Exceeded—Hop Limit Exceeded in Transit message is sent to the source address (including a snapshot of the IPv4 Header including the original destination address, since the source is unaware that source routing is being used) and the source routed packet is discarded.

If the Hop Limit in the IPv6 Header is not less than or equal to 1, then IPV6-FEH[i] is further processed by checking reachability of the address of IPV6-FEH[i].

If the address of IPV6-FEH[i] is reachable, swap the IPv6 DA and the IPv6 address of IPV6-FEH[i] and set the R Flag in IPV6-FEH[i]=1 to indicate that this hop has been traversed by the source routed packet. The following processing is performed: (1) if Num_Prot Hops in IPV6-FEH[i]>0, decrement Segments Left by Num_Protection_Hops in IPV6-FEH[i] (this means that the hops in protection path have been skipped since the source routed packet is not being forwarded along the protection path) or (2) if Skip_Count in IPV6-FEH[i]>0, decrement Segments Left by Skip_Count in IPV6-FEH[i] (this means that the hops in the primary path have been skipped, i.e., bypassed by the protection path). If Segments Left=0 and the C Flag in the IPV6-FEH-Shim Header=0, restore the Protocol field in the IPv6 Header from the Next Header field in the IPV6-FEH-Shim Header and remove the IPV6-FEH-Shim Header. The source routed packet is then resubmitted to the IPv6 module for transmission to the new destination.

If the address of IPV6-FEH[i] is not reachable and if the Num_Protection_Hops in IPV6-FEH[i]=0 (this means the next-hop is neither operational nor protected and, thus, that the source routed packet is to be dropped), then the IPv6 DA address and the address of IPV6-FEH[i] are swapped and the R Flag in IPV6-FEH[i] is set equal to 1 to indicate that this hop has been traversed by the source routed packet. If the C Flag in the IPV6-FEH-Shim Header=0, then swap the IPv6 DA and the Address of IPV6-FEH[1] (i.e., the final destination address will be restored as the IPv6 DA, restore the Protocol field in the IPv6 Header from the Next Header field in the IPV6-FEH-Shim Header and remove the IPV6-FEH-Shim Header. An ICMP Unreachable message (including a snapshot of the IPv6 header including the original destination address, since the source is unaware that source routing is being used) is sent to the Source Address and the source routed packet is discarded.

If the address of IPV6-FEH[i] is not reachable and if Num_Protection_Hops in IPV6-FEH[i] !=0 (this means the next-hop is not operational but is protected by a protection path), then Segments Left value is decremented by 1 (such that it now points to IPV6-FEH[i−2]), the IPv6 DA address and the address of IPV6-FEH[i] (i.e., the first entry in the protection path) are swapped, and the R Flag in IPV6-FEH [i] is set equal to 1 to indicate that this hop has been traversed by the source routed packet. If Segments Left=0 and the C Flag in the IPV6-FEH-Shim Header=0, restore the Protocol field in the IPv6 Header from the Next Header field in the IPV6-FEH-Shim Header and remove the IPV6-FEH-Shim Header. The source routed packet is then resubmitted to the IPv6 module for transmission to the new destination.

If the address of IPV6-FEH[i] is a path address, then the following processing is performed. The protection path address is looked up in the IPv6 Path Address Table to determine the IPv6 address hop list of the protection path. Here, assume that the hop list of the protection path includes P hops as follows: {H1, H2, H3, . . . , Hp}. The IPV6-FEH [i−1] is replaced with {H2, H3, . . . Hp}, with each of the hops being encoded using an IPV6-FEH, respectively. The IPV6-FEH[i−1] is encoded with Hp and IPV6-FEH[i+p−2] is encoded with H2. The Segments_Left field is updated to point to the IPV6-FEH[i+p−2]. The DA is recorded at IPV6-FEH[i+p−1]. The R Flag is set equal to one in IPV6-FEH[i+p−1], to indicate that it has been traversed by the source routed packet. The DA in the IPv6 header is set to H1 (i.e., the first hop in the protection path, as this is the next hop for the source routed packet).

Various example embodiments for supporting flow-specific fast rerouting of source routed packets for flow-specific FRR in IPv6-based source routing, based on use of an IP-Shim layer, may be further understood by considering an example in which source router R1 sends a packet from source S to destination D with explicit path E(A).

The source node, as described above, sends a source routed packet including a source route that includes an explicit encoding of the hops of the source routed path and an explicit encoding of a protection path address indicative of a protection path configured to protect one of the hops of the source routed path.

The source node inserts an FPPE in order to include an IPV6-FEH in an IPv6 source routed path.

In the case of flow A, for example, the encoding of an FPPE including IPV6-FEH=[IP6-24, (P=1, C=1), IP6-2357] is as depicted in FIG. 68.

Figure 69:
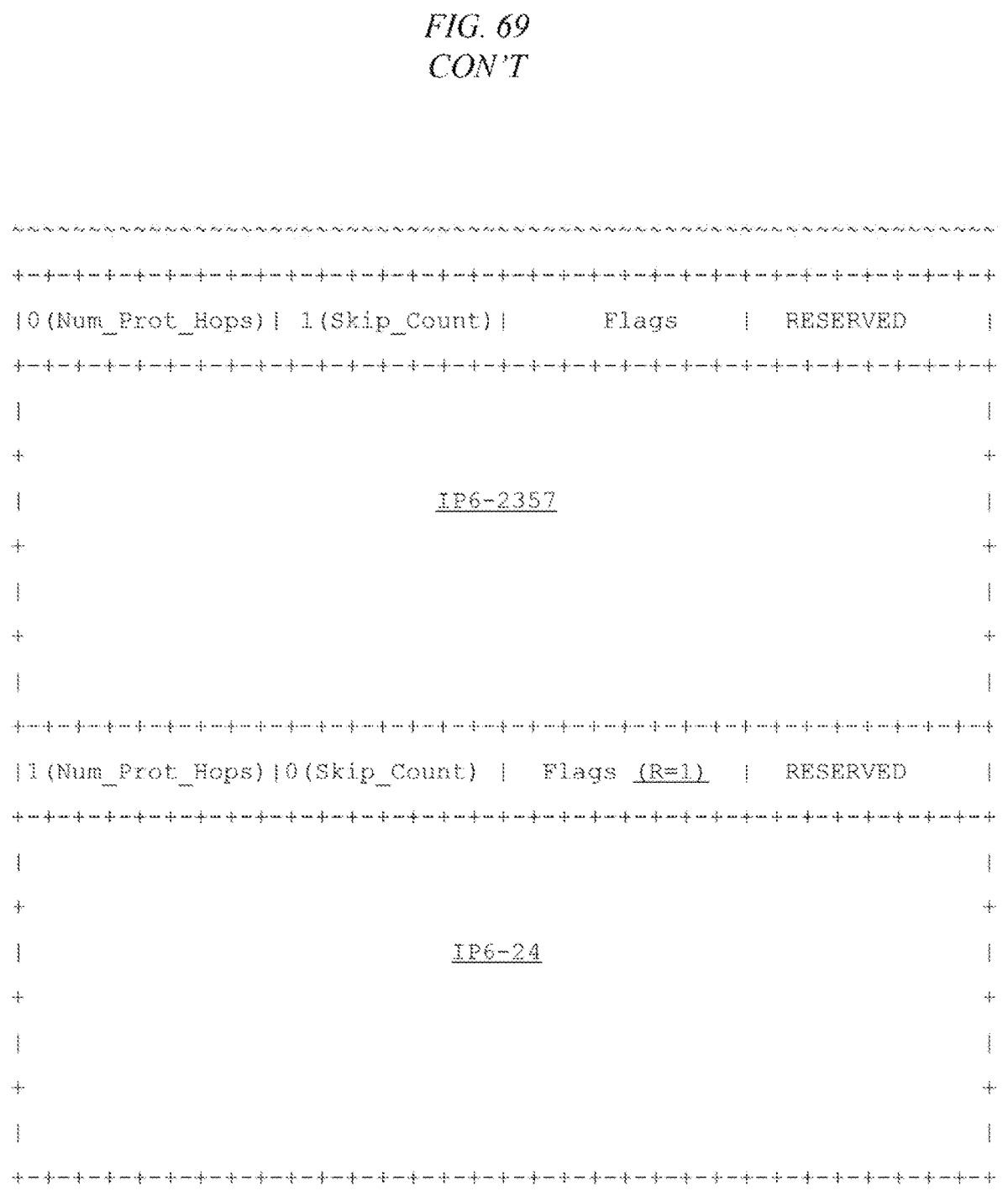

In the case of flow A, for example, the source route SR(A) included in the source routed packet sent by R1 to R2 is configured as depicted in FIG. 69.

A receiver that receives an FPPE (i.e., Segments Left points to the first IPV6-FEH of FPPE) may process the IPV6-FEHs of the FPPE as follows. The receiver processes the first hop in the FPPE, which is an IPV6-FEH of the protected hop. The IPV6-FEH of the protected hop includes an IPv6 address of the protected hop. The receiver looks up the IPv6 address of the protected hop in the IPv6 Route Table to get the next-hop/forwarding information (denoted as NH) for the protected hop. The IPV6-FEH of the protected hop is removed from the list of IPV6-FEHs of the source routed packet. The Num_Protection_Hops value is read from the IPV6-FEH of the protected hop (in this case, since the first hop is a protected hop that is protected by a protection path, the Num_Protection_Hops value is set to one ("1") to indicate that the next IPV6-FEH of the FPPE includes the protection path address of the protection path for the protected hop. A determination is made as to whether the next-hop (NH) is operational. If the NH is operational, the number of IPV6-FEHs specified by the Num_Protection_Hops value is removed from the list of IPV6-FEHs of the source routed packet (thereby removing the IPV6-FEH of the protection path from the list of IPV6-FEHs of the source routed packet, since it is not going to be used) and the source routed packet is forwarded to the NH. If the NH is not operational, the top hop (which is now the first hop in the list of IPV6-FEHs and which includes a protection path address identifying the protection path) is processed and used to initiate fast rerouting of the source routed packet using the protection path. The hops of the protection path and actions to be performed for fast rerouting along the protection path are determined based on a table lookup using the protection path address (e.g., the IPV6-FEH of the protection path is removed from the list of IPV6-FEHs of the source routed packet, the hops of the protection path with the exception of the first hop of the protection path are encoded within the list of IPV6-FEHs of the source route in the source routed packet, and the next-hop/forwarding information of the first hop of the protection path (denoted as NH2) is determined). The source routed packet is then handled based on whether NH2 is operational (either the source routed packet is forwarded to NH2 as an FRR operation if NH2 is operational or the source routed packet is dropped if NH2 is not operational).

The operation of R2 upon receiving the source routed packet, including the source route SR(A), from R1 depends on whether the R2→R4 link is forwarding.

Figure 70:
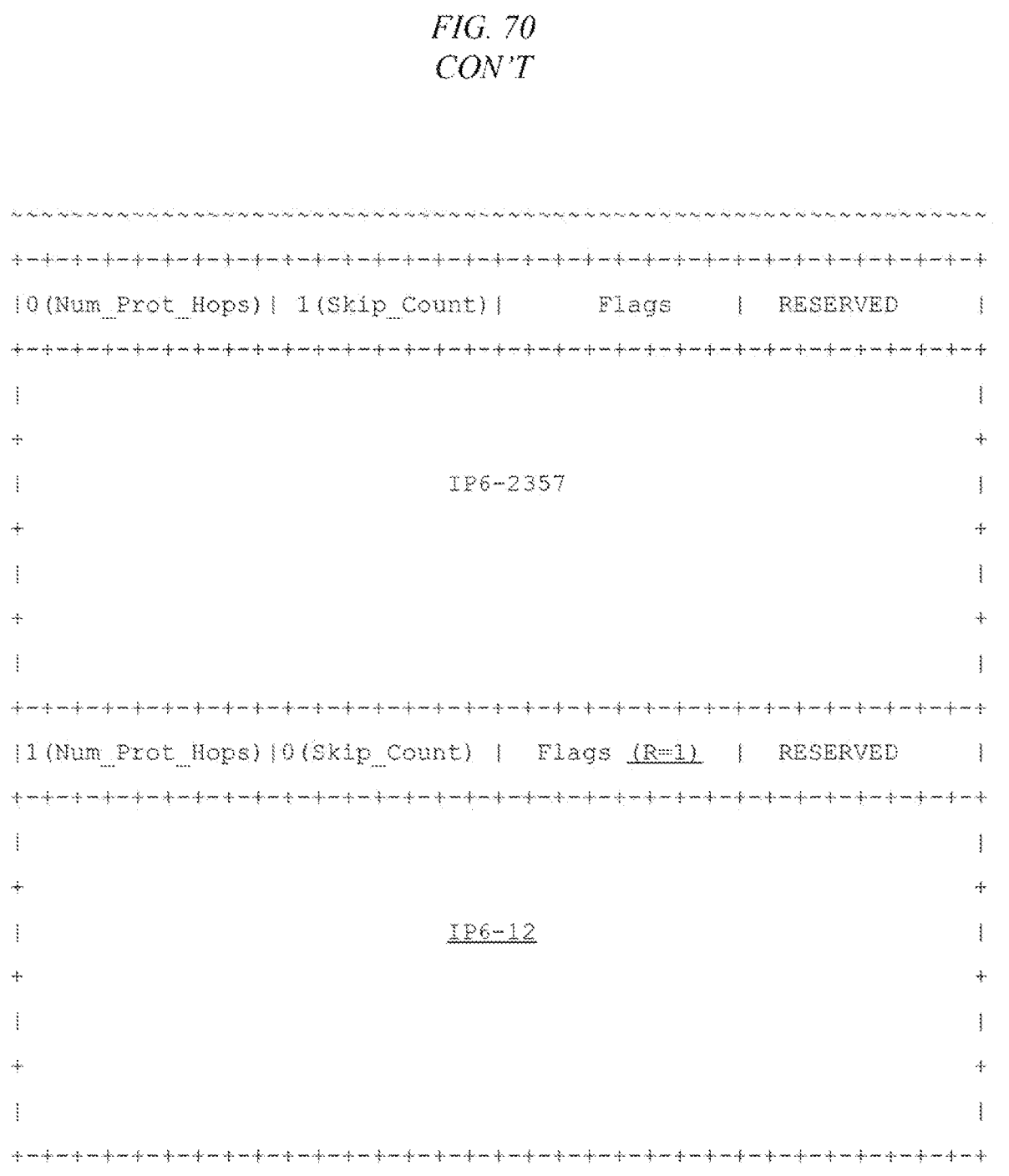

R2, upon receiving a packet with SR(A) and DA=IP-12 from R1 when the R2→R4 link is forwarding (the R2→R4 link is active and R4 is active), processes the first hop, which is IPV6-FEH [4]={[IP6-24, P=1, S=0]}, as follows: (1) R2 performs an IPv6 Route Table lookup using IP6-24, which results in forward action on the R2→R4 link, (2) R2 determines that R2→R4 is forwarding and, thus, ignores the Protection Path IPV6-FEH [3] and updates Segments Left=2 (namely, the hop for IP6-47 and the hop for IP6-79), (3) R2 swaps the DA and IPV6-FEH[4], marks the R Flag (Recorded Route) to 1, and sets the new DA=IP6-24 (i.e., the next hop in the source routed path), and (4) R2 sends the source routed packet on the R2→R4 link with the format for SR(A) as is depicted in FIG. 70.

Figure 71:
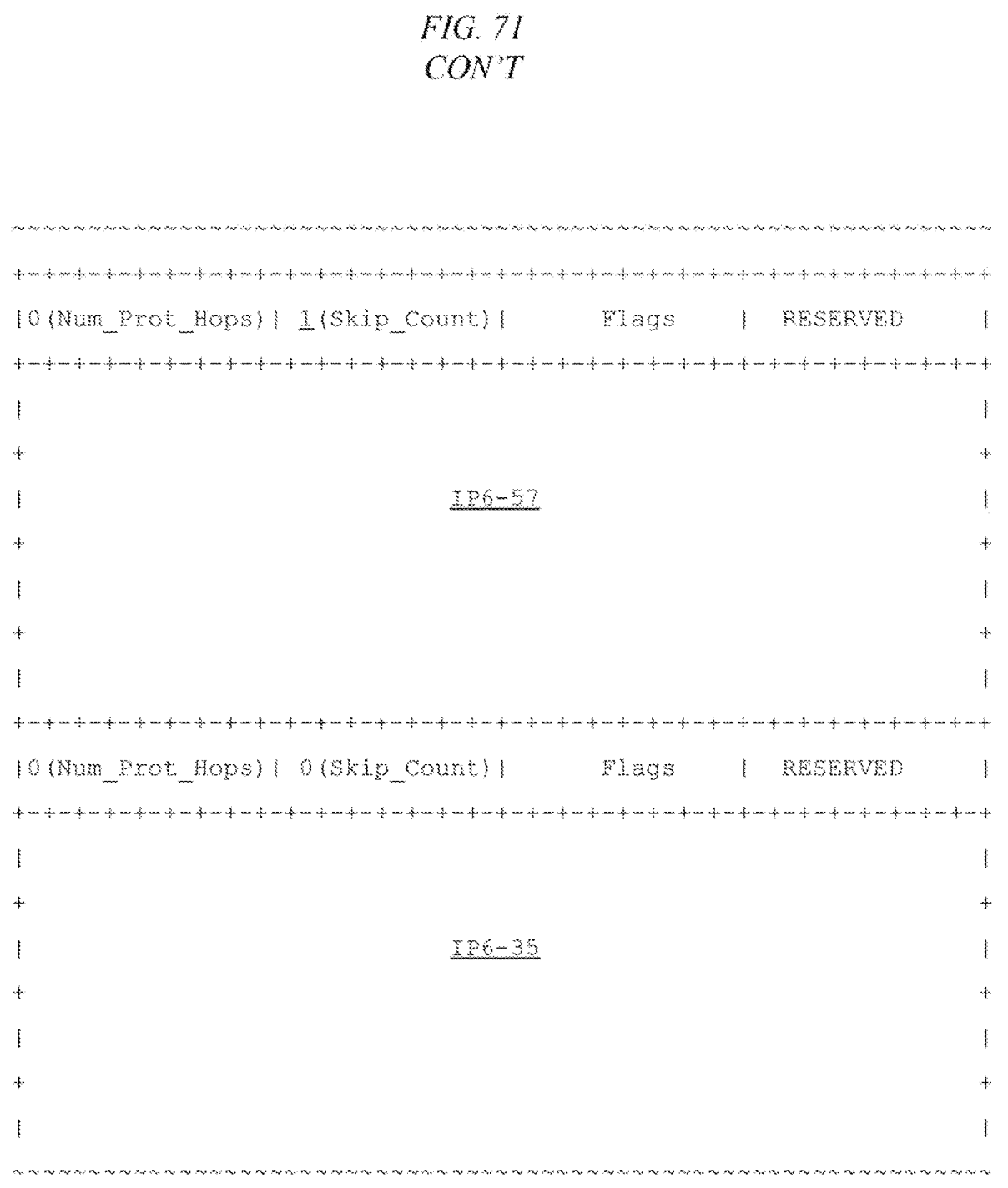
Figure 71:
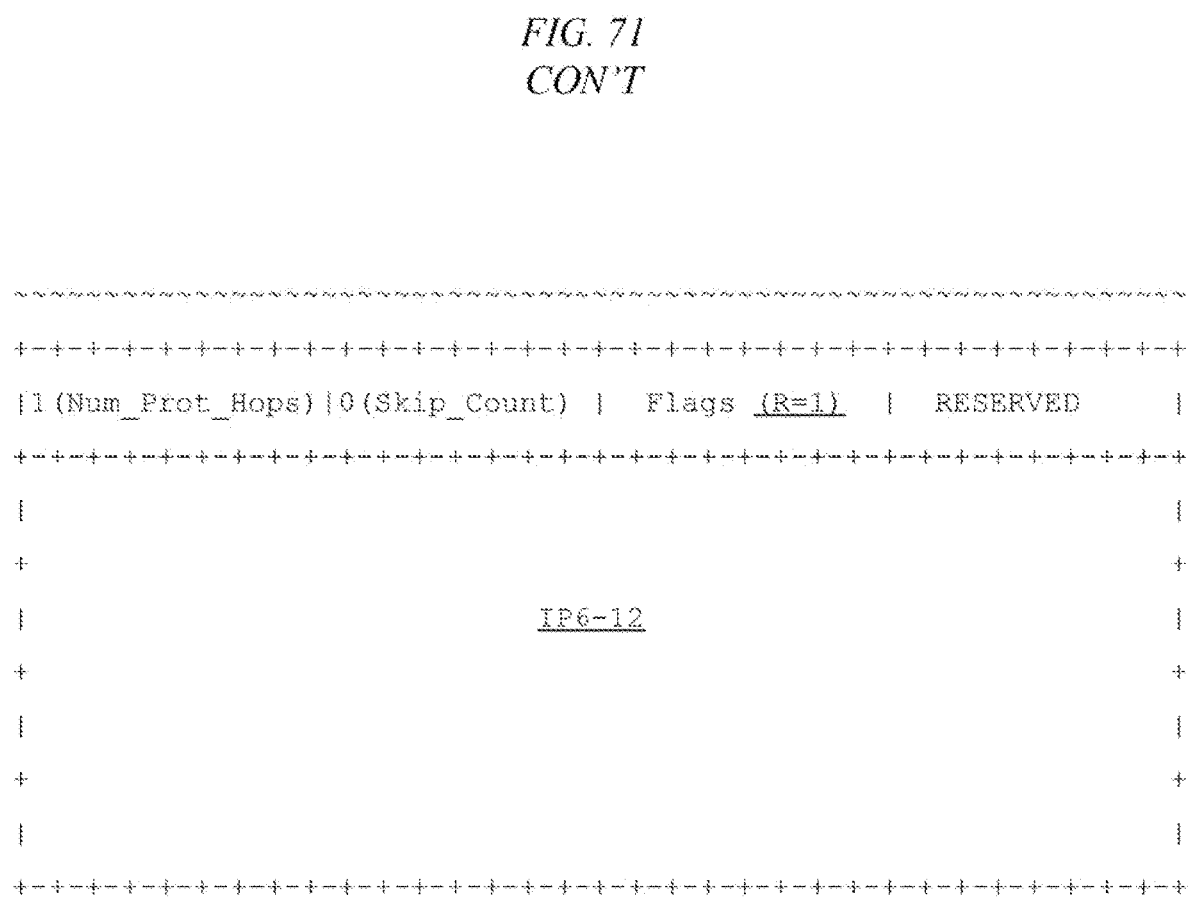

R2, upon receiving a packet with SR(A) and DA=IP-12 from R1 when the R2→R4 link is not forwarding (the R2→R4 link has failed or R4 has failed), processes the first hop, which is IPV6-FEH [4]={[IP-24, P=1, S=0]}, as follows: (1) R2 performs an IPv6 Route Table lookup using IP6-24, which results in forward action on the R2→R4 link, (2) R2 determines that R2→R4 is not forwarding, (3) R2 determines that R2→R4 has a protection path and decides to fast reroute the source routed packet along the protection path, (4) R2 processes the protection path, which is IPV6-FEH [3]={[IP6-2357, P=0, S=1], including looking up the protection path address (namely, IP6-2357) in IPv6 Path Address Table, which results in expansion of each of the hops of the protection path with the exception of the first hop of the protection path into the source route of the source routed packet (namely, the protection path address {IP6-2357} is replaced with the addresses {IP6-23, IP6-57}) and a forwarding action on the next-hop identified by the first hop of the protection path (identified by IP6-23, which is R2→R3), (5) R2 swaps the DA and IPV6-FEH[4], marks the R Flag (Recorded Route) to 1, and sets the new DA=IP6-23 (i.e., the first hop of the protection path), (6) R2 updates Segments Left to point to first hop in the encoded protection path (i.e., IPV6-FEH[4]) and carries the Skip_Count received in the Protection Path IPV6-FEH over to the last hop in the expanded protection path (i.e., IPV6-FEH[3]), and (7) R2 sends the source routed packet on R2→R3 link with the format for SR(A) as is depicted in FIG. 71.

It is noted that, since R1 sets the C Flag to 0 while inserting the IPV6-FEH-Shim Header, the egress router of the source routing domain (namely, R9) is to remove the IPV6-FEH-Shim Header before forwarding the source routed packet to D. Additionally, before removing the IPV6-FEH-Shim Header, R9 restores the Protocol field in the IPv6 Header from the Next Header field in IPV6-FEH-Shim Header.

Various example embodiments for supporting flow-specific FRR of source routed packets based on path compression in IPV6-based source routing, as indicated above, may be configured to support encoding of the IPV6-FEH using an IP-Shim Layer in various other ways.

It will be appreciated that various example embodiments for supporting flow-specific FRR of source routed packets may be configured to support flow-specific FRR of source routed packets, based on path compression, in IPv6-based source routing in various other ways.

It will be appreciated that various example embodiments for supporting flow-specific FRR of source routed packets may be configured to support flow-specific FRR of source routed packets based on path compression in various other ways.

Various example embodiments for supporting routing of source routed packets using path compression (e.g., path compression for paths which are segments of source routed paths, path compression for protection paths configured to protect portions of source routed paths, or the like, as well as various combinations thereof) may be configured to support path identifier management in the control plane. This may be supported for various types of source routing (e.g., MPLS, IPv4, IPv6, and so forth) based on various control protocols (e.g., IS-IS, OSPF, OSPFv3, BGP-LS, and so forth).

Various example embodiments for supporting routing of source routed packets using path compression (e.g., path compression for paths which are segments of source routed paths, path compression for protection paths configured to protect portions of source routed paths, or the like, as well as various combinations thereof) in MPLS-based source routing may be configured to support path label management in the control plane. As discussed further below, this may be performed using IS-IS, OSPF, OSPFv3, BGP-LS, or any other suitable protocol.

As discussed herein, the PCE may instruct a router to allocate and program a path label against a path. In this context, the PCE describes the path as a list of hops of which the path is composed, where each hop is denoted by an IP address/prefix. The router figures out the label against a hop from its IGP database with Segment Routing Extensions (where each LSA has the mapped SID/Label). If a label mapped to a hop is not available at the router (e.g., IGP re-convergence), then the path label would stay "unresolved" at the router and will not be programmed into the ILM of the router. Once IGP converges and the path label is resolved, then the path label is programmed into the ILM of the router. This Path-Label→Path Mapping may be referred to herein as a path label mapping.

The router, once a path label is allocated by the router and is mapped to the path (i.e., to the list of node/adjacency labels along the path), programs the path label into the ILM Table and the NHLFE Table in the data plane of the router.

In order for the PCE to know the range of labels that the router has reserved for local paths, the router advertises its local path label range to the PCE. Various example embodiments may be configured to enable a router to advertise its local path label range to the PCE (or any external agent) via IGPs (e.g., IS-IS, OSPFv2, OSPFv3, or the like) and BGPs (e.g., BGP-LS or the like).

In order for the path label mappings created by a router in one area to be visible to routers in other areas, an Area Border Router (ABR) advertises all path label mappings in its area to an external agent (e.g., a PCE, an SDN Controller, or any suitable external application). This is due to the fact that, for an MPLS source route that traverses across multiple IGP areas, a head-end router may need to encode the path label against a path segment in another area. Various example embodiments may be configured to enable an ABR to advertises all path label mappings in its area to an external agent (or any external agent) via BGPs (e.g., BGP-LS or the like) or other suitable protocols or mechanisms. As such, each router floods its path label mappings throughout its area, so that such path label mappings reach the ABR(s) of the area and, thus, may be redistributed by ABR to the external agent(s) outside of the area. Various example embodiments may be configured to enable a router to advertise its path label mappings within its area via IGPs (e.g., IS-IS, OSPFv2, OSPFv3, or the like) and BGPs (e.g., BGP-LS or the like).

As the path label mappings are exchanged between routers within and between areas, the routers build path label mapping databases (PLMDs). With respect to the example of FIG. 1, for example, the structure of the PLMD at R1 may be as depicted in FIG. 72.

The PLMD for R1, as depicted in FIG. 72, includes a section (denoted as Area: Self) with path label mappings for its own area (assuming that routers R2-R9 are the only routers in its area) and a section (denoted as Area: Other) with path label mappings from another area. The section of the PLMD with the path label mappings from the other area is learned by R1 from external agents via redistribution of path label mappings of the other area by the ABR of the other area. It will be appreciated (as may be seen from the example PLMD above), that multiple paths may originate from any given node (e.g., two paths are depicted as originating from router R2: namely, the path {IP-23, IP-35, IP-57} which has an associated path label of L2357 and path {IP-25, IP-56} which has an associated path label of L256). The router R1 may then use the PLMD to look up paths originating from other nodes such that, when a matching path is found (in terms of the hops of the path), the associated path label mapped to the matching path may be used to encode the source routed packet. For example, if router R1 wants to look for a path originating from R2 (where the path includes a set of hops), it searches the path entries of R2 in the PLMD and matches the set of hops of the path against the listed hops in the path label mapping entries for R2, such that the path label mapped to that path may be identified and used to encode the source routed packet.

Various example embodiments for supporting routing of source routed packets using path compression (e.g., path compression for paths which are segments of source routed paths, path compression for protection paths configured to protect portions of source routed paths, or the like, as well as various combinations thereof) in MPLS-based source routing may be configured to support path label management in the control plane using IS-IS.

In general, IS-IS is an IGP protocol that distributes network topology information among the IS-IS speaking routers. The base specification of IS-IS is defined in RFC 1142. In IS-IS, such network topology information is exchanged in Link State PDUs (LSPs). The LSPs may carry link status for links of a router, internal or external route prefixes of a router, or the like. The IS-IS control plane for MPLS segment routing is being standardized in the IETF in the "IS-IS Extensions for Segment Routing" draft (also denoted as SR-ISIS-DRAFT). The IS-IS control plane for MPLS segment routing, as discussed further below, may be configured to support path label management in the control plane.

Various example embodiments for supporting routing of source routed packets using path compression in MPLS-based source routing may be configured to support advertisement of path label range in the control plane using IS-IS.

In at least some embodiments, advertisement of path label range in the control plane using IS-IS may be performed using an SR Local Block (SRLB) Sub-TLV as defined in the SR-ISIS-DRAFT. Section 3.3 in the SR-ISIS-DRAFT defines an SRLB Sub-TLV that includes the range of labels that the node has reserved for local SIDs, such as Adjacency-SIDs. Section 3.3 in the SR-ISIS-DRAFT describes the format for the SRLB Sub-TLV as depicted in FIG. 73.

The SRLB Sub-TLV, as depicted in FIG. 73, includes a Type field, a Length field, and a Flags field, followed by one or more SRLB descriptor entries (each of which includes a 3-octet Range field and a variable-sized SID/Label Sub-TLV).

The Type field of the SRLB Sub-TLV is a 1-octet field that includes the type of the SRLB Sub-TLV. The value of the Type field has yet to be determined (e.g., a value of 22 is suggested; however, it will be appreciated that other suitable values may be used).

The Length Field of the SRLB Sub-TLV is a 1-octet field that includes the variable length of the Value portion of the SRLB Sub-TLV (namely, the Flags field and any SLRB descriptor entries).

The Flags field of the SRLB Sub-TLV is a 1-octet field that may be used to define various flags (although it is noted that none are currently defined).

The SRLB descriptor entries of the SRLB Sub-TLV, as depicted in FIG. 73, each include a 3-octet Range field and a variable-sized SID/Label Sub-TLV, where the SID/Label Sub-TLV includes the first value of the SRLB while the Range field includes the number of SRLB elements. Since the path label is locally significant to the head-end router of the path, the SRLB also signifies the label range available for allocation of path labels (or path SIDs).

Various example embodiments for supporting routing of source routed packets using path compression in MPLS-based source routing may be configured to support advertisement of path label range in the control plane using IS-IS in other ways.

Various example embodiments for supporting routing of source routed packets using path compression in MPLS-based source routing may be configured to support advertisement of path label mappings in the control plane using IS-IS.

In at least some embodiments, advertisement of path label mappings in the control plane using IS-IS may be performed using a Path-SID Sub-TLV carried as a nested Sub-TLV within a Path Address Mapping Sub-TLV, where the Path Address Mapping Sub-TLV is carried within a Path TLV. It is noted that the Path TLV may be a TLV supported by IS-IS for distributing path address mappings in IP-based source routing, but also may be used for distributing path label mappings in MPLS-based source routing. The Path-SID Sub-TLV carries the path label assigned to the path described by the Path Address Mapping Sub-TLV.

The Path TLV, which is carried within a Link State PDU (LSP), may have the format as depicted in FIG. 74.

The Path TLV, as depicted in FIG. 74, includes a Type field, a Length field, a Flags field, and one or more Path Address Mapping Sub-TLVs.

The Type field of the Path TLV is a 1-octet field that includes the type of the Path TLV. The value of the Type field has yet to be determined (e.g., a value of 25, which may be allocated from the IANA registry, is suggested; however, it will be appreciated that other suitable values may be used).

The Length field of the Path TLV is a 1-octet field that includes the variable length of the Value portion of the Path TLV (namely, the Flags field and the Path Address Mapping Sub-TLVs).

The Flags field of the Path TLV is a 1-octet field that may be used to define various flags (although it is noted that none are currently defined).

The Path TLV, as depicted in FIG. 74, includes one or more Path Address Mapping Sub-TLVs.

The Path Address Mapping Sub-TLV, which is carried within the Path TLV, may have the format as depicted in FIG. 75.

The Path Address Mapping Sub-TLV includes a single path address mapping. The Path Address Mapping Sub-TLV, as depicted in FIG. 75, includes a Type field, a Length field, a Flags field, a Number of Hops (Num Hops) field, a Path Address field, one or more Hop Address fields, and Sub-TLVs.

The Type field of the Path Address Mapping Sub-TLV includes the type of the Path Address Mapping Sub-TLV. The Type field may be a first type (e.g., Type 1) in IPv4, in which case the Path Address field may be 4-octets in size (and including an IPv4 path address) and each Hop Address field may be 4-octets in size (including IPv4 addresses of hops of the path). The Type field may be a second type (e.g., Type 2) in IPv6, in which case the Path Address field may be 16-octets in size (and including an IPv6 path address) and each Hop Address field may be 16-octets in size (including IPv6 addresses of hops of the path).

The Length field of the Path Address Mapping Sub-TLV has a value that is variable.

The 1-octet Flags field of the Path Address Mapping Sub-TLV may be used to define various flags (although it is noted that none are currently defined).

The Number of Hops (Num Hops) field of the Path Address Mapping Sub-TLV indicates the number of hops in the path (and, thus, the number of Hop Address fields included in the Path Address Mapping Sub-TLV.

The Path Address field of the Path Address Mapping Sub-TLV includes the path address (4 octets for a Type 1 Path Address Mapping Sub-TLV associated with IPv4 or 16 octets for a Type 2 Path Address Mapping Sub-TLV associated with IPv6).

The Hop Address fields of the Path Address Mapping Sub-TLV includes the addresses of the hops of the path (i.e., Hop Address[x] includes the address of the x-th hop in the path).

The Sub-TLVs of the Path Address Mapping Sub-TLV, in this case, will include the Path-SID Sub-TLV (which, as previously indicated, is carried as a nested Sub-TLV within the Path Address Mapping Sub-TLV).

The Path-SID Sub-TLV, which is carried as a nested Sub-TLV within a Path Address Mapping Sub-TLV of a Path TLV, carries the path label that is assigned to the path described by the Path Address Mapping Sub-TLV of the Path TLV. The format of the Path-SID Sub-TLV is as depicted in FIG. 76.

The Path-SID Sub-TLV, as depicted in FIG. 76, includes a Type field, a Length field, a Flags field, a Weight field, and an SID/Label/Index field.

The Type field of the Path-SID Sub-TLV includes the type of the Path-SID Sub-TLV. The value of the Type field has yet to be determined (e.g., a value of 33 is suggested; however, it will be appreciated that other suitable values may be used).

The Length field of the Path-SID Sub-TLV has a value that is variable.

The Flags field of the Path-SID Sub-TLV is a 1-octet field that includes a set of one-bit flags configured to indicate various capabilities. The Flags field of the Path-SID Sub-TLV has the format as depicted in FIG. 77. The Flags field of the Path-SID Sub-TLV, as depicted in FIG. 77, includes a P Flag, a V Flag, and an L Flag. The P Flag is a protection flag which is configured such that, if set (e.g., equal to "1"), the Path-SID refers to a protection-path and carries a Protection Label. The V Flag is value flag which is configured such that, if set (e.g., equal to "1"), the Path-SID carries a value (and it is noted that this flag may be set by default). The 1 Flag is a local flag which is configured such that, if set (e.g., equal to "1"), the value/index carried by the Path-SID has local significance (and it is noted that this flag may be set by default). It is noted that the other bits of the Flags field may be set to zero when originated and ignored when received.

The Weight field of the Path-SID Sub-TLV has a value that represents the weight of the Path-SID for the purpose of load balancing.

The SID/Label/Index field of the Path-SID Sub-TLV, according to the V and L Flags of the Flags field, includes either: (1) a 3 octet local label where the 20 rightmost bits are used for encoding the label value (in which case the V and L Flags are set) or (2) a 4 octet index defining the offset in the SID/Label space advertised by this router using the encodings defined herein (in which case the V and L Flags are unset).

It is noted, with respect to the Path-SID Sub-TLV, that it is expected that an IS-IS speaker (router) will set the P Flag when the path is programmed as a protection path, may allocate more than one Path-SID to a path, and will not allocate the same Path-SID to different paths.

It is noted that the inclusion of the Path-SID Sub-TLV (which includes the path label) within the Path Address Mapping Sub-TLV (which includes a description of the associated path) provides advertisement of the path label mapping (namely, since the path label carried in the Path-SID Sub-TLV is associated with the path described by the Path Address Mapping Sub-TLV that carries the Path-SID Sub-TLV which includes the path label).

As described above, an IS-IS speaker (router) maintains a PLMD for the area in which it participates. The PLMD includes path label mappings for each IS-IS router in the area and is built by flooding of Path TLVs carrying Path-SIDs across the area.

As described above, a router, upon receipt of a path label mapping (e.g., a Path TLV including a Path Address Mapping Sub-TLV that includes a Path-SID Sub-TLV), updates its PLMD. It is noted that SPF or other route calculations are unnecessary.

As described above, an IS-IS ABR may redistribute its PLMD to an external agent (e.g., to an SDN controller, PCE server, or the like, via BGP-LS or other means) for visibility of path label mappings across multiple areas.

Various example embodiments for supporting routing of source routed packets using path compression in MPLS-based source routing may be configured to support advertisement of path label mappings in the control plane using IS-IS in other ways.

Various example embodiments for supporting routing of source routed packets using path compression in MPLS-based source routing may be configured to support path label management in the control plane using IS-IS in other ways.

Various example embodiments for supporting routing of source routed packets using path compression (e.g., path compression for paths which are segments of source routed paths, path compression for protection paths configured to protect portions of source routed paths, or the like, as well as various combinations thereof) in MPLS-based source routing may be configured to support path label management in the control plane using OSPF (e.g., OSPF, OSPFv3, or the like).

In general, OSPF is an IGP protocol that distributes network topology information among the OSPF speaking routers.

OSPF (or OSPFv2) is an IGP protocol that distributes IPv4 network topology information among the OSPF speaking routers. The base specification of OSPF is defined in RFC 2328. In OSPF, such IPv4 network topology information is exchanged in Link State Advertisements (LSAs). The LSAs may carry link status for links of a router, internal or external route prefixes of a router, or the like. The OSPF control plane for MPLS segment routing is being standardized in the IETF in the "OSPF Extensions for Segment Routing" draft (also denoted as SR-OSPF-DRAFT). The OSPF control plane for MPLS segment routing, as discussed further below, may be configured to support path label management in the control plane.

OSPFv3 is an IGP protocol that distributes IPv6 network topology information among the OSPF speaking routers. The base specification of OSPF is defined in RFC 5340. In OSPFv3, such IPv6 network topology information is exchanged in LSAs. The LSAs may carry link status for links of a router, internal or external route prefixes of a router, or the like. The OSPFv3 control plane for MPLS segment routing is being standardized in the IETF in the "OSPFv3 Extensions for Segment Routing" draft (also denoted as SR-OSPFV3-DRAFT). The OSPFv3 control plane for MPLS segment routing, as discussed further below, may be configured to support path label management in the control plane.

Various example embodiments for supporting routing of source routed packets using path compression in MPLS-based source routing may be configured to support advertisement of path label range in the control plane using OSPF.

Section 3.3 in the SR-OSPF-DRAFT defines a SR Local Block (SRLB) Sub-TLV that includes the range of labels that the node has reserved for local SIDs, such as Adjacency-SIDs. Section 3.3 in the SR-OSPF-DRAFT describes the format for the SRLB Sub-TLV as depicted in FIG. 78.

The SRLB Sub-TLV includes a Type field, a Length field, a Range Size field, and a RESERVED field, followed by one or more Sub-TLVs). The value of the Type field has yet to be determined (e.g., a value of 14 is suggested; however, it will be appreciated that other suitable values may be used). The value of the Length field is variable, in octets, depending on the number of Sub-TLVs included. The Range Size field is a 3-octet SID/label range size (i.e., the number of SIDs or labels in the range, including the first SID/label). The Sub-TLV includes an SID/Label Sub-TLV as defined in Section 2.1 of the SR-OSPF-DRAFT. The SID/Label Sub-TLV is included in the SRLB Sub-TLV. The SID/Label that is advertised in the SID/Label Sub-TLV represents the first SID/Label in the advertised range (indicated in the Range Size field, as discussed above). Since the path label is locally significant to the head-end router of the path, the SRLB also signifies the label range available for allocation of path labels (or path SIDs).

Various example embodiments for supporting routing of source routed packets using path compression in MPLS-based source routing may be configured to support advertisement of path label range in the control plane using OSPF in other ways.

Various example embodiments for supporting routing of source routed packets using path compression in MPLS-based source routing may be configured to support advertisement of path label mappings in the control plane using OSPF.

In at least some embodiments, advertisement of path label mappings in the control plane using OSPF may be performed using a Path LSA carried within an OSPF Opaque LSA. It is noted that Path LSA may be an LSA supported by OSPF for distributing IP path address mapping information (a mapping of a path address to a list of IP hops along the path), including an LSA supported by OSPF for distributing IPv4 path address mapping information (e.g., a mapping of an IPv4 path address to a list of IPv4 hops along the path) and an LSA supported by OSPFv3 for distributing IPv6 path address mapping information (e.g., a mapping of an IPv6 path address to a list of IPv6 hops along the path).

The Path LSA, as indicated above, is carried within an OSPF Opaque LSA. The "OSPF Opaque LSA Option" is described in RFC 5250. Opaque LSAs provide a generalized mechanism to allow for the future extensibility of OSPF. Opaque LSAs include a standard LSA header followed by application-specific information. Standard OSPF link-state database flooding mechanisms are used to distribute Opaque LSAs to all or some limited portion of the OSPF topology. Opaque LSAs can be carried in both OSPFv2 and OSPFV3. As described in section A.2 in RFC 5250, the format of Opaque LSA starts with standard LSA header which has the format as depicted in FIG. 79.

The Opaque LSA, as depicted in FIG. 79, includes an LS Age field, an Options field, a Type field, an Opaque Type field, an Opaque ID field, an Advertising Router field, an LS Sequence Number field, an LS Checksum field, a Length field, and Opaque Information (which is considered to be the payload of the Opaque LSA). These fields of the Path LSA are defined in RFC 5250. RFC 5250 defines three Opaque LSA Types (9, 10, and 11, as indicated above). A Type 10 Opaque LSA denotes an area-local scope that is not to be flooded beyond its area of origin. The Path LSA may be carried within such a Type 10 Opaque LSA, since path address mapping information does not need to be leaked across areas. The Opaque Type field of the Opaque LSA defines the format and semantics of the payload (Opaque Information).

The value of the Opaque Type field has yet to be determined (e.g., a value of 16 is suggested; however, it will be appreciated that other suitable values may be used). The Opaque Information of the Opaque LSA includes one or more nested TLV triplets for extensibility. The format of each TLV that may be included within the Opaque Information of the Opaque LSA is depicted in FIG. 80.

The TLV for the Opaque Information, as depicted in FIG. 80, includes an a Type field, a Length field, and a Value field. The Length field defines the length of the value portion in octets (thus, a TLV with no value portion would have a length of zero). The TLV is padded to four-octet alignment; padding is not included in the length field (so a 3-octet value would have a length of three, but the total size of the TLV would be eight octets). Nested TLVs are also 32-bit aligned. Unrecognized types are ignored. The TLV may be a Path Address Mapping TLV (which may be used for path label mapping information in MPLS), which may have the format as depicted in FIG. 81.

The Path Address Mapping TLV, as depicted in FIG. 81, includes a Type field, a Length field, an AF field, a Number of Hops (Num_Hops) field, a Flags field, a RESERVED field, a Path Address field, one or more Hop Address fields, and Sub-TLVs.

The Type field of the Path Address Mapping TLV includes the type of the Path Address Mapping TLV. The Type field may be a first type (e.g., Type 1).

The Length field of the Path Address Mapping TLV has a value that is variable, dependent on the number of hops (i.e., the number of Hop Address field) and the number of Sub-TLVs.

The AF field of the Path Address Mapping TLV includes the address family for the path address and the hop addresses associated with the path address. The value of the AF field may be Type 0 for IPv4 unicast and may be Type 1 for IPv6 unicast. The inclusion of the address family in this TLV allows for future extension.

The Number of Hops (Num Hops) field of the Path Address Mapping TLV indicates the number of hops in the path (and, thus, the number of Hop Address fields included in the Path Address Mapping TLV).

The Sub-TLVs of the Path Address Mapping TLV, in this case, will include the Path-SID Sub-TLV (which, as previously indicated, is carried as a Sub-TLV within the Path Address Mapping TLV).

The Path-SID Sub-TLV, which is carried as a nested Sub-TLV within a Path Address Mapping TLV of a Path LSA, carries the path label that is assigned to the path described by the Path Address Mapping TLV of the Path LSA. It is expected that the Path-SID Sub-TLV may appear once in the Path Address Mapping TLV. The format of the Path-SID Sub-TLV may be different for OSPF versus OSPFv3.

In OSPF, the Path-SID Sub-TLV that is carried within the Path Address Mapping TLV may have the format as depicted in FIG. 82.

The Path-SID Sub-TLV in OSPF, as depicted in FIG. 82, includes a Type field, a Length field, a Flags field, a first RESERVED field, an MT-IS field, a second RESERVED field, and an SID/Label/Index field.

The value of the Type field of the Path-SID Sub-TLV in OSPF has yet to be determined (e.g., a value of 3 is suggested; however, it will be appreciated that other suitable values may be used).

The value of the Length field of the Path-SID Sub-TLV in OSPF is variable, in octets, including 7 octets or 8 octets depending on the value of the V Flag in the Flags field.

The Flags field of the Path-SID Sub-TLV in OSPF is a 1-octet field that includes a set of one-bit flags configured to indicate various capabilities. The Flags field of the Path-SID Sub-TLV has the format as depicted in FIG. 83. The Flags field of the Path-SID Sub-TLV in OSPF, as depicted in FIG. 83, includes a P Flag, a V Flag, and an L Flag. The P Flag is a protection flag which is configured such that, if set (e.g., equal to "1"), the Path-SID refers to a protection path and carries a Protection Path Label. The V Flag is value flag which is configured such that (1) if set (e.g., equal to "1"), the Path-SID carries a value (and it is noted that this flag may be set by default) or (2) if not set (e.g., equal to "0"), the Path-SID carries an index. The L Flag is a local flag which is configured such that (1) if set (e.g., equal to "1"), the value/index carried by the Path-SID has local significance (and it is noted that this flag may be set by default) or (2) if not set (e.g., equal to "0"), the value/index carried by this Sub-TLV has global significance. It is noted that the other bits of the Flags field may be set to zero when originated and ignored when received.

The first RESERVED field of the Path-SID Sub-TLV in OSPF should be set to zero on transmission and ignored on reception.

The MT-ID field of the Path-SID Sub-TLV in OSPF includes a Multi-Topology ID (as defined in RFC 4915).

The second RESERVED field of the Path-SID Sub-TLV in OSPF should be set to zero on transmission and ignored on reception.

The SID/Label/Index field of the Path-SID Sub-TLV in OSPF, according to the V and L flags of the Flags field, includes either: (1) a 3 octet label where the 20 rightmost bits are used for encoding the label value (in which case the V and L Flags are set) or (2) a 4 octet index defining the offset in the SID/Label space advertised by this router using the encodings defined herein (in which case the V and L Flags are unset).

In OSPFv3, the Path-SID Sub-TLV that is carried within the Path Address Mapping TLV may have the format as depicted in FIG. 84.

The Path-SID Sub-TLV in OSPF, as depicted in FIG. 84, includes a Type field, a Length field, a Flags field, a Weight field, a RESERVED field, and an SID/Label/Index field.

The value of the Type field of the Path-SID Sub-TLV in OSPFv3 has yet to be determined (e.g., a value of 6 is suggested; however, it will be appreciated that other suitable values may be used).

The value of the Length field of the Path-SID Sub-TLV in OSPFv3 is variable, in octets, including 7 octets or 8 octets depending on the value of the V Flag in the Flags field.

The Flags field of the Path-SID Sub-TLV in OSPFv3 includes a set of one-bit flags configured to indicate various capabilities. The Flags field of the Path-SID Sub-TLV has the following format as depicted in FIG. 85. The Flags field Path-SID Sub-TLV, as depicted in FIG. 85, includes a P Flag, a V Flag, and an L Flag. The P Flag is a protection flag which is configured such that, if set (e.g., equal to "1"), the Path-SID refers to a protection path and carries a Protection Path Label. The V Flag is value flag which is configured such that (1) if set (e.g., equal to "1"), the Path-SID carries a value (and it is noted that this flag may be set by default) or (2) if not set (e.g., equal to "0"), the Path-SID carries an index. The L Flag is a local flag which is configured such that (1) if set (e.g., equal to "1"), the value/index carried by the Path-SID has local significance (and it is noted that this flag may be set by default) or (2) if not set (e.g., equal to "0"), the value/index carried by this Sub-TLV has global significance. It is noted that the other bits of the Flags field may be set to zero when originated and ignored when received.

The Weight field of the Path-SID Sub-TLV in OSPFv3 has a value that represents the weight of the Path-SID for the purpose of load balancing.

The RESERVED field of the Path-SID Sub-TLV in OSPFv3 should be set to zero on transmission and ignored on reception.

The SID/Label/Index field of the Path-SID Sub-TLV in OSPFv3, according to the V and L Flags of the Flags field, includes either: (1) a 3 octet label where the 20 rightmost bits are used for encoding the label value (in which case the V and L Flags are set) or (2) a 4 octet index defining the offset in the SID/Label space advertised by this router using the encodings defined herein (in which case the V and L Flags are unset).

It is noted, with respect to the Path-SID Sub-TLV, that it is expected that an OSPF or OSPFv3 speaker (router) will set the P Flag when the path is programmed as a protection path, may allocate more than one Path-SID to a path, and will not allocate the same Path-SID to different paths.

It is noted that the inclusion of the Path-SID Sub-TLV (which includes the path label) within the Path Address Mapping TLV (which includes a description of the associated path) provides advertisement of the path label mapping (namely, since the path label carried in the Path-SID Sub-TLV is associated with the path described by the Path Address Mapping TLV that carries the Path-SID Sub-TLV which includes the path label).

As described above, an OSPF or OSPFv3 speaker (router) maintains a PLMD for the area in which it participates. The PLMD includes path label mappings for each OSPF or OSPFv3 router in the area and is built by flooding of path LSAs carrying Path-SIDs across the area.

As described above, a router, upon receipt of a path label mapping (e.g., a Path LSA including a Path Address Mapping TLV that includes a Path-SID Sub-TLV), updates its PLMD. It is noted that SPF or other route calculations are unnecessary.

As described above, an OSPF/OSPFv3 ABR may redistribute its PLMD to an external agent (e.g., to an SDN controller, PCE server, or the like, via BGP-LS or other means) for visibility of path label mappings across multiple areas.

Various example embodiments for supporting routing of source routed packets using path compression in MPLS-based source routing may be configured to support advertisement of path label mappings in the control plane using OSPF in other ways.

Various example embodiments for supporting routing of source routed packets using path compression in MPLS-based source routing may be configured to support path label management in the control plane using OSPF in other ways.

Various example embodiments for supporting routing of source routed packets using path compression (e.g., path compression for paths which are segments of source routed paths, path compression for protection paths configured to protect portions of source routed paths, or the like, as well as various combinations thereof) in MPLS-based source routing may be configured to support path label management in the control plane using BGP-LS.

The flooding scope for IGP-based methods of SR is IGP area-wide. As a result, the contents of a Link State Database (LSDB) or a Traffic Engineering Database (TED) have the scope of an IGP area and, therefore, by using the IGP alone, it may not be enough to construct segments across multiple IGP areas or Autonomous System (AS) boundaries.

In order to address the need for applications that require topological visibility across IGP areas, or even across ASs, the BGP-LS address-family/sub-address-family have been defined to allow BGP to carry Link-State information. The BGP Network Layer Reachability Information (NLRI) encoding format for BGP-LS, and a new BGP Path Attribute called the BGP-LS attribute, are defined in RFC 7752. The BGP-LS specifications for SR are described in the "BGP Link-State extensions for Segment Routing" draft (also denoted as SR-BGP-LS-DRAFT). BGP-LS provides the containers for 1:1 mapping of link state information from IGPs.

In at least some embodiments, a new type of BGP-LS NLRI, referred to as a Path NLRI, may carry the Path LSAs originated by IGPs. The Path NLRI may be used by an ABR to advertise path address mappings received via different types of IGPs (e.g., for advertising path address mappings received in Path Address Mapping Sub-TLVs via IS-IS, for advertising path address mappings received in Path Address Mapping TLVs via OSPF or OSPFv3, or the like, as well as various combinations thereof).

The Path NLRI in BGP-LS may have a TLV format similar to the TLV format described in Section 3.1 of RFC 7752. The Value portion of the TLV format for the Path NLRI may have the format as depicted in FIG. 86.

The Value portion of the Path NLRI, as depicted in FIG. 86, includes a Protocol-ID field and a Path Descriptors field.

The Protocol-ID of the Value portion of the Path NLRI describes the IGP protocol that originated the Path information (e.g., IS-IS, OSPF, OSPFv3 or the like).

The Path Descriptors field of the Value portion of the Path NLRI is a set of TLV triplets. The Path Descriptor TLVs uniquely identify a Path Address Mapping originated by a node (the path address mapping advertised via IGP within the area which is now being distributed outside of the area by the ABR via BGP-LS).

The Path Descriptor field of the Value portion of the Path NLRI may carry a Path Address Mapping TLV (e.g., an IPv4 Path Address Mapping TLV for IPv4 or an IPv6 Path Address Mapping TLV for IPv6), which may include a Path-SID TLV (which includes the path label such that the path label is mapped to the associated path that is defined in the Path Address Mapping TLV).

In IPv4, the Path Descriptor fields may carry an IPv4 Path Address Mapping TLV. The format of the IPv4 Path Address Mapping TLV is as depicted in FIG. 87.

The IPv4 Path Address Mapping TLV, as depicted in FIG. 87, includes a Type field, a Length field, a Number of Hops (Num_Hops) field, a Flags field, a RESERVED field, a Path Address field, one or more Hop Address fields, and Sub-TLVs.

The Type field of the IPv4 Path Address Mapping TLV includes the type of the Path Address Mapping TLV. The value of the Type field has yet to be determined (e.g., a value of 266 is suggested; however, it will be appreciated that other suitable values may be used).

The Length field of the IPv4 Path Address Mapping TLV has a value that is variable, dependent on the number of hops (i.e., the number of Hop Address fields) and the number of Sub-TLVs.

The Number of Hops (Num Hops) field of the IPv4 Path Address Mapping TLV indicates the number of hops in the path (and, thus, the number of Hop Address fields included in the IPv4 Path Address Mapping TLV).

The Flags field of the IPv4 Path Address Mapping TLV is a 1-octet field that may be used to define various flags (although it is noted that none are currently defined).

The RESERVED field of the IPv4 Path Address Mapping TLV is a 1-octet field that should be set to zero on transmission and ignored on reception.

The Path Address field of the IPv4 Path Address Mapping TLV includes the path address (4 octets for a Type 1 Path Address Mapping TLV associated with IPv4).

The Hop Address fields of the IPv4 Path Address Mapping TLV include the addresses of the hops of the path (i.e., Hop Address[x] includes the IPv4 address of the x-th hop in the path).

The Sub-TLVs of the IPv4 Path Address Mapping TLV, in this case, will include the Path-SID TLV (which, as previously indicated, is carried as a Sub-TLV within the IPv4 Path Address Mapping TLV).

In IPv6, the Path Descriptor fields may carry an IPv6 Path Address Mapping TLV. The format of the IPv6 Path Address Mapping TLV is as depicted in FIG. 88.

Figure 88:
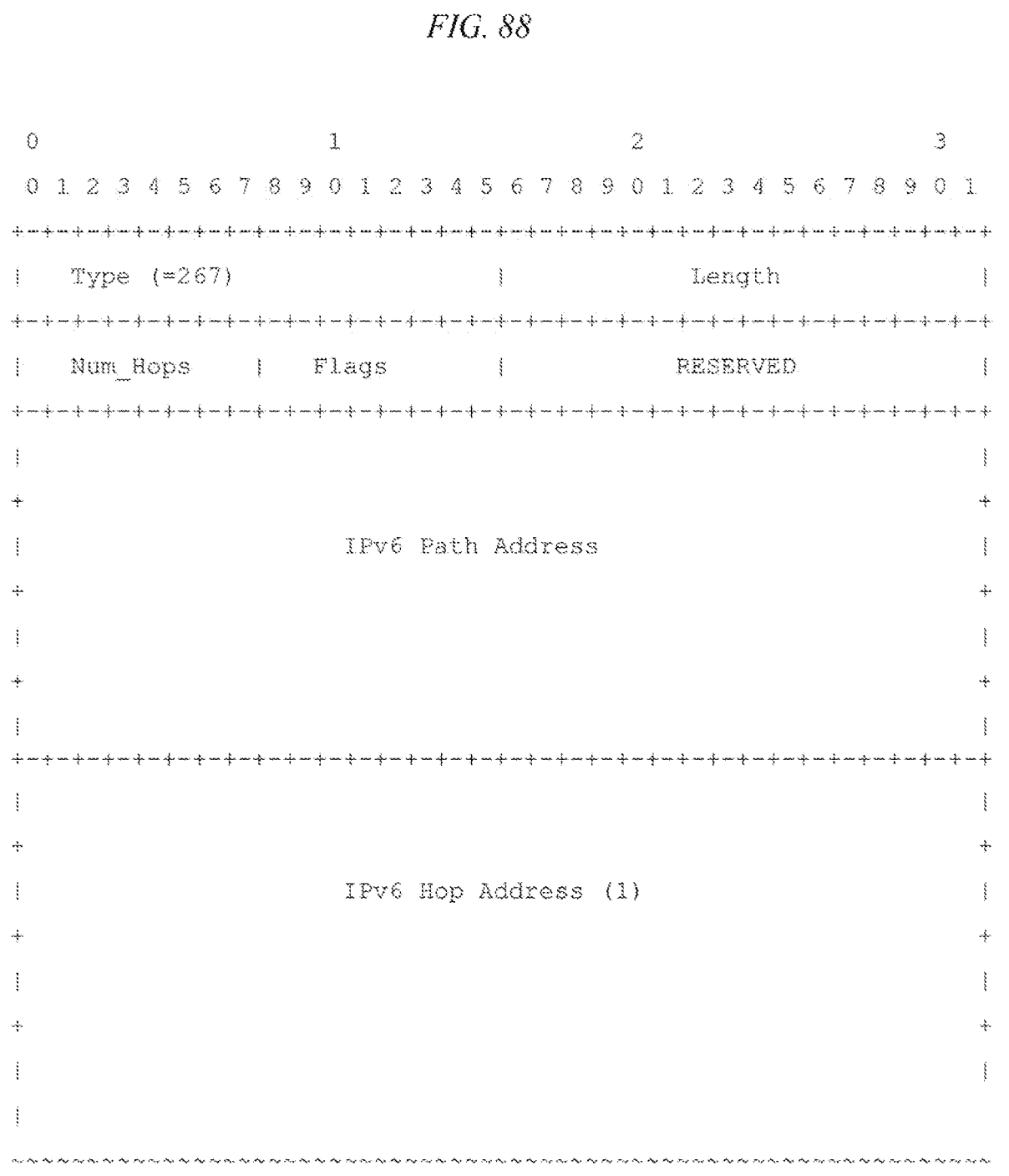
Figure 88:
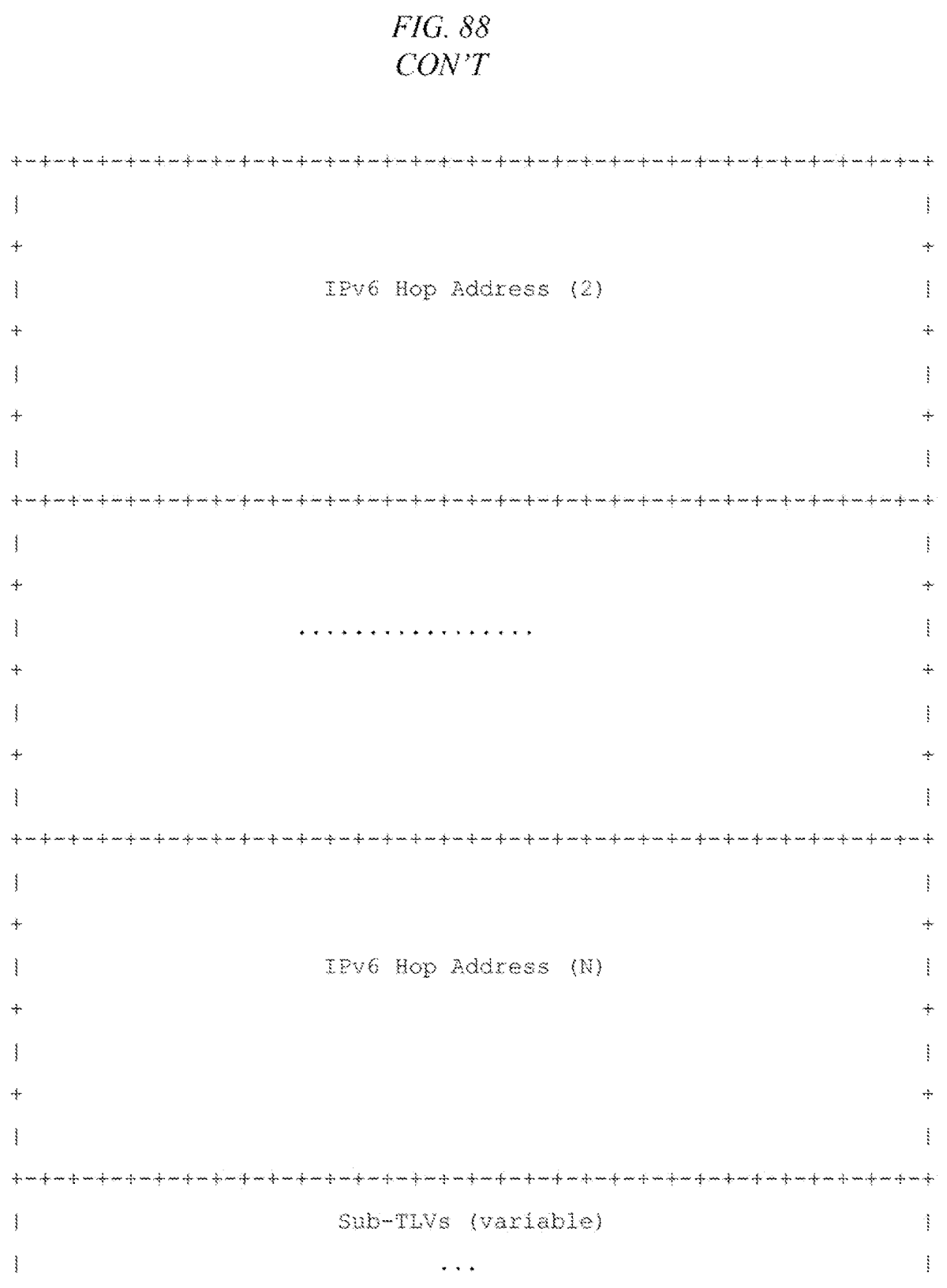

The IPv6 Path Address Mapping TLV, as depicted in FIG. 88, includes a Type field, a Length field, a Number of Hops (Num_Hops) field, a Flags field, a RESERVED field, an IPv6 Path Address field, one or more IPv6 Hop Address fields, and Sub-TLVs.

The Type field of the IPv6 Path Address Mapping TLV includes the type of the Path Address Mapping TLV. The value of the Type field has yet to be determined (e.g., a value of 267 is suggested; however, it will be appreciated that other suitable values may be used).

The Length field of the IPv6 Path Address Mapping TLV has a value that is variable, dependent on the number of hops (i.e., the number of IPv6 Hop Address fields) and the number of Sub-TLVs.

The Number of Hops (Num Hops) field of the IPv6 Path Address Mapping TLV indicates the number of hops in the path (and, thus, the number of IPv6 Hop Address fields included in the IPv6 Path Address Mapping TLV).

The Sub-TLVs of the IPv6 Path Address Mapping TLV, in this case, will include the Path-SID TLV (which, as previously indicated, is carried as a Sub-TLV within the IPv6 Path Address Mapping TLV).

The Path-SID TLV, which is carried as a nested Sub-TLV within an Path Address Mapping TLV of a Path NLRI (namely, an IPv4 Path Address Mapping TLV for IPv4 or an IPv6 Path Address Mapping TLV for IPv6), carries the path label that is assigned to the path described by the Path Address Mapping TLV of the Path NLRI. It is expected that the Path-SID TLV may appear once in the Path Address Mapping TLV. The format of the Path-SID TLV, as discussed further below, may be the same for IPv4 and IPv6.

Figures 89, 90:
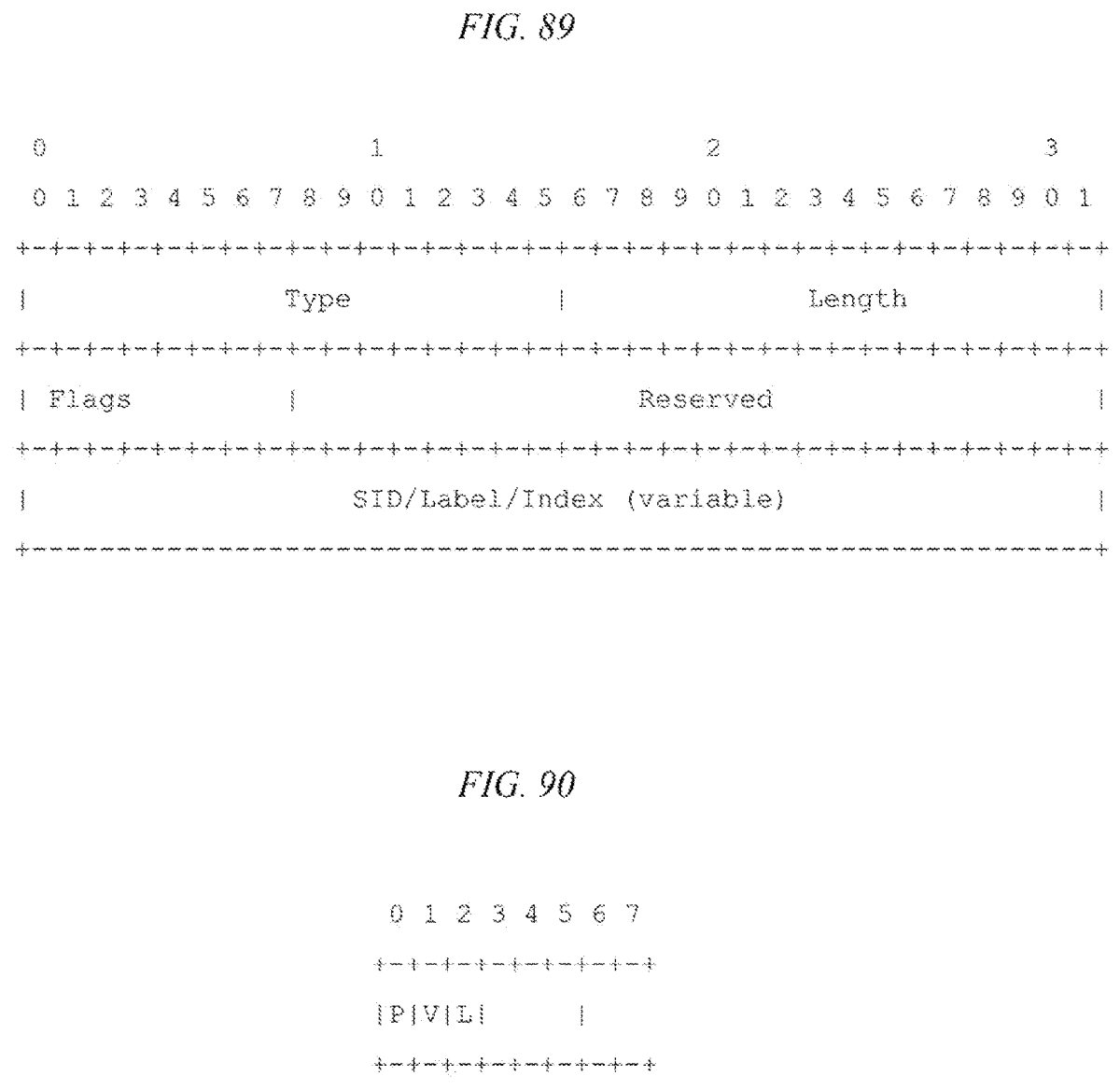

In BGP-LS, for IPv4 or IPv6, the Path-SID TLV that is carried within the associated Path Address Mapping TLV (again, IPv4 or IPv6) may have the format as depicted in FIG. 89.

The Path-SID TLV in BGP-LS, as depicted in FIG. 89, includes a Type field, a Length field, a Flags field, a RESERVED field, and an SID/Label/Index field.

The value of the Type field of the Path-SID TLV in BGP-LS has yet to be determined (e.g., a TLV Codepoint of 1101 is suggested; however, it will be appreciated that other suitable values may be used).

The value of the Length field of the Path-SID TLV in BGP-LS is variable, in octets, including 7 octets or 8 octets depending on the value of the V Flag in the Flags field.

The Flags field of the Path-SID TLV in BGP-LS is a 1-octet field that includes a set of one-bit flags configured to indicate various capabilities. The Flags field of the Path-SID TLV in BGP-LS has the format as depicted in FIG. 90. The Flags field of the Path-SID TLV in BGP-LS, as depicted in FIG. 90, includes a P Flag, a V Flag, and a L Flag. The P Flag is a protection flag which is configured such that, if set (e.g., equal to "1"), the Path-SID refers to a protection path and carries a Protection Path Label. The V Flag is value flag which is configured such that (1) if set (e.g., equal to "1"), the Path-SID carries a value (and it is noted that this flag may be set by default) or (2) if not set (e.g., equal to "0"), the Path-SID carries an index. The L Flag is a local flag which is configured such that (1) if set (e.g., equal to "1"), the value/index carried by the Path-SID has local significance (and it is noted that this flag may be set by default) or (2) if not set (e.g., equal to "0"), the value/index carried by this Sub-TLV has global significance. It is noted that the other bits of the Flags field may be set to zero when originated and ignored when received.

The RESERVED field of the Path-SID TLV in BGP-LS should be set to zero on transmission and ignored on reception.

The SID/Label/Index field of the Path-SID TLV in BGP-LS, according to the V and L Flags of the Flags field, includes either: (1) a 3 octet label where the 20 rightmost bits are used for encoding the label value (in which case the V and L Flags are set) or (2) a 4 octet index defining the offset in the SID/Label space advertised by this router using the encodings defined herein (in which case the V and L Flags are unset).

It is noted that the inclusion of the Path-SID TLV (which includes the path label) within the IPv4/IPv6 Path Address Mapping TLV (which includes a description of the associated path) provides advertisement of the path label mapping (namely, since the path label carried in the Path-SID TLV is associated with the path described by the IPv4/IPv6 Path Address Mapping TLV that carries the Path-SID TLV which includes the path label).

Various example embodiments for supporting routing of source routed packets using path compression in MPLS-based source routing may be configured to support path label management in the control plane using BGP-LS in other ways.

It will be appreciated that various example embodiments for supporting routing of source routed packets using path compression (e.g., path compression for paths which are segments of source routed paths, path compression for protection paths configured to protect portions of source routed paths, or the like, as well as various combinations thereof) in MPLS-based source routing may be configured to support path label management in the control plane in various other ways.

Various example embodiments for supporting routing of source routed packets using path compression (e.g., path compression for paths which are segments of source routed paths, path compression for protection paths configured to protect portions of source routed paths, or the like, as well as various combinations thereof) in IPv4-based source routing may be configured to support path label management in the control plane. As discussed further below, this may be performed using IS-IS, OSPF, OSPFv3, BGP-LS, or any other suitable protocol.

As discussed herein, the PCE may instruct a router to allocate and program a path address against a path. In this context, the PCE describes the path as a list of hops of which the path is composed, where each hop is denoted as an IPv4 address/prefix. The router learns about the hops from the Link State Advertisements (LSAs) by the IGPs (IS-IS, OSPF, OSPFv3, BGP-LA or the likes). If the router has not yet learned about a hop specified in the path (e.g., IGP re-convergence), then the path address would stay "unresolved" at the router and will not be programmed into the IPv4 Path Address Table, the IPv4 Path Table, or the IPv4 Next-Hop Table of the router. Once the IGP converges and the path address is resolved, then the path address is programmed into the IPv4 Path Address Table, the IPv4 Path Table, and the IPv4 Next-Hop Table of the router. This Path-Address→Path Mapping may be referred to herein as a path address mapping.

The router, once a path address is allocated by the router and is mapped to the path (i.e., to the list of explicit hops of the path), programs the path address mapping into its IPv4 Path Address Table, IPv4 Path Table, and IPv4 Next-Hop Table in the data plane of the router.

In order for the PCE to know the path addresses that are available in a router, the router advertises its local path address space to the PCE. Various example embodiments may be configured to enable a router to advertise its path address space to the PCE (or any external agent) via IGPs (e.g., IS-IS, OSPFv2, or the like) and BGPs (e.g., BGP-LS or the like).

In order for the path address mappings created by a router in one area to be visible to routers in other areas, an Area Border Router (ABR) advertises all path address mappings in its area to an external agent (e.g., a PCE, an SDN Controller, or any suitable external application). This is due to the fact that, for an IPv4 source route that traverses across multiple IGP areas, a head-end router may need to encode the path address against a path segment in another area. Various example embodiments may be configured to enable an ABR to advertise all path address mappings in its area to an external agent (or any external agent) via BGPs (e.g., BGP-LS or the like) or other suitable protocols or mechanisms. As such, each router floods its path address mappings throughout its area, so that such path address mappings reach the ABR(s) of the area and, thus, may be redistributed by ABR to the external agent(s) outside of the area. Various example embodiments may be configured to enable a router to advertise its path address mappings within its area via IGPs (e.g., IS-IS, OSPFv2, or the like) and BGPs (e.g., BGP-LS or the like).

As the path address mappings are exchanged between routers within and between areas, the routers build path address mapping databases (PAMDs). With respect to the example of FIG. 1, for example, the structure of the PAMD at R1 may be as depicted in FIG. 91.

The PAMD for R1, as depicted in FIG. 91, includes a section (denoted as Area: Self) with path address mappings for its own area (assuming that routers R2-R9 are the only routers in its area) and a section (denoted as Area: Other) with path address mappings from another area. The section of the PAMD with the path address mappings from the other area is learned by R1 from external agents via redistribution of path address mappings of the other area by the ABR of the other area. It will be appreciated (as may be seen from the example PAMD above), that multiple paths may originate from any given node (e.g., two paths are depicted as originating from router R2: namely, the path {IP-23, IP-35, IP-57} which has an associated path address of IP-2357 and path {IP-25, IP-56} which has an associated path address of IP-256). The router R1 may then use the PAMD to look up paths originating from other nodes such that, when a matching path is found (in terms of the hops of the path), the associated path label mapped to the matching path may be used to encode the source routed packet. For example, if router R1 wants to look for a path originating from R2 (where the path includes a set of hops), it searches the path entries of R2 in the PAMD and matches the set of hops of the path against the listed hops in the path label mapping entries for R2, such that the path label mapped to that path may be identified and used to encode the source routed packet.

Various example embodiments for supporting routing of source routed packets using path compression (e.g., path compression for paths which are segments of source routed paths, path compression for protection paths configured to protect portions of source routed paths, or the like, as well as various combinations thereof) in IPv4-based source routing may be configured to support path address management in the control plane using IS-IS.

In general, IS-IS is an IGP protocol that distributes network topology information among the IS-IS speaking routers. The base specification of IS-IS is defined in RFC 1142. In IS-IS, such network topology information is exchanged in Link State PDUs (LSPs). The LSPs may carry link status for links of a router, internal or external route prefixes of a router, or the like. The IS-IS control plane for IPv4 segment routing is being standardized in the IETF in the "IS-IS Extensions for Segment Routing" draft (also denoted as SR-ISIS-DRAFT). The IS-IS control plane for IPv4 segment routing, as discussed further below, may be configured to support path address management in the control plane.

Various example embodiments for supporting routing of source routed packets using path compression in IPv4-based source routing may be configured to support advertisement of the path address space in the control plane using IS-IS.

In at least some embodiments, advertisement of path address space in the control plane using IS-IS may be performed using a new Path Address Block (PAB) Sub-TLV carried within an IS-IS Router Capability TLV.

Section 2 of RFC 7981 defines an IS-IS Router Capability TLV, which allows a router to announce its capabilities within an IS-IS level or the entire routing domain. The IS-IS Router Capability TLV can carry any number of router specific capabilities within it, as optional sub-TLVs. Section 2 of RFC 7981 describes the format for the IS-IS Router Capability TLV as depicted in FIG. 92.

The IS-IS Router Capability TLV, as depicted in FIG. 92, includes a Type field, a Length field, a Router-ID field, and a Flags field, followed by one or more sub-TLVs.

The Type field of the IS-IS Router Capability TLV includes the type of the IS-IS Router Capability TLV. As indicated in RFC 7981, the value of the Type field is 242

The Length field of the IS-IS Router Capability TLV has a value that is variable, dependent on the size of the Value field (which includes the Router-ID field, the Flags field, and any sub-TLVs).

The Router-ID field of the IS-IS Router Capability TLV is a 4-octet field indicating the router that is the source of the IS-IS Router Capability TLV.

The Flags field of the IS-IS Router Capability TLV is a 1-octet field that includes a set of one-bit flags configured to indicate various capabilities. The Flags field of the IS-IS Router Capability TLV has the format as depicted in FIG. 93. The Flags field of the IS-IS Router Capability TLV, as depicted in FIG. 93, includes a D Flag and an S Flag. The D Flag and the S Flag control the scope of advertisement of the IS-IS Router Capability TLV. The S-Bit (0x01) may control the scope of advertisement of the IS-IS Router Capability TLV as follows: (1) if the S bit is set (e.g., equal to "1"), the IS-IS Router Capability TLV is flooded across the entire routing domain and (2) if the S bit is not set (e.g., equal to 0), the IS-IS Router Capability TLV is leaked between levels (although it is noted that this bit should not be altered during the TLV leaking). The D-Bit (0x02) may control the scope of advertisement of the IS-IS Router Capability TLV as follows: (1) when the IS-IS Router Capability TLV is leaked from Level 2 (L2) to Level 1 (L1), the D bit is to be set (e.g., equal to "1"), otherwise the bit is cleared and (2) IS-IS Router Capability TLVs with the D bit are not to be leaked from Level 1 to Level 2 (to prevent TLV looping).

The sub-TLVs portion of the IS-IS Router Capability TLV is a variable-sized portion of the Value field that may be used to carry the PAB Sub-TLV that includes the path address space being advertised.

The path address space, as indicated above, may be advertised using the PAB Sub-TLV carried as a sub-TLV within the IS-IS Router Capability TLV. The format of the PAB Sub-TLV is as depicted in FIG. 94.

The PAB Sub-TLV, as depicted in FIG. 94, includes a Type field, a Length field, and a Flags field, followed by one or more PAB descriptor entries (each of which includes a 3-octet Range field and a variable-sized Path Address Sub-TLV).

The Type field of the PAB Sub-TLV includes the type of the PAB Sub-TLV. The value of the Type field has yet to be determined (e.g., a value of 24 is suggested; however, it will be appreciated that other suitable values may be used).

The Length Field of the PAB Sub-TLV is a 1-octet field that includes the variable length of the Value portion of the PAB Sub-TLV.

The Flags field of the PAB Sub-TLV is a 1-octet field that may be used to define various flags (although it is noted that none are currently defined).

The PAB descriptor entries of the PAB Sub-TLV, as depicted in FIG. 94, each include a 3-octet Range field and a variable-sized Path Address Sub-TLV, where the Path Address Sub-TLV includes the first value of the PAB descriptor while the Range field includes the number of path addresses in the PAB descriptor.

The Path Address Sub-TLV, which is included within the PAB descriptor entry of the PAB Sub-TLV, includes the first path address in the range of path addresses advertised by the Path Address Sub-TLV. The Path Address Sub-TLV may be formatted as depicted in FIG. 95.

The Path Address Sub-TLV, as depicted in FIG. 95, includes a Type field, a Length field, a Flags field, and a Path Address field.

The Type field of the Path Address Sub-TLV includes the type of the Path Address Sub-TLV. The Type field may be a first type (e.g., Type 1) in IPv4 (indicating that the Path Address Sub-TLV is an IPv4 Path Address Sub-TLV), in which case the Path Address field may be 4-octets in size (including an IPv4 path address).

The Length field of the Path Address Sub-TLV is a 1-octet field that includes the variable length of the Value portion of the Path Address Sub-TLV (namely, the Flags field and the Path Address field).

The Flags field of the Path Address Sub-TLV is a 1-octet field that may be used to define various flags (although it is noted that none are currently defined).

The Path Address field of the Path Address Sub-TLV includes the 4-octet IPv4 path address.

It is noted that the PAB Sub-TLV may be advertised in an LSP of any number; however, it is expected that a router will not advertise more than one PAB Sub-TLV. In at least some embodiments, in which a router receives multiple PAB Sub-TLVs from the same originating router, the receiving router may select the first advertisement in the lowest numbered LSP.

It is noted that it is expected that the originating router will not advertise overlapping path address ranges.

It is noted that, each time a path address is allocated from the PAB, the allocation of the path address should be reported to any relevant components (e.g., controllers, applications, or the like) in order for the components to have an up-to-date view of the current SRLB allocation and in order to avoid collisions between allocation instructions.

Various example embodiments for supporting routing of source routed packets using path compression in IPv4-based source routing may be configured to support advertisement of path label range in the control plane using IS-IS in other ways.

Various example embodiments for supporting routing of source routed packets using path compression in IPv4-based source routing may be configured to support advertisement of the path address mappings in the control plane using IS-IS.

In at least some embodiments, advertisement of path address mappings in the control plane using IS-IS may be performed using a Path Address Mapping Sub-TLV, where the Path Address Mapping Sub-TLV is carried within a Path TLV. It is noted that the Path TLV may be a TLV supported by IS-IS for distributing path address mappings in IP-based source routing. The Path Address Mapping Sub-TLV carries the path address and the path (namely, the explicit hops of the path) to which the path address is mapped.

The Path TLV, which is carried within a Link State PDU (LSP), may have the format as depicted in FIG. 96.

The Path TLV, as depicted in FIG. 96, includes a Type field, a Length field, a Flags field, and one or more Path Address Mapping Sub-TLVs.

The Type field of the Path TLV is a one-octet field that includes the type of the Path TLV. The value of the Type field has yet to be determined (e.g., a value of 25, which may be allocated from the IANA registry, is suggested; however, it will be appreciated that other suitable values may be used).

The Length field of the Path TLV is a 1-octet field that includes the variable length of the Value portion of the Path TLV (namely, the Flags field and the Path Address Mapping Sub-TLVs).

The Flags field of the Path TLV is a 1-octet field that may be used to define various flags (although it is noted that none are currently defined).

The Path TLV, as depicted in FIG. 96, includes one or more Path Address Mapping Sub-TLVs.

The Path Address Mapping Sub-TLV, which is carried within the Path TLV, may have the format as depicted in FIG. 97.

The Path Address Mapping Sub-TLV includes a single path address mapping. The Path Address Mapping Sub-TLV, as depicted in FIG. 97, includes a Type field, a Length field, a Flags field, a Number of Hops (Num Hops) field, a Path Address field, one or more Hop Address fields, and Sub-TLVs.

The Type field of the Path Address Mapping Sub-TLV includes the type of the Path Address Mapping Sub-TLV. The Type field may be a first type (e.g., Type 1) in IPv4, in which case the Path Address field may be 4-octets in size (and including an IPv4 path address).

The Length field of the Path Address Mapping Sub-TLV is a 1-octet field that includes the variable length of the Value portion of the Path Address Mapping Sub-TLV (namely, the Flags field, the Num Hops field, the Path Address field, the Hop Address field, and any Sub-TLVs).

The Flags field of the Path Address Mapping Sub-TLV is a 1-octet field that may be used to define various flags (although it is noted that none are currently defined).

The Number of Hops (Num Hops) field of the Path Address Mapping Sub-TLV indicates the number of hops in the path (and, thus, the number of Hop Address fields included in the Path Address Mapping Sub-TLV).

The Path Address field of the Path Address Mapping Sub-TLV includes the 4-octet path address that is mapped to the path (namely, the explicit hops of the path as indicated in the Hop Address fields).

The Hop Address fields of the Path Address Mapping Sub-TLV include the addresses of the hops of the path (i.e., Hop Address[x] includes the 4-octet IPv4 address of the x-th hop in the path).

The Sub-TLVs of the Path Address Mapping Sub-TLV may include one or more Sub-TLVs (although it is noted that none are currently defined).

It is noted that the inclusion of the Path Address Mapping Sub-TLV (which includes the path address and the description of the associated path) within the Path TLV provides advertisement of the path address mapping.

As described above, an IS-IS speaker (router) maintains a PAMD for the area in which it participates. The PAMD includes path address mappings for each IS-IS router in the area and is built by flooding of Path TLVs carrying path address mappings across the area. It is noted that routers may originate Path TLVs whenever the contents of the Path TLV change or whenever otherwise indicated by IS-IS (e.g., an LSP refresh or other conditions).

As described above, a router, upon receipt of a path address mapping (e.g., a Path TLV including a Path Address Mapping Sub-TLV that includes the path address mapping), updates its PAMD. It is noted that SPF or other route calculations are unnecessary.

As described above, an IS-IS ABR may redistribute its PAMD to an external agent (e.g., to an SDN controller, PCE server, or the like, via BGP-LS or other means) for visibility of path address mappings across multiple areas.

Various example embodiments for supporting routing of source routed packets using path compression in IPv4-based source routing may be configured to support advertisement of path address mappings in the control plane using IS-IS in other ways.

Various example embodiments for supporting routing of source routed packets using path compression (e.g., path compression for paths which are segments of source routed paths, path compression for protection paths configured to protect portions of source routed paths, or the like, as well as various combinations thereof) in MPLS-based source routing may be configured to support path address management in the control plane using OSPFv2.

OSPF (or OSPFv2) is an IGP protocol that distributes IPv4 network topology information among the OSPF speaking routers. The base specification of OSPF is defined in RFC 2328. In OSPF, such IPv4 network topology information is exchanged in Link State Advertisements (LSAs). The LSAs may carry link status for links of a router, internal or external route prefixes of a router, or the like. The OSPF control plane for MPLS segment routing is being standardized in the IETF in the "OSPF Extensions for Segment Routing" draft (also denoted as SR-OSPF-DRAFT). The OSPF control plane for MPLS segment routing, as discussed further below, may be configured to support path label management in the control plane.

Various example embodiments for supporting routing of source routed packets using path compression in IPv4-based source routing may be configured to support advertisement of the path address space in the control plane using OSPF.

In at least some embodiments, advertisement of the path address space in the control plane using OSPF may be performed using a Path Address Block (PAB) TLV carried within a Router Information Opaque LSA. It is noted that PAB TLV may be a TLV supported by OSPF for distributing IP path address space information. The PAB TLV may be a top-level TLV of the Router Information Opaque LSA.

The Router Information Opaque LSA is described in RFC 7770. Opaque LSAs provide a generalized mechanism to allow for the future extensibility of OSPF. Opaque LSAs include a standard LSA header followed by application-specific information. Standard OSPF link-state database flooding mechanisms are used to distribute Opaque LSAs to all or some limited portion of the OSPF topology. Opaque LSAs can be carried in both OSPFv2 and OSPFV3. As described in section 2.1 in RFC 7770, the format of Router Information Opaque LSA starts with a standard LSA header which has the format as depicted in FIG. 98.

The Router Information Opaque LSA, as depicted in FIG. 98, includes an LS Age field, an Options field, a Type field, an Opaque Type field, an Opaque ID field, an Advertising Router field, an LS Sequence Number field, an LS Checksum field, a Length field, and TLVs (which is considered to be the payload of the Opaque LSA). These fields of the Router Information Opaque LSA are defined in RFC 7770. RFC 7770 defines three Opaque LSA Types (9, 10, and 11, as indicated above). A Type 10 Opaque LSA denotes an area-local scope that is not to be flooded beyond its area of origin. The Path LSA may be carried within such a Type 10 Opaque LSA, since path address mapping information does not need to be leaked across areas. The Opaque Type field of the Opaque LSA defines the format and semantics of the payload (TLVs). The value of the Opaque Type field is 4. The TLVs of the Router Information Opaque LSA include one or more nested TLV triplets for extensibility. The format of each TLV that may be included within the TLVs of the Router Information Opaque LSA is as depicted in FIG. 99.

The TLV for the Router Information Opaque LSA, as depicted in FIG. 99, includes a Type field, a Length field, and a Value field. The Length field defines the length of the value portion in octets (thus, a TLV with no value portion would have a length of zero). The TLV is padded to four-octet alignment; padding is not included in the length field (so a 3-octet value would have a length of three, but the total size of the TLV would be eight octets). Nested TLVs are also 32-bit aligned. Unrecognized types are ignored. The TLV may be a PAB TLV including a path address mapping.

The PAB TLV, as indicated above, is carried within a Router Information Opaque LSA (as a TLV after the LSA header portion of the Router Information Opaque LSA). The PAB TLV MAY appear multiple times in the Router Information Opaque LSA. The PAB TLV has the format as depicted in FIG. 100.

The PAB TLV, as depicted in FIG. 100, includes a Type field, a Length field, a Range Size field, a RESERVED field, and an IPv4 Path Address field.

The Type field of the PAB TLV is a 2-octet field that includes the type of the PAB TLV. The value of the Type field of the Path-SID TLV in BGP-LS has yet to be determined (e.g., a value of 17 is suggested; however, it will be appreciated that other suitable values may be used).

The Length field of the PAB TLV is a 2-octet field that includes the variable length of the Value portion of the PAB TLV (namely, the Range Size field, the RESERVED field, and the IPv4 Path Address field).

The Range Size field of the PAB TLV is a 3-octet field including the range of the path address block (e.g., the number of path addresses in the range, including the first path address which is specified in the IPv4 Path Address field).

The RESERVED field of the PAB TLV is unused and is reserved for future use. This should be unset on transmission and ignored on receipt.

The Path Address field of the PAB TLV is a 4-octet field that includes the IPv4 Path Address that is the first path address in the path address block being advertised.

It is noted that it is expected that the originating router will not advertise overlapping path address ranges.

It is noted that, each time a path address is allocated from the PAB, the allocation of the path address should be reported to any relevant components (e.g., controllers, applications, or the like) in order for the components to have an up-to-date view of the current PAB allocation and in order to avoid collisions between allocation instructions.

It is noted that an originating router advertising the PAB TLV may also have other IPv4 path address ranges, outside of the PAB being advertised, which may be used for local allocation purposes and, thus, which are not advertised in the PAB TLV.

Various example embodiments for supporting routing of source routed packets using path compression in IPv4-based source routing may be configured to support advertisement of path address range in the control plane using OSPF in other ways.

Various example embodiments for supporting routing of source routed packets using path compression in IPv4-based source routing may be configured to support advertisement of the path address mappings in the control plane using OSPF.

In at least some embodiments, advertisement of path address mappings in the control plane using OSPF may be performed using a Path LSA carried within an OSPF Opaque LSA. It is noted that Path LSA may be an LSA supported by OSPF for distributing IP path address mapping information (a mapping of a path address to a list of IP hops along the path), including an LSA supported by OSPF for distributing IPv4 path address mapping information (e.g., a mapping of an IPv4 path address to a list of IPv4 hops along the path) and an LSA supported by OSPFv3 for distributing IPv6 path address mapping information (e.g., a mapping of an IPv6 path address to a list of IPv6 hops along the path).

The Path LSA, as indicated above, is carried within an OSPF Opaque LSA. The "OSPF Opaque LSA Option" is described in RFC 5250. Opaque LSAs provide a generalized mechanism to allow for the future extensibility of OSPF. Opaque LSAs include a standard LSA header followed by application-specific information. Standard OSPF link-state database flooding mechanisms are used to distribute Opaque LSAs to all or some limited portion of the OSPF topology. Opaque LSAs can be carried in both OSPFv2 and OSPFV3. As described in section A.2 in RFC 5250, the format of Opaque LSA starts with a standard LSA header which has the format as depicted in FIG. 101.

The Path LSA, as depicted in FIG. 101, includes an LS Age field, an Options field, a Type field, an Opaque Type field, an Opaque ID field, an Advertising Router field, an LS Sequence Number field, an LS Checksum field, a Length field, and Opaque Information (which is considered to be the payload of the Opaque LSA). These fields of the Path LSA are defined in RFC 5250. RFC 5250 defines three Opaque LSA Types (9, 10, and 11, as indicated above). A Type 10 Opaque LSA denotes an area-local scope that is not to be flooded beyond its area of origin. The Path LSA may be carried within such a Type 10 Opaque LSA, since path address mapping information does not need to be leaked across areas. The Opaque Type field of the Opaque LSA defines the format and semantics of the payload (Opaque Information).

The value of the Opaque Type field has yet to be determined (e.g., a value of 16 is suggested; however, it will be appreciated that other suitable values may be used). The Opaque Information of the Path LSA includes one or more nested TLV triplets for extensibility. The format of each TLV that may be included within the Opaque Information of the Path LSA is as depicted in FIG. 102.

The TLV for the Opaque Information, as depicted in FIG. 102, includes a Type field, a Length field, and a Value field. The Length field defines the length of the value portion in octets (thus, a TLV with no value portion would have a length of zero). The TLV is padded to four-octet alignment; padding is not included in the length field (so a 3-octet value would have a length of three, but the total size of the TLV would be eight octets). Nested TLVs are also 32-bit aligned. Unrecognized types are ignored. The TLV may be an IPv4 Path Address Mapping TLV, which may have the format as depicted in FIG. 103.

The IPv4 Path Address Mapping TLV, as depicted in FIG. 103, includes a Type field, a Length field, an AF field, a Number of Hops (Num_Hops) field, a Flags field, a RESERVED field, a Path Address field, one or more Hop Address fields, and Sub-TLVs.

The Type field of the IPv4 Path Address Mapping TLV is a 2-octet field that includes the type of the IPv4 Path Address Mapping TLV. The Type field may be a first type (e.g., Type 1).

The Length field of the IPv4 Path Address Mapping TLV is a 2-octet field that includes the variable length of the Value portion of the IPv4 Path Address Mapping TLV.

The AF field of the IPv4 Path Address Mapping TLV includes the address family for the path address and the hop addresses associated with the path address. The value of the AF field may be Type 0 for IPv4 unicast. The inclusion of the address family in this TLV allows for future extension.

The Number of Hops (Num Hops) field of the IPv4 Path Address Mapping TLV indicates the number of hops in the path (and, thus, the number of Hop Address fields included in the IPv4 Path Address Mapping TLV).

The Flags field of the IPv4 Path Address Mapping TLV is a 1-octet field that may be used to define various flags (although it is noted that none are currently defined).

The RESERVED field of the IPv4 Path Address Mapping TLV is a 1-octet field that should be set to zero on transmission and ignored on reception.

The Path Address field of the IPv4 Path Address Mapping TLV includes the path address (4 octets for a Type 1 Path Address Mapping TLV associated with IPv4).

The Hop Address fields of the IPv4 Path Address Mapping TLV include the addresses of the hops of the path (i.e., Hop Address[x] includes the IPv4 address of the x-th hop in the path).

The Sub-TLVs of the IPv4 Path Address Mapping TLV, in this case, are not needed, since the path address mapping is provided by the Path Address field and the set of Hop Address fields of the IPv4 Path Address Mapping TLV.

It is noted that the inclusion of the IPv4 Path Address Mapping TLV (which includes the path address and the description of the associated path) within the Opaque LSA provides advertisement of the path address mapping.

As described above, an OSPF speaker (router) maintains a PAMD for the area in which it participates. The PAMD includes path address mappings for each OSPF router in the area and is built by flooding of Path LSAs carrying path address mappings across the area. It is noted that routers may originate Path LSAs whenever the contents of the Path LSA change or whenever otherwise indicated by OSPF (e.g., an LSA refresh or other conditions).

As described above, a router, upon receipt of a path address mapping (e.g., a Path TLV including a Path Address Mapping Sub-TLV that includes the path address mapping), updates its PAMD. It is noted that SPF or other route calculations are unnecessary.

As described above, an OSPF ABR may redistribute its PAMD to an external agent (e.g., to an SDN controller, PCE server, or the like, via BGP-LS or other means) for visibility of path address mappings across multiple areas.

Various example embodiments for supporting routing of source routed packets using path compression in IPv4-based source routing may be configured to support advertisement of path address mappings in the control plane using OSPF in other ways.

Various example embodiments for supporting routing of source routed packets using path compression (e.g., path compression for paths which are segments of source routed paths, path compression for protection paths configured to protect portions of source routed paths, or the like, as well as various combinations thereof) in IPv4-based source routing may be configured to support path address management in the control plane using BGP-LS.

The flooding scope for IGP-based methods of SR is IGP area-wide. As a result, the contents of a PAMD have the scope of an IGP area and, therefore, by using the IGP alone, it may not be enough to construct IPv4 source routes across multiple IGP areas or AS boundaries.

In order to address the need for applications that require topological visibility across IGP areas, or even across ASs, the BGP-LS address-family/sub-address-family have been defined to allow BGP to carry Link-State information. The BGP Network Layer Reachability Information (NLRI) encoding format for BGP-LS, and a new BGP Path Attribute called the BGP-LS attribute, are defined in RFC 7752. The BGP-LS specifications for SR are described in the "BGP Link-State extensions for Segment Routing" draft (also denoted as SR-BGP-LS-DRAFT). BGP-LS provides the containers for 1:1 mapping of link state information from IGPs.

In at least some embodiments, a new type of BGP-LS NLRI, referred to as a Path NLRI, may carry the Path LSAs originated by IGPs. The Path NLRI may be used by an ABR to advertise path address mappings received via different types of IGPs (e.g., for advertising path address mappings received in Path Address Mapping Sub-TLVs via IS-IS, for advertising path address mappings received in Path Address Mapping TLVs via OSPF, or the like, as well as various combinations thereof).

The Path NLRI in BGP-LS may have a TLV format similar to the TLV format described in Section 3.1 of RFC 7752. The Value portion of the TLV format for the Path NLRI may have the format as depicted in FIG. 104.

The Value portion of the Path NLRI, as depicted in FIG. 104, includes a Protocol-ID field and a Path Descriptors field.

The Protocol-ID of the Value portion of the Path NLRI describes the IGP protocol that originated the Path information (e.g., IS-IS, OSPF, or the like).

The Path Descriptors field of the Value portion of the Path NLRI is a set of TLV triplets. The Path Descriptor TLVs uniquely identify a Path Address Mapping originated by a node (the path address mapping advertised via IGP within the area which is now being distributed outside of the area by the ABR via BGP-LS).

The Path Descriptor field of the Value portion of the Path NLRI may carry a Path Address Mapping TLV (e.g., an IPv4 Path Address Mapping TLV for IPv4).

In IPv4, the Path Descriptor fields may carry an IPv4 Path Address Mapping TLV. The format of the IPv4 Path Address Mapping TLV is as depicted in FIG. 105.

Figure 105:
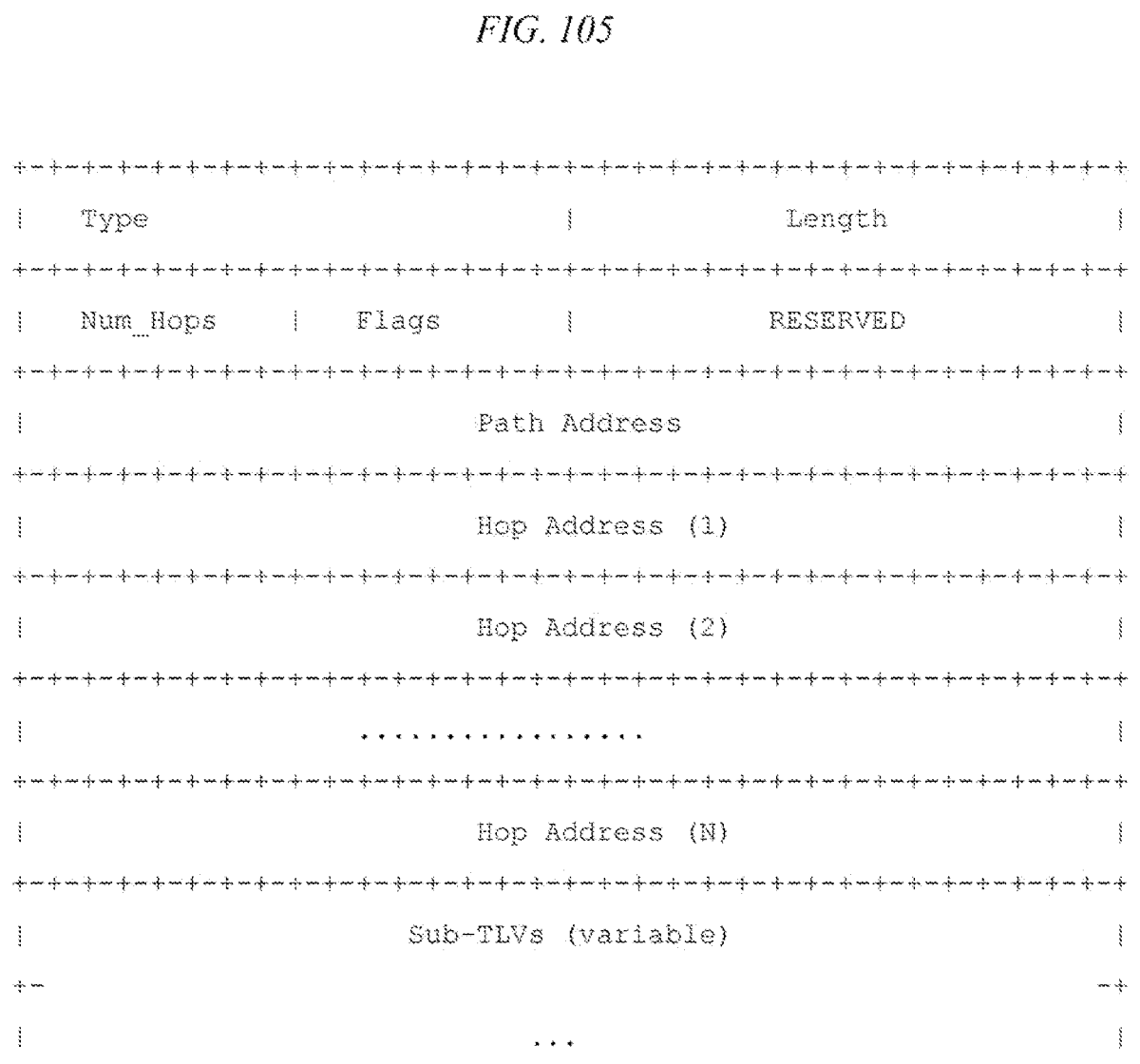

The IPv4 Path Address Mapping TLV, as depicted in FIG. 105, includes a Type field, a Length field, a Number of Hops (Num_Hops) field, a Flags field, a RESERVED field, a Path Address field, one or more Hop Address fields, and Sub-TLVs.

The Type field of the IPv4 Path Address Mapping TLV includes the type of the Path Address Mapping TLV. The value of the Type field has yet to be determined (e.g., a value of 266 is suggested; however, it will be appreciated that other suitable values may be used).

The Length field of the IPv4 Path Address Mapping TLV has a value that is variable, dependent on the number of hops (i.e., the number of Hop Address fields) and the number of Sub-TLVs.

The Number of Hops (Num Hops) field of the IPv4 Path Address Mapping TLV indicates the number of hops in the path (and, thus, the number of Hop Address fields included in the IPv4 Path Address Mapping TLV).

The Flags field of the IPv4 Path Address Mapping TLV is a 1-octet field that may be used to define various flags (although it is noted that none are currently defined).

The RESERVED field of the IPv4 Path Address Mapping TLV is a 1-octet field that should be set to zero on transmission and ignored on reception.

The Path Address field of the IPv4 Path Address Mapping TLV includes the path address (4 octets for a Type 1 Path Address Mapping TLV associated with IPv4).

The Hop Address fields of the IPv4 Path Address Mapping TLV include the addresses of the hops of the path (i.e., Hop Address[x] includes the IPv4 address of the x-th hop in the path).

The Sub-TLVs of the IPv4 Path Address Mapping TLV, in this case, are not needed, since the path address mapping is provided by the Path Address field and the set of Hop Address fields of the IPv4 Path Address Mapping TLV.

Various example embodiments for supporting routing of source routed packets using path compression in IPv4-based source routing may be configured to support advertisement of path address management in the control plane using BGLP-LS in other ways.

It will be appreciated that various example embodiments for supporting routing of source routed packets using path compression (e.g., path compression for paths which are segments of source routed paths, path compression for protection paths configured to protect portions of source routed paths, or the like, as well as various combinations thereof) in IPv4-based source routing may be configured to support path label management in the control plane in various other ways.

Various example embodiments for supporting routing of source routed packets using path compression (e.g., path compression for paths which are segments of source routed paths, path compression for protection paths configured to protect portions of source routed paths, or the like, as well as various combinations thereof) in IPv6-based source routing may be configured to support path address management in the control plane. As discussed further below, this may be performed using IS-IS, OSPFv3, BGP-LS, or any other suitable protocol.

As discussed herein, the PCE may instruct a router to allocate and program a path address against a path. In this context, the PCE describes the path as list of hops of which the path is composed, where each hop is denoted as an IPv6 address/prefix. The router learns about the hops from the Link State Advertisements (LSAs) by the IGPs (IS-IS, OSPFv3, BGP-LS or the likes). If the router has not yet learned about a hop specified in the path (e.g., IGP re-convergence), then the path address would stay "unresolved" at the router and will not be programmed into the IPv6 Path Address Table, the IPv6 Path Table, or the IPv6 Next-Hop Table of the router. Once the IGP converges and the path address is resolved, then the path address is programmed into the IPv6 Path Address Table, the IPv6 Path Table, and the IPv6 Next-Hop Table of the router of the router. This Path-Address→Path Mapping may be referred to herein as a path address mapping.

The router, once a path address is allocated by the router and is mapped to the path (i.e., to the list of explicit hops of the path), programs the path address mapping into its IPv6 Path Address Table, IPv6 Path Table, and IPv6 Next-Hop Table in the data plane of the router.

In order for the PCE to know the path addresses that are available in a router, the router advertises its local path address space to the PCE. Various example embodiments may be configured to enable a router to advertise its path address space to the PCE (or any external agent) via IGPs (e.g., IS-IS, OSPFv3, or the like) and BGPs (e.g., BGP-LS or the like).

In order for the path address mappings created by a router in one area to be visible to routers in other areas, an Area Border Router (ABR) advertises all path address mappings in its area to an external agent (e.g., a PCE, an SDN Controller, or any suitable external application). This is due to the fact that, for an IPv6 source route that traverses across multiple IGP areas, a head-end router may need to encode the path address against a path segment in another area. Various example embodiments may be configured to enable an ABR to advertise all path address mappings in its area to an external agent (or any external agent) via BGPs (e.g., BGP-LS or the like) or other suitable protocols or mechanisms. As such, each router floods its path address mappings throughout its area, so that such path address mappings reach the ABR(s) of the area and, thus, may be redistributed by ABR to the external agent(s) outside of the area. Various example embodiments may be configured to enable a router to advertise its path address mappings within its area via IGPs (e.g., IS-IS, OSPFv3, or the like) and BGPs (e.g., BGP-LS or the like).

As the path address mappings are exchanged between routers within and between areas, the routers build path address mapping databases (PAMDs). With respect to the example of FIG. 1, for example, the structure of the PAMD at R1 may be as depicted in FIG. 106.

The PAMD for R1, as depicted in FIG. 106, includes a section (denoted as Area: Self) with path address mappings for its own area (assuming that routers R2-R9 are the only routers in its area) and a section (denoted as Area: Other) with path address mappings from another area. The section of the PAMD with the path address mappings from the other area is learned by R1 from external agents via redistribution of path address mappings of the other area by the ABR of the other area. It will be appreciated (as may be seen from the example PAMD above), that multiple paths may originate from any given node (e.g., two paths are depicted as originating from router R2: namely, the path {IP6-23, IP6-35, IP6-57} which has an associated path address of IP6-2357 and path {IP6-25, IP6-56} which has an associated path address of IP6-256). The router R1 may then use the PAMD to look up paths originating from other nodes such that, when a matching path is found (in terms of the hops of the path), the associated path label mapped to the matching path may be used to encode the source routed packet. For example, if router R1 wants to look for a path originating from R2 (where the path includes a set of hops), it searches the path entries of R2 in the PAMD and matches the set of hops of the path against the listed hops in the path label mapping entries for R2, such that the path label mapped to that path may be identified and used to encode the source routed packet.

Various example embodiments for supporting routing of source routed packets using path compression (e.g., path compression for paths which are segments of source routed paths, path compression for protection paths configured to protect portions of source routed paths, or the like, as well as various combinations thereof) in IPv6-based source routing may be configured to support path address management in the control plane using IS-IS.

In general, IS-IS is an IGP protocol that distributes network topology information among the IS-IS speaking routers. The base specification of IS-IS is defined in RFC 1142. In IS-IS, such network topology information is exchanged in Link State PDUs (LSPs). The LSPs may carry link status for links of a router, internal or external route prefixes of a router, or the like. The IS-IS control plane for IPv4 segment routing is being standardized in the IETF in the "IS-IS Extensions for Segment Routing" draft (also denoted as SR-ISIS-DRAFT). The IS-IS control plane for IPv6 segment routing, as discussed further below, may be configured to support path address management in the control plane.

Various example embodiments for supporting routing of source routed packets using path compression in IPv6-based source routing may be configured to support advertisement of the path address space in the control plane using IS-IS.

In at least some embodiments, advertisement of path address space in the control plane using IS-IS may be performed using a new Path Address Block (PAB) Sub-TLV carried within an IS-IS Router Capability TLV.

Section 2 of RFC 7981 defines an IS-IS Router Capability TLV, which allows a router to announce its capabilities within an IS-IS level or the entire routing domain. The IS-IS Router Capability TLV can carry any number of router specific capabilities within it, as optional sub-TLVs. Section 2 of RFC 7981 describes the format for the IS-IS Router Capability TLV as depicted in FIG. 107.

The IS-IS Router Capability TLV, as depicted in FIG. 107, includes a Type field, a Length field, a Router-ID field, and a Flags field, followed by one or more sub-TLVs.

The Type field of the IS-IS Router Capability TLV includes the type of the IS-IS Router Capability TLV. As indicated in RFC 7981, the value of the Type field is 242

The Length field of the IS-IS Router Capability TLV has a value that is variable, dependent on the size of the Value field (which includes the Router-ID field, the Flags field, and any sub-TLVs).

The Router-ID field of the IS-IS Router Capability TLV is a 4-octet field indicating the router that is the source of the IS-IS Router Capability TLV.

The 1-octet Flags field of the IS-IS Router Capability TLV includes a set of one-bit flags configured to indicate various capabilities. The flags of the Flags field have the following format and are defined as depicted in FIG. 108.

The IS-IS Router Capability TLV, as noted above, includes a 1-octet Flags field. The 1-octet Flags field, as depicted in FIG. 108, includes a set of one-bit flags configured to indicate various capabilities. The D Flag and the S Flag control the scope of advertisement of the IS-IS Router Capability TLV. The S-Bit (0x01) may control the scope of advertisement of the IS-IS Router Capability TLV as follows: (1) if the S bit is set (e.g., equal to "1"), the IS-IS Router Capability TLV is flooded across the entire routing domain and (2) if the S bit is not set (e.g., equal to 0), the IS-IS Router Capability TLV is leaked between levels (although it is noted that this bit should not be altered during the TLV leaking). The D-Bit (0x02) may control the scope of advertisement of the IS-IS Router Capability TLV as follows: (1) when the IS-IS Router Capability TLV is leaked from Level 2 (L2) to Level 1 (L1), the D bit is to be set (e.g., equal to "1"), otherwise the bit is cleared and (2) IS-IS Router Capability TLVs with the D bit are not to be leaked from Level 1 to Level 2 (to prevent TLV looping).

The sub-TLVs portion of the IS-IS Router Capability TLV is a variable-sized portion of the Value field that may be used to carry the PAB Sub-TLV that includes the path address space being advertised.

The path address space, as indicated above, may be advertised using the PAB Sub-TLV carried as a sub-TLV within the IS-IS Router Capability TLV. The format of the PAB Sub-TLV is as depicted in FIG. 109.

The PAB Sub-TLV, as depicted in FIG. 109, includes a Type field, a Length field, and a Flags field, followed by one or more PAB descriptor entries (each of which includes a 3-octet Range field and a variable-sized Path Address Sub-TLV).

The Type field of the PAB Sub-TLV includes the type of the PAB Sub-TLV. The value of the Type field has yet to be determined (e.g., a value of 24 is suggested; however, it will be appreciated that other suitable values may be used).

The Length Field of the PAB Sub-TLV is a 1-octet field that includes the variable length of the Value portion of the PAB Sub-TLV.

The Flags field of the PAB Sub-TLV is a 1-octet field that may be used to define various flags (although it is noted that none are currently defined).

The PAB descriptor entries of the PAB Sub-TLV, as depicted in FIG. 109, each include a 3-octet Range field and a variable-sized Path Address Sub-TLV, where the Path Address Sub-TLV includes the first value of the PAB descriptor while the Range field includes the number of path addresses in the PAB descriptor.

The Path Address Sub-TLV, which is included within the PAB descriptor entry of the PAB Sub-TLV, includes the first path address in the range of path addresses advertised by the Path Address Sub-TLV. The Path Address Sub-TLV may be formatted as depicted in FIG. 110.

The Path Address Sub-TLV, as depicted in FIG. 110, includes a Type field, a Length field, a Flags field, and a Path Address field.

The Type field of the Path Address Sub-TLV includes the type of the Path Address Sub-TLV. The Type field may be a first type (e.g., Type 2) in IPv6 (indicating that the Path Address Sub-TLV is an IPv6 Path Address Sub-TLV), in which case the Path Address field may be 16-octets in size (including an IPv6 path address).

The Length field of the Path Address Sub-TLV is a 1-octet field that includes the variable length of the Value portion of the Path Address Sub-TLV (namely, the Flags field and the Path Address field).

The 1-octet Flags field of the Path Address Sub-TLV may be used to define various flags (although it is noted that none are currently defined).

The Path Address field of the Path Address Sub-TLV includes the 16-octet IPv6 path address.

It is noted that the PAB Sub-TLV may be advertised in an LSP of any number; however, it is expected that a router will not advertise more than one PAB Sub-TLV. In at least some embodiments, in which a router receives multiple PAB Sub-TLVs from the same originating router, the receiving router may select the first advertisement in the lowest numbered LSP.

It is noted that it is expected that the originating router will not advertise overlapping path address ranges.

It is noted that, each time a path address is allocated from the PAB, the allocation of the path address should be reported to any relevant components (e.g., controllers, applications, or the like) in order for the components to have an up-to-date view of the current IPv6 path address allocation and in order to avoid collisions between allocation instructions.

Various example embodiments for supporting routing of source routed packets using path compression in IPv6-based source routing may be configured to support advertisement of the path address mappings in the control plane using IS-IS.

In at least some embodiments, advertisement of path address mappings in the control plane using IS-IS may be performed using a Path Address Mapping Sub-TLV, where the Path Address Mapping Sub-TLV is carried within a Path TLV. It is noted that the Path TLV may be a TLV supported by IS-IS for distributing path address mappings in IP-based source routing. The Path Address Mapping Sub-TLV carries the path address and the path (namely, the explicit hops of the path) to which the path address is mapped.

The Path TLV, which is carried within a Link State PDU (LSP), may have the format as depicted in FIG. 111.

The Path TLV, as depicted in FIG. 111, includes a Type field, a Length field, a Flags field, and one or more Path Address Mapping Sub-TLVs.

The Type field of the Path TLV is a one-octet field that includes the type of the Path TLV. The value of the Type field has yet to be determined (e.g., a value of 25, which may be allocated from the IANA registry, is suggested; however, it will be appreciated that other suitable values may be used).

The Length field of the Path TLV is a 1-octet field that includes the variable length of the Value portion of the Path TLV (namely, the Flags field and the Path Address Mapping Sub-TLVs).

The Flags field of the Path TLV is a 1-octet field that may be used to define various flags (although it is noted that none are currently defined).

The Path TLV, as depicted in FIG. 111, includes one or more Path Address Mapping Sub-TLVs.

The Path Address Mapping Sub-TLV, which is carried within the Path TLV, may have the format as depicted in FIG. 112.

The Path Address Mapping Sub-TLV includes a single path address mapping. The Path Address Mapping Sub-TLV, as depicted in FIG. 112, includes a Type field, a Length field, a Flags field, a Number of Hops (Num Hops) field, a Path Address field, one or more Hop Address fields, and Sub-TLVs.

The Type field of the Path Address Mapping Sub-TLV includes the type of the Path Address Mapping Sub-TLV. The Type field may be a second type (e.g., Type 2) in IPv6, in which case the Path Address field may be 16-octets in size (and including an IPv6 path address).

The Length field of the Path Address Mapping Sub-TLV is a 1-octet field that includes the variable length of the Value portion of the Path Address Mapping Sub-TLV (namely, the Flags field, the Num Hops field, the Path Address field, the Hop Address field, and any Sub-TLVs).

The 1-octet Flags field of the Path Address Mapping Sub-TLV may be used to define various flags (although it is noted that none are currently defined).

The Number of Hops (Num Hops) field of the Path Address Mapping Sub-TLV indicates the number of hops in the path (and, thus, the number of Hop Address fields included in the Path Address Mapping Sub-TLV).

The Path Address field of the Path Address Mapping Sub-TLV includes the 16-octet path address that is mapped to the path (namely, the explicit hops of the path as indicated in the Hop Address fields).

The Hop Address fields of the Path Address Mapping Sub-TLV include the addresses of the hops of the path (i.e., Hop Address[x] includes the 16-octet IPv6 address of the x-th hop in the path).

The Sub-TLVs of the Path Address Mapping Sub-TLV may include one or more Sub-TLVs (although it is noted that none are currently defined).

It is noted that the inclusion of the Path Address Mapping Sub-TLV (which includes the path address and the description of the associated path) within the Path TLV provides advertisement of the path address mapping.

As described above, an IS-IS speaker (router) maintains a PAMD for the area in which it participates. The PAMD includes path address mappings for each IS-IS router in the area and is built by flooding of Path TLVs carrying path address mappings across the area. It is noted that routers may originate Path TLVs whenever the contents of the Path TLV change or whenever otherwise indicated by IS-IS (e.g., an LSP refresh or other conditions).

As described above, a router, upon receipt of a path address mapping (e.g., a Path TLV including a Path Address Mapping Sub-TLV that includes the path address mapping), updates its PAMD. It is noted that SPF or other route calculations are unnecessary.

As described above, an IS-IS ABR may redistribute its PAMD to an external agent (e.g., to an SDN controller, PCE server, or the like, via BGP-LS or other means) for visibility of path address mappings across multiple areas.

Various example embodiments for supporting routing of source routed packets using path compression (e.g., path compression for paths which are segments of source routed paths, path compression for protection paths configured to protect portions of source routed paths, or the like, as well as various combinations thereof) in IPv6-based source routing may be configured to support path address management in the control plane using OSPFv3.

OSPFv3 is an IGP protocol that distributes IPv6 network topology information among the OSPF speaking routers. The base specification of OSPF is defined in RFC 5340. In OSPFv3, such IPv6 network topology information is exchanged in LSAs. The LSAs may carry link status for links of a router, internal or external route prefixes of a router, or the like. The OSPFv3 control plane for MPLS segment routing is being standardized in the IETF in the "OSPFv3 Extensions for Segment Routing" draft (also denoted as SR-OSPFV3-DRAFT). The OSPFv3 control plane for MPLS segment routing, as discussed further below, may be configured to support path label management in the control plane.

Various example embodiments for supporting routing of source routed packets using path compression in IPv6-based source routing may be configured to support advertisement of the path address space in the control plane using OSPFv3.

In at least some embodiments, advertisement of the path address space in the control plane using OSPFv3 may be performed using a Path Address Block (PAB) TLV carried within an OSPFv3 Router Information Opaque LSA. It is noted that PAB TLV may be a TLV supported by OSPFv3 for distributing IP path address space information. The PAB TLV may be a top-level TLV of the OSPFv3 Router Information Opaque LSA.

The OSPFv3 Router Information Opaque LSA is described in RFC 7770. Opaque LSAs provide a generalized mechanism to allow for the future extensibility of OSPF. Opaque LSAs include a standard LSA header followed by application-specific information. Standard OSPF link-state database flooding mechanisms are used to distribute Opaque LSAs to all or some limited portion of the OSPF topology. Opaque LSAs can be carried in both OSPFv2 and OSPFV3. As described in section 2.2 in RFC 7770, the format of OSPFv3 Router Information Opaque LSA starts with a standard LSA header which has the format as depicted in FIG. 113.

The OSPFv3 Router Information Opaque LSA, as depicted in FIG. 113, includes an LS Age field, a U-bit field (which, as depicted in FIG. 113, is always set to 1 (indicating that the LSA should be flooded even if it is not understood)), an S12 field including S1 and S2 bits (indicating the flooding scope of the LSA), a Type field, a Link State ID (Instance ID) field, an Advertising Router field, an LS Sequence Number field, an LS Checksum field, a Length field, and TLVs (which is considered to be the payload of the Opaque LSA). These fields of the OSPFv3 Router Information Opaque LSA are defined in RFC 7770. RFC 7770 indicates that the Opaque LSA Type is 12. A Type 12 Opaque LSA denotes an area-local scope that is not to be flooded beyond its area of origin. The PAB TLV may be carried within such a Type 12 Opaque LSA, since path address mapping information does not need to be leaked across areas. The TLVs of the OSPFv3 Router Information Opaque LSA include one or more nested TLV triplets for extensibility. The format of each TLV that may be included within the TLVs of the OSPFv3 Router Information Opaque LSA is as depicted in FIG. 114.

The TLV for the Router Information Opaque LSA, as depicted in FIG. 114, includes a Type field, a Length field, and a Value field. The Length field defines the length of the value portion in octets (thus, a TLV with no value portion would have a length of zero). The TLV is padded to four-octet alignment; padding is not included in the length field (so a 3-octet value would have a length of three, but the total size of the TLV would be eight octets). Nested TLVs are also 32-bit aligned. Unrecognized types are ignored. The TLV may be a PAB TLV including a path address mapping.

The PAB TLV, as indicated above, is carried within an OSPFv3 Router Information Opaque LSA (as a TLV after the LSA header portion of the OSPFv3 Router Information Opaque LSA). The PAB TLV may appear multiple times in the OSPFv3 Router Information Opaque LSA. The PAB TLV has the format as depicted in FIG. 115.

The PAB TLV, as depicted in FIG. 115, includes a Type field, a Length field, a Range Size field, a RESERVED field, and an IPv6 Path Address field.

The Type field of the PAB TLV is a 2-octet field that includes the type of the PAB TLV. The value of the Type field of the Path-SID TLV in BGP-LS has yet to be determined (e.g., a value of 18 is suggested; however, it will be appreciated that other suitable values may be used).

The Length field of the PAB TLV is a 2-octet field that includes the variable length of the Value portion of the PAB TLV (namely, the Range Size field, the RESERVED field, and the IPv6 Path Address field).

The Range Size field of the PAB TLV is a 3-octet field including the range of the path address block (e.g., the number of path addresses in the range, including the first path address which is specified in the IPv6 Path Address field).

The RESERVED field is unused and is reserved for future use. This should be unset on transmission and ignored on receipt.

The IPv6 Path Address field of the PAB TLV is a 16-octet field that includes the IPv6 Path Address that is the first path address in the path address block being advertised.

It is noted that it is expected that the originating router will not advertise overlapping path address ranges.

It is noted that, each time a path address is allocated from the PAB, the allocation of the path address should be reported to any relevant components (e.g., controllers, applications, or the like) in order for the components to have an up-to-date view of the current PAB allocation and in order to avoid collisions between allocation instructions.

It is noted that an originating router advertising the PAB TLV may also have other IPv6 path address ranges, outside of the PAB being advertised, which may be used for local allocation purposes and, thus, which are not advertised in the PAB TLV.

Various example embodiments for supporting routing of source routed packets using path compression in IPv6-based source routing may be configured to support advertisement of the path address space in the control plane using OSPFv3 in other ways.

Various example embodiments for supporting routing of source routed packets using path compression in IPv6-based source routing may be configured to support advertisement of the path address mappings in the control plane using OSPFv3.

In at least some embodiments, advertisement of path address mappings in the control plane using OSPFv3 may be performed using a Path LSA carried within an OSPF Opaque LSA. It is noted that Path LSA may be an LSA supported by OSPFv3 for distributing IP path address mapping information (a mapping of a path address to a list of IP hops along the path), including an LSA supported by OSPF for distributing IPv4 path address mapping information (e.g., a mapping of an IPv4 path address to a list of IPv4 hops along the path) and an LSA supported by OSPFv3 for distributing IPv6 path address mapping information (e.g., a mapping of an IPv6 path address to a list of IPv6 hops along the path).

The Path LSA, as indicated above, is carried within an OSPF Opaque LSA. The "OSPF Opaque LSA Option" is described in RFC 5250. Opaque LSAs provide a generalized mechanism to allow for the future extensibility of OSPF. Opaque LSAs include a standard LSA header followed by application-specific information. Standard OSPF link-state database flooding mechanisms are used to distribute Opaque LSAs to all or some limited portion of the OSPF topology. Opaque LSAs can be carried in both OSPFv2 and OSPFV3. As described in section A.2 in RFC 5250, the format of Opaque LSA starts with a standard LSA header which has the format as depicted in FIG. 116.

The Path LSA, as depicted in FIG. 116, includes an LS Age field, an Options field, a Type field, an Opaque Type field, an Opaque ID field, an Advertising Router field, an LS Sequence Number field, an LS Checksum field, a Length field, and Opaque Information (which is considered to be the payload of the Opaque LSA). These fields of the Path LSA are defined in RFC 5250. RFC 5250 defines three Opaque LSA Types (9, 10, and 11, as indicated above). A Type 10 Opaque LSA denotes an area-local scope that is not to be flooded beyond its area of origin. The Path LSA may be carried within such a Type 10 Opaque LSA, since path address mapping information does not need to be leaked across areas. The Opaque Type field of the Opaque LSA defines the format and semantics of the payload (Opaque Information).

The value of the Opaque Type field has yet to be determined (e.g., a value of 16 is suggested; however, it will be appreciated that other suitable values may be used). The Opaque Information of the Path LSA includes one or more nested TLV triplets for extensibility. The format of each TLV that may be included within the Opaque Information of the Path LSA is depicted in FIG. 117.

The TLV for the Opaque Information, as depicted in FIG. 117, includes a Type field, a Length field, and a Value field. The Length field defines the length of the value portion in octets (thus, a TLV with no value portion would have a length of zero). The TLV is padded to four-octet alignment; padding is not included in the length field (so a 3-octet value would have a length of three, but the total size of the TLV would be eight octets). Nested TLVs are also 32-bit aligned. Unrecognized types are ignored. The TLV may be an IPv6 Path Address Mapping TLV, which may have the format as depicted in FIG. 118.

The IPv6 Path Address Mapping TLV, as depicted in FIG. 118, includes a Type field, a Length field, an AF field, a Number of Hops (Num_Hops) field, a Flags field, a RESERVED field, a Path Address field, one or more Hop Address fields, and Sub-TLVs.

The Type field of the IPv6 Path Address Mapping TLV is a 2-octet field that includes the type of the IPv6 Path Address Mapping TLV. The Type field may be a second type (e.g., Type 2).

The Length field of the IPv6 Path Address Mapping TLV is a 2-octet field that includes the variable length of the Value portion of the IPv6 Path Address Mapping TLV.

The AF field of the IPv6 Path Address Mapping TLV includes the address family for the path address and the hop addresses associated with the path address. The value of the AF field may be Type 1 for IPv6 unicast. The inclusion of the address family in this TLV allows for future extension.

The Number of Hops (Num Hops) field of the IPv6 Path Address Mapping TLV indicates the number of hops in the path (and, thus, the number of Hop Address fields included in the IPv6 Path Address Mapping TLV).

The Flags field of the IPv6 Path Address Mapping TLV is a 1-octet field that may be used to define various flags (although it is noted that none are currently defined).

The RESERVED field of the IPv6 Path Address Mapping TLV is a 1-octet field that should be set to zero on transmission and ignored on reception.

The Path Address field of the IPv6 Path Address Mapping TLV includes the path address (16 octets for a Type 2 Path Address Mapping TLV associated with IPv6).

The Hop Address fields of the IPv6 Path Address Mapping TLV include the addresses of the hops of the path (i.e., Hop Address[x] includes the IPv6 address of the x-th hop in the path).

The Sub-TLVs of the IPv6 Path Address Mapping TLV, in this case, are not needed, since the path address mapping is provided by the Path Address field and the set of Hop Address fields of the IPv4 Path Address Mapping TLV.

It is noted that the inclusion of the IPv6 Path Address Mapping TLV (which includes the path address and the description of the associated path) within the Opaque LSA provides advertisement of the path address mapping.

As described above, an OSPF speaker (router) maintains a PAMD for the area in which it participates. The PAMD includes path address mappings for each OSPF router in the area and is built by flooding of Path LSAs carrying path address mappings across the area. It is noted that routers may originate Path LSAs whenever the contents of the Path LSA change or whenever otherwise indicated by OSPF (e.g., an LSA refresh or other conditions).

As described above, a router, upon receipt of a path address mapping (e.g., a Path TLV including a Path Address Mapping Sub-TLV that includes the path address mapping), updates its PAMD. It is noted that SPF or other route calculations are unnecessary.

As described above, an OSPF ABR may redistribute its PAMD to an external agent (e.g., to an SDN controller, PCE server, or the like, via BGP-LS or other means) for visibility of path address mappings across multiple areas.

Various example embodiments for supporting routing of source routed packets using path compression in IPv6-based source routing may be configured to support advertisement of the path address mappings in the control plane using OSPFv3 in other ways.

Various example embodiments for supporting routing of source routed packets using path compression (e.g., path compression for paths which are segments of source routed paths, path compression for protection paths configured to protect portions of source routed paths, or the like, as well as various combinations thereof) in IPv6-based source routing may be configured to support path address management in the control plane using BGP-LS.

The flooding scope for IGP-based methods of SR is IGP area-wide. As a result, the contents of a PAMD have the scope of an IGP area and, therefore, by using the IGP alone, it may not be enough to construct IPv6 source routes across multiple IGP areas or AS boundaries.

In order to address the need for applications that require topological visibility across IGP areas, or even across ASs, the BGP-LS address-family/sub-address-family have been defined to allow BGP to carry Link-State information. The BGP Network Layer Reachability Information (NLRI) encoding format for BGP-LS, and a new BGP Path Attribute called the BGP-LS attribute, are defined in RFC 7752. The BGP-LS specifications for SR are described in the "BGP Link-State extensions for Segment Routing" draft (also denoted as SR-BGP-LS-DRAFT). BGP-LS provides the containers for 1:1 mapping of link state information from IGPs.

In at least some embodiments, a new type of BGP-LS NLRI, referred to as a Path NLRI, may carry the Path LSAs originated by IGPs. The Path NLRI may be used by an ABR to advertise path address mappings received via different types of IGPs (e.g., for advertising path address mappings received in Path Address Mapping Sub-TLVs via IS-IS, for advertising path address mappings received in Path Address Mapping TLVs via OSPFv3, or the like, as well as various combinations thereof).

The Path NLRI in BGP-LS may have a TLV format similar to the TLV format described in Section 3.1 of RFC 7752. The Value portion of the TLV format for the Path NLRI may have the format as depicted in FIG. 119.

The Protocol-ID of the Value portion of the Path NLRI describes the IGP protocol that originated the Path information (e.g., IS-IS, OSPF, or the like).

The Path Descriptors field of the Value portion of the Path NLRI is a set of TLV triplets. The Path Descriptor TLVs uniquely identify a Path Address Mapping originated by a node (the path address mapping advertised via IGP within the area which is now being distributed outside of the area by the ABR via BGP-LS).

The Path Descriptor field of the Value portion of the Path NLRI may carry a Path Address Mapping TLV (e.g., an IPv6 Path Address Mapping TLV for IPv6).

In IPv6, the Path Descriptor fields may carry an IPv6 Path Address Mapping TLV. The format of the IPv6 Path Address Mapping TLV is depicted in FIG. 120.

Figure 120:
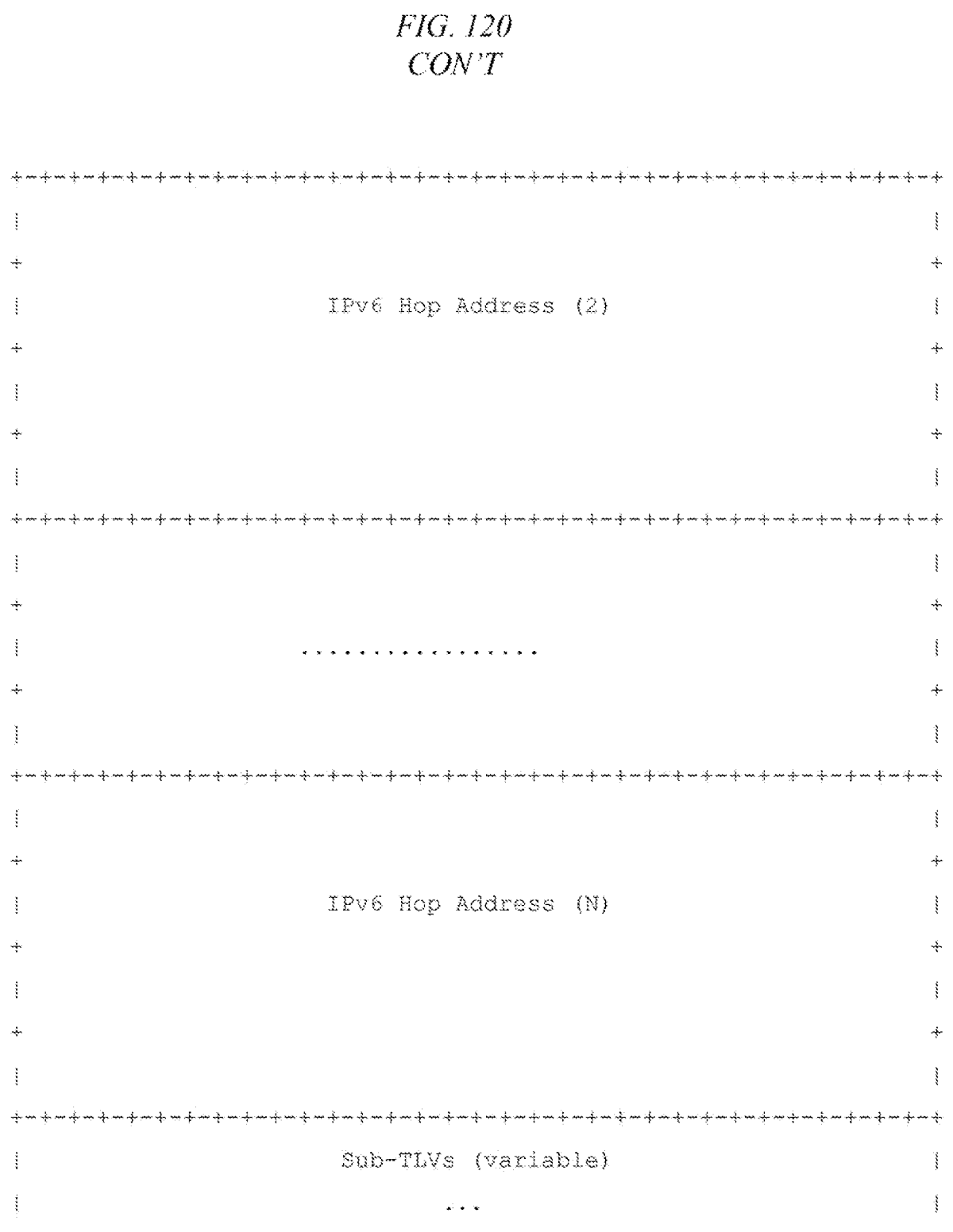

The IPv6 Path Address Mapping TLV, as depicted in FIG. 120, includes a Type field, a Length field, a Number of Hops (Num_Hops) field, a Flags field, a RESERVED field, a Path Address field, one or more Hop Address fields, and Sub-TLVs.

The Type field of the IPv6 Path Address Mapping TLV includes the type of the Path Address Mapping TLV. The value of the Type field has yet to be determined (e.g., a value of 267 is suggested; however, it will be appreciated that other suitable values may be used).

The Length field of the IPv6 Path Address Mapping TLV has a value that is variable, dependent on the number of hops (i.e., the number of Hop Address fields) and the number of Sub-TLVs.

The Number of Hops (Num Hops) field of the IPv6 Path Address Mapping TLV indicates the number of hops in the path (and, thus, the number of Hop Address fields included in the IPv6 Path Address Mapping TLV).

The Flags field of the IPv6 Path Address Mapping TLV is a 1-octet field that may be used to define various flags (although it is noted that none are currently defined).

The RESERVED field of the IPv6 Path Address Mapping TLV is a 1-octet field that should be set to zero on transmission and ignored on reception.

The Path Address field of the IPv6 Path Address Mapping TLV includes the path address (16 octets for a Type 2 Path Address Mapping TLV associated with IPv6).

The Hop Address fields of the IPv6 Path Address Mapping TLV include the addresses of the hops of the path (i.e., Hop Address[x] includes the IPv6 address of the x-th hop in the path).

The Sub-TLVs of the IPv6 Path Address Mapping TLV, in this case, are not needed, since the path address mapping is provided by the Path Address field and the set of Hop Address fields of the IPv6 Path Address Mapping TLV.

It will be appreciated that various example embodiments for supporting routing of source routed packets using path compression (e.g., path compression for paths which are segments of source routed paths, path compression for protection paths configured to protect portions of source routed paths, or the like, as well as various combinations thereof) in IPv6-based source routing may be configured to support path label management in the control plane in various other ways.

It will be appreciated that various example embodiments for supporting routing of source routed packets using path compression (e.g., path compression for paths which are segments of source routed paths, path compression for protection paths configured to protect portions of source routed paths, or the like, as well as various combinations thereof) may be configured to support path label management in the control plane, for various types of source routing protocols, in various other ways.

Various example embodiments for supporting flow-specific FRR of source routed packets, as indicated above, are configured to support distribution and use of control plane information for supporting flow-specific FRR of source routed packets based on use of path identifiers for path compression. The control plane information may include various information types, various information, or the like, as well as various combinations thereof. The control plane information may be advertised in various ways (e.g., based on various protocols, fields, TLVs, or the like, as well as various combinations thereof).

Figure 121:
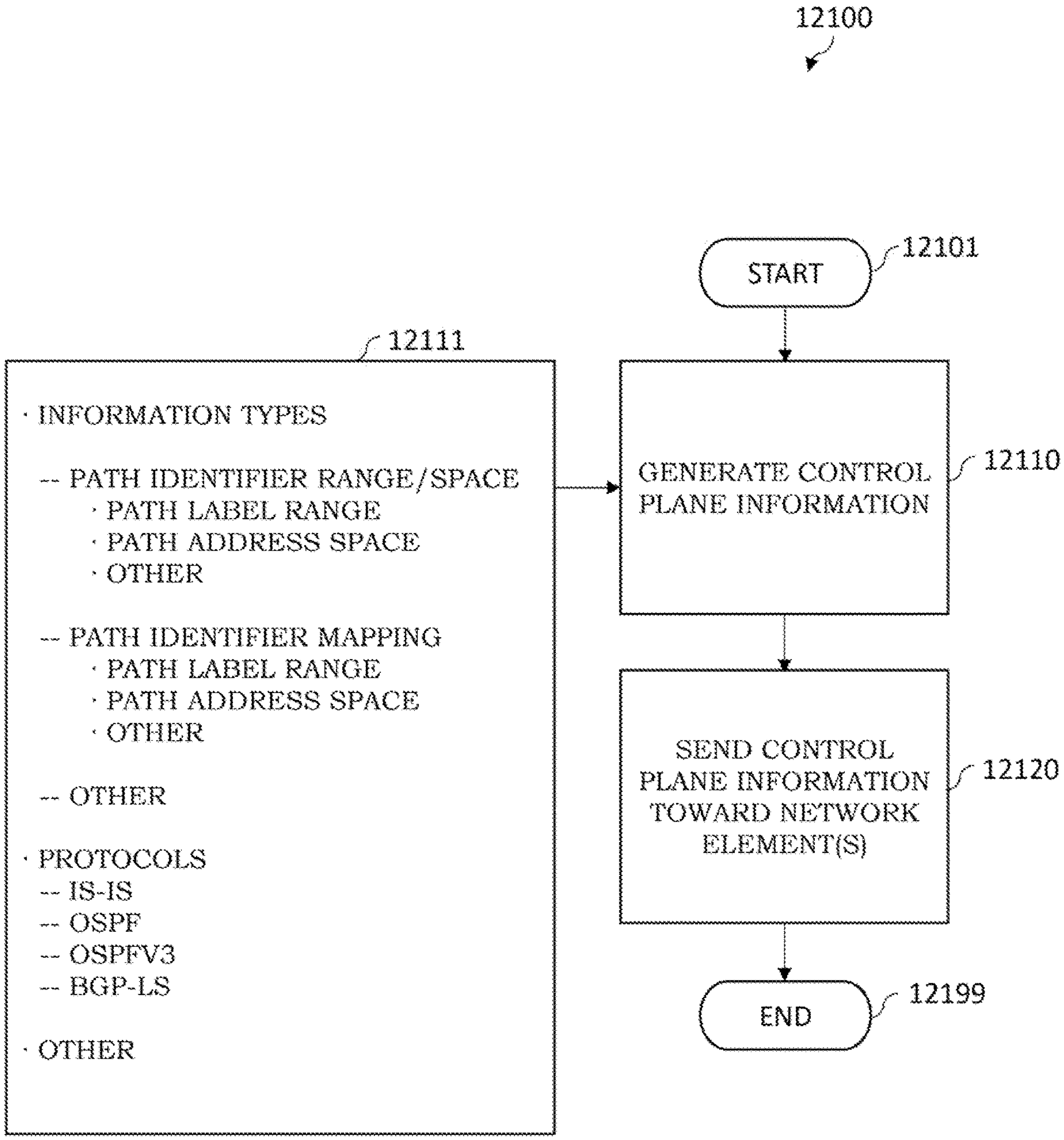

FIG. 121 depicts an example embodiment of a method for use by a network element to generate and distribute control plane information for supporting flow-specific fast rerouting of source routed packets based on path compression. It will be appreciated that, although primarily presented as being performed serially, at least a portion of the functions of method 12100 may be performed contemporaneously or in a different order than as presented in FIG. 120. At block 12101, method 12100 begins. At block 12110, control plane information is generated. As indicated at block 12111, the control plane information may include various information types (e.g., path identifier range or space (e.g., path label range in MPLS, path address space in IPv4 or IPv6, or the like), path identifier mappings (e.g., path label mappings in MPLS, path address mappings in IPv4 or IPv6, or the like), or the like, as well as various combinations thereof), may be based on various protocols (e.g., IS-IS, OSPF, OSPFv3, BGP-LS, or the like, as well as various combinations thereof), or the like, as well as various combinations thereof. At block 12120, the control plane information is sent toward one or more network elements. The control plane information may be sent using various protocols, messages, or the like, as well as various combinations thereof. At block 12199, method 12100 ends.

Figure 122:
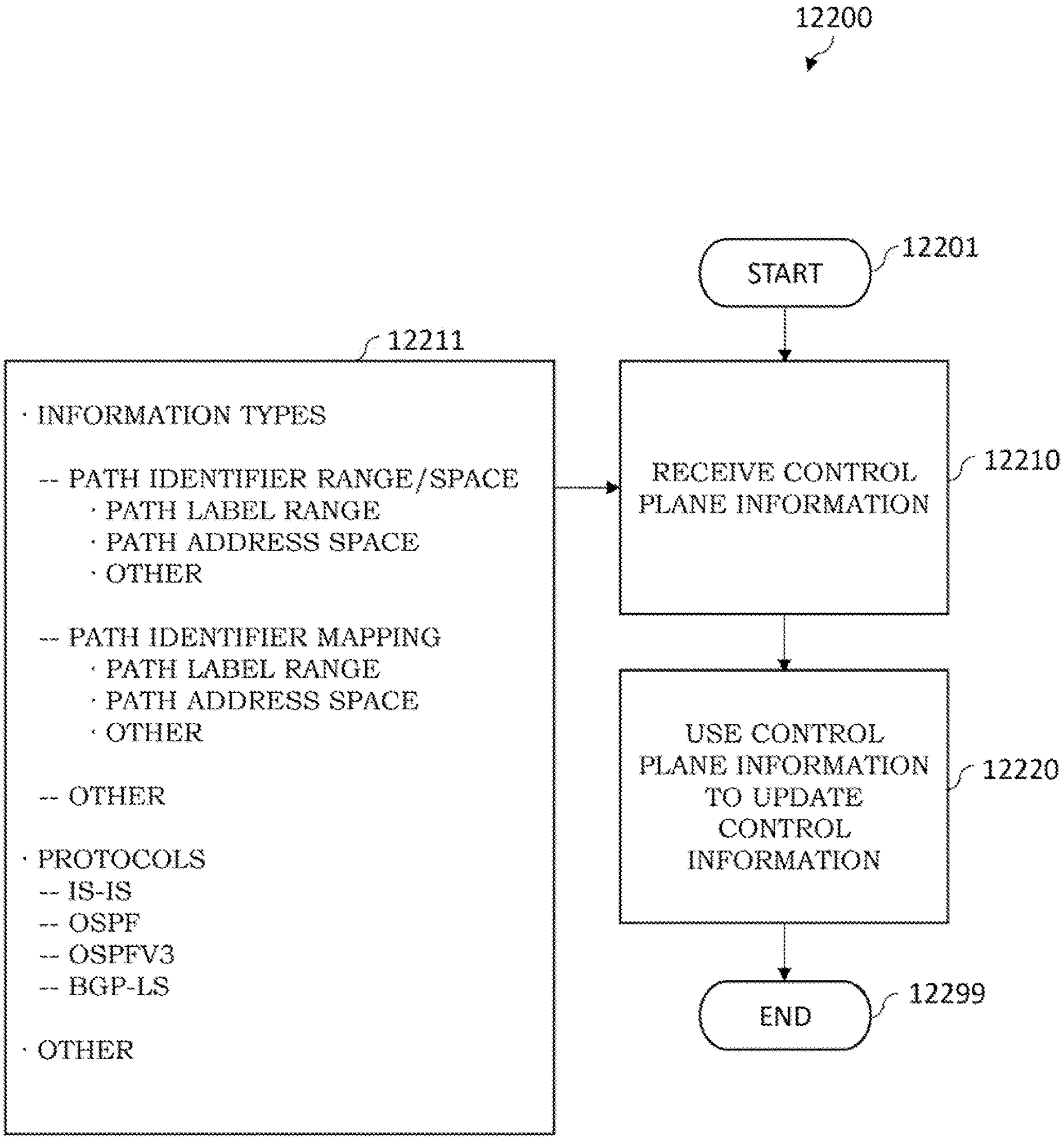

FIG. 122 depicts an example embodiment of a method for use by a network element to receive and use control plane information for supporting flow-specific fast rerouting of source routed packets based on path compression. It will be appreciated that, although primarily presented as being performed serially, at least a portion of the functions of method 12200 may be performed contemporaneously or in a different order than as presented in FIG. 122. At block 12201, method 12200 begins. At block 12210, control plane information is received. As indicated at block 12211, the control plane information may include various information types (e.g., path identifier range or space (e.g., path label range in MPLS, path address space in IPv4 or IPv6, or the like), path identifier mappings (e.g., path label mappings in MPLS, path address mappings in IPv4 or IPv6, or the like), or the like, as well as various combinations thereof), may be based on various protocols (e.g., IS-IS, OSPF, OSPFv3, BGP-LS, or the like, as well as various combinations thereof), or the like, as well as various combinations thereof. At block 12220, the control plane information is used to update control information (e.g., control information in the data plane of the network element, control information in the control plane of the network element, or the like, as well as various combinations thereof). The updating of the control information enables use of flow-specific fast rerouting of source routed packets by the network element based on path compression. At block 12299, method 12200 ends.

Various example embodiments for supporting flow-specific FRR of source routed packets based on path compression may provide various capabilities or advantages. In at least some embodiments, for example, various example embodiments for supporting flow-specific FRR of source routed packets may be configured to provide improved compression in source routing (e.g., based on use of path addresses in source routes, based on use of path addresses to encode protection paths configured to protect portions of source routes, or the like, as well as various combinations thereof). It is noted that various example embodiments for supporting flow-specific FRR of source routed packets based on path compression may provide various other capabilities or advantages.

Figure 123:
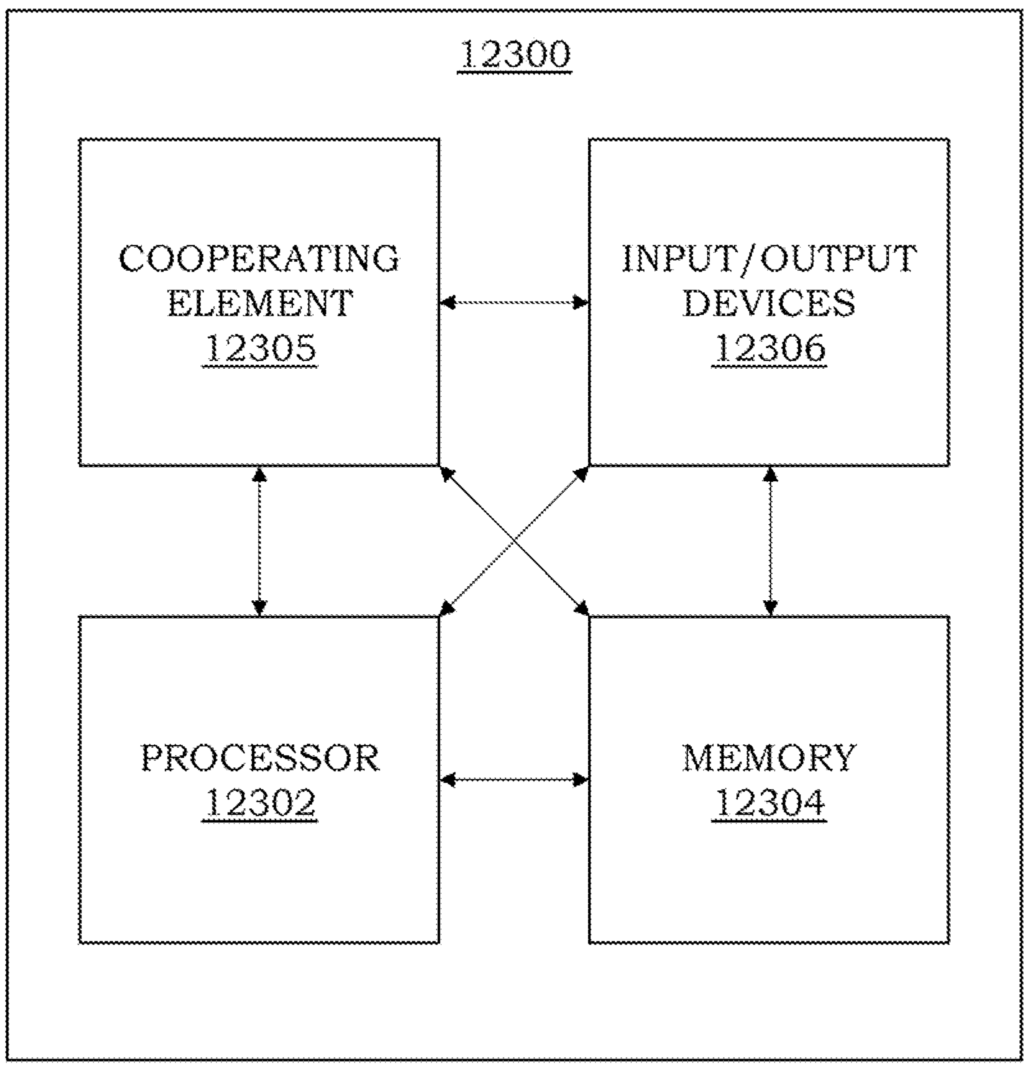

FIG. 123 depicts a high-level block diagram of a computer suitable for use in performing various functions described herein.

The computer 12300 includes a processor 12302 (e.g., a central processing unit (CPU), a processor having a set of processor cores, a processor core of a processor, or the like) and a memory 12304 (e.g., a random access memory (RAM), a read only memory (ROM), or the like). The processor 12302 and the memory 12304 are communicatively connected.

The computer 12300 also may include a cooperating element 12305. The cooperating element 12305 may be a hardware device. The cooperating element 12305 may be a process that can be loaded into the memory 12304 and executed by the processor 12302 to implement functions as discussed herein (in which case, for example, the cooperating element 12305 (including associated data structures) can be stored on a non-transitory computer-readable storage medium, such as a storage device or other storage element (e.g., a magnetic drive, an optical drive, or the like)).

The computer 12300 also may include one or more input/output devices 12306. The input/output devices 12306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 12300 of FIG. 123 may represent a general architecture and functionality suitable for implementing functional elements described herein, portions of functional elements described herein, or the like, as well as various combinations thereof. For example, computer 12300 may provide a general architecture and functionality that is suitable for implementing one or more elements presented herein.

It will be appreciated that various functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that various functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:

at least one processor; and at least one memory including computer program code;

wherein the at least one memory and the computer program code are configured to, with the at least one processor, cause the apparatus to at least:

handle a source routed packet including a header and a payload, wherein the header includes an encoding of a hop of a primary path, wherein the encoding of the hop of the primary path includes a hop identifier of the hop of the primary path, a path identifier representing a set of hops of a protection path configured to protect the hop of the primary path, and an indication that the encoding of the hop of the primary path includes the path identifier representing the set of hops of the protection path.

2. The apparatus of claim 1, wherein the indication that the encoding of the hop of the primary path includes the path identifier representing the set of hops of the protection path includes a label including a value configured to indicate that the encoding of the hop of the primary path includes the path identifier representing the set of hops of the protection path.

3. The apparatus of claim 1, wherein the encoding of the hop of the primary path includes a first label including the indication that the encoding of the hop of the primary path includes the path identifier representing the set of hops of the protection path, a second label including the hop identifier of the hop of the primary path, and a third label including the path identifier representing the set of hops of the protection path.

4. The apparatus of claim 1, wherein the encoding of the hop of the primary path includes an indication that the path identifier representing the set of hops of the protection path is to be skipped when the protection path is not used for the source routed packet.

5. The apparatus of claim 1, wherein the encoding of the hop of the primary path includes an indication of a quantity of hops in the primary path to be skipped when the protection path is used for the source routed packet.

6. The apparatus of claim 1, wherein the encoding of the hop of the primary path includes an indication that the path identifier representing the set of hops of the protection path is to be skipped when the protection path is not used for the source routed packet and an indication of a quantity of hops in the primary path to be skipped when the protection path is used for the source routed packet.

7. The apparatus of claim 6, wherein the encoding of the hop of the primary path includes a label including a first field including the indication that the path identifier representing the set of hops of the protection path is to be skipped when the protection path is not used for the source routed packet and a second field including the indication of the quantity of hops in the primary path to be skipped when the protection path is used for the source routed packet.

8. The apparatus of claim 1, wherein the indication that the encoding of the hop of the primary path includes the path identifier representing the set of hops of the protection path includes a field including a value indicative of a quantity of protection hops encoded within the source routed packet for the hop of the primary path.

9. The apparatus of claim 1, wherein the encoding of the hop of the primary path includes a first element and a second element, wherein the first element includes the hop identifier of the hop of the primary path, wherein the second element includes the path identifier representing the set of hops of the protection path.

10. The apparatus of claim 9, wherein the first element includes the indication that the encoding of the hop of the primary path includes the path identifier representing the set of hops of the protection path.

11. The apparatus of claim 9, wherein the second element includes an indication of a quantity of hops of the primary path to be skipped when the protection path is used for the source routed packet.

12. The apparatus of claim 9, wherein the first element includes a first sub-element including the hop identifier of the hop of the primary path and a second sub-element including a set of fields, wherein the set of fields includes a Number of Protection Hops field including the indication that the encoding of the hop of the primary path includes the path identifier representing the set of hops of the protection path, a Skip Count field, a Flags field, and a Reserved field.

13. The apparatus of claim 9, wherein the second element includes a first sub-element including the path identifier representing the set of hops of the protection path and a second sub-element including a set of fields, wherein the set of fields includes a Number of Protection Hops field, a Skip Count field including an indication of a quantity of hops of the primary path to be skipped when the protection path is used for the source routed packet, a Flags field, and a Reserved field.

14. The apparatus of claim 1, wherein the source routed packet is based on a Multiprotocol Label Switching (MPLS) source routing protocol, wherein the encoding of the hop of the primary path is based on a set of MPLS labels.

15. The apparatus of claim 1, wherein the source routed packet is based on an Internet Protocol (IP) source routing protocol, wherein one of:

the IP source routing protocol includes an IP version 4 (IPv4) source routing protocol and the encoding of the hop of the primary path is based on a set of fields of an IPv4 Options Header or a set of fields of an IPv4 Shim Header; or the IP source routing protocol includes an IP version 6 (IPv6) source routing protocol and the encoding of the hop of the primary path is based on a set of fields of an IPv6 Routing Header or a set of fields of an IPv6 Shim Header.

16. The apparatus of claim 1, wherein, to handle the source routed packet, the at least one memory and the computer program code are configured to, with the at least one processor, cause the apparatus to at least:

generate the header for the source routed packet;

associate the header for the source routed packet with the payload for the source routed packet to form the source routed packet; and send the source routed packet toward a network element.

17. The apparatus of claim 1, wherein, to handle the source routed packet, the at least one memory and the computer program code are configured to, with the at least one processor, cause the apparatus to at least:

receive the source routed packet;

process the source routed packet including removing the encoding of the hop of the primary path from the header of the source routed packet; and send the source routed packet toward the hop of the primary path based on a determination that the hop of the primary path is reachable.

18. The apparatus of claim 1, wherein, to handle the source routed packet, the at least one memory and the computer program code are configured to, with the at least one processor, cause the apparatus to at least:

receive the source routed packet;

process the source routed packet; and send the source routed packet toward a first hop of the protection path, using a fast reroute operation based on the path identifier representing the set of hops of the protection path, based on a determination that the hop of the primary path is not reachable.

19. A non-transitory computer-readable storage medium storing computer program code configured to cause an apparatus to at least:

handle a source routed packet including a header and a payload, wherein the header includes an encoding of a hop of a primary path, wherein the encoding of the hop of the primary path includes a hop identifier of the hop of the primary path, a path identifier representing a set of hops of a protection path configured to protect the hop of the primary path, and an indication that the encoding of the hop of the primary path includes the path identifier representing the set of hops of the protection path.

20. A method, comprising:

handling a source routed packet including a header and a payload, wherein the header includes an encoding of a hop of a primary path, wherein the encoding of the hop of the primary path includes a hop identifier of the hop of the primary path, a path identifier representing a set of hops of a protection path configured to protect the hop of the primary path, and an indication that the encoding of the hop of the primary path includes the path identifier representing the set of hops of the protection path.

* * * * *